US011715575B2

(12) United States Patent
Singh

(10) Patent No.: US 11,715,575 B2
(45) Date of Patent: Aug. 1, 2023

(54) NUCLEAR MATERIALS APPARATUS AND IMPLEMENTING THE SAME

(71) Applicant: Holtec International, Camden, NJ (US)

(72) Inventor: Krishna P. Singh, Jupiter, FL (US)

(73) Assignee: Holtec International

( * ) Notice: Subject to any disclaimer, the term of this patent is extended or adjusted under 35 U.S.C. 154(b) by 150 days.

(21) Appl. No.: 17/080,966

(22) Filed: Oct. 27, 2020

(65) Prior Publication Data

US 2021/0057118 A1 Feb. 25, 2021

Related U.S. Application Data

(63) Continuation-in-part of application No. 15/570,790, filed as application No. PCT/US2016/030809 on May (Continued)

(51) Int. Cl.
*G21F 5/08* (2006.01)
*G21F 5/005* (2006.01)

(Continued)

(52) U.S. Cl.
CPC ................ *G21F 5/005* (2013.01); *G21F 5/08* (2013.01); *G21F 5/10* (2013.01); *G21F 5/12* (2013.01); *G21F 9/34* (2013.01)

(58) Field of Classification Search
CPC ... G21F 5/10; G21F 5/008; G21F 5/12; G21F 5/14; B65D 25/22

(Continued)

(56) References Cited

U.S. PATENT DOCUMENTS 3,206,367 A 9/1965 Peuchmaur et al.
3,448,859 A 6/1969 Hall et al.

(Continued)

FOREIGN PATENT DOCUMENTS

CN 86100474 5/1987
CN 1208495 2/1999

(Continued)

OTHER PUBLICATIONS

International Search Report—PCT/US18/58198 dated Feb. 26, 2019, pp. 1-11.

(Continued)

*Primary Examiner* — Michael Maskell
(74) *Attorney, Agent, or Firm* — The Belles Group, P.C.

(57) ABSTRACT

An apparatus for supporting spent nuclear fuel including a plurality of wall plates arranged in an intersecting manner to define a basket apparatus extending along a longitudinal axis. The basket apparatus may include a plurality of fuel cells and a plurality of flux traps between adjacent fuel cells. A plurality of reinforcement members may be positioned in the flux traps and may extend between opposing ones of the wall plates that form the flux traps. Each of the wall plates may be a slotted wall plate. The slotted wall plates may be interlocked with one another to form the basket apparatus. Each of the slotted wall plates may include an upper edge, a lower edge, and a plurality of plate slots formed in each of the upper and lower edges. The plate slots of the slotted wall plates may receive intersecting slotted wall plates.

19 Claims, 96 Drawing Sheets

Related U.S. Application Data

4, 2016, now Pat. No. 10,854,346, application No. 17/080,966 is a continuation-in-part of application No. 16/690,228, filed on Nov. 21, 2019, now Pat. No. 10,861,612, which is a continuation of application No. 16/086,961, filed as application No. PCT/US2017/022648 on Mar. 16, 2017, now Pat. No. 10,515,730, application No. 17/080,966 is a continuation-in-part of application No. 16/520,698, filed on Jul. 24, 2019, now Pat. No. 11,081,248, which is a continuation of application No. 15/639,332, filed on Jun. 30, 2017, now Pat. No. 10,410,756, application No. 17/080,966 is a continuation-in-part of application No. 16/900,820, filed on Jun. 12, 2020, now abandoned, which is a continuation of application No. 16/175,143, filed on Oct. 30, 2018, now Pat. No. 10,714,223, application No. 17/080,966 is a continuation-in-part of application No. 16/407,992, filed on May 9, 2019, now Pat. No. 11,282,615, and a continuation-in-part of application No. 16/434,620, filed on Jun. 7, 2019, now Pat. No. 11,043,312, and a continuation-in-part of application No. 16/568,078, filed on Sep. 11, 2019, now Pat. No. 10,878,973.

(60) Provisional application No. 62/156,604, filed on May 4, 2015, provisional application No. 62/311,540, filed on Mar. 22, 2016, provisional application No. 62/357,603, filed on Jul. 1, 2016, provisional application No. 62/581,229, filed on Nov. 3, 2017, provisional application No. 62/669,665, filed on May 10, 2018, provisional application No. 62/681,731, filed on Jun. 7, 2018, provisional application No. 62/729,482, filed on Sep. 11, 2018.

(51) Int. Cl.
*G21F 9/34* (2006.01)
*G21F 5/12* (2006.01)
*G21F 5/10* (2006.01)

(58) Field of Classification Search
USPC ........................ 250/505.1, 506.1, 507.1, 517
See application file for complete search history.

(56) References Cited

U.S. PATENT DOCUMENTS 4,044,267 A 8/1977 Bevilacqua
4,177,385 A 12/1979 Bevilacqua
4,336,460 A 6/1982 Best et al.
4,457,888 A 7/1984 Vickrey, Jr.
4,525,324 A 6/1985 Spilker et al.
4,532,428 A 7/1985 Dyck et al.
4,543,488 A 9/1985 Diem
4,634,875 A 1/1987 Kugeler et al.
4,649,018 A 3/1987 Waltersdorf et al.
4,776,366 A 10/1988 Czerwinski et al.
4,781,883 A 11/1988 Daugherty et al.
4,800,283 A 1/1989 Efferding
4,825,088 A 4/1989 Nair et al.
4,834,916 A 5/1989 Chaudon
4,862,007 A 8/1989 Mallory
4,893,022 A 1/1990 Hall et al.
4,930,650 A 6/1990 Wells
5,056,408 A 10/1991 Joner et al.
5,061,858 A 10/1991 Mallory
5,406,600 A 4/1995 Jones et al.
5,448,604 A 9/1995 William
5,513,231 A 4/1996 Jones et al.
5,513,232 A 4/1996 Jones et al.
5,546,436 A 8/1996 Jones et al.
5,564,498 A 10/1996 Bochard
5,615,799 A 4/1997 Palazzo
5,651,038 A 7/1997 Chechelnitsky et al.
5,724,853 A 3/1998 Johansson
5,753,925 A 5/1998 Yamanaka et al.
5,786,611 A 7/1998 Quapp et al.
5,862,195 A 1/1999 Peterson, II
5,898,747 A 4/1999 Singh
5,926,516 A 7/1999 Rudnick et al.
6,252,923 B1 * 6/2001 Iacovino .................. G21F 5/06 250/370.06
6,442,227 B1 8/2002 Iacovino, Jr. et al.
6,519,307 B1 2/2003 Singh et al.
6,538,259 B2 3/2003 Matsunaga et al.
6,724,853 B2 4/2004 Gluschke et al.
6,741,669 B2 5/2004 LIndquist
6,778,625 B2 8/2004 Ohsono et al.
7,264,770 B2 9/2007 Andresen et al.
7,590,213 B1 9/2009 Singh
7,786,456 B2 8/2010 Singh et al.
7,864,914 B2 1/2011 Ishida et al.
7,893,414 B2 * 2/2011 Larsen ................. H01L 23/556 250/515.1
8,175,211 B2 5/2012 Ishida et al.
8,548,112 B2 10/2013 Singh et al.
8,576,973 B2 11/2013 Fantini
8,576,976 B2 11/2013 Singh et al.
8,630,384 B2 1/2014 Carver et al.
8,705,683 B2 4/2014 Tamaki
8,798,224 B2 8/2014 Singh
8,929,504 B2 1/2015 Singh et al.
9,105,365 B2 8/2015 Singh et al.
9,208,914 B2 * 12/2015 Singh ..................... G21F 5/002
9,275,768 B2 3/2016 Wegeler et al.
9,443,626 B2 9/2016 Bracey et al.
9,466,400 B2 10/2016 Singh et al.
9,640,289 B2 * 5/2017 Springman .............. G21F 9/34
9,685,248 B2 6/2017 Agace et al.
9,793,021 B2 10/2017 Carver et al.
9,831,006 B2 11/2017 Minor et al.
10,049,777 B2 8/2018 Singh
10,311,987 B2 6/2019 Singh et al.
10,410,756 B2 9/2019 Singh
10,446,285 B2 * 10/2019 Singh ....................... G21F 5/14
10,515,730 B2 12/2019 Singh et al.
10,714,223 B2 7/2020 Singh
10,854,346 B2 12/2020 Singh et al.
10,861,612 B2 12/2020 Singh et al.
10,878,973 B2 12/2020 Singh et al.
11,043,312 B2 6/2021 Singh
11,081,248 B2 8/2021 Singh
2002/0191730 A1 12/2002 Ohsono et al.
2003/0028065 A1 2/2003 Matsunaga et al.
2003/0147486 A1 8/2003 Singh et al.
2003/0223529 A1 12/2003 de la Pena et al.
2004/0067328 A1 4/2004 Taniuchi et al.
2005/0213698 A1 9/2005 Morishige
2005/0220257 A1 10/2005 Singh
2005/0224729 A1 10/2005 Tamaki
2006/0215803 A1 9/2006 Singh
2006/0219960 A1 * 10/2006 Shimojo .................. G21F 9/36 250/518.1
2008/0031396 A1 2/2008 Singh et al.
2008/0031397 A1 2/2008 Singh et al.
2008/0207977 A1 8/2008 Peterson
2008/0265182 A1 * 10/2008 Singh ....................... G21F 5/10 250/506.1
2009/0175404 A1 7/2009 Singh et al.
2009/0190711 A1 7/2009 Fantini
2010/0027733 A1 2/2010 Cantonwine et al.
2010/0230619 A1 * 9/2010 Tamaki .................... G21F 9/36 493/93
2010/0284506 A1 11/2010 Singh
2011/0122985 A1 5/2011 Tamaki
2011/0142189 A1 6/2011 Foussard et al.
2011/0255647 A1 10/2011 Singh
2011/0286567 A1 11/2011 Singh et al.
2012/0037632 A1 2/2012 Singh et al.
2012/0238200 A1 9/2012 Berkovitz

(56) References Cited

U.S. PATENT DOCUMENTS

| | | | |
|---|---|---|---|
| 2013/0045070 A1 | 2/2013 | Waisanen et al. | |
| 2013/0129043 A1 | 5/2013 | Morton et al. | |
| 2013/0322589 A1 | 12/2013 | Bracey et al. | |
| 2013/0343503 A1 | 12/2013 | Agace et al. | |
| 2014/0169515 A1 | 6/2014 | Singh et al. | |
| 2014/0247916 A1 | 9/2014 | Singh et al. | |
| 2014/0270042 A1 | 9/2014 | Dederer | |
| 2014/0329455 A1 | 11/2014 | Singh | |
| 2015/0284506 A1 | 2/2015 | Reyenge et al. | |
| 2015/0092904 A1* | 4/2015 | Carver | G21C 19/32 376/272 |
| 2015/0206610 A1 | 7/2015 | Carver et al. | |
| 2015/0211954 A1 | 7/2015 | Agace | |
| 2015/0243390 A1 | 8/2015 | Bracey et al. | |
| 2016/0005501 A1 | 1/2016 | Singh et al. | |
| 2016/0019991 A1* | 1/2016 | Dederer | G21H 1/10 376/272 |
| 2016/0035444 A1 | 2/2016 | Singh et al. | |
| 2016/0035446 A1 | 2/2016 | Cheng et al. | |
| 2016/0196887 A1 | 7/2016 | Singh et al. | |
| 2017/0110210 A1 | 4/2017 | Singh | |
| 2017/0316843 A1 | 11/2017 | Agace et al. | |
| 2017/0372806 A1 | 12/2017 | Singh et al. | |
| 2018/0005717 A1 | 1/2018 | Singh et al. | |
| 2018/0075933 A1 | 3/2018 | Al Rashdan | |
| 2018/0122527 A1 | 5/2018 | Singh et al. | |
| 2018/0130566 A1 | 5/2018 | Hida et al. | |
| 2018/0144841 A1 | 5/2018 | Singh | |
| 2019/0103197 A1 | 4/2019 | Singh et al. | |
| 2019/0131024 A1 | 5/2019 | Pfeifer et al. | |
| 2019/0139661 A1 | 5/2019 | Singh | |

FOREIGN PATENT DOCUMENTS

| | | |
|---|---|---|
| CN | 107533873 | 1/2018 |
| DE | 3015553 | 10/1981 |
| EP | 0107889 | 5/1984 |
| FR | 2968822 | 6/2012 |
| JP | S57160699 A | 10/1982 |
| JP | 2000-098082 A | 4/2000 |
| JP | 2000-275396 A | 10/2000 |
| JP | 2001-133590 A | 5/2001 |
| JP | 2009-300251 | 12/2009 |
| JP | 2010-175331 | 8/2010 |
| JP | 2011-058845 | 3/2011 |
| JP | 2017-524912 A | 8/2017 |
| WO | WO2013/096966 A1 | 6/2013 |
| WO | WO2014/117082 | 7/2014 |
| WO | WO2006/005891 | 1/2016 |
| WO | WO2017/087106 | 5/2017 |

OTHER PUBLICATIONS

L. Caseres et al., Atmospheric Stress Corrosion Cracking Susceptibility of Welded and Unwelded 304, 304L, and 316L Austenitic Stainless Steels Commonly Used for Dry Cask Storage Containers Exposed to Marine Environments, Office of Nuclear Regulatory Research, U.S.NRC, Oct. 2010.

CN First Office Action—Search Report, dated Dec. 18, 2018 by the Chinese Patent Office, Corresponding Family CN Application No. 2017800001612, Office Action pp. 1-4 and Search Report pp. 1-2.

International Search Report for Corresponding Application No. PCT/US17/22648 dated Jun. 9, 2017.

International Search Report for International Application No. PCT/US19/50674 dated Feb. 11, 2020.

Corresponding European Search Report from EP Application No. 17179187 dated Nov. 24, 2017, pp. 1-9.

Corresponding International Search Report and Written Opinion from PCT/US2017/040357 dated Sep. 14, 2017, pp. 1-12.

International Search Report and Written Opinion for International Application No. PCT/US2019/036019 dated Aug. 27, 2019.

International Search Report and Written Opinion for International Application No. PCT/US2019-031594 dated Jul. 23, 2019.

Corresponding International Search Report and Written Opinion for PCT/US16/30809 dated Sep. 9, 2016. WO.

* cited by examiner

NUCLEAR MATERIALS APPARATUS AND IMPLEMENTING THE SAME

CROSS-REFERENCE TO RELATED APPLICATIONS

This application is a continuation-in-part of U.S. patent application Ser. No. 15/570,790, filed Oct. 31, 2017, which is a U.S. national stage application under 35 U.S.C. § 371 of PCT Application No. PCT/US2016/030809, filed May 4, 2016, which claims the benefit of U.S. Provisional Application No. 62/156,604, filed May 4, 2015. The entireties of the foregoing applications are incorporated herein by reference.

This application is also a continuation-in-part of U.S. patent application Ser. No. 16/690,228, filed Nov. 21, 2019, which is a continuation of U.S. patent application Ser. No. 16/086,961, filed Sep. 20, 2018, (now U.S. Pat. No. 10,515,730), which is a U.S. national stage application under 35 U.S.C. § 371 of PCT Application No. PCT/US2017/022648, filed Mar. 16, 2017, which claims the benefit of U.S. Provisional Patent Application Ser. No. 62/311,540, filed Mar. 22, 2016. The entireties of the foregoing applications are incorporated herein by reference.

This application is also a continuation-in-part of U.S. patent application Ser. No. 16/520,698, filed Jul. 24, 2019, which is a continuation of U.S. patent application Ser. No. 15/639,332, filed Jun. 30, 2017, (now U.S. Pat. No. 10,410,756), which claims the benefit of U.S. Provisional Patent Application Ser. No. 62/357,603, filed Jul. 1, 2016. The entireties of the foregoing applications are incorporated herein by reference.

This application is also a continuation-in-part of U.S. patent application Ser. No. 16/900,820, filed Jun. 12, 2020, which is a continuation of U.S. patent application Ser. No. 16/175,143 filed Oct. 30, 2018, (now U.S. Pat. No. 10,714,223), which claims the benefit of U.S. Provisional Patent Application No. 62/581,229, filed Nov. 3, 2017. The entireties of the foregoing applications are incorporated herein by reference.

This application is also a continuation-in-part of U.S. patent application Ser. No. 16/407,992, filed May 9, 2019, which claims the benefit of U.S. Provisional Application No. 62/669,665 filed May 10, 2018. The entireties of the foregoing applications are incorporated herein by reference.

This application is also a continuation-in-part of U.S. patent application Ser. No. 16/434,620, filed Jun. 7, 2019, which claims the benefit of U.S. Provisional Application No. 62/681,731, filed Jun. 7, 2018. The entireties of the foregoing applications are incorporated herein by reference.

The application is also a continuation-in-part of U.S. patent application Ser. No. 16/568,078, filed Sep. 11, 2019, which claims the benefit of U.S. Provisional Application No. 62/729,482 filed Sep. 11, 2018. The entireties of the foregoing applications are incorporated herein by reference.

The entirety of each of the aforementioned applications is incorporated herein by reference.

BACKGROUND

The present invention relates generally to an apparatus for supporting spent nuclear fuel, and more specifically to a fuel basket for spent nuclear fuel and a container implementing the same. There are two different types of fuel baskets that dominate the industry: flux trap baskets and non-flux trap baskets. Flux trap baskets require an additional empty space between each fuel cell, which results in the flux trap baskets having a reduced capacity relative to non-flux trap baskets. The size of the flux trap baskets are governed by the number of cells, the size of the cells, and the thickness of the material used to form the baskets. It may be possible to increase capacity (increase the number of cells) by decreasing the thickness of the material used to form the basket while not increasing the overall area of the basket. However, material thickness is dictated by the structural resistance required to withstand regulatory normal conditions, off-normal conditions, and accident events. Thus, there is great hesitancy in the industry to reduce the material thickness, and in fact such thickness reductions without additional modification may not pass required agency approvals. Thus, a need exists for an improvement in flux trap fuel baskets that enables the wall thickness of the baskets to be decreased, thereby increasing overall capacity and performance.

In the operation of nuclear reactors, it is customary to remove fuel assemblies after their energy has been depleted down to a predetermined level. Upon removal, the spent nuclear fuel (hereinafter, "SNF") is still highly radioactive and produces considerable heat, requiring that great care be taken in its packaging, transporting, and storing. In order to protect the environment from radiation exposure, SNF is first placed in a hermetically sealed canister that creates a confinement boundary about the SNF. The loaded canister is then transported and stored in a large cylindrical container called a cask. Generally, a transfer cask is used to transport SNF from location to location while a storage cask is used to store SNF for a determined period of time.

One type of storage cask is a ventilated vertical overpack ("VVO"). A VVO is a massive structure made principally from steel and concrete and is used to store a canister loaded with SNF. In using a VVO to store SNF, a canister loaded with SNF is placed in the cavity of the body of the VVO. Because the SNF is still producing a considerable amount of heat when it is placed in the VVO for storage, it is necessary that the cavity is vented so that this heat energy has a means to escape from the VVO cavity. It is also imperative that the VVO provide adequate radiation shielding and that the SNF not be directly exposed to the external environment. Thus, a need exists for a VVO system for the storage of radioactive materials that provides enhanced ventilation, reduces the likelihood of radiation exposure, and provides sufficient radiation blockage of both gamma and neutron radiation emanating from the high level radioactive waste.

Heavy casks containing hazardous materials such as high level nuclear waste and fissile materials are typically handled by a set of trunnions. The trunnions are generally made of a cylindrical bar stock welded to a hard location near the top of the cask. The trunnion must project out sufficiently to provide an engagement shoulder for a lift yoke to engage it. This projection, however, is a problem where the cask must be designed to withstand a free fall event such as that required for transport casks containing used nuclear fuel. The federal regulations and the IAEA standards require the cask to be qualified under a free fall event from a height of 30 feet onto an essentially unyielding surface under any orientation of impact. In such a case, the cask may be equipped with an impact limiter at each extremity to absorb the kinetic energy of impact by crushing. The projection of the trunnion, made of a high strength steel or other alloy material, however, interferes with the crushing action of the impact limiter if the impact orientation of the cask is aligned with the plane of the trunnion. The solution to this design problem thus far has been to tap the trunnions and thread them into the cask's flange. The trunnion is removed when not in use to eliminate the threat of trunnion penetration during the above-mentioned design basis accident event. This approach has three major shortcomings:

(1) The threaded joint sometimes freezes under the bending moment from the lifted load making the trunnion's subsequent removal problematic;

(2) It may not be possible to handle the cask without the trunnions in place (after all, their sole purpose is to enable cask's handling); and (3) The trunnions are restricted to be located in the neck of the cask so that its projection beyond the cask's body is minimized.

The above limitations make the conventional trunnion design a rather unsatisfactory embodiment. Thus, a need exists for a trunnion design that overcomes the aforementioned deficiencies.

In the operation of nuclear reactors, it is customary to remove fuel assemblies after their energy has been depleted down to a predetermined level. Upon removal, this spent nuclear fuel ("SNF") is still highly radioactive and produces considerable heat, requiring that great care be taken in its packaging, transporting, and storing. In order to protect the environment from radiation exposure, SNF is first placed in a canister, which is typically a hermetically sealed canister that creates a confinement boundary about the SNF. The loaded canister is then transported and stored in a large cylindrical container called a cask. Generally, a transfer cask is used to transport spent nuclear fuel from location to location while a storage cask is used to store SNF for a determined period of time. Such storage casks may be vertically oriented or horizontally oriented.

The decay heat generated in a canister in a typical ventilated storage module is rejected to the environment by the air entering the storage space near the bottom and exiting near the top. The upward flow of the ventilation air is actuated and sustained by the heat delivered from the SNF convectively raising its temperature as it rises inside the module. Regardless of the flow configuration, as the air heats up during its upwards movement in the storage module cavity, it becomes lighter in density and its relative humidity decreases, i.e., it becomes drier.

Stress Corrosion Cracking (SCC) of stainless steel nuclear waste canisters and containers in storage at costal sites with harsh marine environments is an important issue receiving increased industry and regulatory scrutiny. Canister designers and manufactures take preventative measures to minimize the chance of SCC developing by maintaining controlled temperatures during welding processes and engineering large conservative margins into canisters to keep stresses at a minimum. Investigations on SCC have demonstrated that SCC has a strong dependence on the surface temperature of the stainless steel canister. The dependence on the surface temperature is driven by the mechanism of the deposit of airborne contaminants (e.g. chlorides) and subsequent deliquesce of those contaminants on the stainless steel surface. It is known that dry air (defined as its relative humidity below 20%) cannot cause stress corrosion cracking. A higher surface temperature decreases the relative humidity of the air adjacent to the surface and prevents deliquesce the contaminants and subsequent penetration into the stainless steel surface, a precursor for SCC.

This means that if there is a sufficient amount of decay heat available, only a short lowermost region of the vertical canister and the bottom half of the horizontal canister are vulnerable to Stress Corrosion Cracking (hereinafter, "SCC"); the balance of the canister is not. The limited vulnerable region can be protected from SCC by other means such as peening. The problem arises, however, when the decay heat progressively declines with the passage of time, the heating of air becomes much slower making a greater portion of the canister vulnerable to SCC.

Thus, a need exists to reduce or prevent the risk of stress corrosion from spreading over the surface of a horizontal or vertical canister.

The present invention relates generally to casks used to transport and store spent nuclear fuel created by nuclear generating plants or other facilities, and more particularly to such casks which incorporate a radiation does attenuation device.

In the operation of nuclear reactors, the nuclear energy source is in the form of hollow zircaloy tubes filled with enriched uranium, collectively arranged in assemblages referred to as fuel assemblies. When the energy in the fuel assembly has been depleted to a certain predetermined level, the fuel assembly is removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a metallic storage canister which is placed into a ventilated outer overpack or cask for safe transport or storage of the multiple spent fuel assemblies within the inner fuel basket. Such outer casks are generally constructed to provide enhanced radiation shielding including metallic inner and outer cylindrical walls with a concrete mass or liner disposed therebetween for radiation shielding.

The spent nuclear fuel ("SNF") in the fuel assemblies is still highly radioactive and produces considerable heat which must be dissipated, in addition to concomitantly emitting dangerous ionizing neutron and gamma photons (i.e. neutron and gamma radiation) requiring protective shielding. Thus, great caution must be exercised when the fuel assemblies are handled, transported, packaged and stored. Neutron radiation may be effectively attenuated with metallic and polymeric shielding materials containing boron which may be incorporated into the storage cells of the spent nuclear fuel baskets. These boron-containing materials however are not effective at attenuating and shielding gamma radiation emitted from the fuel baskets. Effective gamma radiation shielding requires very dense materials, such as lead or others. Heretofore, spent nuclear fuel baskets have not addressed the issue of gamma radiation shielding.

The fuel assembly storage canister held inside the outer cask provides an opportunity to enhance gamma radiation shielding. The cross sectional opening of the fuel basket storage cell, each of which hold a single spent fuel assembly, is typically at least 6 mm, and sometimes as large as 10 mm greater than the fuel assembly's square cross section to facilitate its insertion and removal into the reactor and eventual placement in the fuel basket storage cell taking into account the bow and camber that some fuel assemblies may suffer and develop during their irradiation in the reactor. Some peripheral clearance in the storage cell is also typically required to accommodate a damaged fuel assembly that has been physically damaged and is no longer in-tact for normal handling.

A need exists for gamma radiation shielding of spent nuclear fuel canisters which preferably also takes into account the need to effectively dissipate the excessive heat still generated by the decaying nuclear fuel in the canister during transport or storage.

The present invention relates generally to casks used to transport and store spent nuclear fuel created by nuclear generating plants or other facilities.

In the operation of nuclear reactors, the nuclear energy source is in the form of hollow zircaloy tubes filled with enriched uranium, collectively arranged in assemblages referred to as fuel assemblies. When the energy in the fuel assembly has been depleted to a certain predetermined level, the fuel assembly is removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a metallic storage canister which is placed into a ventilated outer overpack or cask for safe transport or storage of the multiple spent fuel assemblies within the inner fuel basket.

The spent nuclear fuel ("SNF") in the fuel assemblies is still highly radioactive and produces considerable heat which must be dissipated, in addition to concomitantly emitting dangerous ionizing neutron and gamma photons (i.e. neutron and gamma radiation) requiring protective shielding. Thus, caution must be exercised when the fuel assemblies are handled, transported, packaged and stored. Neutron radiation may be effectively attenuated with metallic and polymeric shielding materials typically containing boron. These boron-containing materials however are not effective at attenuating and shielding gamma radiation emitted from the fuel baskets. Effective gamma radiation shielding requires very dense materials, such as lead or others.

A typical transfer cask features a main body designed to structurally protect the spent nuclear fuel stored in the fuel canister inside it. A common configuration consists of concentrically arranged steel shells filled with lead. Such a cask body made with high-density conductive materials has excellent heat conduction and gamma radiation shielding capabilities, but unfortunately possesses a relatively modest neutron capture capability. For capturing neutrons, a hydrogenous material is needed which is generally provided by a jacket filled with water or a solid resinous material integrally and permanently joined to the main cask body.

This traditional transfer cask design suffers from several drawbacks which makes it marginal or unsuitable for loading canisters with high decay heat generation rates (i.e., in excess of 40 kW), in locations where the crane capacity is less than what is typically needed to load such a heavy transfer cask with inserted canister, or where the facility's cask loading area dimensions or spatial constraints prevent the placement of a traditional large-sized high-capacity transfer cask.

Improvements in the traditional transfer cask design to extend the applicability and versatility of transfer casks which overcomes the foregoing crane capacity and spatial constraint situations noted above are desired.

The present invention relates generally to ventilated dry storage modules used to store and/or transport heat-emitting spent nuclear fuel ("SNF") from nuclear power generating plants or other facilities.

In the operation of nuclear reactors, the nuclear energy source is typically in the form of a plurality of hollow Zircaloy tubes each filled with enriched uranium pellets, which are collectively arranged in assemblages referred to as fuel assemblies. When the energy in the fuel assembly has been depleted to a certain predetermined level, the fuel assembly is removed from the nuclear reactor and referred to as used or spent nuclear fuel ("SNF"). The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly each of which in turn comprises a plurality of individual spent nuclear fuel rods. The fuel basket is arranged inside a metallic storage canister, which in turn is placed inside a ventilated outer overpack or module for safe transport and/or storage of the multiple spent fuel assemblies within the inner fuel basket.

In addition to emitting dangerous ionizing neutron and gamma photons (i.e. neutron and gamma radiation) requiring protective shielding, the highly radioactive SNF in the fuel assemblies still produces considerable heat which must be dissipated to avoid damage to the fuel assemblies. Cooling of conventional ventilated modules suffers from several drawbacks. The cooling air inlets are typically close to the support pad and susceptible to blockage by snow, debris, or runoff and floor waters at outdoor flood prone sites. In unsheltered locations, the variability in wind direction with respect to the location of cooling air inlet and outlet duct locations may adversely impact the air flow rate and cooling of the fuel assemblies. At sunny sites, the support pad absorbs solar radiation which heats the pad, thereby in turn heating the incoming air as it passes over the pad since the air inlets are close to the pad. This adversely affects cooling performance and efficiency resulting in inadequate cooling of the fuel assemblies held inside the outer storage module.

A need exists for improved nuclear fuel storage modules.

BRIEF SUMMARY

The present application is directed to an apparatus for supporting spent nuclear fuel. The apparatus may include a basket apparatus that is designed to be inserted into a cavity of a container. The basket apparatus may be formed by arranging a plurality of slotted plates in an intersecting manner, although other designs for the basket apparatus that do not include use of such slotted plates may also be used to form the basket apparatus. The slotted plates may form fuel cells for storing fuel assemblies with spent nuclear fuel rods therein and flux trap spaces between adjacent ones of the fuel cells. Furthermore, the apparatus may include reinforcement members positioned in the flux traps to increase the structural strength of the basket apparatus.

In one aspect, the invention may be an apparatus for supporting spent nuclear fuel, the apparatus comprising: a plurality of wall plates arranged in an intersecting manner to define a basket apparatus extending along a longitudinal axis, the basket apparatus comprising a plurality of fuel cells and a plurality of flux traps between adjacent ones of the fuel cells; and a plurality of reinforcement members positioned in the flux traps and extending between opposing ones of the wall plates that form the flux traps.

In another aspect, the invention may be an apparatus for supporting spent nuclear fuel, the apparatus comprising: a plurality of wall plates forming a basket apparatus comprising a plurality of fuel cells and a plurality of flux traps between adjacent ones of the fuel cells; the basket apparatus extending along a longitudinal axis and comprising a topmost axial portion, a bottom-most axial portion, and a middle portion; a first set of reinforcement members positioned in lower portions of the flux traps formed by the bottom-most axial portion of the basket apparatus, the reinforcement members of the first set extending between sections of opposing ones of the wall plates that form the lower portions of the flux traps; a second set of reinforcement members positioned in upper portions of the flux traps formed by the top-most axial portion of the basket apparatus, the reinforcement members of the second set extending between sections of opposing ones of the wall plates that form the upper portions of the flux traps; and a plurality of fuel assemblies disposed in the fuel cells, each of the fuel assemblies comprising a plurality of spent nuclear fuel rods supported between two end caps.

In yet another embodiment, the invention may be an apparatus for supporting spent nuclear fuel, the apparatus comprising: a plurality of wall plates forming a basket apparatus comprising a plurality of fuel cells and a plurality of flux traps between adjacent ones of the fuel cells, the wall plates comprising reinforcement slots; a plurality of reinforcement members, each of the reinforcement members comprising a body portion and first and second flange portions protruding from opposite sides of the body portion; the reinforcement members positioned in the flux traps so that: (1) the first and second flange portions nest within the reinforcement slots of opposing ones of the wall plates that form the flux traps; and (2) the body portion abuts outer surfaces of the opposing ones of the wall plates, thereby maintaining a fixed distance between the outer surface of the opposing ones of the slotted wall plates.

In still another embodiment, the invention may be an apparatus for supporting spent nuclear fuel, the apparatus comprising: a plurality of wall plates forming a basket apparatus that extends along a longitudinal axis and comprises a plurality of fuel cells and a plurality of flux traps between adjacent ones of the fuel cells; and a plurality of reinforcement members positioned in the flux traps and extending between opposing ones of the wall plates that form the flux traps, the reinforcement members arranged in a plurality of longitudinal groups, each of the longitudinal groups comprising a subset of the reinforcement members arranged in a spaced apart manner along a group axis that is substantially parallel to the longitudinal axis.

The present invention, in one aspect, is a ventilated apparatus having specially designed inlet ducts that allow a canister loaded with SNF (or other radioactive materials) to be positioned within the ventilated apparatus so that a bottom end of the canister is below a top of the inlet ducts while still preventing radiation from escaping through the inlet ducts. This aspect of the present invention allows the ventilated apparatus to be designed with a minimized height because the canister does not have to be supported in a raised position above the inlet ducts within the cavity of the ventilated apparatus. Thus, it is possible for the height of the cavity of the ventilated apparatus to be approximately equal to the height of the canister, with the addition of the necessary tolerances for thermal growth effects and to provide for an adequate ventilation space above the canister.

In one embodiment, the invention can be ventilated apparatus for transporting and/or storing radioactive materials comprising: an overpack body having an outer surface and an inner surface forming an internal cavity about a longitudinal axis; a base enclosing a bottom end of the cavity; a lid enclosing a top end of the cavity; a plurality of outlet ducts, each of the outlet ducts forming an air outlet passageway from a top portion of the cavity to an external atmosphere; a bottom portion of the overpack body formed by a plurality of curved segments, each of the curved segments extending circumferentially from a first end wall having a convex portion to a second end wall having a concave portion; and the curved segments circumferentially surrounding the longitudinal axis and arranged in an intermeshing configuration such that for all adjacent curved segments: (1) the convex portion of the first end wall of one of the curved segments at least partially nests within the concave portion of the second end wall of an adjacent one of the curved segments; and (2) the convex portion of the first end wall of the one of the curved segments is spaced from the concave portion of the second end wall of the adjacent one of the curved segments, thereby forming an inlet duct forming an air inlet passageway from the external atmosphere to a bottom portion of the cavity.

In another embodiment, the invention can be a ventilated apparatus for transporting and/or storing radioactive materials comprising: an overpack body having an outer surface and an inner surface forming an internal cavity about a longitudinal axis; a base enclosing a bottom end of the cavity; a lid enclosing a top end of the cavity; a plurality of outlet ducts, each of the outlet ducts forming an air outlet passageway from a top portion of the cavity to an external atmosphere; a bottom portion of the overpack body formed by a plurality of segments, each of the segments extending from a first end wall having a projection to a second end wall having a channel; and the segments circumferentially surrounding the longitudinal axis and arranged in an intermeshing and spaced-apart configuration such that the projections of the first end walls of the segments project into the channels of the second end walls of adjacent ones of the segments, thereby forming an inlet duct between adjacent ones of the segments that includes an air inlet passageway from the external atmosphere to a bottom portion of the cavity through which a line of sight does not exist from the cavity to the external atmosphere.

In yet another aspect, the invention can be a ventilated apparatus for transporting and/or storing radioactive materials comprising: an overpack body having an outer surface, an inner surface forming an internal cavity about a longitudinal axis, and a top surface; a base enclosing a bottom end of the cavity; a plurality of air inlet ducts, each of the air inlet ducts forming an air inlet passageway from an external atmosphere to a bottom portion of the cavity; and a lid enclosing a top end of the cavity, the lid configured so that a plurality of air outlet passageways are at least partially defined by an interface between the lid and the top surface of the overpack body, each of the air outlet passageways extending from a top portion of the cavity to the external atmosphere.

The present invention, in one aspect, is a container for storing and/or transporting spent nuclear fuel. The container includes a body that defines an internal cavity that holds the spent nuclear fuel and an outer surface. The outer surface has holes formed therein into which trunnions are positioned. The container can be lifted by a lift yoke by coupling the lift yoke to the trunnions. The trunnions may include first and second components such that the first component is slidable in its axial direction relative to the second component when a force that exceeds a threshold acts on the second component. Thus, the second component may be slidable between a protruded state in which a portion of the second component protrudes from the outer surface of the body and a retracted state in which the second component does not protrude from the outer surface of the body.

In one aspect, the invention can be a container for storing and/or transporting spent nuclear fuel comprising: a body having an outer surface and an inner surface defining an internal cavity; a plurality of blind holes formed into the body, each of the blind holes defined by a floor and a sidewall extending from the floor to an opening in the outer surface of the body; a plurality of trunnions coupled to the body, each of the trunnions comprising: a first component located within one of the blind holes, the first component extending from a first end to a second end and having an inner surface defining a hollow interior; and a second component at least partially located within the hollow interior of the first component, the second component extending from a first end to a second end along a longitudinal axis; and wherein for each of the plurality of trunnions, the second component is axially slidable relative to the first component between: (1) a protruded state in which a portion of the second component protrudes from the outer surface of the body; and (2) a retracted state in which the second component does not protrude from the outer surface of the body In another aspect, the invention can be a container for storing and/or transporting spent nuclear fuel comprising: a body having an outer surface and an inner surface defining an internal cavity configured to hold spent nuclear fuel; a hole formed into the body, the hole defined by a floor and a sidewall extending from the floor to an opening in the outer surface of the body; a trunnion coupled to the body within the hole, the trunnion comprising: a first component welded to the body within the hole, the first component having a first end that is in contact with the floor of the hole, a second end that is flush with or recessed relative to the outer surface of the body, an outer surface that is in contact with the sidewall of the hole, and an inner surface that defines a hollow interior; and a second component located within the hollow interior of the first component, the second component extending from a first end to a second end along a longitudinal axis, the second component comprising a first portion that is located within the hollow interior of the first component and spaced from the floor of the hole by a gap and a second portion that protrudes from the outer surface of the body; and wherein upon application of an axial force that exceeds a predetermined threshold onto the second end of the second component, the second component slides relative to the first component in an axial direction into the gap.

In yet another aspect, the invention can be a container for storing and/or transporting spent nuclear fuel comprising: a body having an outer surface and an inner surface defining an cavity; a lid enclosing a top end of the cavity, the lid having a bottom surface facing the cavity and an opposite top surface; at least one lifting lug coupled to the lid, the lifting lug comprising: a first component coupled to the lid and protruding from the top surface of the lid, the first component having a top surface and an inner surface that defines a hollow interior; and a second component coupled to the first component and extending from a first end to a second end along a longitudinal axis, the second component having a first portion located within the hollow interior of the first component and a second portion protruding from the top surface of the first component; and wherein upon application of a compression force that exceeds a predetermined threshold onto the second component, the second component axially slides relative to the first component until a top surface of the second component is flush with or recessed relative to the top surface of the first component.

In a further aspect, the invention can be a container for storing and/or transporting spent nuclear fuel comprising: a body having an outer surface and an inner surface defining an internal cavity; a lid enclosing a top end of the cavity, the lid having a bottom surface facing the cavity and an opposite top surface; at least one lifting lug coupled to the lid, the lifting lug comprising: a first component coupled to the lid and protruding from the top surface of the lid, the first component having an inner surface that defines a hollow interior and a top surface; and a second component coupled to the first component and at least partially located within the hollow interior of the first component, the second component extending from a first end to a second end along a longitudinal axis; and wherein the second component of the lifting lug is axially slidable relative to the first component of the lifting lug between: (1) a protruded state in which a portion of the second component protrudes from the top surface of the first component; and (2) a retracted state in which the second portion of the lifting lug does not protrude from the top surface of the first component of the lifting lug.

In a still further aspect, the invention can be a container for storing and/or transporting spent nuclear fuel comprising: a body having an outer surface and an inner surface defining an internal cavity; a plurality of blind holes formed into the body, each of the blind holes defined by a floor and a sidewall extending from the floor to an opening in the outer surface of the body; a plurality of trunnions, each of the trunnions located within one of the blind holes and extending from a first end to a second end along a longitudinal axis; and wherein at least one of the plurality of trunnions is axially slidable relative to the body between: (1) a protruded state in which a portion of the trunnion protrudes from the outer surface of the body; and (2) a retracted state in which the trunnion does not protrude from the outer surface of the body.

In a yet further aspect, the invention may be a lifting lug comprising: a first component having an inner surface that defines a hollow interior and a top surface; a second component at least partially located within the hollow interior of the first component, the second component extending from a first end to a second end along a longitudinal axis; and wherein the second component of the lifting lug is axially slidable relative to the first component of the lifting lug between: (1) a protruded state in which a portion of the second component protrudes from the top surface of the first component; and (2) a retracted state in which the second portion of the lifting lug does not protrude from the top surface of the first component of the lifting lug.

In another aspect, the invention may be a container for storing and/or transporting spent nuclear fuel comprising: a body having an outer surface and an inner surface defining an internal cavity; a canister containing radioactive materials located in the internal cavity; at least one lifting device coupled to the body; wherein the lifting device is collapsible between: (1) a non-collapsed state; and (2) a collapsed state; and wherein in the non-collapsed state the lifting device protrudes a greater distance from the outer surface of the body than in the non-collapsed state.

Exemplary embodiments according to the present disclosure are directed to a method of storing high level radioactive waste, and specifically a method of adjusting or controlling the temperature of ventilation air flowing through a storage cavity of a ventilated system. The method includes positioning a metal canister containing high level radioactive waste in a storage cavity of the ventilated system. The ventilated system includes a cask body, a cask lid, a plurality of inlet ducts, and at least one outlet duct so that ventilation air can flow from atmosphere into the storage cavity where it is heated and then back out to the atmosphere. The method includes progressively reducing a cross-sectional area of one or more of the inlet ducts and/or the outlet duct over time so that a rate at which the ventilation air is heated within the storage cavity is maintained above a predetermined threshold to mitigate the risk of stress corrosion cracking in the metal canister.

In one aspect, the invention may be a method of storing high level radioactive waste comprising: a) positioning a metal canister containing high level radioactive waste in a storage cavity of a ventilated system comprising a cask body, a cask lid positioned atop the cask body, at least one outlet duct extending from a top of the storage cavity to an ambient atmosphere, and a plurality of inlet ducts, the plurality of inlet ducts having a combined cross-sectional area that is a sum of a cross-sectional area of each of the inlet ducts of the plurality of inlet ducts; b) convectively flowing ventilation air from the ambient atmosphere into a bottom of the storage cavity through the inlet ducts, the ventilation air being heated at a heating rate and rising from the bottom of the storage cavity to the top of the storage cavity, the ventilation air exiting the storage cavity through the at least one outlet duct; and c) progressively reducing the combined cross-sectional area of the plurality of inlet ducts over time to reduce an amount of the ventilation air that enters the storage cavity and maintain the heating rate of the ventilation air above a predetermined threshold.

In another aspect, the invention may be a method of storing high level radioactive waste comprising: a) positioning a metal canister containing high level radioactive waste in a storage cavity of a ventilated system comprising a cask body, a cask lid positioned atop the cask body, at least one outlet duct extending from a top of the storage cavity to an ambient atmosphere, and a plurality of inlet ducts, each of the inlet ducts having a cross-sectional area and the at least one outlet duct having a cross-sectional area; b) convectively flowing ventilation air from the ambient atmosphere into a bottom of the storage cavity through the inlet ducts, the ventilation air being heated at a heating rate and rising from the bottom of the storage cavity to the top of the storage cavity, the ventilation air exiting the storage cavity through the at least one outlet duct; c) positioning a first air flow adjustment member in at least one of: (1) one or more of the plurality of inlet ducts; or (2) the at least one outlet duct to reduce the cross-sectional area of the at least one of the one or more of the plurality of inlet ducts or the at least one outlet duct to maintain the heating rate of the ventilation air above a predetermined threshold; and wherein the first air flow adjustment member is selected to reduce the cross-sectional area of the at least one of the one or more of the plurality of inlet ducts or the at least one outlet duct by a predetermined percentage based on a first set of conditions measured at time T1.

In a further aspect, the invention may be a method of storing high level radioactive waste comprising: a) positioning a metal canister containing high level radioactive waste in a storage cavity of a ventilated system comprising a cask body, a cask lid positioned atop the cask body, at least one outlet duct extending from a top of the storage cavity to an ambient atmosphere, and a plurality of inlet ducts, the plurality of inlet ducts having a combined cross-sectional area and the at least one outlet duct having a combined cross-sectional area; b) convectively flowing ventilation air from the ambient atmosphere into a bottom of the storage cavity through the inlet ducts, the ventilation air being heated at a heating rate and rising from the bottom of the storage cavity to the top of the storage cavity, the ventilation air exiting the storage cavity through the at least one outlet duct; and c) modifying at least one of: (1) the combined cross-sectional area of the plurality of inlet ducts; or (2) the combined cross-sectional area of the at least one outlet duct over time to maintain the heating rate of the ventilation air above a predetermined threshold.

The present application is directed to a storage system for spent nuclear fuel which seeks to exploit the existing fuel assembly to fuel basket storage cell clearances cited above to provide gamma radiation shielding of the spent nuclear fuel canister. A radiation dose attenuation device is provided which is formed of a dense gamma-blocking material having a composition with high density and preferably a high thermal conductivity to effectively dissipate the substantial heat generated by the decaying nuclear fuel. The radiation does attenuation device is configured for insertion into the fuel storage cells of the fuel basket.

The fuel basket is configured to be inserted into the cavity of the fuel storage canister, which may then be placed inside the outer overpacks or casks described above. The fuel basket may be a gridded structure comprising interlocking metallic plates or adjacent tubes which form a plurality of tightly packed and upwardly open prismatic fuel assembly storage cells. Each cell may have a transverse cross-sectional area configured to insert and accommodate no more than a single fuel assembly which has a rectilinear cross section (e.g. square or rectangular). The storage cells may therefore have a corresponding complementary configured rectilinear cross section to the fuel assemblies with a perimetrically extending gap or clearance provided between the fuel assembly and inside surface of walls of each cell. The gap may extend around the entire perimeter of the fuel assembly of each cell in some implementations.

In one embodiment, the radiation dose attenuation device according to the present disclosure may be in the form of a radiation attenuation insert which is configured to occupy the available gap or clearance between the fuel assembly and inner storage cells walls in the fuel basket. The height of the attenuation insert tube may be substantially coextensive with the height of each storage cell in the fuel basket. The attenuation insert may be configured for either permanent fixation in one of spent fuel assembly storage cells, or removable and detachable securement in to the cell via self-locking retention or securement features as further described herein.

The gamma radiation attenuation insert has a tubular body including open top and bottom, and sidewalls extending therebetween. The attenuation insert may be in the form of a thin walled open-ended rectangular cuboid box or tube with corresponding rectilinear square transverse cross-sectional shape. The tubular attenuation insert is configured and dimensioned for slideable insertion into a respective fuel basket storage cell of the canister.

An ideal material for the present tubular radiation attenuation insert preferably is made of a material having the composition and characteristics of high density for effective gamma ray blocking and high thermal conductivity for residual nuclear fuel decay heat dissipation from the fuel basket. Metallic non-boron containing materials with one or both of these characteristics is preferred. Examples of suitable materials include some dense non-ferrous metals and their alloys. A preferred material is copper in one non-limiting embodiment having both desired characteristics. Lightweight metals with lower densities such as aluminum (e.g. densities less than 3 grams/cubic centimeter) are generally not preferred for the present gamma radiation shielding application in a nuclear fuel basket. Suitable materials preferably have a density of at least 7.0 g/cc, more preferably greater than 8.0 g/cc for effective gamma radiation shielding. It bears noting that lead, a common gamma blocking material sometimes used in the heavier outer overpack or cask construction, is generally not suitable for the present fuel basket application due to its relatively poor/low thermal conductivity and extreme density/weight which would unduly add to the overall weight of the canister.

One non-limiting principal objective of the present is to provide absorption or shielding of the gamma radiation emanating outwards to the environment from the fuel basket and canister in the lateral direction via the gamma-blocking radiation attenuation inserts. Because most of the gamma radiation in the lateral direction is from the spent nuclear fuel assemblies located in the outermost peripheral cells of the canister fuel basket, the attenuation inserts in one embodiment may be installed only in those peripheral cells that have a high radiation emission rate in one non-limiting arrangement. In certain embodiments, all of the outermost peripheral fuel assembly storage cells of the fuel basket may include a radiation attenuation insert tube to construct a continuous lateral barrier against gamma ray emissions which encircles the entire circumference or perimeter of the fuel basket. In other embodiments, only some of the peripheral storage cells may include a attenuation insert which contain fuel assemblies emitting unduly high levels of gamma radiation.

Adding the tubular dense radiation attenuation inserts or boxes in the outer peripheral storage cells advantageously has minimal effect on the reactivity of the basket. Advantageously, as noted above, copper's high thermal conductivity, as opposed to the less thermally conductive materials from which the fuel basket storage cells themselves may be formed (e.g. stainless steel, etc.), will ameliorate any loss of the heat dissipation capacity of the fuel basket and effectively reject heat emanating from the decaying nuclear fuel. Copper also has the attributes of high specific gravity and density, which makes it more efficient at gamma radiation attenuation than other possible materials. Heretofore, copper has typically not been used for gamma radiation attenuation in fuel baskets, and is underappreciated for the present gamma blocking application despite its unique combination of gamma radiation attenuation due to its high density and excellent thermal conductivity properties to dissipate heat from the decaying nuclear fuel in the fuel basket. This makes copper ideally suited for the present gamma radiation attenuation inserts for fuel baskets.

As a basic principle in nuclear shielding, the effectiveness of the radiation attenuation insert box-like structure in attenuating the intensity of the accreted radiation from the fuel is underpinned by and corresponds to its proximity to the fuel assembly. The gamma radiation attenuation insert (dose attenuation device) is therefore preferably located between the fuel assembly and interior surfaces of the cell walls or plates. The thickness of the attenuation insert may be selected so that the spent nuclear fuel assembly insertion or withdrawal capability into and from the fuel basket storage cells of the storage canister is not adversely affected.

In one aspect, a storage apparatus with gamma radiation shielding for spent nuclear fuel comprises: a fuel basket comprising a plurality of elongated fuel storage tubes extending along a longitudinal axis, each of the tubes defining a cell configured to hold a nuclear fuel assembly; a plurality of gamma radiation attenuation inserts each one of which is nested inside a respective cell of at least some of the storage tubes of the fuel basket; each radiation attenuation insert comprising a longitudinally elongated tubular body including an open top end, a bottom end, and plurality of sidewalls extending between the ends; wherein the radiation attenuation insert is composed of a dense material operable to block gamma radiation. The inserts may be formed of non-boron containing material, and more particularly copper in one non-limiting embodiment.

In another aspect, a storage apparatus with gamma radiation shielding for spent nuclear fuel comprises: a canister comprising a baseplate and an elongated shell defining an internal cavity; a fuel basket disposed in the internal cavity, the fuel basket comprising a plurality of metal fuel storage tubes extending upwards from the baseplate along a longitudinal axis and each defining a fuel storage cell; a gamma radiation attenuation insert nested inside a first cell of a first tube of the fuel basket; the radiation attenuation insert comprising a longitudinally elongated cuboid body including open top and bottom ends, and a plurality of sidewalls extending between the ends; an upper securement feature of the radiation attenuation insert engaging a top end of the first tube; and an elastically deformable lower securement feature on the radiation attenuation insert engaging a bottom end portion of the first tube and configured to detachably affix the radiation attenuation insert to the first tube; wherein the radiation attenuation insert is composed of a dense material operable to block gamma radiation. The inserts may be formed of non-boron containing material, and more particularly copper in one non-limiting embodiment.

In another aspect, a method for adding gamma radiation shielding to a fuel basket for storing spent nuclear fuel comprises: providing a fuel basket comprising a plurality of longitudinally elongated fuel storage tubes including peripheral outboard tubes arranged perimetrically around the fuel basket and inboard tubes, each of the tubes defining a cell configured to hold a nuclear fuel assembly; positioning a radiation attenuation insert over a selected outboard tube, the radiation attenuation insert including a plurality of elastically deformable locking members each movable laterally between an outward undeflected position and an inward deflected position; the locking members being in the undeflected position; lowering the radiation attenuation insert into the selected outboard tube; engaging the locking members with walls of the selected outboard tube, wherein the locking members are each moved to the deflected position; sliding the radiation attenuation downwards insert along the walls of the selected outboard tube; disengaging the locking members from the walls of the selected outboard tube near a bottom portion of the selected outboard tube, wherein the locking members each return to the undeflected position; and lockingly engaging each locking member with a corresponding locking edge formed on the bottom portion of the selected tube which resists axial withdrawal of the radiation attenuation insert from the selected outboard tube.

The present application provides a unique multi-component transfer cask comprised of two detachably coupled and separable nested containers. The transfer cask according to the present disclosure primarily comprises an outer neutron shield container or cylinder (NSC) and inner gamma blocker container or cylinder (GBC) removably insertable into the NSC. Unlike traditional transfer casks in which the neutron shielding material may be permanently incorporated with the gamma blocking material in the cask body, the present two-component transfer cask system with non-permanently mounted and separable GBC allows the spent fuel canister cask loading operations to be staged in a particular manner which can be accomplished within limited spatial constraints of the cask loading area (e.g. spent fuel pool) and within limited crane lifting capacities in situations where applicable. Otherwise, the weight of the fuel canister must be reduced by inserted fewer spent fuel assemblies than the full storage capacity of the canister which is inefficient and costly as more canisters must be employed.

The main body of the inner GBC of the transfer cask has a gamma radiation blocking composition that is preferably comprised of high density and high thermal conductivity materials such as steel, lead, or copper to block gamma radiation which are effective at blocking gamma radiation and in combination to provide structural integrity to the cylinder. The shell of the GBC is thus constructed of materials having a higher thermal conductivity than the shell of the NSC whose role is to shield neutron radiation requiring generally different typically less dense materials with lower thermal conductivity properties for neutron shielding. The GBC main body has a cylindrical cavity which encloses and supports the nuclear spent fuel canister. The transfer cask has suitably sized flanges or other structural connections or elements to secure the NSC thereto. The GBC can be of non-cylindrical external profile in some embodiments to comport with the architecture of the cask loading area in the spent fuel pool where the GBC is staged for fuel loading. In one embodiment, the shell of the GBC has a cylindrical shape with circular transverse cross section.

The outer NSC of the transfer cask serves the function of attenuating and absorbing (i.e., shielding) the neutrons emitted by the used fuel inside the canister and GBC. The NSC therefore has a solid or liquid neutron radiation blocking composition which may contain boron for neutron moderation. While it may also provide supplemental gamma shielding, its primary function is to provide shielding of neutrons. The NSC is separated from the cask's GBC main body at such times where the NSC's weight may exceed the available nuclear facility crane's lifting capacity, or its size may restrict loading operations in the facility's cask loading area (i.e., spent fuel pool) due to spatial constraints. The water-filled fuel canister with spent fuel assembly therein may be loaded into the GBC while submerged in the fuel pool. At the earliest convenient opportunity, following removal of the GBC from the cask loading area (with canister therein), the GBC and NSC are mated. At the time of the GBC removal from the spent fuel pool, the water filled in the fuel canister provides the neutron shielding until placement of the GBC in the outer NSC. The lighter lift weight of GBC and loaded water-filled fuel canister (without the NSC) is advantageously within the allowable crane capacity. When the operations in the cask loading area of the spent fuel pool are complete, the GBC is set down and the NSC and GBC are mated and coupled together as further described herein. The transfer cask assembly, now comprising the GBC and NSC, has the requisite shielding for the spent nuclear fuel in the canister to commence with traditional canister closure and transfer operations. Preferably, the NSC is installed prior to the dewatering of the canister in the GBC to assure no lapse in neutron shielding. Prior to lifting the transfer cask, now including the GBC, canister, and NSC, the canister preferably has been dewatered to reduce its overall lift weight to within the capacity of the crane (or other lifting device such as the cask, vertical transporter vehicle). With the NSC in place, there is no longer a need for the neutron protection afforded by the water inside the canister.

The principal means of heat rejection in the two-piece transfer cask according to the present disclosure is the natural convective air flow ventilation action in a circumferentially and vertically extending air ventilation annulus formed between the GBC and NSC. The cooling air circulation is naturally driven and induced by the hot exterior surface of the GBC heated by decay heat emitting by the spent fuel assemblies in the canister located inside the GBC. The annulus extends for substantially the entire height of the cask having a bottom air inlet opening and top air outlet openings. The heat rejection may further be boosted and enhanced by providing an open and ventilated annular space inside the GBC at the canister-to-GBC interface for on-demand ventilation capacity. For optimal thermal and ALARA performance, the ability to keep this secondary inner annulus filled with water for additional neutron shielding when needed, or alternatively air ventilated at times for additional heat rejection is desirable during different stages of the spent fuel loading and transfer process.

This drainable canister-to-GBC annular space is also valuable if it is desired to cool the canister more efficiently by spraying of the canister lid with cooling water to remove excess heat in some situations. The spray may be gravity fed and flows over and around the canister through the annular space for maximum reliability to protect the structural integrity of the canister and fuel assemblies therein. Calculations show that the spray mode can keep the water in the water-filled canister from boiling for an indefinite period which is critically important to deal with the scenario where a fuel bearing canister must remain water filled for an extended period of time such as for neutron shielding.

The coupling arrangement between the separable NSC and GBC is unique and compensates for differential thermal expansion between these two cylinders. The inner GBC has a top mounting flange which is rigidly and detachably coupled to a top flange of the outer NSC such that the inner GBC is suspended and supported via the coupled flanges at the top in a cantilevered manner. In one preferred embodiment, there is no other rigid coupling engagement between the NSC and GBC below the coupled top flanges. Advantageously, this allows the hotter body of inner GBC (heated by decay nuclear fuel heat emitted from the canister inside the GBC) to thermally grow and expand vertically downwards in length from the coupled flanges to a greater degree than the relatively cooler outer NSC which is exposed to natural ambient cooling air. This avoids the formation of cracks between the GBC and NSC due to differential thermal expansion. In one embodiment, the two flanged may be bolted together by a plurality of threaded fasteners.

In one aspect, a separable multi-component cask for spent nuclear fuel transport and storage comprises: a vertical longitudinal axis; a vertically elongated first cylinder having a neutron radiation shielding composition, the first cylinder defining a first cavity extending along the longitudinal axis; a vertically elongated second cylinder having a gamma radiation blocking composition, the second cylinder defining a second cavity extending along the longitudinal axis and configured to hold a spent nuclear fuel canister; the second cylinder detachably mounted inside the first cavity of the first cylinder; and an air ventilation annulus formed between the first and second cylinders, the air ventilation annulus defining a heat removal passage to remove heat emitted by the canister when placed inside the second cylinder.

In one aspect, a multi-component transfer cask system for storage and transport of spent nuclear fuel comprises: a vertical longitudinal axis; a vertically elongated outer container having a neutron radiation shielding composition, the outer container comprising a top end including an annular top flange, a bottom end, and a cylindrical sidewall extending between the ends and defining a first cavity; a vertically elongated inner container having a gamma radiation blocking composition, the inner container comprising a top end including an annular mounting flange, a bottom end, and a sidewall extending between the ends and defining a second cavity configured to hold a spent nuclear fuel canister; the mounting flange of the inner container detachably coupled to the top flange of the outer the outer container such that the inner container is suspended and supported via the coupled flanges in a cantilevered manner; wherein the inner container is axially and slideably separable from the outer container. The suspended and cantilevered mounting of the inner container allows the container which is directly heated by a spent nuclear fuel canister when placed therein to grow at a higher differential thermal expansion rate than the cooler outer container, thereby avoiding thermal expansion cracking between the two containers.

In one aspect, a method for transferring and transporting spent nuclear fuel comprises: providing a nuclear fuel transport cask comprising an outer neutron shield cylinder having an internal first cavity and an inner gamma block cylinder having an internal second cavity, the gamma block cylinder detachably coupled to and nested inside the first cavity of the neutron shield cylinder; separating the gamma block cylinder from the neutron shield cylinder; placing the gamma block cylinder on a support surface; loading a plurality of spent nuclear fuel assembles into the second cavity of the gamma block cylinder; lifting the gamma block cylinder over the neutron shield cylinder; and inserting the gamma block cylinder and fuel canister assembly into the neutron shield cylinder.

The present application is directed to an improved ventilated dry storage system for passively cooling spent nuclear fuel using available ambient cooling air. An outer ventilated storage cask or module for dry storage of SNF. The module has an elongated body which comprises an internal cavity configured for holding a single SNF canister containing a plurality of heat-emitting nuclear fuel assemblies. The module may be vertically oriented in one embodiment and rests on a concrete support pad. A plurality of radially oriented cooling air inlet ducts spaced circumferentially around the module body fluidly connects the internal cavity with ambient cooling air outside the module. The inlet ducts each draw cooling air radially inwards into the cavity via natural circulation and distributes the air around the canister which emits heat produced by the SNF. The cooling air flows alongside the canister and upwards in the cavity due to the natural chimney effect as it is heated by the heat emitted by the SNF inside the canister and exits the top of the cavity via one or a plurality of air outlet ducts. The outlet ducts may be radially oriented in one embodiment. No blower or fans are used to supply pressurized cooling air to the canister.

In one embodiment, the air inlet ducts may each have a recurving configuration to draw cooling air radially inwards and initially upwards into each air inlet duct, and then redirect the cooling air downwards in the air inlet duct into the lowermost part of the internal cavity of the module. The inlet ducts may have a multi-angled configuration such that no straight line of sight exists between the inlet and outlet end openings of the air inlet ducts to prevent neutron streaming from the canister to ambient atmosphere. In some embodiments, radiation attenuation shielding comprising steel or other radiation attenuation inserts or shields may be incorporated into the ducts to enhance radiation blocking.

The present cooling air inlet ducts may each have an inlet end opening located at a different preferably higher elevation than the outlet end opening which opens into the cavity of the storage module. The inlet end openings may be sufficiently elevated above the concrete support pad and bottom of the module to prevent flood waters from entering the module particularly in flood prone SNF storage sites. In addition, this advantageously elevates the inlet end openings of each duct above the pad or ground surrounding the fuel storage module by a distance sufficient to minimize heating the cooling air entering the ducts by the concrete support pads encountered by the foregoing conventional SNF fuel storage module duct arrangements previously described above. The inlet openings are arranged to draw air radially directly inward into the internal cavity of the module from the ambient environment surrounding the lower portion of the storage module. In one embodiment, the inlet end openings of each cooling air inlet duct preferably may be below the vertical midline of module. This also avoids thermal interference between the air inlet ducts and outlet ducts near the top of the module to avoid heating the cooling air drawn into the module cavity with the already heated air leaving the outlet ducts. In some arrangements, the inlet end openings have a vertically staggered arrangement in which the elevation of the inlet end opening of each air inlet duct is at a different elevation than the inlet end opening of each adjacent inlet air duct to maximize the supply of available cool ambient air to each inlet duct in the event air temperature stratification surrounding the storage module is present when the air is calm.

The present disclosure also provides an improved module lid comprised of a metallic shell filled with concrete for radiation shielding. The lid is configured such that an interface between the top end of the SNF storage module and the lid forms a circumferentially-extending vertical annular gap which defines radial air outlet ducts for ejecting cooling air heated by the canister in the module cavity to atmosphere. In lieu of a multitude of individual discrete air outlet ducts which increases resistance to airflow, the present air outlet ducts are radially open to atmosphere for substantially a full 360 degrees around the circumference of the lid-to-module interface to minimize airflow resistance and maximize ejection of heated cooling air by discharging the air around the entire circumference of the module. This provides essentially radially symmetric outflow of heated air from the module.

The present module lid also comprises a pair of lifting beams in the form of vertical plates embedded in the concrete liner of the lid. The lifting beans may be arranged in an interlocked X-shaped configuration in one embodiment. The beam plates each have an exposed downwardly extending lower portion which may be stepped in configuration and is insertable into the open top of the SNF storage module to create neutron scatter and enhance radiation attenuation. In addition, this unique configuration provides a wind-resistant feature which divides the radial cooling air outlet duct into four discrete sectors or quadrants beneath the lid at the interface to the module body to block. This advantageously mitigates the adverse impacts of wind working directly against the discharge flow of heated cooling air radially outwards form the air outlet ducts of the module. Accordingly, because the wind typically blows from one direction at a time, only heated cooling air discharged from primarily one cooling air outlet quadrant might be adversely affected since the downwardly extending lower portion of the lifting beam plates shields or shrouds the other remaining air outlet quadrants from the wind. It further bears noting that discharging heated cooling air from entire sectors or quadrants at the top end of module beneath the lid creates a larger air outlet flow area and concomitantly less resistance to flow than individual smaller ducts. This advantageously maximizes the outflow of heated air and heat removal from the SNF canister in the module.

In one aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway fluidly connecting ambient atmosphere with the internal cavity; each air inlet duct having an inlet end opening at an exterior surface of the sidewall and an outlet end opening at an interior surface of the sidewall adjoining the cavity; wherein the air inlet ducts each have a recurving configuration to draw cooling air radially inwards and initially upwards from ambient atmosphere, and then redirect the cooling air downwards through the air inlet duct into a lower part of the internal cavity of the module.

In another aspect, a ventilated dry storage system for passive cooling of spent nuclear fuel comprises: an elongated module defining a top end, a bottom end, and a sidewall extending between the ends defining an internal cavity extending along a longitudinal axis; the sidewall including an inner shell, an outer shell, a radiation shielding fill material disposed between the shells; a plurality of radially oriented interconnector plates embedded in the fill material and welded to the inner and outer shells to rigidly couple shells together; a base plate sealingly affixed to the bottom end of the module; a removable lid detachably coupled to the top end of the module; a fuel storage canister disposed in the internal cavity and containing heat-emitting spent nuclear fuel; a plurality of cooling air inlet ducts each forming a radially oriented air inlet passageway through the sidewall of the module configured to fluidly connect ambient atmosphere with the internal cavity; the air inlet ducts each having an inlet end opening at an exterior surface of the sidewall which is at a higher elevation than at an outlet end opening of each air inlet duct at an interior surface of sidewall adjacent to the internal cavity; wherein cooling air is drawn into the internal cavity through each air inlet duct, flows upwards alongside the canister thereby heating the cooling air, and the heated cooling air is discharged back to atmosphere through a plurality of air outlet ducts.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a baseplate attached to the bottom end of the module body; a plurality of cooling air inlet ducts fluidly connecting ambient atmosphere with the internal cavity; a lid detachably coupled to a top end of the module body to access the internal cavity; the lid comprising a metallic shell filled with concrete and a first lifting beam embedded in the concrete; wherein the first lifting beam includes a lower portion which protrudes downwards through and beneath a bottom cover of the lid into a top end of the cavity.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway through the sidewall fluidly connecting ambient atmosphere with the internal cavity; the air inlet ducts each having an inlet end opening at an exterior surface of the sidewall which is at a higher elevation than at an outlet end opening of each air inlet duct at an interior surface of sidewall adjoining the internal cavity; the air inlet ducts each comprising an upper roof wall and a lower floor wall; wherein a highest point of the roof wall of each air inlet duct is at an elevation higher than a top of the inlet end opening of the air inlet duct.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway through the sidewall fluidly connecting ambient atmosphere with the internal cavity; the air inlet ducts each having an exterior inlet end opening and an interior outlet end opening adjoining the cavity; wherein the inlet end openings are vertically staggered in arrangement in which the elevation of the inlet end opening of each air inlet duct is at a different elevation than the inlet end opening of each adjacent inlet air duct.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway through the sidewall fluidly connecting ambient atmosphere with the internal cavity; the air inlet ducts each having a radiation attenuation shield member attached to an exterior surface thereof.

In another aspect, a ventilated dry storage system for passive cooling of spent nuclear fuel comprises: an elongated module defining a top end, a bottom end, and a sidewall extending between the ends defining an internal cavity extending along a longitudinal axis; the sidewall including an inner shell, an outer shell, a radiation shielding fill material disposed between the shells, and a plurality of radially oriented interconnector plates embedded in the fill material and rigidly coupling the inner and outer shells together; a base plate sealingly affixed to the bottom end of the module; a removable lid detachably coupled to the top end of the module; a fuel storage canister disposed in the internal cavity and containing heat-emitting spent nuclear fuel; a plurality of cooling air inlet ducts each forming a radially oriented air inlet passageway through the sidewall of the module configured to fluidly connect ambient atmosphere with the internal cavity; the air inlet ducts each having an inlet end opening at an exterior surface of the sidewall which is at a higher elevation than at an outlet end opening of each air inlet duct at an interior surface of sidewall adjacent to the internal cavity; wherein cooling air is drawn into the internal cavity through each air inlet duct, flows upwards alongside the canister thereby heating the cooling air, and the heated cooling air is discharged back to atmosphere through the air outlet ducts.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a baseplate attached to the bottom end of the module body; a plurality of cooling air inlet ducts fluidly connecting ambient atmosphere with the internal cavity; a lid detachably coupled to a top end of the module body to access the internal cavity; the lid comprising a metallic shell filled with concrete and a first lifting beam embedded in the concrete; wherein the first lifting beam includes a lower portion which protrudes downwards beneath a bottom cover of the lid into a top end of the cavity.

In another aspect, a ventilated dry storage system for passive cooling of spent nuclear fuel comprises: an elongated module defining a top end, a bottom end, and a sidewall extending between the ends defining an internal cavity extending along a longitudinal axis; the sidewall including an inner shell, an outer shell, a radiation shielding fill material disposed between the shells; a plurality of radially oriented interconnector plates embedded in the fill material and welded to the inner and outer shells to rigidly couple shells together; a base plate sealingly affixed to the bottom end of the module; a removable lid detachably coupled to the top end of the module; a fuel storage canister disposed in the internal cavity and containing heat-emitting spent nuclear fuel; a plurality of cooling air inlet ducts each forming a radially oriented air inlet passageway through the fill material of the module and configured to fluidly connect ambient atmosphere with the internal cavity; wherein each of the interconnector plates are disposed between adjacent ones of the air inlet ducts.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a baseplate attached to the bottom end of the module body; a plurality of cooling air inlet ducts fluidly connecting ambient atmosphere with the internal cavity; a lid detachably coupled to a top end of the module body to access the internal cavity; the lid comprising a metallic shell filled with concrete and a first lifting beam embedded in the concrete; wherein the first lifting beam includes a lower portion which protrudes downwards through and beneath a bottom cover of the lid into a top end of the cavity.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts fluidly connecting ambient atmosphere with the internal cavity; a lid detachably coupled to a top end of the module body to access the internal cavity; the lid comprising a pair of lifting beams each including a downwardly extending lower portion which protrudes below the top end of the module into the cavity; wherein the lower portions of the lifting beams divides the interface into quadrant-shaped cooling air outlet ducts for radially discharging the cooling air from the cavity to atmosphere.

BRIEF DESCRIPTION OF THE DRAWINGS

The present invention will become more fully understood from the detailed description and the accompanying drawings, wherein like elements are labeled similarly and in which.

Figure 1:
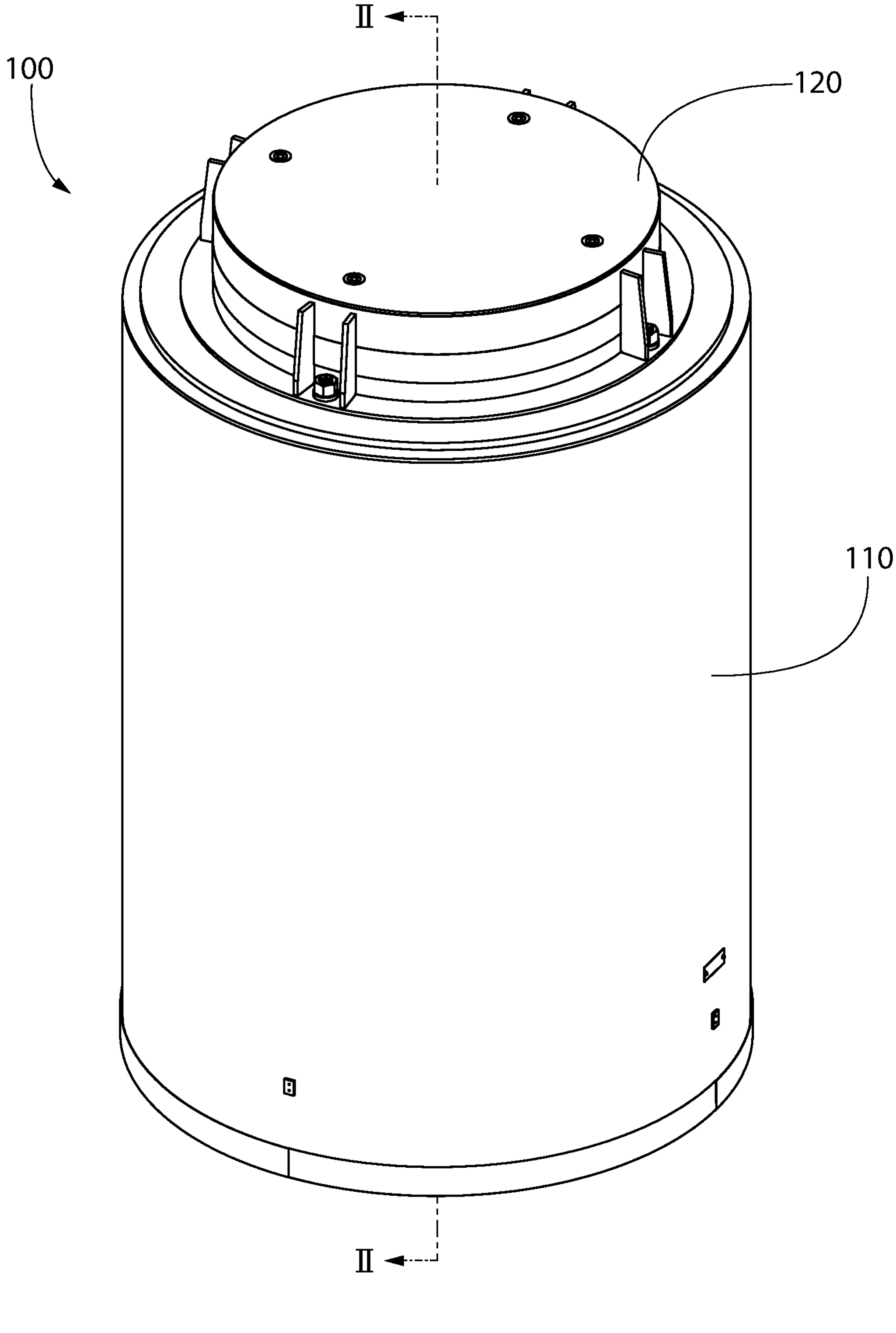
FIG. 1 is a front perspective view of a container for storing spent nuclear fuel in accordance with an embodiment of the present invention.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Throughout the disclosure set forth herein, for certain of the components described several iterations of that component are depicted. For clarity and to avoid clutter, only some depictions of that component will be numbered.

Multiple inventive concepts are described herein and are distinguished from one another using headers in the description that follows. Specifically, FIGS. 1-14 are relevant to a first inventive concept, FIGS. 15-24 are relevant to a second inventive concept, FIGS. 25-36A,B are relevant to a third inventive concept, FIGS. 37-47 are relevant to a fourth inventive concept; FIGS. 48-56 are relevant to a fifth inventive concept; FIGS. 57-70 are relevant to a sixth inventive concept; and FIGS. 71-87 are relevant to a seventh inventive concept. The first through seventh inventive concepts should be considered in isolation from one another. It is possible that there may be conflicting language or terms used in the description of the first through seventh inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed. Similarly, the section of the description describing a particular inventive concept being claimed should be used to interpret claim language when necessary.

I. Inventive Concept 1

With reference to FIGS. 1-14, a first inventive concept will be described.

Referring first to FIG. 1, a container 100 for storing spent nuclear fuel is illustrated. The container 100 generally comprises a container body 110 and a container lid 120 coupled to the container body 110. In certain embodiments, the container 100 may be a ventilated vertical overpack ("VVO"), which is a massive structure made principally from steel and concrete to store canisters loaded with spent nuclear fuel or other high level waste. Although the structural details of the container 100 are not described herein, it should be appreciated that the container 100 is specifically designed and is formed of specifically selected materials to provide extreme radiation blockage of both gamma and neutron radiation emanating from the high level radioactive waste stored therein. Specifically, the high level radioactive waste or spent nuclear fuel that is stored within the container 100 emits gamma and neutron radiation that must be blocked from reaching the environment due to its harmful effects. This blockage of harmful radiation is achieved with the container 100 structure and design and the structure and design of other components located within and surrounding the container 100. Furthermore, the high level radioactive waste or spent nuclear fuel that is stored within the container 100 may be extremely hot. Thus, the container 100 may also be specifically designed to facilitate a convective/no force cooling of any high level radioactive waste containers stored therein, although other techniques including forced air cooling may also be used in other embodiments. The container 100 may include casks, dual-purpose metal casks, multi-purpose canisters (MPCs), silo systems, or any other storage, repository, or transport system that contains a fuel basket structure. The specific structure of the container 100 is not to be limiting of the present invention in all embodiments unless specifically stated as such. Thus, various different container configurations are possible and may be used in accordance with the invention described herein.

Figure 2A:
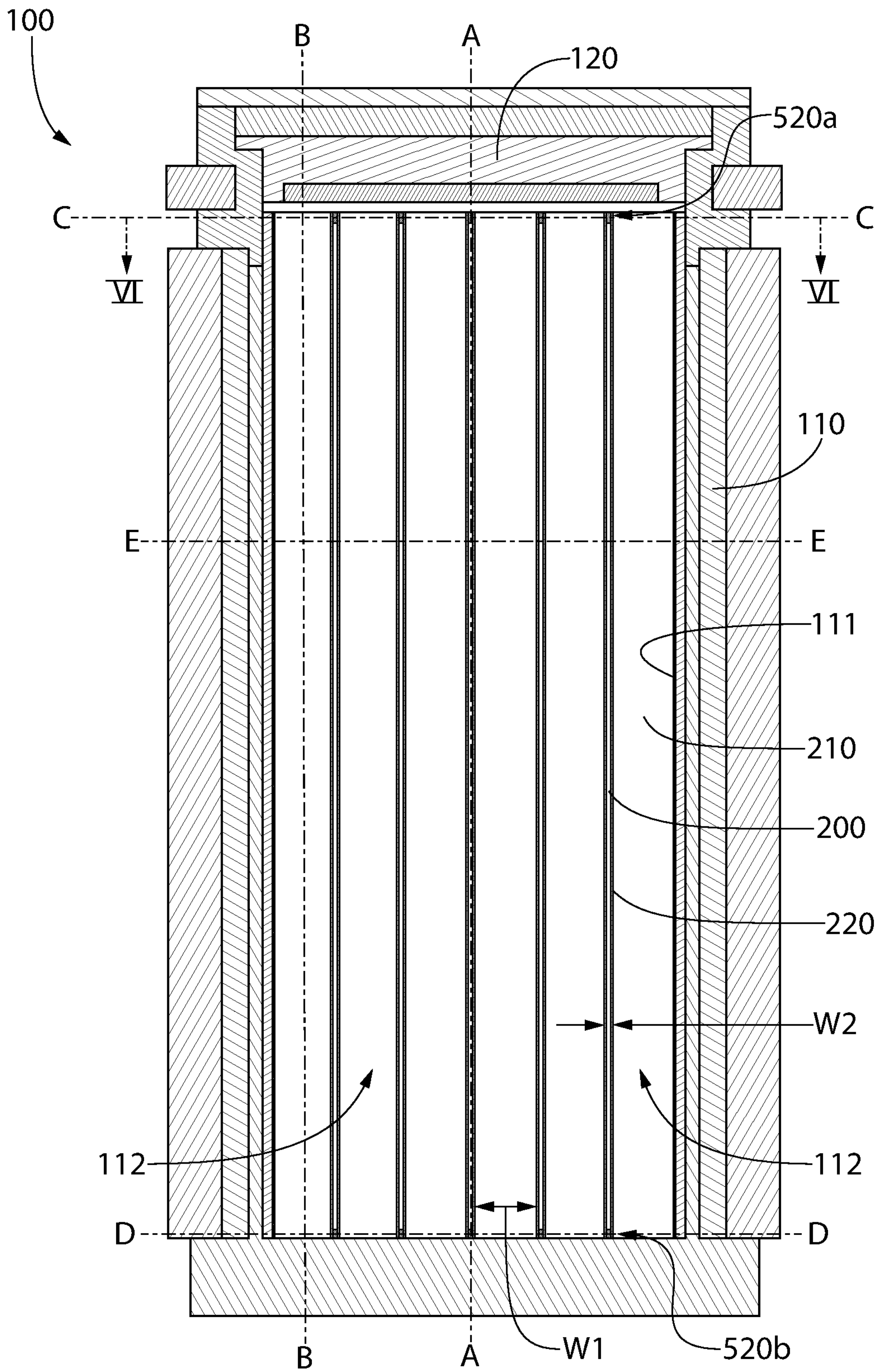
FIG. 2A is a cross-sectional view taken along line II-II of FIG. 1 showing a basket apparatus within a cavity of the container.
Figure 2B:
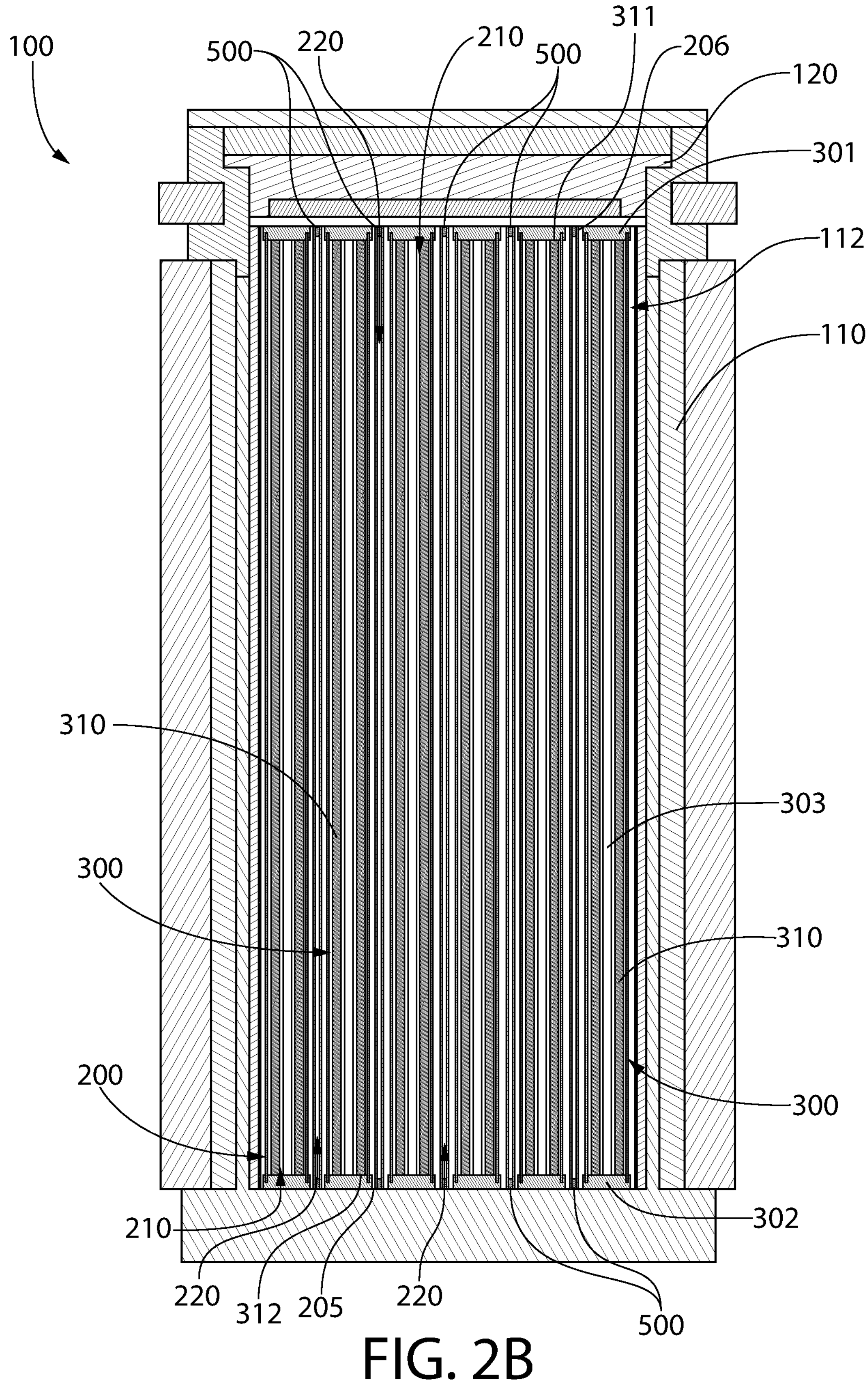
FIG. 2B is a cross-sectional view taken along line II-II of FIG. 1 showing fuel assemblies with spent nuclear fuel in the basket apparatus.

Referring to FIGS. 1, 2A, and 2B concurrently, the container body 110 has an inner surface 111 that defines a cavity 112. The container body 110 may be formed of a single layer of material or multiple different layers as illustrated. A basket apparatus 200, also referred to herein and known in the art as a fuel basket, is positioned within the cavity 112. The invention may in some embodiments be directed to an apparatus for supporting spent nuclear fuel, which apparatus may be the basket apparatus 200 by itself, or the basket apparatus 200 when disposed within the container 100.

When used to support and store spend nuclear fuel, the basket apparatus 200 is positioned within the cavity 112 of the container 100 and forms a plurality of fuel cells 210 and a plurality of flux traps 220 between adjacent ones of the fuel cells 210. Thus, the basket apparatus 200 described herein is known in the art as a flux trap basket. As discussed in more detail below, the flux traps 220 are spaces or gaps between the adjacent fuel cells 210 that may be left empty or filled with a moderator, such as water, to assist in the shielding of radiation. The design of basket apparatuses generally, and the basket apparatus 200 specifically, is dictated by the requirement to manage reactivity control in compliance with prescribed regulatory limits. Basket assemblies having flux traps are required under the standards of certain regulatory bodies and under certain circumstances (such as when highest reactivity fuel or fresh fuel is being stored). This is because basket assemblies that use flux traps are better configured to deal with high levels of radiation in nuclear fuel than basket assemblies without flux traps due to the additional radiation protection provided by the flux trap spaces and any moderator substances such as water contained therein.

FIG. 2A illustrates the cavity 112 of the container 100 with the basket apparatus 200 therein but without any spent nuclear fuel located within the basket apparatus 200. FIG. 2B illustrates the cavity 112 of the container 100 with the basket apparatus 200 therein and with fuel assemblies 300 positioned within the fuel cells 210 of the basket apparatus 200. In some embodiments each of the fuel cells 210 are sized and configured to hold no more than one of the fuel assemblies 300 therein. Furthermore, in some embodiments the flux traps 220 have a cross-sectional size and shape that is insufficient to contain any of the fuel assemblies 300 therein. Thus, the fuel assemblies 300 may be stored in the fuel cells 210, but may not be stored in the flux traps 220. Rather, the flux traps 220 always remain as a space that is free of the fuel assemblies 300.

In the exemplified embodiment a fuel assembly 300 comprising a plurality of spent nuclear fuel rods 310 is positioned and supported within each of the fuel cells 210. The fuel rods 310 are illustrated generically using grayscale, but the fuel rods 310 may be rods having a circular or other transverse cross-sectional shape and the spent nuclear fuel is disposed within the fuel rods 310. In the exemplified embodiment each of the fuel cells 210 contains one or more fuel assemblies 300, each containing a plurality of the spent nuclear fuel rods 310. However, the invention is not to be so limited in all embodiments and some of the fuel cells 210 may be left empty in alternative embodiments.

In the exemplified embodiment, each of the fuel assemblies 300 comprises a first end cap 301, a second end cap 302, and the spent nuclear fuel rods 310 extending between the first and second end caps 301, 302. The fuel assemblies 300 may also include one or more tie rods 303 for coupling the first and second end caps 301, 302 to one another. Although only one tie rod 303 is illustrated as being associated with each of the fuel assemblies 300 in the exemplified embodiment, in alternative embodiments each fuel assembly 300 may include multiple tie rods 303 and may also include tie plates to assist in holding the fuel rods 310 securely in place. In the exemplified embodiment, the first end cap 301 is located in an upper portion of the basket apparatus 200 and the second end cap 302 is located in a lower portion of the basket apparatus 200. The first and second end caps 301, 302 may be tie plates or other structures. In the exemplified embodiment, the first and second end caps 301, 302 extend axially beyond the terminal ends of the spent nuclear fuel rods 301. Stated another way, there exists a transverse axis or plane that intersects the first end caps 301 without intersecting any of the fuel rods 310 (or specifically the nuclear fuel stored therein) and separately there exists a transverse axis or plane that intersects the second end caps 302 without intersecting any of the fuel rods 310 (or specifically the nuclear fuel stored therein).

Figure 5A:
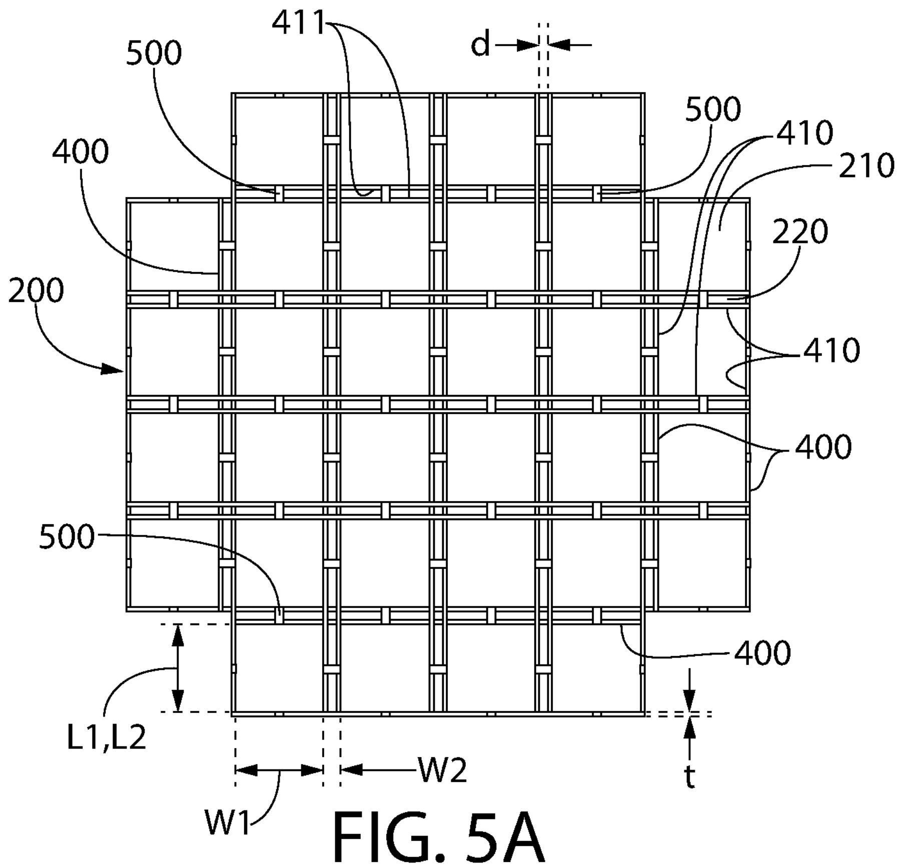
FIG. 5A is a top view of the basket apparatus of FIG. 3.

Referring briefly to FIGS. 2A and 5A concurrently, in certain embodiments each of the fuel cells 210 may have a length L1 and a width W1. Similarly, each of the flux traps 220 (or at least the portion of each of the flux traps 220 that is adjacent to an individual one of the fuel cells 210) may have a length L2 and a width W2. In the exemplified embodiment, the width W1 of the fuel cells 210 is greater than the width W2 of the flux traps 220 and the length L1 of the fuel cells 210 is the same as the length L2 of the flux traps 220. As a result, the fuel cells 210 have a greater cross-sectional area than the flux traps 220. The fuel cells 210 and the flux traps 220 may have heights that extend the entirety of the height of the basket apparatus 200, although the flux traps 220 may be at least partially interrupted by the intersecting wall plates that are used to form the basket apparatus 200 as described in more detail below.

Referring to FIGS. 3, 4, 5A, and 8 concurrently, the basket apparatus 200 will be described in accordance with an embodiment of the present invention. The basket apparatus 200 is formed by a plurality of wall plates 400 that are arranged in an intersecting manner to form and define the basket apparatus 200. More specifically, referring to FIG. 8, each of the wall plates 400 is a slotted wall plate such that the wall plates 400 may be interlocked with one another in an intersecting manner to form the basket apparatus 200. In the exemplified embodiment, each of the wall plates 400 comprises an upper edge 401, a lower edge 402, a plurality of plate slots 403 formed into each of the upper and lower edges 401, 402, and a plurality of reinforcement slots 404 formed into at least one of the upper and lower edges 401, 402.

Although the plate slots 403 are illustrated as being formed into each of the upper and lower edges 401, 402 of the wall plates 400, the invention is not to be so limited and for some of the wall plates 400, for example the upper-most wall plates in the basket apparatus 200, the wall plates 400 may include plate slots 403 in the lower edge 402 but not also in the upper edge 401. The plate slots 403 in each of the wall plates 400 are sized and configured to receive an intersecting one of the wall plates 400 to form the basket apparatus 200. Thus, the plate slots 403 may be positioned and designed to achieve a desired overall basket apparatus structure.

In the exemplified embodiment, the reinforcement slots 404 are illustrated as being formed into both of the upper and lower edges 401, 402 of the wall plates 400. However, the invention is not to be so limited in all embodiments and the reinforcement slots 404 may be formed into only the upper edges 401 or only the lower edges 402 of the wall plates 400 in other embodiments. As will be described in greater detail below, the reinforcement slots 404 provide a location at which a reinforcement member 500 may be coupled to the wall plate 400. Thus, the reinforcement slots 404 are only needed on edges of the wall plates 400 that are intended to retain one of the reinforcement members 500. In some embodiments, some of the wall plates 400 are configured to retain a reinforcement member 500 and therefore will include reinforcement slots 404 in at least one of its upper or lower edges 401, 402 while others of the wall plates 400 will not include any reinforcement slots because such wall plates 400 may not perform any function related to the reinforcement members 500. Furthermore, in some embodiments the reinforcement slots 404 are not needed and the reinforcement members 500 may be coupled to the wall plates 400 without being retained within reinforcement slots 404. Nonetheless, in some embodiments for simplicity the wall plates 400 may all be formed identical with reinforcement slots 404 regardless of whether they are used to retain a reinforcement member 500.

Figure 8:
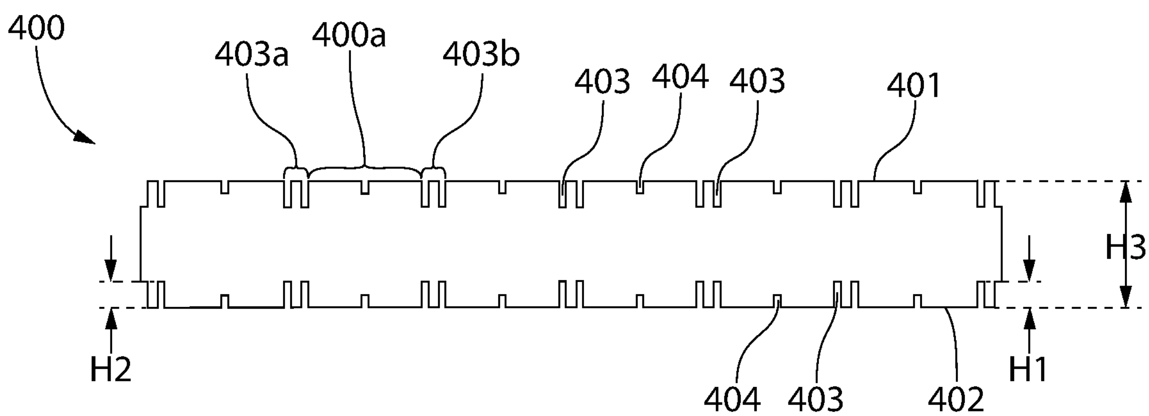
FIG. 8 is a front view of a wall plate that may be used to form the basket apparatus of FIG. 3.

In the exemplified embodiment, the plate slots 403 have a first height H1 and the reinforcement slots 404 have a second height H2. The heights of the plate slots 403 and the reinforcement slots 404 are measured from the upper or lower edge 401, 402 into which the plate and reinforcement slots 403, 404 are formed to a terminal end of the plate and reinforcement slot 403, 404. In the exemplified embodiment, the second height H2 of the reinforcement slots 404 is less than the first height H1 of the plate slots 403. As seen in FIG. 8, the plate slots 403 and the reinforcement slots 404 of the wall plates 400 are arranged in a pattern comprising a repeating sequence of reinforcement slot, plate slot, plate slot. Of course, other arrangements are possible depending upon the overall desired shape of the basket apparatus 200.

In the exemplified embodiment, the reinforcement slots 404 are formed between a first closely spaced pair of the plate slots 403*a* and a second closely spaced pair of the plate slots 403*b*. Specifically, the wall plate 400 has sets of two of the plate slots 403 that are closely spaced. The space in between the intersecting wall plates 400 that are positioned within each set of two closely spaced plate slots forms one of the flux traps 220 of the basket apparatus 200. The space in between adjacent ones of the sets of two of the plate slots 403 that are used to form the flux traps 220 is a portion of the wall plate 400 that is intended to form a part of one of the fuel cells 210. In the exemplified embodiment, the reinforcement slots 404 are centrally positioned between each set of two closely spaced plate slots 403. However, the invention is not to be so limited in all embodiments and other arrangements and positioning of the plate slots 403 and the reinforcement slots 404 relative to one another may be possible in other embodiments.

Figure 3:
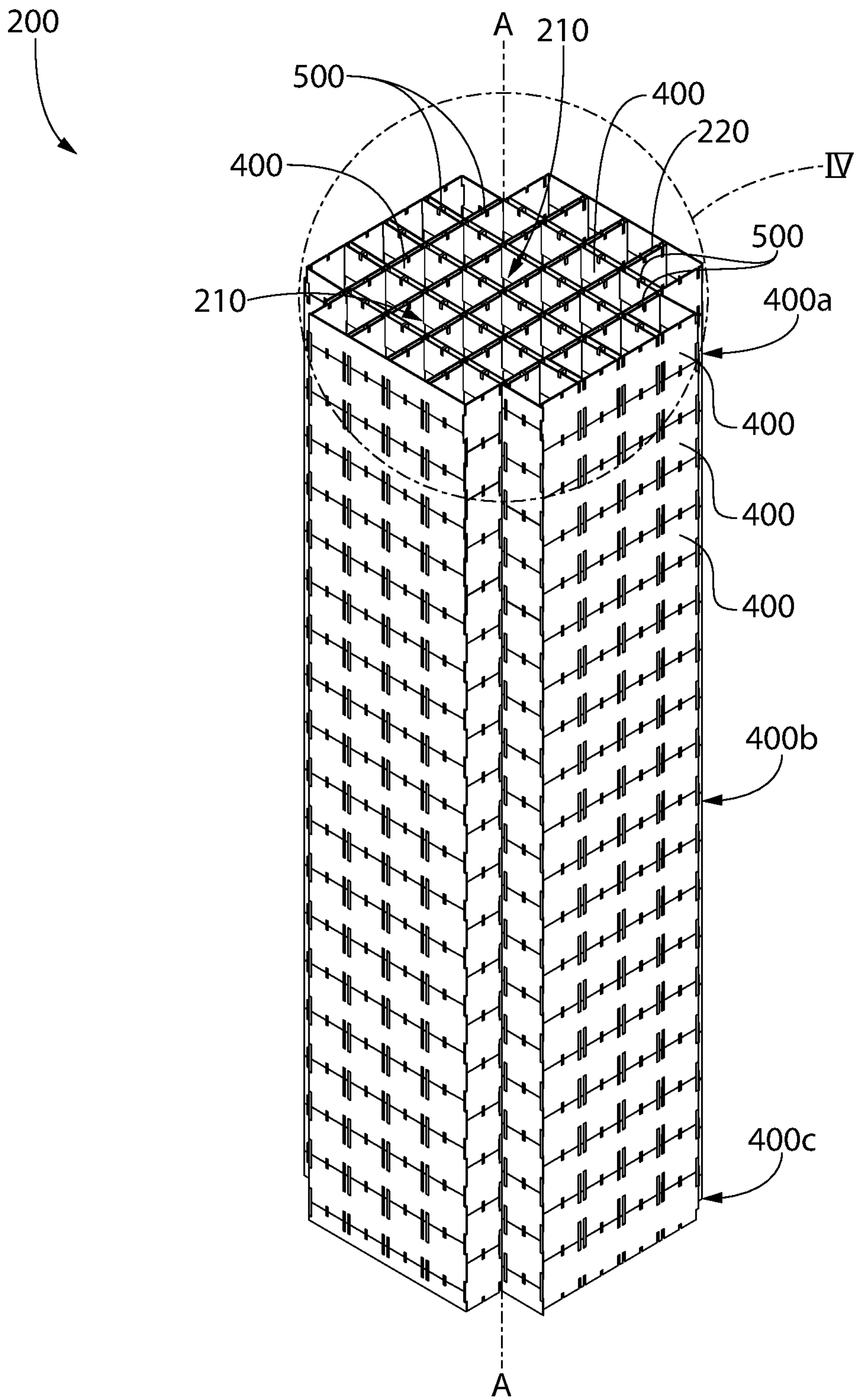
FIG. 3 is a perspective view of a basket apparatus in accordance with an embodiment of the present invention.
Figure 4:
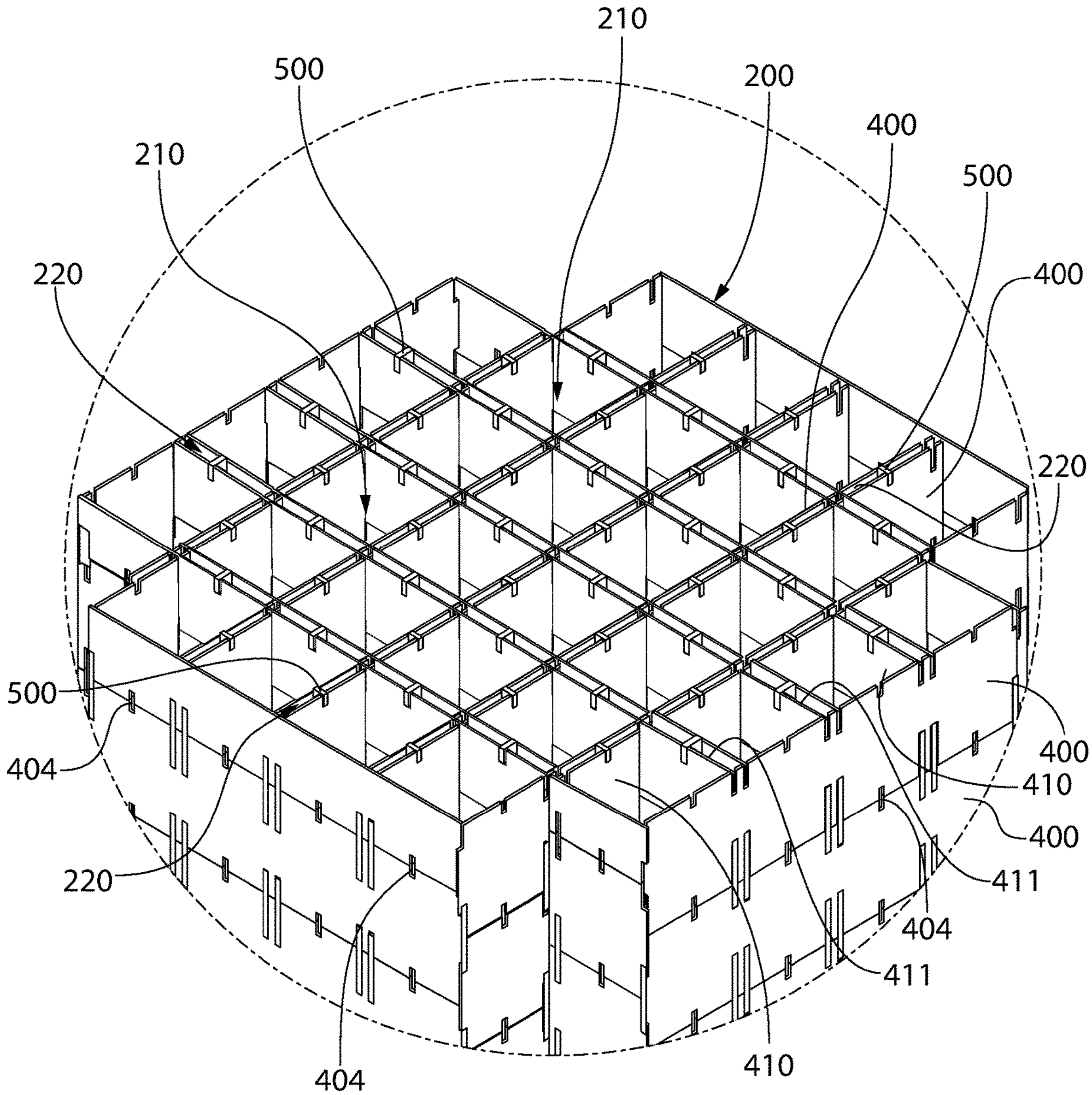
FIG. 4 is a close-up view of area IV of FIG. 3.

Referring to FIGS. 3, 4, and 5A concurrently, the basket apparatus 200 is illustrated that has been formed by a plurality of the wall plates 400 being arranged in an intersecting manner as has been described in detail above. Specifically, the basket apparatus 200 is formed by placing a first set of the wall plates 400 in a parallel and spaced apart arrangement. Then, a second set of the wall plates 400 are positioned in a parallel and spaced apart arrangement that is orthogonal to the orientation of the first set of wall plates 400. Next, the plate slots 403 of the wall plates 400 of the first set are aligned with the plate slots 403 of the wall plates 400 of the second set, and the intersecting/orthogonal wall plates 400 are coupled to one another by inserting the wall plates 400 of the first set into the plate slots 403 of the wall plates 400 of the second set and vice versa. Thus, the plate slots 403 of each of the wall plates 400 receive an intersecting one of the wall plates 400 therein. This operation continues as the basket apparatus 200 is built up axially, which results in the assembly of the basket apparatus 200.

As noted herein above, the basket apparatus 200 comprises a plurality of fuel cells 310 for storing fuel assemblies of spent nuclear fuel therein and a plurality of flux traps 220 between adjacent ones of the fuel cells 210. In the exemplified embodiment, there is a flux trap 220 between each adjacent pair of the fuel cells 210. However, the invention is not to be so limited in all embodiments and the basket apparatus 200 may be a combination flux trap/non-flux trap basket such that not every adjacent fuel cell 210 is separated by one of the flux traps 220.

Figure 5B:
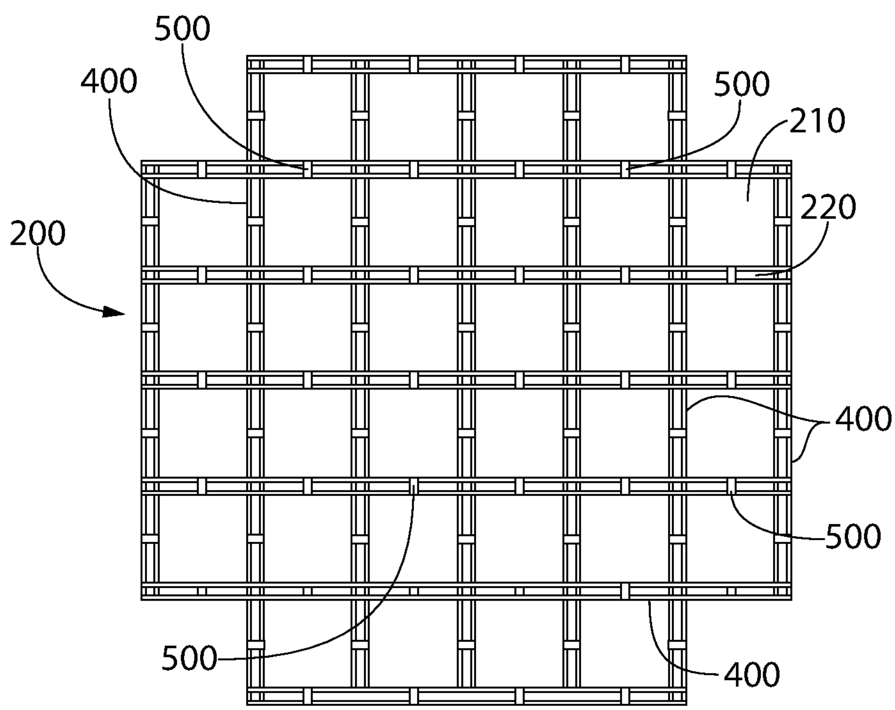
FIG. 5B is a top view of a basket apparatus in accordance with a first alternative embodiment of the present invention.

In the exemplified embodiment, each of the wall plates 400 has an inner surface 410 and an outer surface 411. For a first one of the wall plates 400 and a second one of the wall plates 400, the inner surfaces 410 of the first and second ones of the wall plates 400 face one another. For the second one of the wall plates 400 and a third one of the wall plates, the outer surfaces 411 of the second and third ones of the wall plates 400 face one another. The inner surfaces 410 of the wall plates 400 bounds a portion of one of the fuel cells 210. Specifically, in the exemplified embodiment the inner surfaces 410 of four wall plates 400 collectively form or bound one of the fuel cells 210. The outer surfaces 411 of the wall plates 400 bounds a portion of one of the flux traps 220. Specifically, in the exemplified embodiment the outer surfaces 411 of two adjacently positioned wall plates 400 collectively form one of the flux traps 220. Thus, in one embodiment each wall plate 400 forms, defines, or bounds a portion of one of the fuel cells 210 and a portion of one of the flux traps 220. In one alternative embodiment, the peripheral wall plates 400 may only define a portion of one of the fuel cells 210 and not also a portion of one of the flux traps 220, as shown in FIG. 5A. In another alternative embodiment, the peripheral-most wall plates 400 may only define a portion of one of the flux traps 220 and not also a portion of one of the fuel cells 210, as shown in FIG. 5B.

The flux traps 220 are designed to have a particular width W2 to facilitate decreasing radiation and eliminating the danger of criticality. In some embodiments, the flux traps 220 have a width W2 between 20 mm and 30 mm, more specifically between 22 mm and 28 mm, and still more specifically approximately 26 mm. However, the invention is not to be so limited in all embodiments and the exact width of the flux traps 220 may be outside of the range noted herein depending on radiation levels of the fuel assemblies to be stored therein. As described above, in the exemplified embodiment the wall plates 400 form and define the flux traps 220. In some embodiments, the wall plates 400 have a wall thickness t of between 7 mm and 14 mm, and more specifically approximately 10 mm. Of course, thicknesses of the wall plates 400 outside of the aforementioned range may also be permissible in some embodiments.

In certain embodiments, the wall plates 400 have a thickness t and the flux traps 220 have a width W2. There are two walls plates 400 that bound each of the flux traps 220, such that the combined thickness of the flux traps 220 and the walls bounding them is 2t+W2. In previous basket apparatuses, the wall thickness t has been maintained at a predetermined minimum value to ensure that reactivity control is maintained below regulatory limits regardless of the level of reactivity of the fuel stored therein and to ensure proper thermal conductivity. Furthermore, the wall thickness t has been selected to ensure that it can withstand regulatory normal, off-normal, and accident conditions (i.e., structural rigidity). One major consideration in fuel basket design is that it must withstand inertial impact loads, such as a severe inertial loading event that might cause a free fall in the horizontal direction leading to an impact with a hard surface or a sudden tip-over of the cask from a vertical orientation. Under such events, the fuel assembly 300 bearing on the wall plate 400 acts to deform it and the wall plate 400 must be adequately stiff to withstand the exerted load. Thus, two important considerations for the structural resistance of the wall panel 400 are: (1) ensuring that deflection is maintained below acceptable limits for reactivity control; and (2) ensuring that the wall panels 400 are not compromised. These are some of the many factors that go into determining the appropriate wall thickness t. Regardless, in order to ensure safe operation, and to also maximize capacity, t is selected to be a specific value and 2t+W2 is selected to be a specific value.

Using the inventive concepts described below, it has been found that the value of t may be decreased while maintaining 2t+W2 at the same level, thereby increasing the width of the flux traps 220 and increasing the volume of water that can be placed within the flux trap spaces. Alternatively, it has been found that the value of t may be decreased without increasing the width of the flux traps 220, thereby increasing the overall capacity of the flux trap fuel apparatus 200 relative to those previously known and used. Furthermore, the value of t may be decreased while the value of W2 is increased but less than the decrease in the value of t, which results in an increase in capacity while also increasing the width of the flux trap spaces for enhanced performance. Even with these modifications to the values of t and W2, the structural rigidity and other performance characteristics and regulatory requirements remain met due to the inclusion of the reinforcement members 500 which will be described in greater detail below. Specifically, the reinforcement members 500 are located within the flux traps 220 and span between and abut the outer surfaces 411 of the wall plates 400 that bound the flux traps 220, which significantly reduces the amount of deflection of the wall panels 400 because the reinforcement members 500 will reinforce the wall panels 400 and maintain the width W2 of the flux trap 220. Thus, the reinforcement members 500 provide a means to reduce the wall panel 400 thickness and maintain adequate structural strength and thermal performance in the basket apparatus 200.

Still referring to FIGS. 3, 4 and 5A, as noted above the wall plates 400 are arranged in an intersecting manner to define the basket apparatus 200. The basket apparatus 200 extends along a longitudinal axis A-A. The fuel cells 210 and the flux traps 220 are formed by the spaces between the intersecting wall plates 400, with the larger cross-sectional area spaces forming the fuel cells 210 and the relatively smaller cross-sectional area spaces forming the flux traps 220. In this embodiment, the fuel cells 210 have square or rectangular cross-sectional shapes, although the invention is not to be so limited in all embodiments. Furthermore, as illustrated in these figures, the reinforcement slots 500 are positioned in the flux traps 220 and extend between opposing ones of the wall plates 400 that form the flux traps 220. Specifically, the reinforcement slots 500 extend between, and may abut and be coupled directly via welding, bolting, or the like, to the outer surfaces 411 of the wall plates 400 that face one another and form the flux traps 220.

Specifically, the wall plates 400 are arranged in pairs of closely spaced wall plates 400 that have opposing outer surfaces 411 that face one another that form the flux traps 220. Thus, the flux traps 220 are formed or defined by the outer surfaces 411 of two closely spaced parallel wall plates 400, and more specifically by the opposing outer surfaces 411 thereof that face one another. The pairs of closely spaced wall plates 400 are spaced apart from other pairs of closely spaced wall plates 400 by a distance (the width W1 of the fuel cells 210) that is greater than the distance (the width W2 of the flux traps 220) between the closely spaced wall plates 400 (because the width W1 of the fuel cells 210 is greater than the width W2 of the flux traps 220). The spaces between the pairs of closely spaced wall plates 400 form the fuel cells 210. More specifically, each of the fuel cells 210 is formed in the space between by two parallel wall plates 400 extending in a first direction and the space between two parallel wall plates 400 extending in a second direction that is orthogonal to the first direction.

Figure 6:
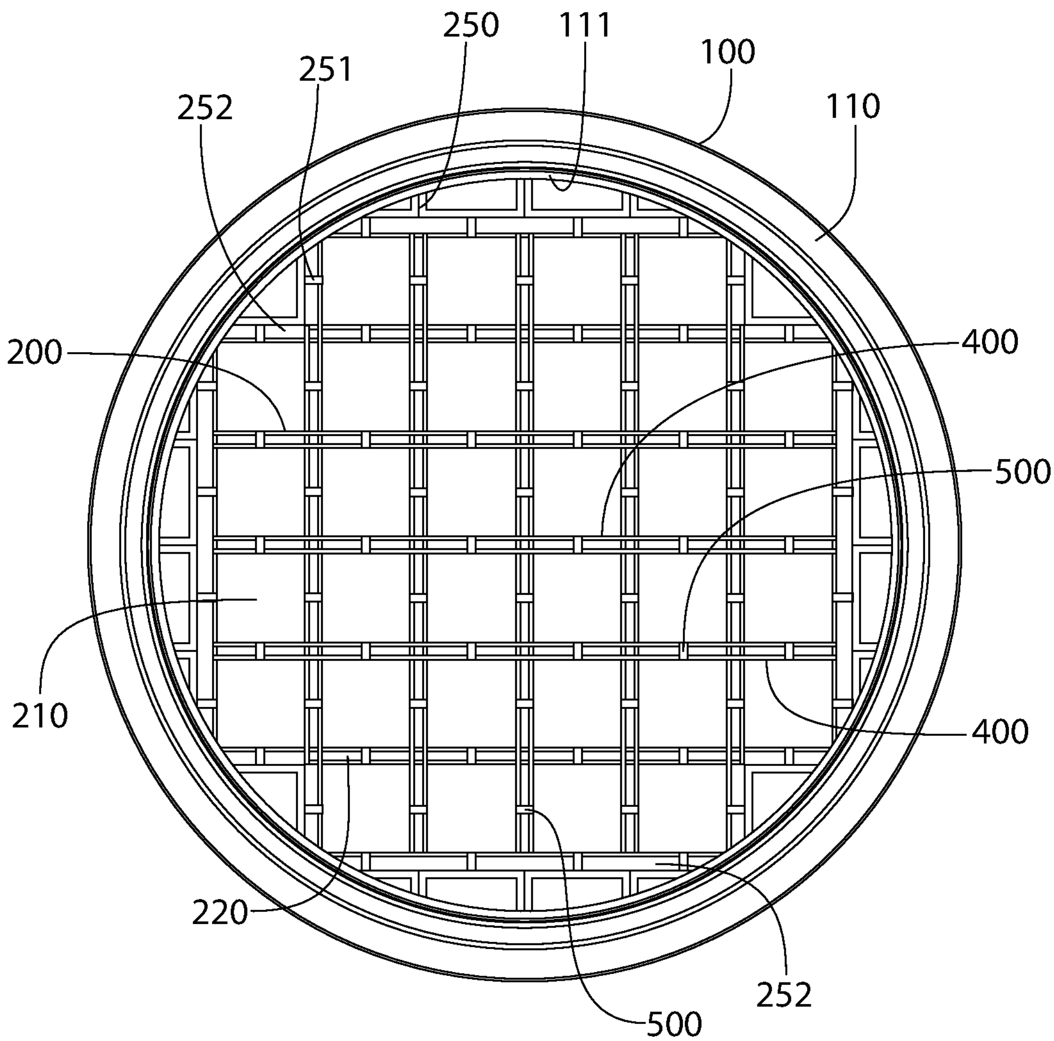
FIG. 6 is a cross-sectional view taken along line VI-VI in FIG. 2A.

In the exemplified embodiment, each of the fuel cells 210 except for the outermost fuel cells 210 is surrounded by flux traps 220 and the outermost fuel cells 210 are surrounded on two sides by flux traps 220. Referring to FIG. 6, in such an embodiment, when the basket apparatus 200 is positioned within the cavity 112 of the container 100, a basket spacer 250 may be included that circumscribes the basket apparatus 200. Specifically, the basket spacer 250 may be positioned between the inner wall 111 of the container body 110 and the basket apparatus 200 to maintain proper spacing between the basket apparatus 200 and the inner wall 111 of the container body 110. In some embodiments, the basket spacer 250 may be spaced apart from the basket apparatus 200 using reinforcement members 251 to form additional flux traps 252 between the basket apparatus 200 and the basket spacer 250.

In an alternate embodiment shown in FIG. 5B, each of the fuel cells 210 may be completely surrounded by the flux traps 220. In still other embodiments, the basket apparatus 200 may be a combination flux trap/non-flux trap fuel basket such that there are rows of flux traps 220 in both directions that the wall plates 400 extend centrally located within the basket apparatus 200 but the outer regions of the basket apparatus 200 are free of flux traps. Thus, variations are possible within the scope of the present invention.

Figure 9:
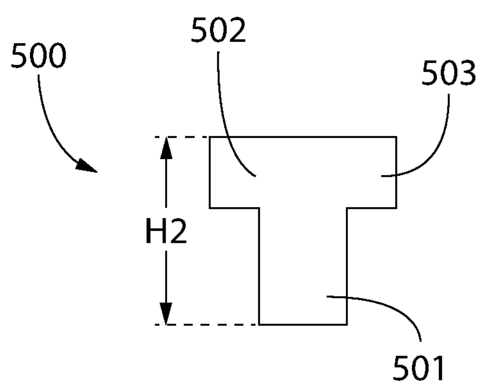
FIG. 9 is a front view of a reinforcement member in accordance with an embodiment of the present invention.

Referring briefly to FIG. 9, the reinforcement member 500 is illustrated in accordance with one embodiment of the present invention. In the exemplified embodiment, the reinforcement member 500 comprises a body portion 501, a first flange portion 502, and a second flange portion 503. The first and second flange portions 502, 503 protrude from opposite sides of the body portion 501. Thus, in the exemplified embodiment the reinforcement member 500 is a "T" shaped member. The reinforcement members 500 may be a T-shaped plate. Furthermore, in some embodiments the reinforcement members 500 may comprise a flat plate that extends substantially orthogonal to the opposing ones of the wall plates 400 between which the reinforcement member 500 extends. Of course, the invention is not to be so limited in all embodiments and the reinforcement member 500 may have a different shape.

Figure 11A:
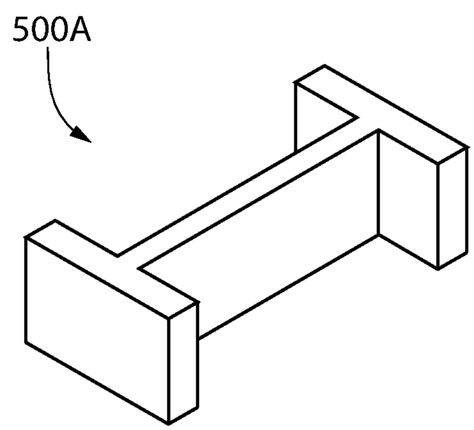
FIGS. 11A-11D are perspective views of reinforcement members in accordance with alternative embodiments of the present invention.
Figure 11B:
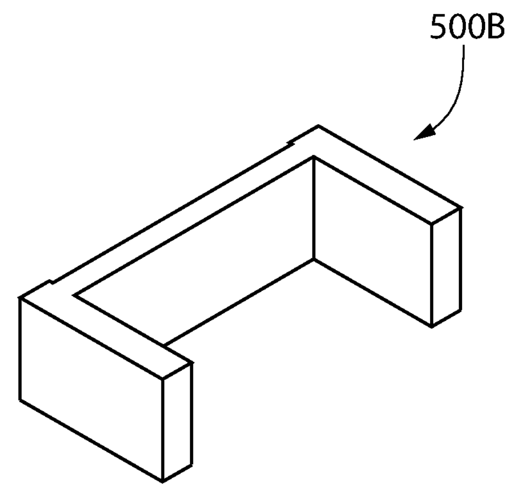
Figure 11C:
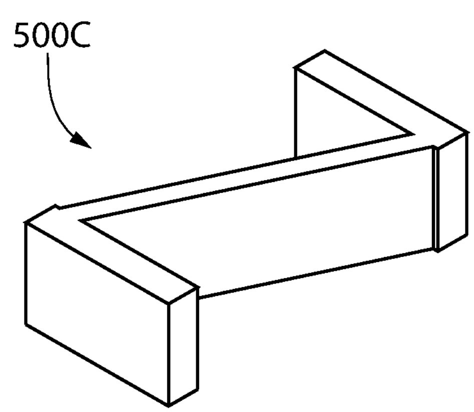
Figure 11D:
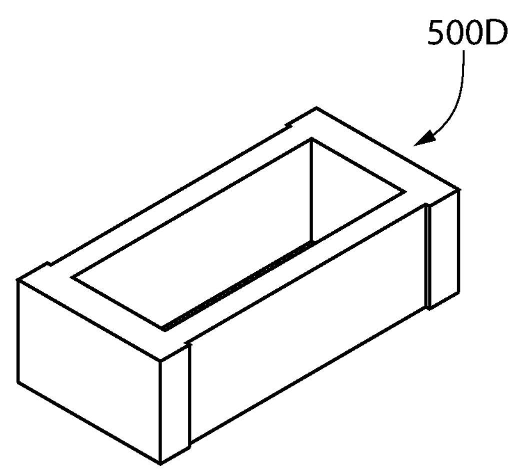

For example, in some embodiments the reinforcement members 500 may be cruciform shaped rather than T-shaped. Such cruciform shaped reinforcement members 500 will readily fit within the reinforcement slot 404 in the upper edge 401 of one wall plate 400 and an aligned reinforcement slot 404 in the lower edge 402 of another wall plate 400 that is axially adjacent to the one wall plate 400. Thus, this will increase the structural rigidity in the slotted wall plate basket apparatus 200. This will be more readily understood upon reading the discussion of the assembly of the basket apparatus 200 below. FIGS. 11A-11D show alternative embodiments for the reinforcement members 500*a-d*, particularly showing their transverse cross-sectional shapes. Thus, the reinforcement members 500A may be I-shaped as shown in FIG. 11A, the reinforcement members 500B may be C-shaped as shown in FIG. 11B, the reinforcement members 500C may be Z-shaped as shown in FIG. 11C, or the reinforcement members 500D may be square/rectangular shaped. Combinations of differently shaped reinforcement members 500 may also be utilized in the same basket apparatus 200 in some embodiments.

Furthermore, although in FIGS. 11A-11D the reinforcement members 500A-D are illustrated as having a particular length, this is not to be limiting of the invention in all embodiments. As discussed in greater detail below, the reinforcement members 500 described herein may have an axial height that is less than the height of the basket apparatus 200, and several of the reinforcement members 500 may be coupled to the basket apparatus 200 in a transversely aligned and axially spaced apart manner to provide the necessary structural rigidity to the basket apparatus 200. This may be desirable because it leaves a greater volume of the flux trap 220 space open. Alternatively, the reinforcement members 500 may have a height that is sufficient to enable a single reinforcement member 500 to extend the entire height of the basket apparatus 200. This may be desirable for ease of assembly and manufacturing. This will be discussed below with reference to FIGS. 13 and 14.

Figure 10A:
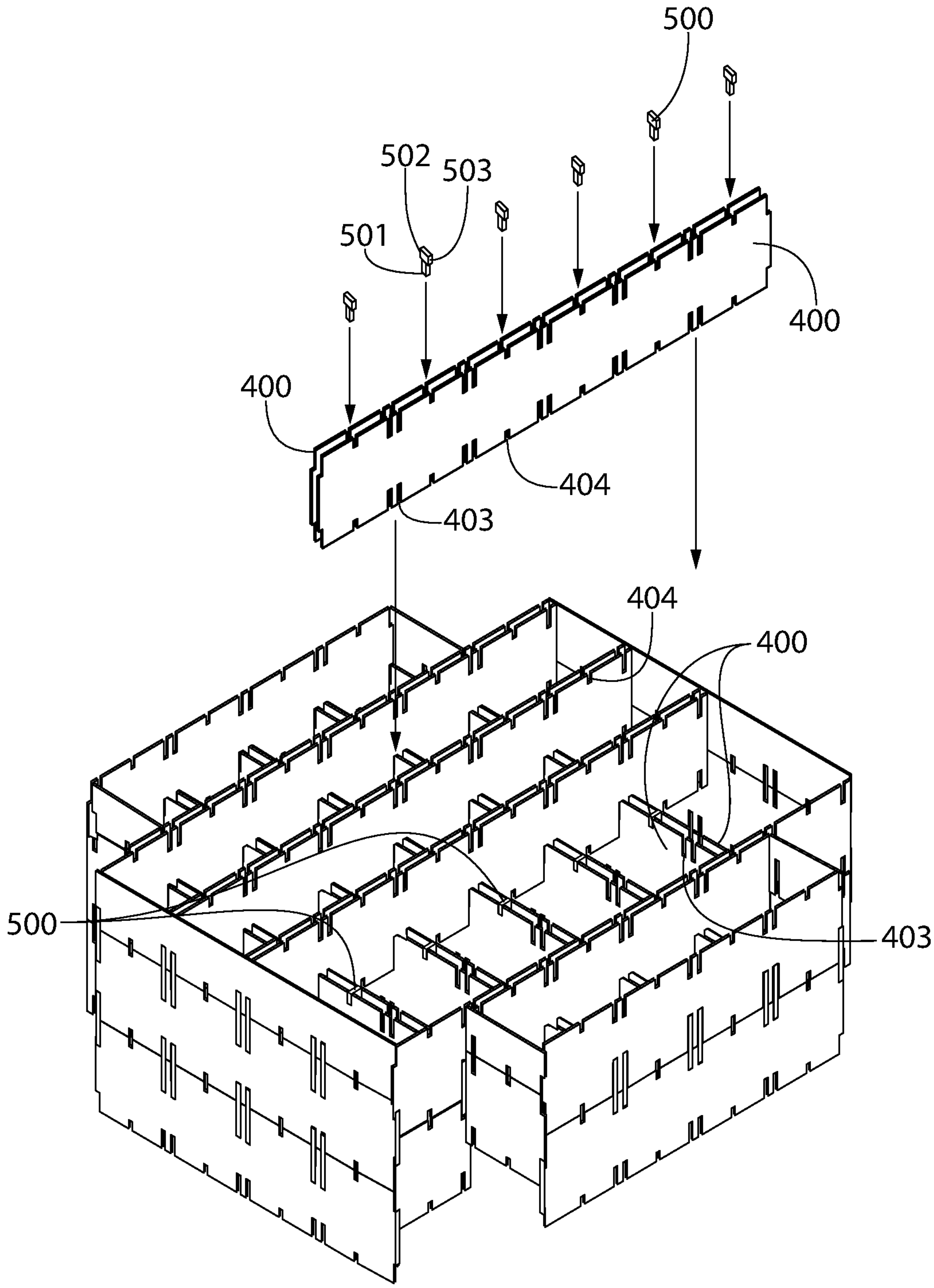
FIGS. 10A-10C are perspective views illustrating assembly of the basket apparatus and reinforcement members of FIG. 3.
Figure 10B:
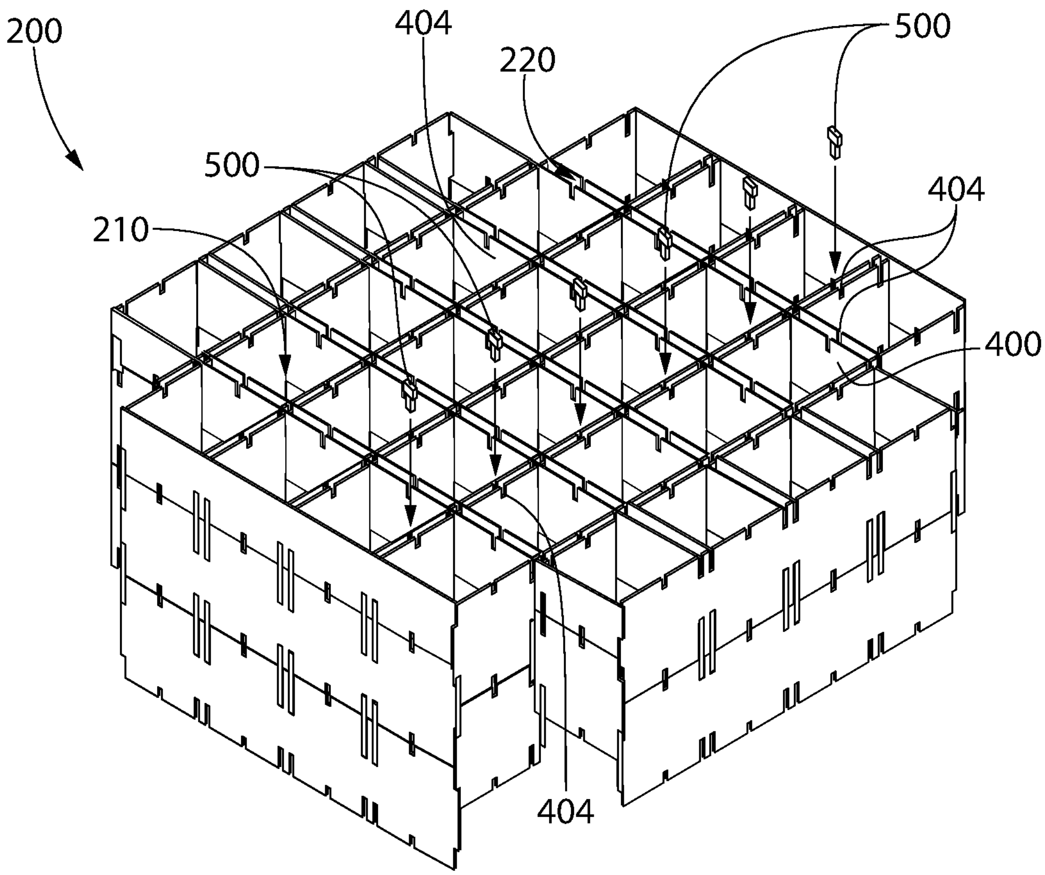
Figure 10C:
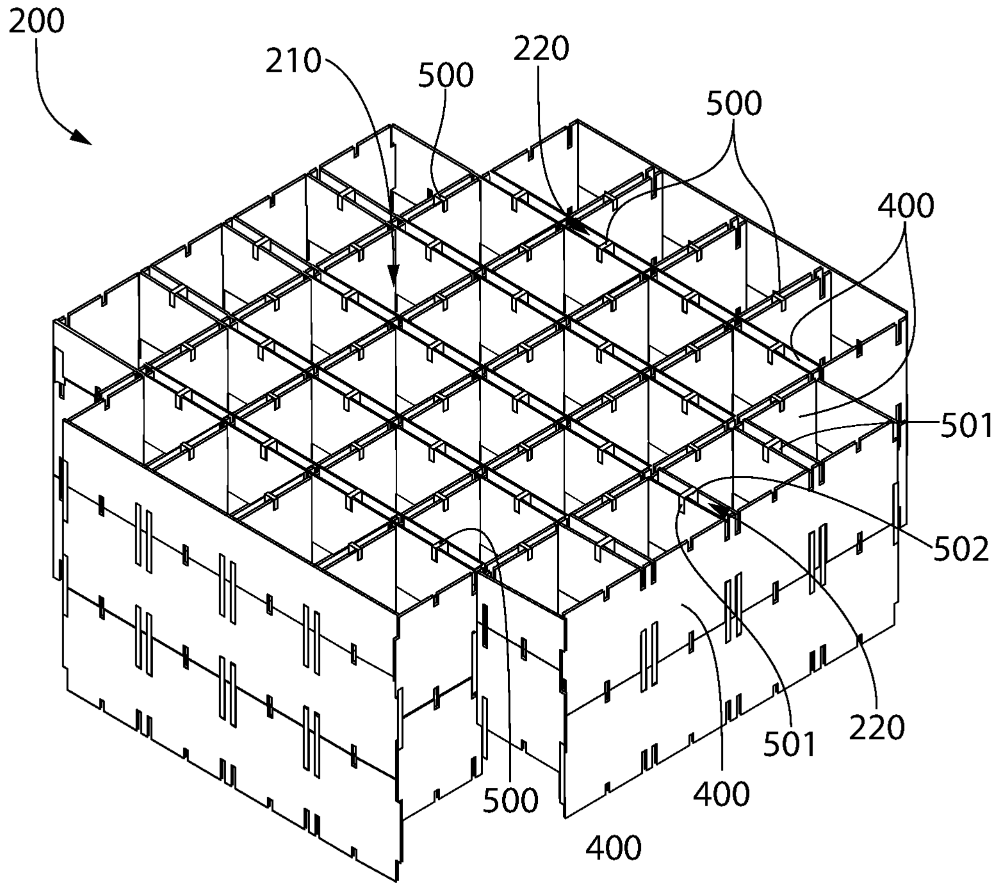

Referring to FIGS. 10A-10C, assembly of the basket apparatus 200 from the wall plates 400 and coupling of the reinforcement members 500 thereto will be described in accordance with one embodiment of the present invention. As noted above, the wall plates 400 are arranged in an intersecting manner. Specifically, a first set of the wall plates 400 are positioned in a parallel and spaced apart manner. Then, a second set of the wall plates 400 are positioned in a parallel and spaced apart manner orthogonal to the first set of wall plates 400. The second set of wall plates 400 are positioned atop of the first set of wall plates 400 with the plate slots 403 of the first and second sets of the wall plates 400 axially aligned with one another so as to cooperatively secure the first set of wall plates 400 to the second set of wall plates 400. Each parallel grouping of the wall plates 400 forms an axial section of the basket apparatus 200. This process continues until the basket apparatus 200 has a desired overall height.

FIG. 10A illustrates the basket apparatus 200 partially assembled with two of the wall plates 400 positioned in preparation for being assembled onto others of the wall plates 400 that are already assembled in the partially formed basket apparatus 200. Within the assembled portion of the basket apparatus 200, some of the reinforcement members 500 are visible secured to the wall plates 400 via the reinforcement slots 404 thereof. In some embodiments, the reinforcement members 500 may be included throughout the basket apparatus 200 nested within each of the reinforcement slots 404. Thus as each layer (or axial segment) of the basket apparatus 200 is formed, reinforcement members 500 may be coupled to the wall plates 400 of that layer so that the reinforcement members 500 are interspersed throughout the basket apparatus 200. In others of the embodiments, some of the reinforcement slots 404 of the wall plates 400 that are assembled into the basket apparatus 200 may include reinforcement members 500 therein while others may not include reinforcement members 500. Thus, the structural arrangement of the basket apparatus 200 formed using the intersecting wall plates 400 permits variation in the positioning of the reinforcement members 500 as desired. The reinforcement members 500 do not need to be located at every reinforcement slot 404 so long as there are a sufficient number of them to ensure that the flux traps 220 (i.e., the gaps between the outer surfaces 411 of the wall plates 400) do not close under loading events as described above. Specifically, a sufficient number of the reinforcement members 500 should be included in the basket apparatus 200 to prevent the wall plates 400 from deflecting towards one other during loading or other non-normal conditions.

In FIG. 10A, some of the reinforcement members 500 are illustrated exploded away from the basket apparatus 200 and from the wall plates 400 that are about to be assembled onto the basket apparatus 200. The two wall plates 400 that are not yet assembled will be positioned so that their plate slots 403 will engage the plate slots 403 of the wall plates 400 directly below. This engagement of the plate slots 403 of the axially adjacent plates 400 secures the plates 400 together to form the basket apparatus 200. The axially adjacent plates 400 may also be welded or bolted together for an additional structural rigidity, although this is not required in all embodiments and the interaction of the plate slots 403 alone may be sufficient without additional welding or bolting.

FIG. 10B illustrates the basket apparatus 200 with the wall plates 400 that were previously not formed onto the basket apparatus 200 assembled. In FIG. 10B, the reinforcement members 500 are illustrated exploded away from the basket apparatus 200 in preparation for coupling thereto.

Referring to FIGS. 10B and 10C concurrently, after the wall plates 400 are assembled, the reinforcement members 500 are positioned within the reinforcement slots 404. Specifically, each of the reinforcement members 500 is sized and shaped to be secured to the wall plates 400 and to fit within the flux trap 220. In the exemplified embodiment, the first and second flange portions 502, 503 of the reinforcement members 500 are positioned so as to nest within the reinforcement slots 404 of opposing ones of the wall plates 400 between which the reinforcement member 500 extends. In that regard, the wall plates 400 that form the flux traps 220 each have at least one of the reinforcement slots 404 formed therein. Specifically, as noted above two adjacent ones of the wall plates 400 form each of the flux traps 220. The two adjacent wall plates 400 each have a plurality of the reinforcement slots 404 formed therein such that the reinforcement slots 404 on one of the wall plates 400 forming/defining the flux trap 220 are aligned with the reinforcement slots 404 on the other one of the wall plates 400 forming/defining the same flux trap 220.

Thus, the first flange portion 502 of the reinforcement member 500 nests within the reinforcement slot 404 of one of the wall plates 400 and the second flange portion 503 of the reinforcement member 500 nests within the reinforcement slot 404 of an opposing one of the wall plates 400. As a result, the body portions 501 of the reinforcement members 500 extend into the flux trap 220 that spans between the two wall plates 400 that the first and second flange portions 502, 503 of the reinforcement member 500 are coupled to. The two wall plates 400 that the reinforcement connector 500 couples to collectively define one of the flux traps 220, and thus the reinforcement member 500 is located within the flux trap 220. More specifically, with the first and second flange portions 502, 503 of the reinforcement member 500 nested within the reinforcement slots 404 of the opposing or adjacent wall panels 400, the body portion 501 of the reinforcement member 500 extends into the flux trap 220 and abuts the outer surfaces 411 of the opposing wall plates 400 that face one another. In this manner, the body portions 501 of the reinforcement members 500 maintain a fixed distance between the opposing ones of the wall plates 400 between which the reinforcement member 500 extends. Due to the body portions 501 of the reinforcement members 500 abutting the outer surfaces 411 of the opposing wall plates 400 that form the flux traps 220 (which may be each flux trap in some embodiments), the reinforcement members 200 work in tandem to increase the structural strength of the basket apparatus 200 and prevent deflection of the wall panels 400 as described herein.

FIG. 10C illustrates the basket apparatus 200 with one of the reinforcement members 500 positioned within every pair of reinforcement slots 404 formed into adjacent ones of the wall panels 400 forming the flux traps 220. Of course, there does not need to be a reinforcement member 500 within every pair of reinforcement slots 404 in all embodiments, and some of the reinforcement slots 404 may be left empty and free of a reinforcement member 500 therein.

Figure 7A:
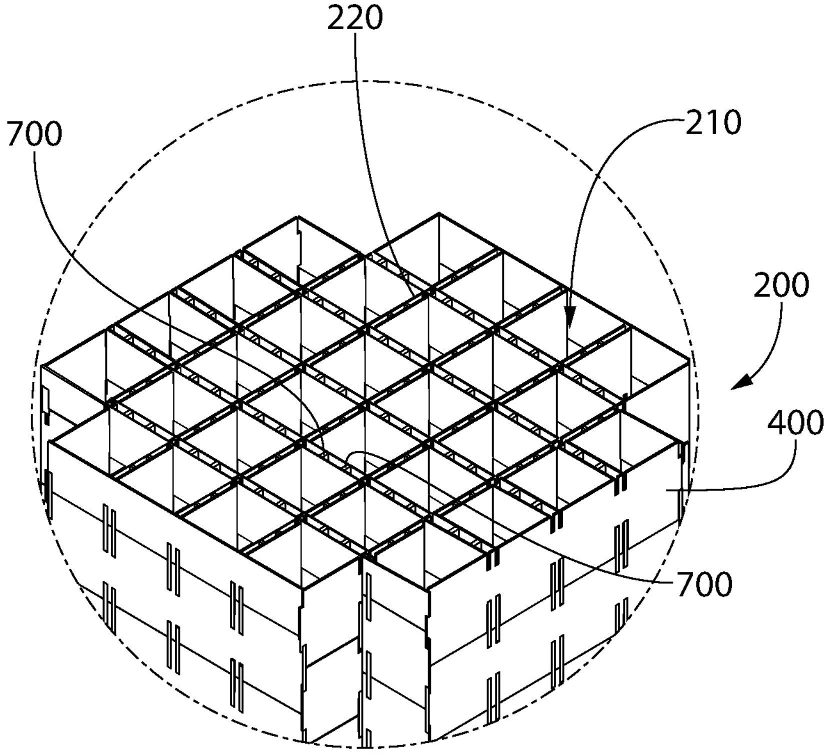
FIG. 7A is a perspective view of a portion of a basket apparatus in accordance with a second alternative embodiment of the present invention.
Figure 7B:
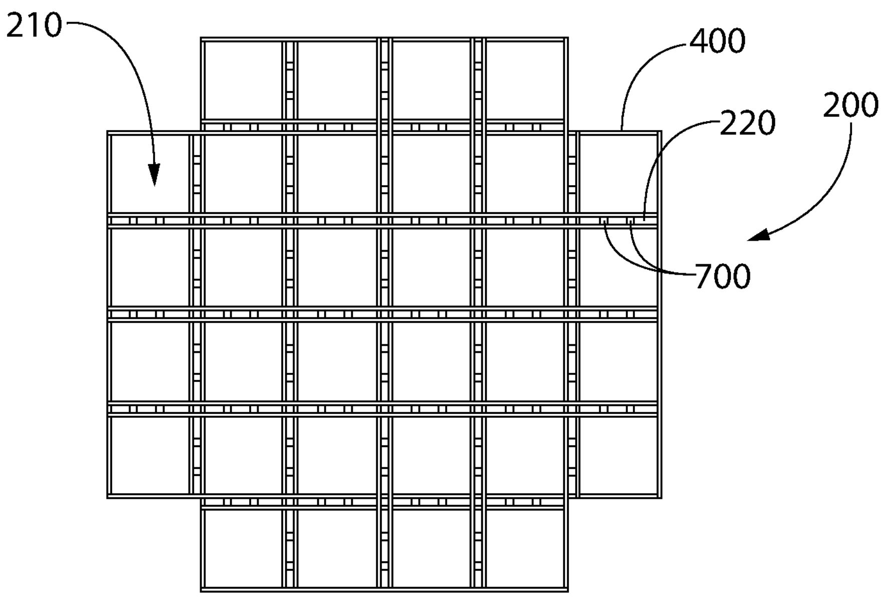
FIG. 7B is a top view of the basket apparatus of FIG. 7A.

In the exemplified embodiment, each of the fuel cells 210 is defined by an enclosed geometry formed by a portion of four of the wall plates 400 (although it may be more than four of the wall plates 400 depending on the shape of the fuel cells 210). In the exemplified embodiment, for each of the portions of the four wall plates 400 that form the fuel cells 210, the reinforcement members 500 are centrally located along that portion of the wall plate 400. Stated another way, each of the fuel cells 210 extends along an axis B-B (see FIG. 2A) that is substantially parallel to the longitudinal axis A-A of the basket apparatus 200. For each adjacent pair of the fuel cells 210, a longitudinal reference plane that extends between and includes the fuel axes B-B of the adjacent pair of the fuel cells 210 intersects at least one of the reinforcement members 500. This occurs due to the central location of the reinforcement members 500 along the portion of the wall plates 400 forming each fuel cell 210. Of course, the invention is not to be so limited in all embodiments and the reinforcement members 500 may be positioned at other locations along the wall panels 400, an example of which is shown in FIGS. 7A and 7B and described below.

As noted above, in certain embodiments each of the wall panels 400 that is used to form the basket apparatus 200 is an identical construction. Thus, each of the wall panels 400 may include the reinforcement slots 404 for retaining the reinforcement members 500. In some embodiments the reinforcement members 500 may be coupled to each of the wall panels 400 at each of the reinforcement slots 404. Thus, the reinforcement members 500 may be positioned throughout the basket apparatus 200 along its axial height. However, the structure of the basket apparatus 200 using the wall panels 400 allows for a great deal of variation. Specifically, the reinforcement members 500 may only be coupled to some of the wall panels 400 and/or at some of the reinforcement slots 404.

Referring to FIGS. 8 and 9, in one embodiment the wall panels 400 may have a height H3 measured between the upper and lower edges 401, 402. Furthermore, the reinforcement members 500 may have a height H4. The height H4 of the reinforcement members 500 may be less than the height H3 of the wall panels 400. In one embodiment, the height H4 of the reinforcement members 500 may be less than or equal to one-half of the height H3 of the wall panels 400. This enables one of the reinforcement members 500 to nest within the reinforcement slot 404 in the upper edge 401 of the wall panel 400 while another one of the reinforcement members 500 nests within the reinforcement slot 404 in the lower edge 401 of the same wall panel 400 that is aligned with the reinforcement slot 404 in the upper edge 401 without the reinforcement members 500 overlapping one another.

FIGS. 2A and 2B illustrate one embodiment of the internal features of the container 100 with the basket apparatus 200 therein. In this embodiment, the reinforcement members 500 are positioned only at the top end of the basket apparatus 200 and at the bottom end of the basket apparatus 200. Specifically, in this embodiment the reinforcement members 500 comprise a first set 520*a* of the reinforcement members located adjacent a top end of the basket apparatus 200 and a second set 520*b* of the reinforcement members located adjacent a bottom end of the basket apparatus 200. The first and second sets 520*a*, 520*b* may be separate and distinct components in some embodiments. In this embodiment a first transverse reference plane C-C (transverse to the longitudinal axis A-A of the basket apparatus 200) exists that intersects each of the reinforcement members 500 of the first set 520*a* of reinforcement members. A second transverse reference plane D-D (transverse to the longitudinal axis A-A of the basket apparatus 200) exists that intersects each of the reinforcement members 500 of the second set 520*b* of reinforcement members. Furthermore, a third transverse reference plane E-E (transverse to the longitudinal axis A-A of the basket apparatus 200) exists axially between the first and second transverse reference planes C-C, D-D. In the exemplified embodiment, due to the reinforcement members 500 being located only at the top and bottom ends of the basket apparatus 200, the third transverse reference plane E-E does not intersect any of the reinforcement members 500.

By positioning the reinforcement members 500 at the top and bottom of the basket apparatus 200 only, it is possible that the reinforcement members 500 are not transversely aligned with any of the spent nuclear fuel. Specifically, as seen in FIG. 2B, the fuel rods 310 do not extend the entire length of the fuel cell 210, but rather extend between the first and second end caps 301, 302. Thus, the fuel rods 310 extend from a first end 311 that is spaced from a top-most end 206 of the basket apparatus 200 to a second end 312 that is spaced from a bottom-most end 205 of the basket apparatus 200. The first set 520*a* of reinforcement members 500 are located within the axial space between the first end 311 of the fuel rods 310 and the top-most end 206 of the basket apparatus 200. The second set 520*b* of reinforcement members 500 are located within the axial space between the second end 312 of the fuel rods 310 and the bottom-most end 205 of the basket apparatus 200. Thus, in this embodiment no portion of the fuel rods 310 is aligned with the reinforcement members 500. Stated another way, there is no transverse plane that intersects a portion of the fuel rods 310 and one or more of the reinforcement members 500.

This arrangement may be advantageous for the following reasons. The fuel rods 310 are known to emanate radiation in the transverse direction. The reinforcement members 500 take up some of the valuable volume of the flux traps 220 that would otherwise be filled with water or some other modulator/radiation shielding material. Because the reinforcement members 500 are not aligned with the fuel rods 310 in this embodiment, the reinforcement members 500 do not interfere with the radiation shielding and the full width of the flux traps 220 that is adjacent to the fuel rods 310 in the transverse direction is available for radiation shielding (either by itself or via being filled with a radiation shielding material). Of course, additional reinforcement members 500 may be included within the flux traps in axial alignment with the reinforcement members 500 of the first and second sets

520*a*, 520*b* to provide additional structural rigidity to the basket apparatus 200 in some embodiments.

Referring to FIGS. 2A, 2B, and 3 concurrently, the above will be described in a different way with specific mention of the wall plates 400. In the exemplified embodiment, the wall plates 400 include a plurality of first wall plates 400*a*, a plurality of second wall plates 400*b*, and a plurality of third wall plates 400*c*. The first wall plates 400*a* form a top-most axial section of the basket apparatus 200. The third wall plates 400*c* form a bottom-most axial section of the basket apparatus 200. The second wall plates 400*b* form one or more middle axial sections of the basket apparatus 200. Each axial section of the basket apparatus 200 is defined by a plurality of the wall plates 400 that are all intersected by the same transverse reference plane.

In this embodiment, it may be the case that the second wall plates 400*b* are formed of a metal matrix material having neutron absorbing particular reinforcement. Thus, the second wall plates 400*b* may be formed of a material that shields against neutron radiation. Furthermore, in this embodiment the first and third wall plates 400*a*, 400*c* may be formed of stainless steel. Stainless steel does not shield against neutron radiation to the same degree that the metal matrix of the second wall plates 400*b* does. Thus, in this embodiment it is preferable to not include fuel rods in transverse alignment with the first and third wall plates 400*a*, 400*c*.

Furthermore, in this same embodiment, the reinforcement members 500 may also be formed of stainless steel. In one embodiment, the reinforcement members 500 formed of stainless steel may be located only in portions of the flux traps that are formed by the top-most axial section (i.e., the first wall plates 400*a*) and the bottom-most axial section (i.e., the third wall plates 400*c*) of the basket apparatus 200. In this embodiment, the end caps 301, 302 may be transversely aligned with the top-most axial section formed by the first wall plates 400*a* and the bottom-most axial section formed by the third wall plates 400*c*. However, it may be preferable that the fuel rods 310 do not extend into the top-most axial section and the bottom-most axial section of the basket apparatus 200.

In embodiments that use wall plates 400 formed of stainless steel and reinforcement members 500 formed of stainless steel, the reinforcement members 500 may be welded to the steel plates 400. Furthermore, in all embodiments disclosed herein it is possible for the reinforcement members 500 to be welded, bolted, combinations thereof, or otherwise mechanically fastened to the wall plates 400 defining the flux trap 220 within which the reinforcement members 500 are positioned either alternative to or in addition to the reinforcement members 500 nesting within the reinforcement slots 404 as disclosed herein.

Referring briefly to FIGS. 7A and 7B, the basket apparatus 200 is illustrated with an alternative arrangement of reinforcement members 700. The basket apparatus 200 and the reinforcement members 700 are identical to the similar structures/components described above except with regard to the differences specifically noted herein below. First, in this embodiment the reinforcement members 700 are not illustrated with flanges that interact with slots in the wall plates 400. Rather, in this embodiment the reinforcement members 700 are illustrated such that they are fastened to the wall plates 400 via welding, bolting, or the like as described herein above. Of course, this arrangement of the reinforcement members 700 may also be coupled to the wall plates 400 using flanges and slots are described above. In this embodiment, the reinforcement members 700 are illustrated as flat rectangular plates rather than T-shaped plates because there is no longer a need for the T-flanges. Of course, other shapes are possible and fall within the scope of this disclosure. For example, the reinforcement members 700 may include additional material/flanges to ensure a proper weld or bolted engagement between the reinforcement members 700 and the wall plates 400.

Another difference between this embodiment and those previously described is in the positioning and arrangement of the reinforcement members 700 within the flux traps 220. Specifically, in this embodiment rather than having one reinforcement member 700 (or a plurality of axially spaced reinforcement members) positioned within each flux trap 220 space at the center-point of that particular flux trap 220 space, this embodiment includes two reinforcement connectors 700 within each flux trap 220 space situated symmetrically from the mid-plane of the portion of the wall plates 400 defining the flux trap 220. Thus, multiple of the reinforcement members 700 may be positioned within one of the flux traps 220 that bounds one side of a single fuel cell 210. In the exemplified embodiment, the two reinforcement members 700 that are positioned within a single flux trap 220 space are equidistantly spaced from the center-point of that flux trap 220 space. However, variations in the arrangement, positioning, and number of the reinforcement members 700 within a single flux trap space 220 are possible.

Although variations are possible, in certain embodiments it is preferable that the reinforcement members 500, 700 described herein be positioned into abutting contact with side surfaces of the wall plates 400 that define the flux traps 220 and the fuel cells 210 rather than the corners thereof. Stated another way, each of the fuel cells 210 has a polygonal shape, which is a square in the exemplified embodiment (although other shapes are possible). The polygonal shape of the fuel cells 210 has a plurality of sides and a plurality of corners. The reinforcement members 500, 700 are positioned adjacent to and aligned with the sides of fuel cells 210 (or the sides of the plates that define the fuel cells 210) rather than the corners of the fuel cells 210. This is because the reinforcement members 500, 700 are intended to prevent these walls from deflecting or moving towards one another during certain conditions. The reinforcement members 500, 700 would not achieve this purpose if positioned at the corners of the fuel cells 210 rather than along the sides of the fuel cells 210.

The flux traps 220 may be considered to extend transversely in intersecting directions orthogonal to the longitudinal axis A-A of the basket apparatus 200 along the entire length and width of the basket apparatus 200. As used herein, a single flux trap space refers to a portion of the flux traps that bound a portion of one of the fuel cells 210. Specifically, each fuel cell 210 (or at least each fuel cell 210 other than the peripheral-most fuel cells) is bounded by portions of four flux traps 220. Those portions of the four flux traps are each referred to herein as a single flux trap. Thus, in the embodiment of FIGS. 7A and 7B, there are two reinforcement members 700 positioned within each of the portions of the four flux traps 220 that bound each of the fuel cells 210.

Figure 12:
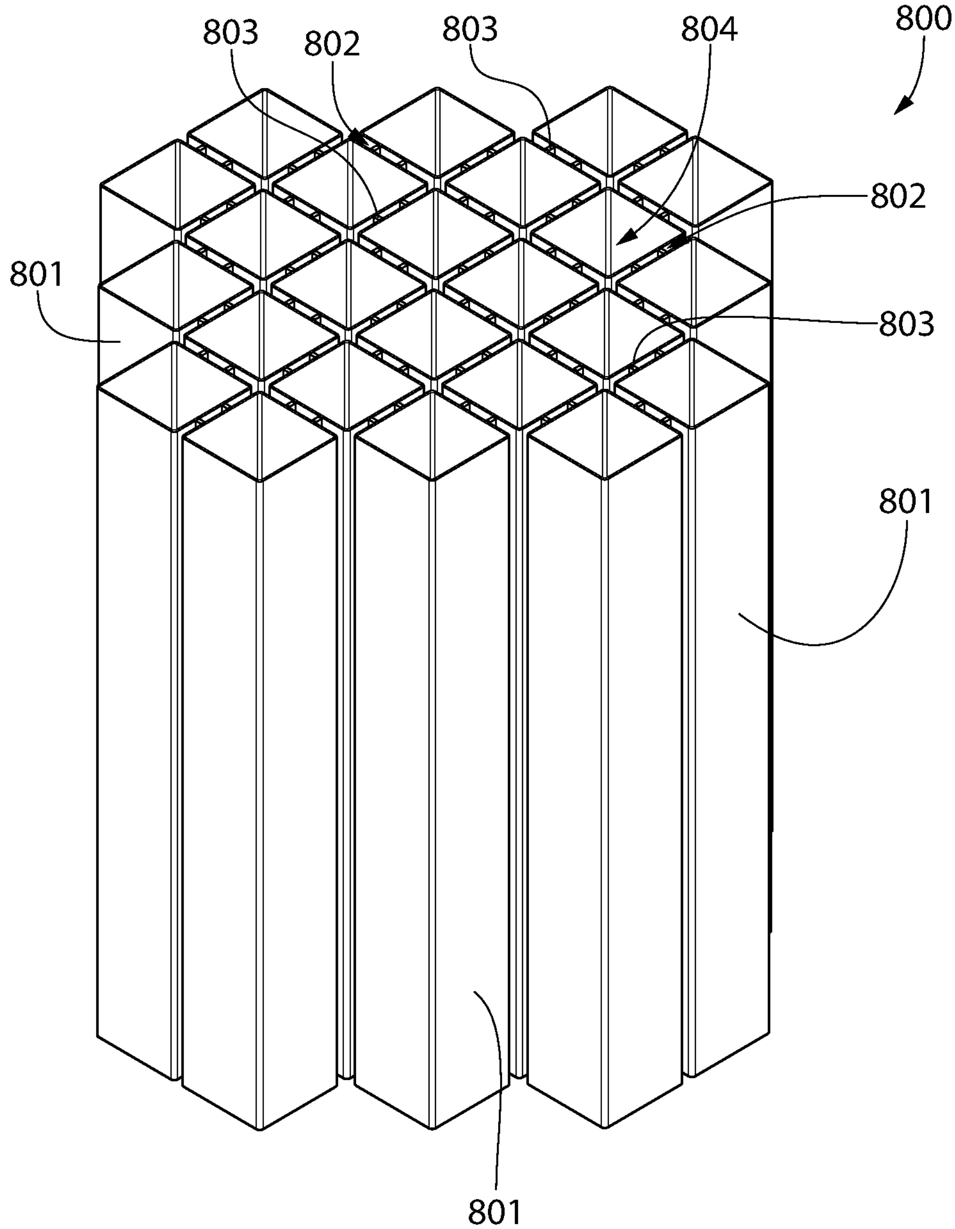
FIG. 12 is a perspective view of a portion of a basket assembly in accordance with a third alternative embodiment of the present invention.

Referring briefly to FIG. 12, an alternative basket apparatus 800 is illustrated. In FIG. 12, the basket apparatus 800 is not formed from slotted plates as with the previously described embodiments. Rather, in the exemplified embodiment the basket apparatus 800 is formed from a plurality of distinct elongated tubes 801 with square-shaped transverse-cross sections. Of course, as with the previously described embodiments, the transverse cross-sectional shape of the elongated tubes is not to be limiting in all embodiments and they may be triangular, rectangular, hexagonal, or the like in alternative embodiments. The elongated tubes 801 have inner surfaces that define a fuel cell 804 for the storage of fuel assemblies as has been described above. The elongated tubes 801 are arranged in an adjacent and spaced apart manner so that each of the elongated tubes 801 is at least partially, if not fully, surrounded by a flux trap 802.

In the exemplified embodiment, two reinforcement members 803 are depicted within each portion of the flux trap space 802 that surrounds one of the elongated tubes 801. The two reinforcement members 803 are offset from the center-point of the flux trap 802 within which they are positioned similar to the arrangement described with reference to FIGS. 7A and 7B above. Of course, the invention is not to be so limited and a single reinforcement member or more than two reinforcement members may be disposed within each portion of the flux trap space 802 as has been described in detail herein above. Thus, FIG. 12 is mainly intended to illustrate a different form of a basket assembly that is formed by elongated tubes rather than by slotted plates. All other features described above and below are applicable to both the embodiments that utilize slotted plates and those that utilize elongated tubes to form the basket assemblies.

Figure 13:
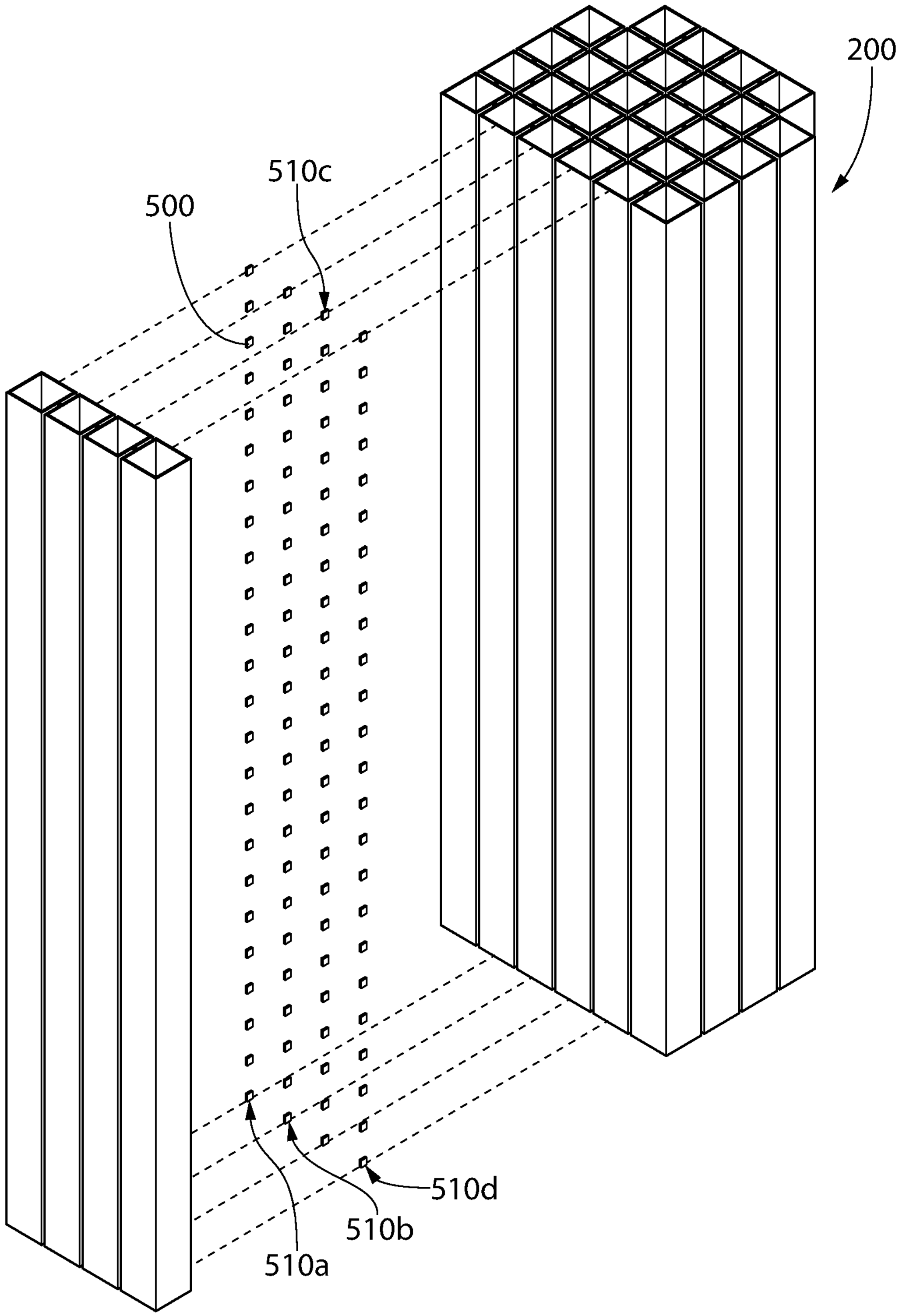
FIG. 13 is a partially exploded view of a basket apparatus and reinforcement members in accordance with an embodiment of the present invention.

Referring to FIG. 13, the fuel basket 200 is illustrated with a portion thereof exploded away so that the positioning of the reinforcement members 500 may be seen. In this embodiment, the fuel basket 200 is illustrated as being formed by separate tubes that are coupled together in a spaced apart manner thereby forming the flux traps therebetween. However, this same discussion is applicable to the embodiments described above whereby the basket apparatus 200 is formed by the wall plates 400. Thus, although in this embodiment the reinforcement slots, plate slots, and the like are omitted, they may be included in other embodiments and thus the description related to FIG. 13 is not intended to be limited to the specific embodiment shown, but rather may be relevant to all embodiments described herein.

In this embodiment, the reinforcement members 500 are arranged in groupings 510*a-d* (also referred to herein as longitudinal groups). Each grouping 510*a-d* is aligned along a longitudinal axis that is parallel to the longitudinal axis of the basket apparatus 200. Furthermore, in this embodiment each grouping 510*a-d* comprises a plurality of the reinforcement members 500 (distinct, separate components) that are axially spaced apart along the height of the basket apparatus 200. Stated another way, in this embodiment each of the groupings 510*a-d* comprises a subset of the reinforcement members 500 that are arranged in a spaced apart manner along an axis of that grouping 510*a-d* (also referred to herein as a group axis) that is substantially parallel to the longitudinal axis A-A of the basket apparatus 200. Each of the reinforcement members 500 may be coupled to the basket apparatus 200 in any number of ways. Specifically, the reinforcement members 500 may be coupled to the basket apparatus 200 utilizing the flange/slot arrangement described above with particular reference to FIGS. 10A-10C. Alternatively, the reinforcement members 500 may be coupled to the basket apparatus 200 via welding, bolting, combinations thereof, or other similar techniques.

Thus, in this embodiment the groupings 510*a-d* of the reinforcement members 500 are positioned within the flux traps 220 in an axially spaced apart manner along the height of the basket apparatus 200. As a result, the reinforcement members 500 take up less space within the flux traps 220 than if the reinforcement members 500 were not axially spaced apart. This may be desirable because maintaining a larger volume of empty space (either left empty or filled with a modulator) within the flux traps 220 may result in greater reactivity control and greater radiation shielding. The exact number of reinforcement members 500 within each of the groupings 500*a-d* and the exact spacing between the reinforcement members 500 is not limiting of the present invention in all embodiments. These design considerations may be made to achieve an appropriate balance between flux space volume, structural rigidity, deformation resistance, and the like. This arrangement utilizing groupings 510*a-d* of the reinforcement members 500 arranged in an axially spaced manner along an axis that is parallel to the longitudinal axis A-A of the basket apparatus 200 is also shown in cross-section in FIG. 2C.

Figure 2C:
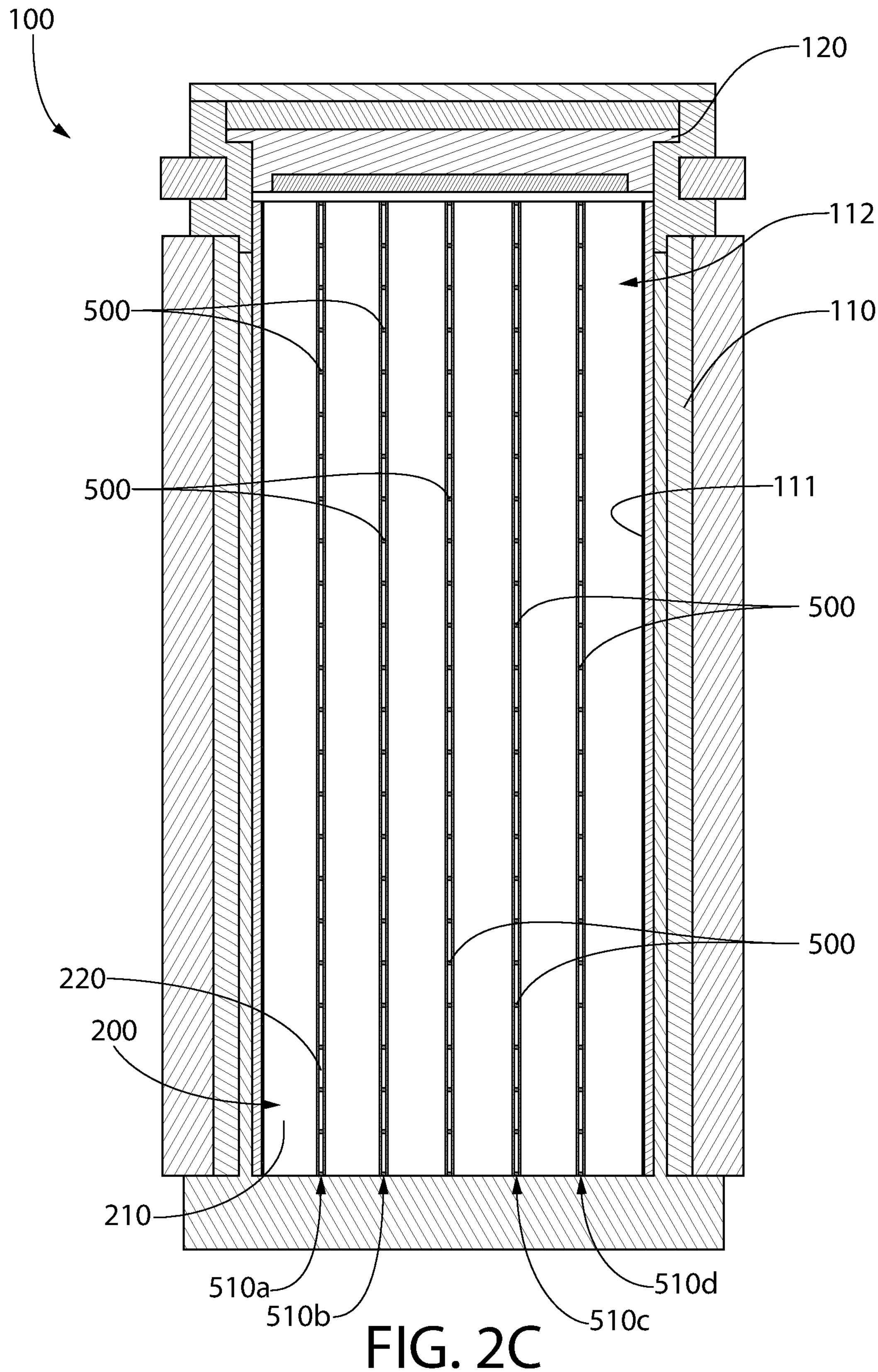
FIG. 2C is a cross-sectional view taken along line II-II of FIG. 1 showing an alternative basket apparatus within a cavity of the container.

Specifically, referring to FIG. 2C, in one embodiment a plurality of the reinforcement members 500 (i.e., a grouping 500*a-d* of the reinforcement members 500) may be positioned within each flux trap 220 in an axially spaced apart manner. Thus, the reinforcement members 500 may form a non-continuous support structure for the walls that define the flux trap 220. In another embodiment, the reinforcement members 500 may be elongated such that the body portion 501 of the reinforcement members 500 extends along a majority of or an entirety of the length of the flux trap 220. In such embodiment, rather than having a plurality of axially spaced apart reinforcement members 500, there may be a single elongated reinforcement member 500 within the flux trap 220 that extends along most or the entirety of the height of the flux trap 220. However, in some embodiments it may be preferable to use the plurality of spaced apart reinforcement members 500 because this may take up less of the flux trap 220 space, leaving more of the flux trap 220 space available for water or the like to provide radiation shielding.

Figure 14:
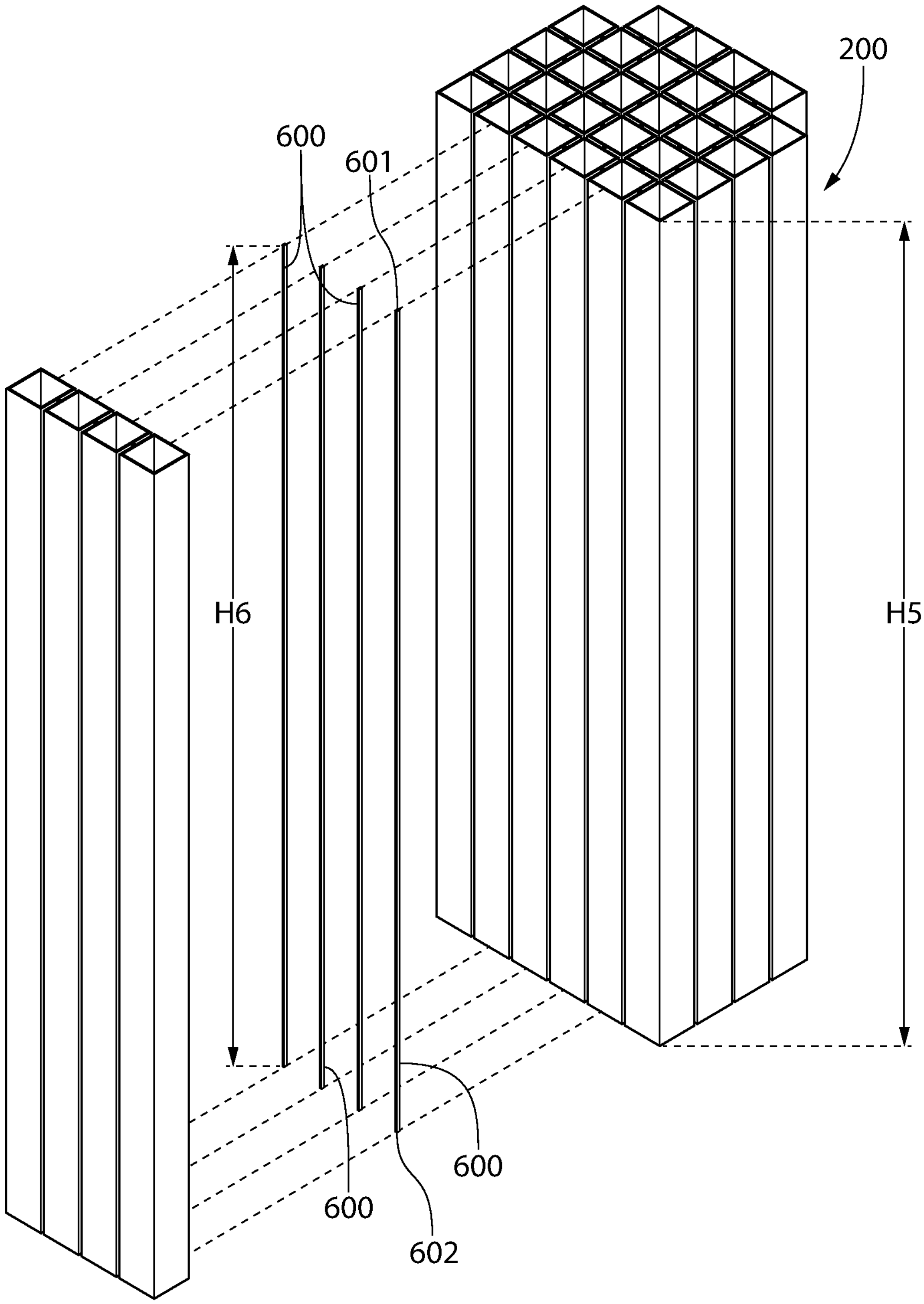
FIG. 14 is a partially exploded view of a basket apparatus and reinforcement members in accordance with another embodiment of the present invention.
Figure 15:
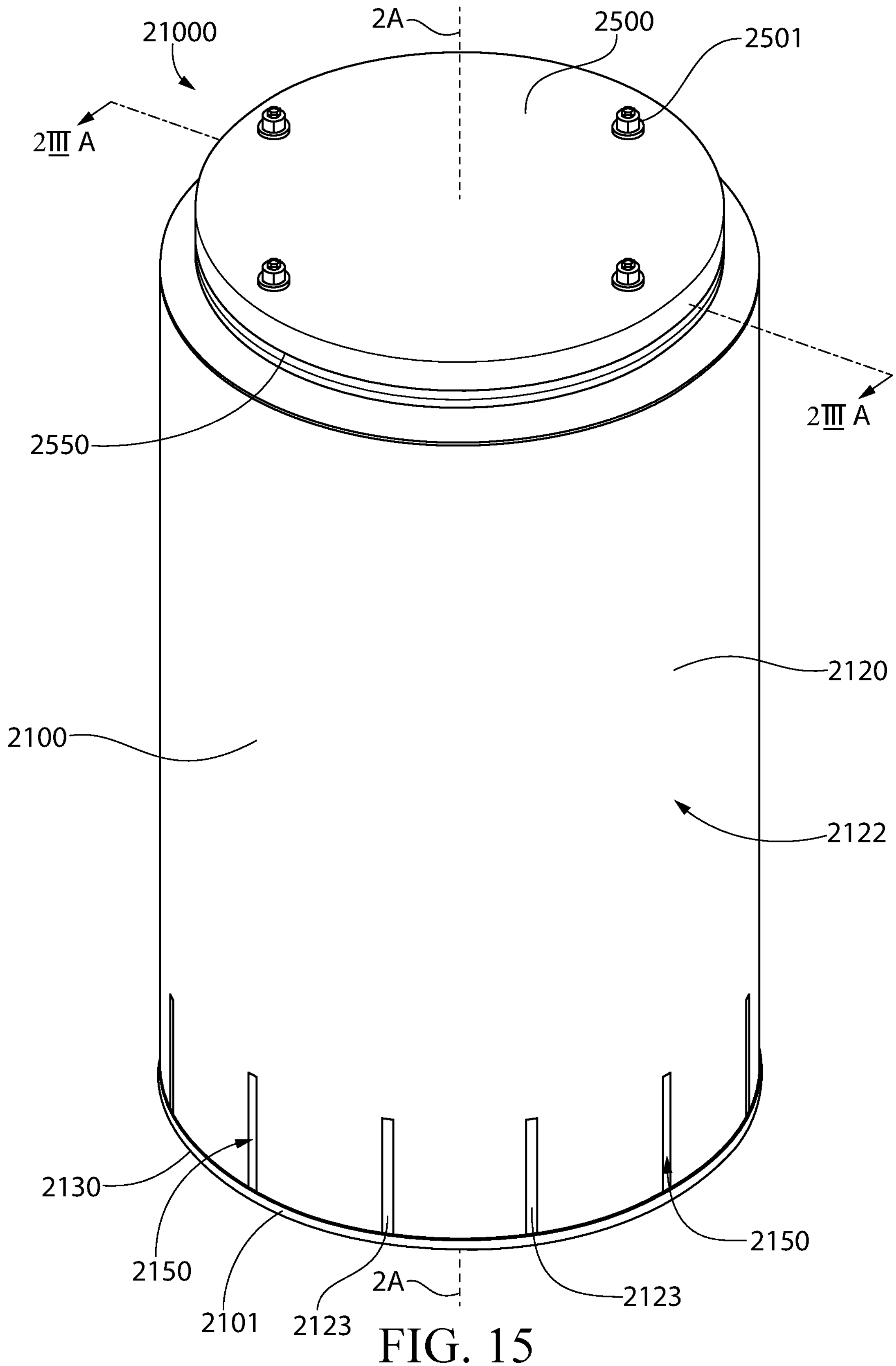
FIG. 15 is a top perspective view of ventilated apparatus according to an embodiment of the present invention.

Referring to FIG. 14, an alternative arrangement of the fuel basket 200 with reinforcement members 600 is illustrated. Again, although the fuel basket 200 is illustrated as being formed by separate tubular structures, the invention is not to be so limited and the concepts described below with reference to FIG. 14 may be applied to any flux trap fuel basket, including those formed using slotted plates described above.

The difference between this embodiment and those previously described, and specifically the embodiment described with reference to FIG. 13, is that the reinforcement members 600 are much taller than those previously described. Specifically, in this embodiment the basket apparatus 200 has a height H5 and the reinforcement members 600 have a height H6. In one embodiment, the height H6 of the reinforcement members 600 is the same as the height H5 of the basket apparatus 200. In another embodiment, the height H6 of the reinforcement members 600 may be slightly less than the height H5 of the basket apparatus 200. Thus, in this embodiment the reinforcement members 600 are singular structures that extend along the entire height of the basket apparatus 200 within the flux trap spaces thereof.

The reinforcement members 600 extend from a top end 601 to a bottom end 602. In some embodiments the reinforcement members 600 may be welded, bolted, or otherwise affixed to the basket apparatus 200 only at the tops and bottoms of the reinforcement members 600 adjacent the top and bottom ends 601, 602 of the reinforcement members 600. This may be sufficient to maintain the reinforcement member 600 within the flux trap without dislodging even during load situations. Thus, it is not necessary in all embodiments to make a connection between the reinforcement members 600 and the basket apparatus 200 along the entire length of the reinforcement members 600. Of course, in some embodiments the reinforcement members 600 may be coupled (welded, bolted, or the like) to the basket apparatus 200 along additional points of contact between the top and bottom ends 601, 602 of the reinforcement members 600.

Furthermore, combinations of the configuration of the groupings 510*a-d* of reinforcement members 500 shown in FIG. 13 and the reinforcement members 600 shown in FIG. 14 are also possible in some embodiments. Specifically, some of the flux trap spaces may have groupings 510*a-d* of the reinforcement members 500 and others of the flux trap spaces may have unitary reinforcement members 600 extending along the entire axial height of the flux trap spaces.

As noted above, the elongated reinforcement members 600 may be utilized in a basket apparatus 200 that is formed from slotted plates as discussed above. In such an embodiment, the reinforcement members 600 may extend from an upper-most wall plate 400 in the basket apparatus 200 to a bottom-most plate 400 in the basket apparatus 200. In this embodiment, the reinforcement members 600 may be physically coupled to only the upper-most wall plate 400 and the bottom-most wall plate 400 while not also being physically coupled to the wall plates 400 therebetween. Specifically, the reinforcement members 600 in this alternative embodiment may be welded, bolted, or the like to the upper-most wall plate 400 and to the lower-most wall plate 400. While the reinforcement member 600 will also abut and extend along all of the wall plates 400 between the upper and lower-most wall plates 400 in the basket apparatus 200, the reinforcement member 600 may not be physically welded, bolted, or the like to those additional wall plates 400. Of course, in alternative embodiments the reinforcement member 600 may be physically secured (via bolting, welding, mechanical mating, or the like) to more than just the upper and lower-most wall plates 400 in the basket apparatus 200.

In some embodiments the basket apparatuses may be formed entirely of neutron absorber material (i.e., the plates forming the basket apparatus may have a built-in neutron absorber material). In such embodiments, it may be preferable to add a stainless steel plate to the bottom and top of the basket apparatus (where the fuel rods are not located) so that the stainless steel plates form the bottom and top portions of the basket apparatus. Furthermore, in such embodiments it may be preferable to utilize a set of axial strips at the basket edges to join the top and bottom grids. The reinforcement members described herein may be made of stainless steel so that they can be welded to the top and bottom portions of the basket apparatus. Stainless steel reinforcement members may be preferable because they enable a thinner wall with equivalent strength, thereby leaving more of the flux space available for being filled with a moderator for criticality control.

The reinforcement member 500 described herein enables the panel thickness of the wall panels 400 to be reduced while allowing the structural response of the wall panels 400 to provide the required resistance during all regulatory loading events during storage, transport, or disposal because the reinforcement member 500 prevents wall deflection even with a thinner wall). The reactivity control is improved in this design since a small fraction of the removed wall panel 400 volume may be maintained as free-space for water influx during flooding events while the remainder of the volume is removed to allow a more compact basket design. The fact that the flux-trap basket apparatus 200 in this embodiment has thinner wall panels 400 compared to the non-flux trap basket design does not adversely affect the thermal performance since there are two panels between adjacent fuel assemblies, providing the same or more material for thermal conductivity.

While the inventive concepts described herein have been illustrated with a basket apparatus made up of square shaped fuel cells, the fundamental design concept disclosed herein is also applicable to fuel cells of rectangular and hexagonal cross section, and the like. Furthermore, while the inventive concepts described herein have been described with reference to flux trap fuel baskets, they may also be used in combination flux trap/non-flux trap iterations.

II. Inventive Concept 2

With reference to FIGS. 15-24, a second inventive concept will be described.

Referring to FIGS. 15-17B concurrently, a ventilated apparatus 1000 is illustrated according to an embodiment of the present invention. The ventilated apparatus 1000 is a vertical, ventilated, dry, SNF storage system that is fully compatible with 100 ton and 125 ton transfer casks for spent fuel canister transfer and storage operations. The ventilated apparatus 21000 can, of course, be modified and/or designed to be compatible with any size or style of transfer cask. Moreover, while the ventilated apparatus 21000 is discussed herein as being used to store SNF, it is to be understood that the invention is not so limited and that, in certain circumstances, the ventilated apparatus 21000 can be used to transport SNF from location to location if desired. Moreover, the ventilated apparatus 21000 can be used in combination with any other type of high level radioactive waste. The ventilated apparatus 21000 may in certain embodiments be a ventilated vertical overpack.

The ventilated apparatus 21000 is designed to accept a canister for storage at an Independent Spent Fuel Storage Installation ("ISFSI"). All canister types engineered for the dry storage of SNF can be stored in the ventilated apparatus 21000. Suitable canisters include multi-purpose canisters ("MPCs") and, in certain instances, can include thermally conductive casks that are hermetically sealed for the dry storage of high level radioactive waste. Typically, such canisters comprise a honeycomb basket or other structure to accommodate a plurality of SNF rods in spaced relation.

The ventilated apparatus 21000 comprises two major parts: (1) a dual-walled cylindrical overpack body 2100 which comprises a set of inlet ducts 2150 at or near its bottom extremity and an integrally welded baseplate 2130; and (2) a removable top lid 2500. In some embodiments, the removable top lid 2500 may be equipped with at least one, or a plurality of, outlet ducts 2550. However, as described herein below with reference to FIGS. 22A-22C, the invention is not to be so limited and the outlet ducts 2550 may not be formed entirely by the lid 2500 but may instead be formed by the interface of the lid 2550 and the overpack body 2100. The overpack body 2100 forms an internal cavity 10 about a longitudinal axis 2A-2A of sufficient height and diameter for housing an MPC 2200 fully therein. The ventilated apparatus 21000 is designed so that the internal cavity 10 has a minimized height that corresponds to a height of the MPC 2200 which is to be stored therein. Moreover, the cavity 10 preferably has a horizontal (i.e., transverse to the longitudinal axis 2A-2A) cross-section that is sized to accommodate only a single MPC 2200.

The overpack body 2100 extends from a bottom end 2101 to a top end 2102. The base plate 2130 is connected to the bottom end 2101 of the overpack body 2100 so as to enclose the bottom end of the cavity 10. An annular plate or shear ring 2140 is connected to the top end 2102 of the overpack body 2100. The shear ring 2140 is a ring-like structure preferably formed from metal (i.e., steel) while the base plate 2130 is a thick solid disk-like plate. The base plate 2130 hermetically closes the bottom end 2101 of the overpack body 2100 (and the cavity 10) and forms a floor for the cavity 10 upon which a canister or MPC can rest as described herein below.

The overpack body 2100 comprises an inner shell 2110 and an outer shell 2120. The inner shell 2110 has an inner surface 2111 and an outer surface 2112. The inner surface 2111 of the inner shell 2110 forms the inner surface of the overpack body 2100 and defines or bounds the internal cavity 10 of the overpack body 2100. The outer shell 2120 has an inner surface 2121 that faces the outer surface 2112 of the inner shell 2110 in a spaced apart manner and an outer surface 2122 that forms the outer surface of the overpack body 2100. In certain embodiments, each of the inner and outer shells 2110, 2120 is formed of metal, such as for example without limitation carbon steel or the like. The inner and outer shells 2110, 2120 are annularly spaced apart from one another. Specifically, the inner and outer shells 2110, 2120 are concentrically arranged so that a gap 2105 exists between the outer surface 2112 of the inner shell 2110 and the inner surface 2121 of the outer shell 2120. The shear ring 2140 mentioned above extends from a top end of the outer shell 2120 inwardly towards the inner shell 2110 and the longitudinal axis 2A-2A. However, the shear ring 2140 stops short of the inner shell 2110 and thus it is connected only to the outer shell 2120 and not also to the inner shell 2110. Thus, a gap 2141 remains between the shear ring 2140 and the inner shell 2110.

By virtue of its geometry, in the exemplified embodiment the overpack body 2100 is a rugged, heavy-walled cylindrical vessel. The main structural function of the overpack body is provided by its carbon steel components (the inner and outer shells 2110, 2120) while the main radiation shielding function is provided by an annular concrete mass 2115 that fills in the gap 2105 between the inner and outer shells 2110, 2120. The concrete mass 2115 may comprise common cement, a chemically inert aggregate of a suitable density, and a specially selected hydrogen-rich additive. In addition, boron carbide powder may be added to the mix that forms the concrete mass 2115 if it is desired to reduce neutron flux to the environment to infinitesimal levels. Boron carbide may be added in powder form or as chips of a metallic neutron absorber such as Metamic. Additional additives that may be included in the mix are vinyl, nylon, and similar hydrogen-rich polymers that are commercially available in granular form and that don't react with concrete or water and are stable at temperatures up to approximately 170° F. The polymeric additives in the concrete may be preferentially concentrated in the outer region of the annulus where the temperature of the concrete during service conditions is lower. The quantity of the hydrogenous additive may be varied to tailor the neutron blockage capability (effectiveness) required of the ventilated apparatus 21000. Both the hydrogen-rich compound and boron carbide are optional additives.

Figure 16A:
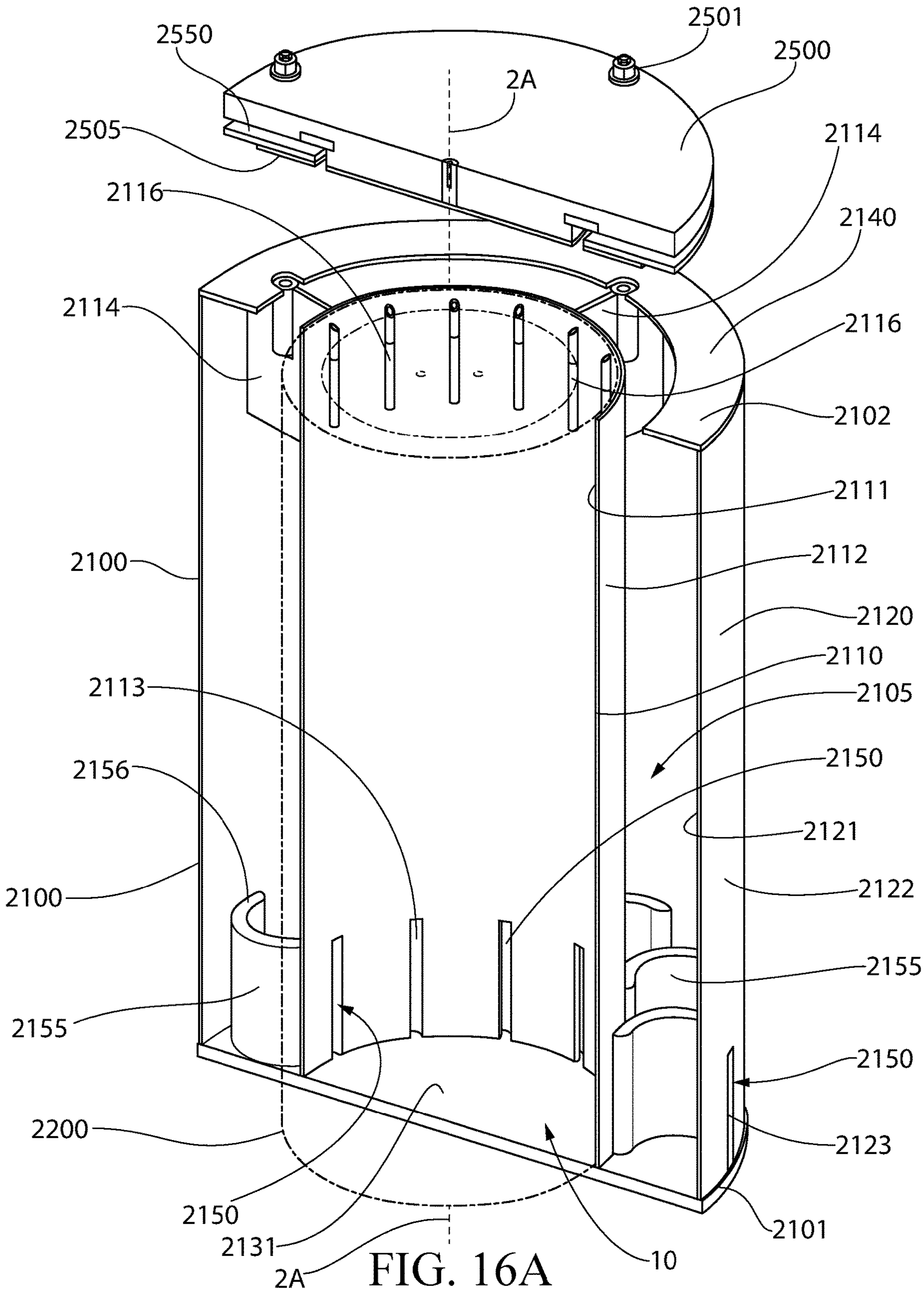
FIG. 16A is a top perspective view of the ventilated apparatus of FIG. 15 illustrating an overpack body having its lid removed and a canister, illustrated in broken lines, positioned in a cavity of the overpack body, wherein a section of the overpack body is cut-away to facilitate viewing.
Figure 16B:
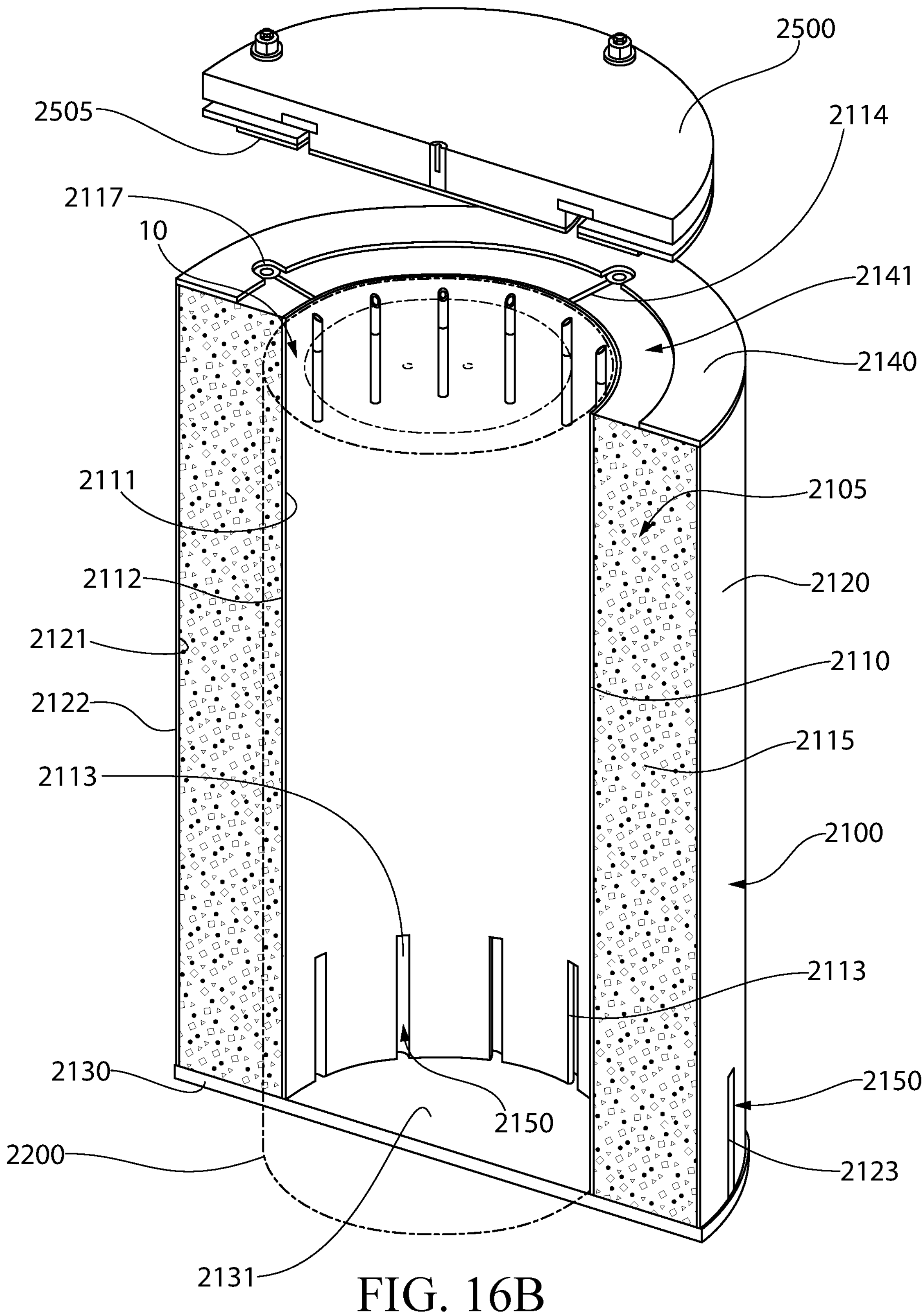
FIG. 16B is the same view as FIG. 16A except that a space between an inner and outer shell of the overpack body is filled with concrete.
Figure 23:
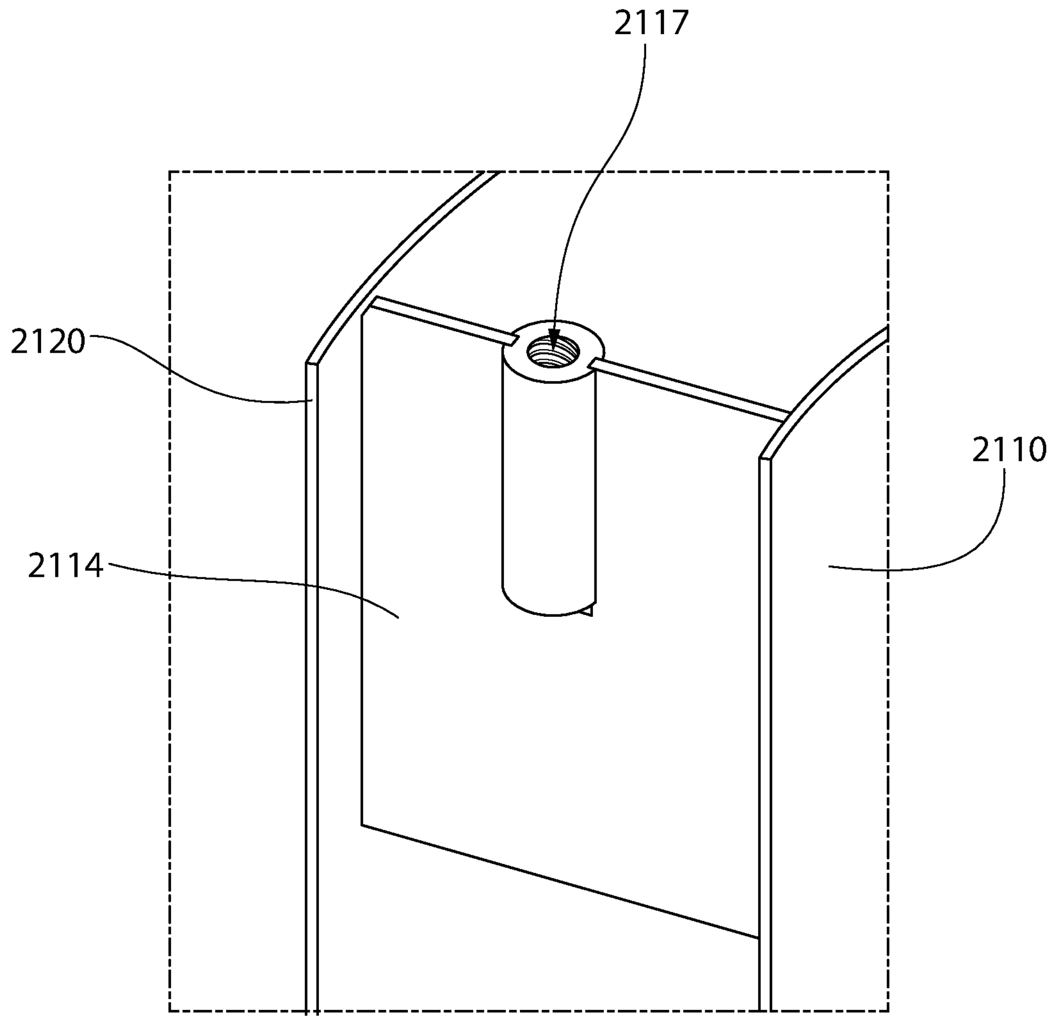
FIG. 23 is a close-up view of an anchor block of the overpack body in accordance with an embodiment of the present invention.

As illustrated in FIG. 16B, the gap 2105 between the inner and outer shells 2110, 2120 is filled with the concrete mass 2115 (the concrete mass 2115 is removed from FIG. 16A so that the details of the inlet ducts 2150 are visible). The concrete mass 2115 of the overpack body 2100 is enclosed by the inner and outer shells 2110, 2120, the baseplate 2130, and the top shear ring 2140. Until the lid 2500 is placed onto the top of the overpack body 2100, the concrete mass 2115 is exposed at the gap 2141. A set of steel radial connector plates 2114 are connected to and join the inner and outer shells 2110, 2120 together, thereby defining a fixed width annular space (i.e., the gap 2105) between the inner and outer shells 2120, 2110 in which the concrete mass 2115 is poured as best seen in FIGS. 16A, 16B and 23. In the exemplified embodiment the radial connector plates 2114 are flat plate-type members oriented in the radial direction but they can be curved or non-radial in other embodiments.

The material make-up of the concrete mass 2115 between the inner and outer shells 2120, 2110 is specified to provide the necessary shielding properties (dry density) and compressive strength for the ventilated apparatus 21000. The principal function of the concrete mass 2115 is to provide shielding against gamma and neutron radiation. However, the concrete mass 2115 also helps enhance the performance of the ventilated apparatus 21000 in other respects as well. For example, the massive bulk of the concrete mass 2115 imparts a large thermal inertia to the ventilated apparatus 21000, allowing it to moderate the rise in temperature of the ventilated apparatus 21000 under hypothetical conditions when all ventilation passages 2150, 2550 are assumed to be blocked. The case of a postulated fire accident at an ISFSI is another example where the high thermal inertia characteristics of the concrete mass 2115 of the ventilated apparatus 21000 control the temperature of the MPC 2200. Although the annular concrete mass 2115 in the overpack body 2100 is not a structural member, it does act as an elastic/plastic filler of the inter-shell space.

While the overpack body 2100 has a generally circular horizontal cross-section in the exemplified embodiment, the invention is not so limited. As used herein, the term "cylindrical" includes any type of prismatic tubular structure that forms a cavity therein. As such, the overpack body 2100 can have a rectangular, circular, triangular, irregular or other polygonal horizontal cross-section. Additionally, the term "concentric" includes arrangements that are non-coaxial and the term "annular" includes varying width.

As noted above, the overpack body 2100 comprises a plurality of specially designed inlet ducts 2150. The inlet ducts 2150 are located at a bottom of the overpack body 2100 and allow cool air to enter the cavity 10 of the ventilated apparatus 21000. The inlet ducts 2150 form passageways that pass from the exterior atmosphere into the cavity 10 through the concrete mass 2115 in the gap 2105. Specifically, the inlet ducts 2150 extend from an opening 2123 in the outer shell 2120 to an opening 2113 in the inner shell 2110. Each of the inlet ducts 2150 is formed by the openings 2113, 2123 in the inner and outer shells 2110, 2120 and a lower metal inter-shell connector 2155 (or a pair of lower metal inter-shell connectors 2155 as described below) extending between one of the openings 2113 in the inner shell 2110 and one of the openings 2123 in the outer shell 2120.

The inlet ducts 2150 are positioned about the circumference of the overpack body 2100 in a radially symmetric and spaced-apart arrangement. Thus, air from the external atmosphere can pass through the opening 2123 in the outer shell 2120 and into the inlet ducts 2150 and then through the openings 2113 in the inner shell 2110 and into the internal cavity 10 of the overpack body 2100. Once within the cavity 10, the air is warmed by the heat emanating from the MPC 2200 stored in the cavity 10. This causes the air to flow upwardly within the cavity 10 towards the lid 2500 and pass from a top portion of the cavity 10 through the outlet duct(s) 2550 to the external atmosphere. The structure, arrangement and function of the inlet ducts 2150 will be described in much greater detail below with reference to FIG. 18.

In the exemplified embodiment, the MPC 2200 rests directly on a top surface 2131 of the base plate 2130. In other embodiments, gussets may be included that connect the inner surface 2111 of the inner shell 2110 to the top surface 2131 of the base plate 2130, and the gussets may support the MPC 2200. Such gussets may additionally act as guides for properly aligning the MPC 2200 within the cavity 10 during loading and as spacers for maintaining the MPC 2200 in the desired alignment within the cavity 10 during storage.

Figure 17A:
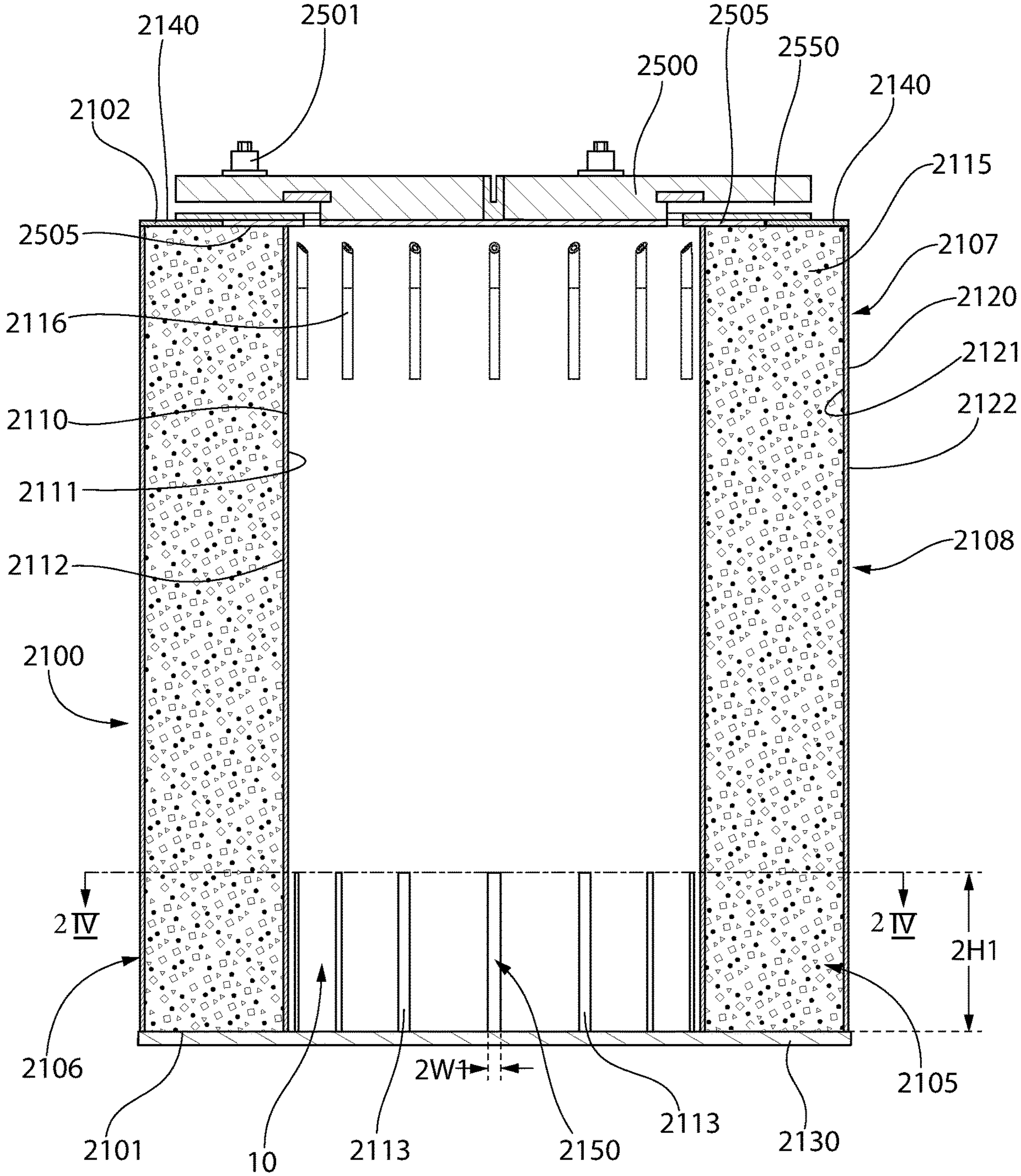
FIG. 17A is a cross-sectional view taken along line 2IIIA-2IIIA of FIG. 15 without the canister in the cavity of the overpack body.
Figure 17B:
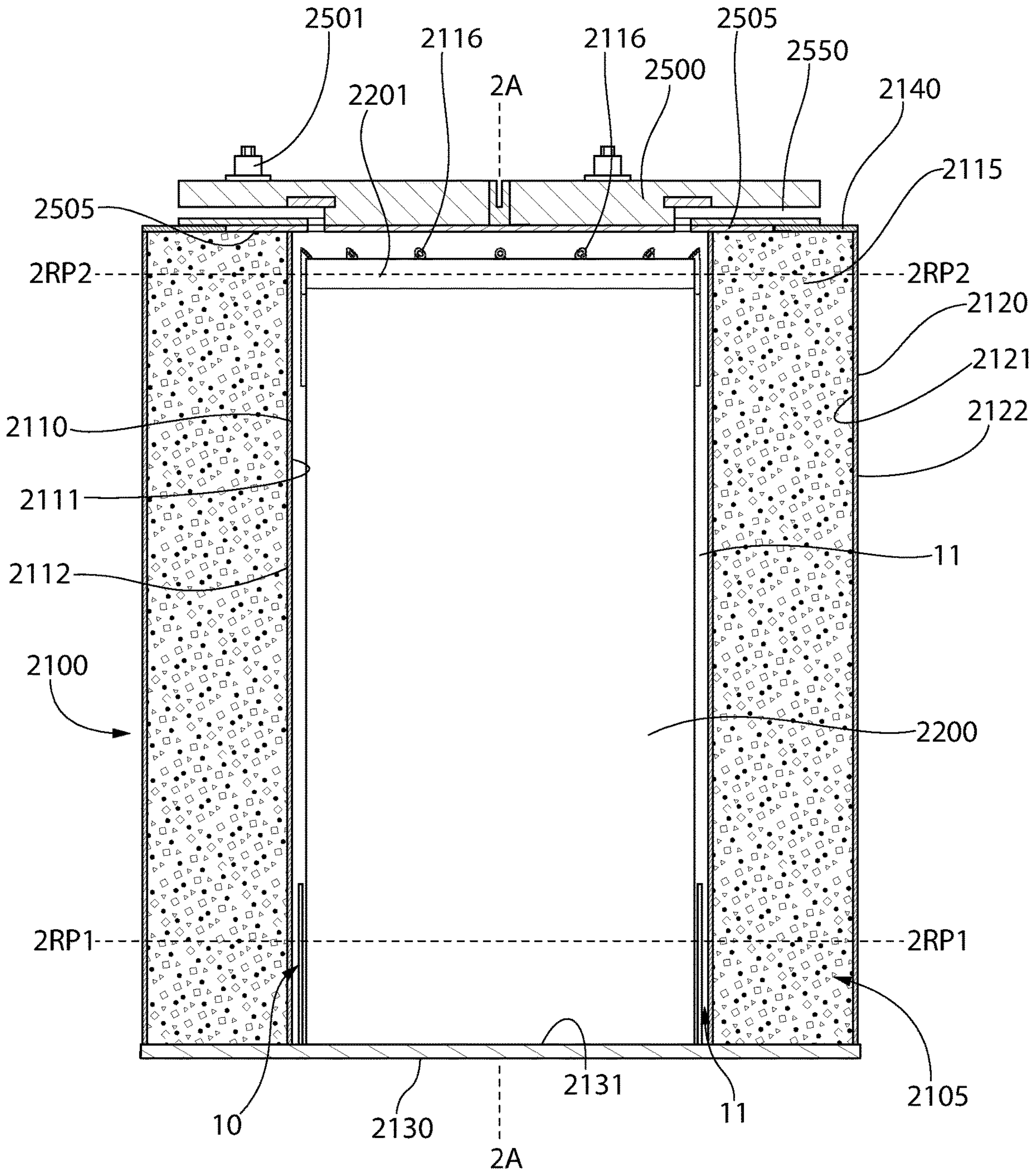
FIG. 17B is a cross-sectional view taken along line 2IIIA-2IIIA of FIG. 15 with the canister positioned in the cavity of the overpack body.

When the MPC 2200 is positioned in the cavity 10, an annular gap 11 exists between the outer surface of the MPC 2200 and the inner surface 2111 of the overpack body 2100 (best seen in FIG. 17B). This provides a space for the air to flow around the MPC 2200 as the cool air enters the cavity 10 through the air inlet ducts 2150, becomes heated within the cavity 10, and then exits the cavity 10 through the air outlet ducts 2550.

The overpack body 2100 also comprises a set of tubular shock absorbers 2116 coupled to the inner surface 2111 of the overpack body 2100 (i.e., the inner surface 2111 of the inner shell 2110). The tubular shock absorbers 2116 are only illustrated being located near the top of the cavity 10 but can additionally be located near the bottom of the cavity. The tubular shock absorbers 2116 are arranged in a circumferentially spaced apart manner about the inner surface 2111 of the overpack body 2100. In the exemplified embodiment, the tubular shock absorbers 2116 are hollow tube like structures but can be plate structures if desired. The tubular shock absorbers 2116 serve as the designated locations of impact with the MPC lid 2201 in case the ventilated apparatus 21000 tips over. The tubular shock absorbers 2116 are designed to absorb kinetic energy to protect the MPC 2200 during an impactive collision (such as a non-mechanistic tip-over scenario). Thus, in the exemplified embodiment, the tubular shock absorbers 2116 are thin steel members sized to serve as impact attenuators by crushing (or buckling) against the solid MPC lid 2201 during an impactive collision (such as a non-mechanistic tip-over scenario). The tubular shock absorbers 2116 may be included to protect the fuel stored in the MPC 2200 from experiencing large inertia loads in the unlikely event that the ventilated apparatus 21000 were to tip over. The tubular shock absorbers 2116 are aligned with a hard location in the MPC 2200, such as its closure lid 2201 (see FIG. 17B), so that impact between the MPC 2200 and the overpack body 2100 is ameliorated by the tubular shock absorbers 2116 during a tip over event.

The overpack body 2100 generally has a bottom portion 2106 which is the portion that includes the air inlet ducts 2150, a top portion 2107 which is generally the portion that includes the tubular shock absorbers 2116, and a middle portion 2108 therebetween. In certain embodiments the air inlet ducts 2150 may be approximately three feet tall, and thus the bottom portion 2106 of the overpack body 2100 may be approximately the bottom three feet of the overpack body 2100. The MPC 2200 is illustrated in the cavity 10 in FIG. 17B with the MPC 2200 resting directly atop the top surface 2131 of the base plate 2130. As best seen in this figure, the set of tubular shock absorbers 2116 are positioned so that a reference plane 2RP2-2RP2 that is perpendicular to the longitudinal axis 2A-2A of the overpack body 2100 intersects both a lid 2201 of the MPC 2200 and the set of tubular shock absorbers 2116.

Figure 18:
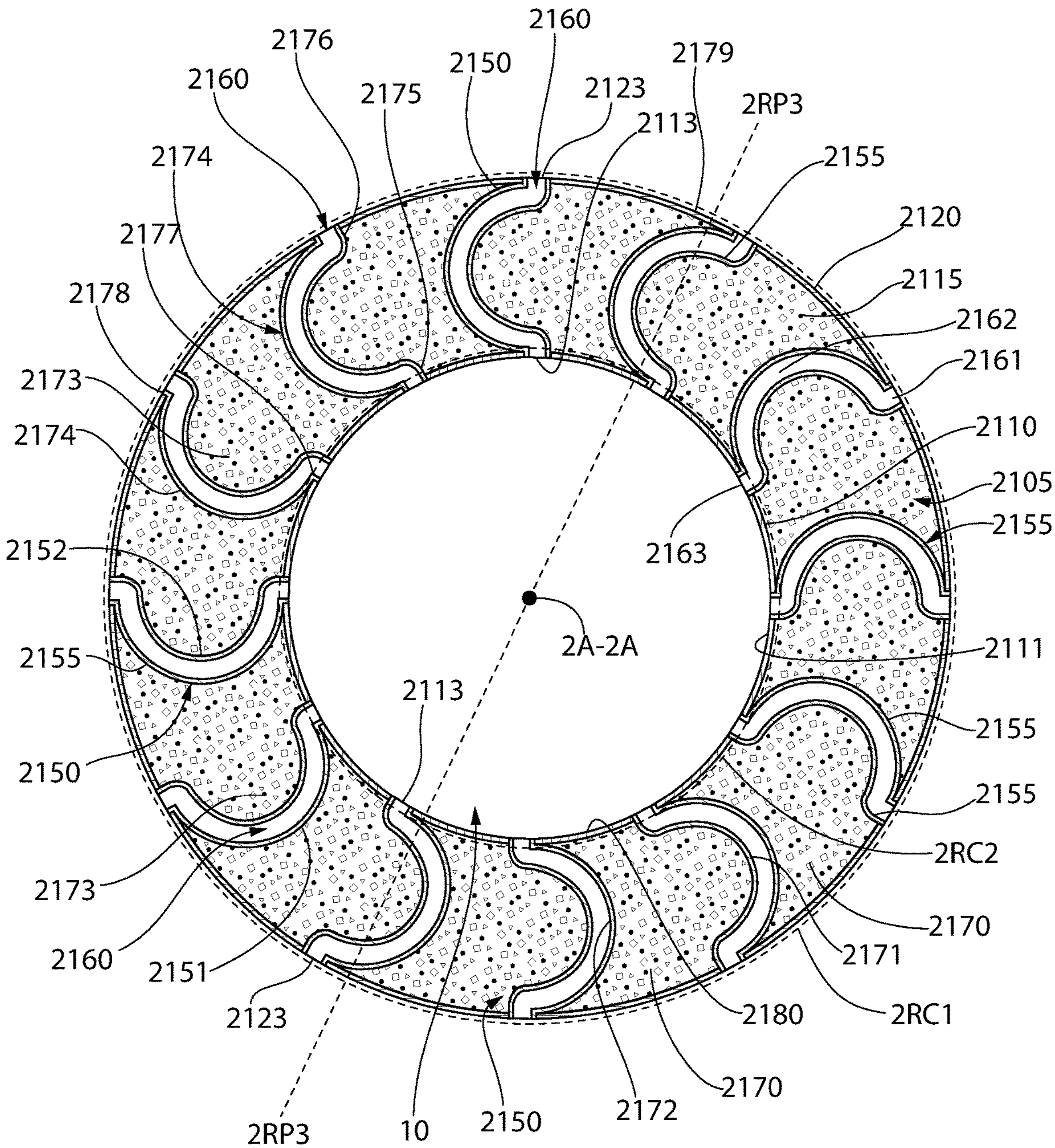
FIG. 18 is a cross-sectional view taken along line 2IV-2IV of FIG. 17A.
Figure 19:
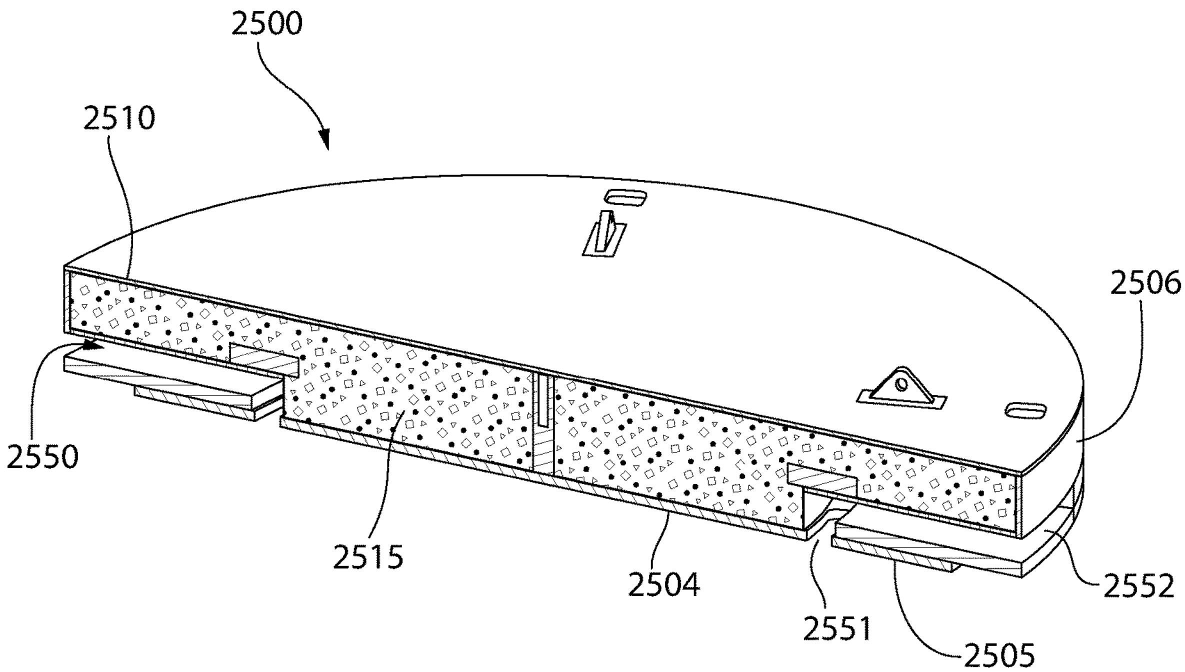
FIG. 19 is a cross sectional view of the lid of the overpack body in accordance with a first embodiment of the present invention.

Referring now to FIGS. 16A, 16B, and 18 the overpack body 2100 and specifically the structure thereof that forms the air inlet ducts 2150 will be described in greater detail. The bottom portion 2106 of the overpack body 2100 is formed by a plurality of spaced apart segments or curved segments 2170. Each segment 2170 is a circumferential section of the bottom portion 2106 of the overpack body 2100 and thus it is curved because the overpack body 2100 is cylindrical in the exemplified embodiment. Each of the segments 2170 is spaced apart from an adjacent segment 2170 and the air inlet ducts 2150 are formed in the spaces between the adjacent segments 2170. Each of the segments 2170 extends circumferentially from a first end wall 2171 having a convex portion or a projection 2173 to a second end wall 2172 having a concave portion or a channel 2174. For each of the segments 2170 that form the bottom portion 2106 of the overpack body 2100, the projection 2173 and the channel 2174 extend along the entire height of that segment 2170. The segments 2170 are also referred to herein as curved segments because they form the bottom portions of the curved inner and outer surfaces 2111, 2122 of the overpack body 2100.

The first end wall 2171 of each of the segments 2170 comprises a first shoulder 2175 on a first side of the projection 2173 and a second shoulder 2176 on a second side of the projection 2173. Specifically, the first shoulder 2175 of each segment 2170 is adjacent to (and may include a portion of) the inner shell 2110 and the second shoulder 2176 of each segment 2170 is adjacent to (and may include a portion of) the outer shell 2120. In the exemplified embodiment the first shoulder 2175 of each segment 2170 is formed partially by the concrete mass 2115 and partially by the inner shell 2110 whereas the second shoulder 2176 of each segment 2170 is formed partially by the concrete mass 2115 and partially by the outer shell 2120. In other embodiments, the first and second shoulders 2175, 2176 may be formed wholly by the inner and outer shells 2110, 2120, respectively, and the projection 2173 may be formed by the concrete mass 2115. The first and second shoulders 2175, 2176 extend generally radially. Furthermore, the first and second shoulders 2175, 2176 of each respective segment 2170 are aligned on the same plane.

The projection 2173 is located between the first and second shoulders 2175, 2176 and protrudes circumferentially from the first and second shoulders 2175, 2176. The projection 2173 of each segment 2170 protrudes in the same circumferential direction. Specifically, in the exemplified embodiment each of the projections 2173 protrudes from its respective segment 2170 in a counter-clockwise direction. However, the invention is not to be so limited in all embodiments and in certain other embodiments each of the projections 2173 may protrude from its respective segment 2170 in a clockwise direction. However, in all embodiments the projections 2173 should protrude in the same circumferential direction.

The second end wall 2172 of each of the segments 2170 comprises a first channel wall 2177 adjacent to the inner shell 2110 and a second channel wall 2178 adjacent to the outer shell 2120. In the exemplified embodiment, the first channel wall 2177 of each segment 2170 is formed entirely by the inner shell 2110 but may also be formed by a portion of the concrete mass 2115. Furthermore, in the exemplified embodiment the second channel wall 2178 of each segment 2170 is formed entirely by the outer shell 2120 but may also be formed by a portion of the concrete mass 2115. Furthermore, the first and second channel walls 2177, 2178 of each respective segment 2170 are aligned on the same plane. The channel 2174 is defined between the first and second channel walls 2177, 2178.

The segments 2170 circumferentially surround the longitudinal axis 2A-2A and are arranged in a nesting or intermeshing configuration. Specifically, the projection 2173 of each segment 2170 at least partially nests within the channel 2174 of an adjacent segment 2170 such that a plane that includes the longitudinal axis 2A-2A will intersect the first end wall 2171 (projection 2173) of a first one of the segments 2170 and a second end wall 2172 (channel 2174) of a second one of the segments 2170 that is in a nested arrangement with the first one of the segments 2170. Thus, the convex portion or the projection 2173 of the first end wall 2171 of a first one of the segments 2170 at least partially nests within the concave portion or channel 2174 of the second end wall 2172 of an adjacent one of the segments 2170 that is circumferentially adjacent to the first one of the segments 2170. This is true for each of the adjacent segments 2170. Thus, for each segment 2170, an adjacent segment's projection 2173 on a first side of the segment 2170 nests within its channel 2174 and the segment's projection 2173 nests within an adjacent segment's channel 2174 on the other side of the segment 2170. In the exemplified embodiment, the channels 2174 have a greater radius of curvature than the projections 2173. For two of the segments 2170 to be nested, a plane that includes the longitudinal axis 2A-2A needs to exist that intersects the first end wall 2171 of one of the nested segments 2170 and the second end wall 2172 of the other one of the nested segments 2170.

In the exemplified embodiment, a reference plane 2RP3 is illustrated (FIG. 18) that includes the longitudinal axis 2A-2A and that intersects the first end wall 2171 of a first one of the segments 2170 and the second end wall 2172 of an adjacent one of the segments 2170. In fact, due to the spacing of the segments 2170 in the exemplified embodiment, the reference plane 2RP3 will also intersect the first end wall 2171 of one segment 2170 and the second end wall 2172 of an adjacent segment 2170 that are circumferentially spaced 180° from the first one of the segments 2170 and its adjacent segment 2170.

Furthermore, despite the nesting/intermeshing arrangement described above and shown in FIG. 18, the convex portion or projection 2173 of the first end wall 2171 of the first one of the segments 2170 is spaced apart from the concave portion or channel 2174 of the second end wall 2172 of the adjacent one of the segments 2170. Thus, the projection 2173 of the first end wall 2171 of the first one of the segments 2170 nests within the channel 2174 of the second end wall 2172 of the adjacent one of the segments 2170 without the first end wall 2171 of the first one of the segments 2170 contacting the second end wall 2172 of the adjacent one of the segments 2170. The spaces between the segments 2170 form the air inlet ducts 2150, which form air inlet passageways 2160 from the external atmosphere to a bottom portion of the cavity 10 as discussed herein.

More specifically, the lower inter-shell connectors 2155 are disposed within the spaces between the adjacent segments 2170. During manufacturing, the lower inter-shell connectors 2155 are put into position first and then the concrete mass 2115 is poured around the lower inter-shell connectors 2155, although other manufacturing techniques are possible. The inter-shell connectors 2155 are provided in pairs and covered with a roof 2156 such that each pair of inter-shell connectors 2155 defines one of the air inlet ducts 2150 therebetween although each air inlet duct 2150 could be formed by a singular member in other embodiments. Each of the inter-shell connectors 2155 extends from the opening 2123 in the outer shell 2120 to the opening 2113 in the inner shell 2110 to form a passageway therebetween. Furthermore, one of the inter-shell connectors 2155 is in contact with each of the first and second end walls 2171, 2172 of each of the segments 2170. Thus, the inter-shell connectors 2155 take on the shape of the first and second end walls 2171, 2172 of the segments 2170. Each of the air inlet ducts 2150 is formed between one of the inter-shell connectors 2155 in contact with the first end wall 2171 of a first segment 2170 and one of the inter-shell connectors 2155 in contact with the second end wall 2172 of a second segment 2170 that is adjacent to the first segment 2170.

In the exemplified embodiment the channels 2174 of each of the segments 2170 have an identical radius of curvature and the projections 2173 of each of the segments 2170 have an identical radius of curvature. Thus, in the exemplified embodiment each segment 2170 is identical in size and shape to each other segment 2170. Of course, this is not required in all embodiments and in alternative embodiments the segments 2170 can be different sizes and shapes. Furthermore, in the exemplified embodiment each pair of adjacent segments 2170 is spaced apart the same distance, thereby forming a plurality of the air inlet ducts 2150 having the same dimensions. However, the invention is not to be so limited and the spacing between the segments 2170 and hence also the dimensions/widths of the air inlet ducts 2150 may vary in alternative embodiments.

As can be seen in FIG. 18, each of the segments 2170 is a singular uninterrupted member. Thus, there is no space or gap within any one of the individual segments 2170. The only air passageways from the external atmosphere to the cavity 10 are between adjacent segments 2170 and there are no air passageways formed within an individual segment 2170. Rather, each of the segments 2170 is an uninterrupted portion of the overpack body 2100 that is formed of a solid material. Thus, a single segment 2170 has a convex end wall (i.e., the first end wall 2171) and a concave end wall (i.e., the second end wall 2172) without any gaps or spaces being formed in the segment 2170 between the first and second end walls 2171, 2172 in the circumferential direction. The only gaps are the air inlet ducts 2150 which are formed between adjacent ones of the segments 2170 and not within the segments 2170.

In the exemplified embodiment, there are twelve of the air inlet ducts 2150 illustrated. However, due to the shape of the air inlet ducts 2150 described in more detail below, it would be possible to include many more of the air inlet ducts 2150 in other embodiments. Specifically, the air inlet ducts 2150 can be positioned very close to one another and can possibly even be placed in a nesting or partially nesting arrangement. This would increase the number of openings in the outer shell 2120 and the number of pathways available for the external air to enter into the cavity 10 to more effectively cool the MPC 2200 stored therein and make the air inlet less sensitive to the direction of ambient wind.

Each of the segments 2170 also has a convex outer wall 2179 and a concave inner wall 2180. The convex outer wall 2179 of each segment 2170 forms a portion of the outer surface 2122 of the overpack body 2100. The concave inner wall 2180 of each segment 2170 forms a portion of the inner surface 2111 of the overpack body 2110. The convex outer walls 2179 of the segments 2170 lie in a first reference cylinder 2RC1. The concave inner walls 2180 of the segments 2170 lie in a second reference cylinder 2RC2 that is concentric to the first reference cylinder 2RC1.

In the exemplified embodiment, each of the air inlet ducts 2150 is a generally U-shaped structure defining generally U-shaped air inlet passageways 2160 extending from the opening 2123 in the outer shell 2120 to the opening 2113 in the inner shell 2110. Thus, each of the air inlet ducts 2150 (and also each of the air inlet passageways 2160) has a convex side 2151 and a concave side 2152. The convex side 2151 of each of the air inlet ducts 2150 (and each of the air inlet passageways 2160) faces the concave side 2152 of an adjacent one of the air inlet ducts 2150 (or air inlet passageways 2160). Similarly, the concave side 2152 of each of the air inlet ducts 2150 (and each of the air inlet passageways 2160) faces the convex side 2151 of an adjacent one of the air inlet ducts 2150 (or air inlet passageways 2160). Thus, the air inlet ducts 2150 may be positioned closer together than that illustrated in a nesting arrangement as mentioned above to increase the number of air inlet ducts 2150 included in the apparatus 21000 in some embodiments.

Furthermore, each of the air inlet passageways 2160 comprises a first radial section 2161 extending from the outer surface 2122 of the overpack body 2100 towards the cavity 10, a curved section 2162 extending from the first radial section 2161 towards the cavity 10, and a second radial section 2163 extending from the curved section to the inner surface 2111 of the overpack body 2100. The first and second radial sections 2161, 2163 of each air inlet passageway 2160 are aligned on the same radius of the first reference cylinder 2RC1 or on the same reference plane that includes the longitudinal axis 2A-2A. In the exemplified embodiment, the overall shape of the air inlet passageways 2160 are that of a horseshoe having ends that extend outwardly away from a longitudinal centerline of the horseshoe.

Due to the U-shape of the air inlet passageways 2160 of the air inlet ducts 2150, a line of sight does not exist from the cavity 10 to the external atmosphere through the air inlet passageway 2160 of the air inlet ducts 2150. Specifically, viewing through the air inlet passageways 2160 of the air inlet ducts 2150 from the cavity 10, a person will not be able to see through to the external atmosphere, and vice versa. Although the U-shape is illustrated in the exemplified embodiment, other shapes are possible so long as a line of sight does not exist through the air inlet passageway 2160 as noted herein. In some embodiments, the MPC 2200 is positioned within the cavity 10 so that a first reference plane 2RP1 that is perpendicular to the longitudinal axis 2A-2A of the overpack body 2100 intersects both the MPC 2200 and the inlet ducts 2150. However, even though the MPC 2200 is positioned atop the top surface 2131 of the base plate 2130 and thus is transversely aligned with the air inlet ducts 2150, radiation (which travels in a straight line and cannot follow a tortuous path) cannot pass from the MPC 2200 to the external environment. Rather, all radiation will contact the concrete mass 2115 thereby preventing the radiation (both gamma and neutron radiation) from passing to the external environment.

To maximize the cooling effect that the ventilating air stream has on the MPC 2200 within the ventilated apparatus 21000, the hydraulic resistance in the air flow path is minimized to the extent possible. Towards that end, the ventilated apparatus 21000 comprises twelve inlet ducts 2150 (shown in FIG. 18) in the exemplified embodiment. Of course, more or less inlet ducts 2150 can be used as desired. Each inlet duct 2150 is narrow and tall so as to minimize radiation streaming while optimizing the size of the airflow passages. The curved shape of the inlet ducts 2150 also helps minimize hydraulic pressure loss. In one embodiment, each of the inlet ducts 2150 has a height 2H1 and a width 2W1 (denoted in FIG. 17A) such that a ratio of the height to the width is at least 10:1, and more specifically at least 15:1, and still more specifically approximately 18:1. In one embodiment, the height is approximately 36 inches and the width is approximately 2 inches.

The inlet ducts 2150 permit the MPC 2200 to be positioned directly atop the top surface 2131 of the base plate 2130 of the ventilated apparatus 21000 if desired, thus minimizing the overall height of the cavity 10 that is necessary to house the MPC 2200. Naturally, the height of the overpack body 2100 may then also be minimized. Minimizing the height of the overpack body 2100 is an important ALARA-friendly design feature for those sites where the Egress Bays in their Fuel Buildings have low overhead openings in their roll-up doors. To this extent, the height of the storage cavity 10 in the ventilated apparatus 21000 is set equal to the height of the MPC 2200 plus a fixed amount to account for thermal growth effects and to provide for adequate ventilation space above the MPC 2200.

As described herein, the MPC 2200 can be placed directly on the base plate 2130 such that the bottom region of the MPC 2200 is level with the inlet ducts 2150 because radiation emanating from the MPC 2200 is not allowed to escape through the specially shaped inlet ducts 2150 due to: (1) the inlet ducts 2150 having a narrow width and being curved in shape; (2) the configuration of the inlet ducts 2150 is such that that there is no clear line of sight from inside the cavity 10 to the exterior environment; and (3) there is enough steel and/or concrete in the path of any radiation emanating from the MPC 2200 to de-energize it to acceptable levels. With the radiation streaming problem at the inlet ducts 2150 solved, the top 2102 of the overpack body 2100 can be as little as ½" higher than a top surface of the MPC 2200.

Additionally, positioning the MPC 2200 in the cavity 10 so that the bottom surface of the MPC 2200 is below the top of the opening 2152 of the inlet ducts 2150 ensures adequate MPC cooling during a "smart flood condition." A "smart flood" is one that floods the cavity 10 so that the water level is just high enough to completely block airflow though the inlet ducts 2150. In other words, the water level is just even with the top of the inlet ducts 2150. Because the bottom surface of the MPC 2200 is situated at a height that is below the top of the openings 2123 of the inlet ducts 2150, the bottom of the MPC 2200 will be in contact with (i.e. submerged in) the water during a "smart flood" condition. Because the heat removal efficacy of water is over 2100 times that of air, a wet bottom is all that is needed to effectively remove heat and keep the MPC 2200 cool. Due to the height of the inlet ducts 2150 being approximately 36 inches, the amount of water required to block the entire inlet duct 2150 is a sufficient amount of water to cool the MPC 2200. Thus, during a "smart flood condition" as described herein, the MPC cooling action effectively changes from ventilation air-cooling to evaporative water cooling.

As noted above, the lid 2500 is provided to close the open top end of the cavity 10. The lid 2500 may also be provided with a structure that forms outlet ducts 2550, thereby permitting air that is heated within the cavity 10 to exit the cavity 10 at a top portion of the cavity 10. The outlet ducts 2550 may be formed into the lid 2500 itself, or may be formed at the interface of the lid 2500 and the overpack body 2100. Either way, as heated air leaves the cavity 10 through the outlet ducts 2550, cool air will continue to enter the cavity 10 at a bottom portion thereof through the air inlet ducts 2150. This creates a natural convective flow of air to cool the MPC 2200 within the cavity 10.

Referring to FIGS. 15-17B and 19, the overpack lid 2500 will be described in accordance with one embodiment of the present invention. The overpack lid 2500 is a weldment of steel plates 2510 filled with a concrete mass 2515 that provides neutron and gamma attenuation to minimize skyshine. The lid 2500 is secured to the top end 2102 of the overpack body 2100 by a plurality of bolts 2501 that extend through the lid 2500. The lid 2500 may in other embodiments include a lid flange and the bolts 2501 may extend through the lid flange for securing to the overpack body 2100. In the exemplified embodiment, the bolts 2501 connect to bolt receiving apertures 2117 formed into the radial connector plates 2114 as best shown in FIG. 23. Of course, alternative structures for securing the lid 2500 to the overpack body 2100 are possible in other embodiments. When secured to the overpack body 2100, surface contact between the lid 2500 and the overpack body 2100 forms a lid-to-body interface. The lid 2500 is preferably non-fixedly secured to the body 2100 and encloses the top end of the cavity 10 formed by the overpack body 2100.

In the embodiment of FIGS. 15-17B and 19, the lid 2500 comprises a radial ring plate or shear ring 2505 welded to a bottom surface of the lid 2500 which provides additional shielding against the laterally directed photons emanating from the MPC 2200 and/or the annular space 11 formed between the outer surface of the MPC 2200 and the inner surface 2121 of the inner shell 2120. The shear ring 2505 also assists in locating the top lid 2500 in a coaxial disposition along the longitudinal axis 2A-2A of the ventilated apparatus 21000 through its interaction with the shear ring 2140 of the overpack body 2100. When the lid 2500 is secured to the overpack body 2100, the outer edge of the shear ring 2505 of the lid 2500 abuts the inner edge of the shear ring 2140 of the overpack body 2100. Specifically, the shear ring 2505 of the lid 2500 lies within the gap 2141 atop the concrete mass 2115 between the shear ring 2140 of the overpack body 2100 and the inner shell 2110. Thus, the shear ring 2505 also functions to prevent the lid 2500 from sliding across the top surface of the overpack body 2100 during a postulated tip-over event defined as a non-mechanistic event for the ventilated apparatus 21000. Specifically, the contact between the shear ring 2505 of the lid 2500 and the shear ring 2140 of the overpack body 2100 prevents any such sliding movement of the lid 2500 relative to the overpack body 2100.

In this embodiment, the lid 2500 comprises the plurality of outlet ducts 2550 that allow heated air within the storage cavity 10 of the ventilated apparatus 21000 to escape. The outlet ducts 2550 form passageways through the lid 2500 that extend from openings 2551 in the bottom surface 2504 of the lid 2500 to openings 2552 in the peripheral surface 2506 of the lid 2500. While the outlet ducts 2550 form L-shaped passageways in the exemplified embodiment, any other tortuous or curved path can be used so long as a clear line of sight does not exist from the external atmosphere to the ventilated apparatus 21000 into the cavity 10 through the outlet ducts 2550. In the exemplified embodiment, the outlet ducts 2550 are positioned about the circumference of the lid 2500 in a radially symmetric and spaced-apart arrangement. The outlet ducts 2550 terminate in openings 2552 that are narrow in height but axis-symmetric in the circumferential extent. The narrow vertical dimensions of the outlet ducts 2550 helps to efficiently block the leakage of radiation. It should be noted, however, that while the outlet ducts 2550 are preferably located within the lid 2500 in the exemplified embodiment, the outlet ducts 2550 can be located within the overpack body 2100 in alternative embodiments, for example at a top thereof, or at an interface of the lid 2500 and the overpack body 2100 as described herein with reference to FIGS. 22A-22C.

As has been mentioned herein, the purpose of the inlet ducts 2150 and the outlet ducts 2550 is to facilitate the passive cooling of an MPC 2200 located within the cavity 10 of the ventilated apparatus 21000 through natural convection/ventilation. The ventilated apparatus 21000 is free of forced cooling equipment, such as blowers and closed-loop cooling systems. Instead, the ventilated apparatus 21000 utilizes the natural phenomena of rising warmed air, i.e., the chimney effect, to effectuate the necessary circulation of air about the MPC 2200 stored in the storage cavity 10. More specifically, the upward flowing air (which is heated from the MPC 2200) within the annular space 11 that is formed between the inner surface 2121 of the overpack body 2100 and the outer surface of the MPC 2200 draws cool ambient air into the storage cavity 10 through inlet ducts 2150 by creating a siphoning effect at the inlet ducts 2150. The rising warm air exits the cavity 10 through the outlet ducts 2550 as heated air. The rate of air flow through the ventilated apparatus 21000 is governed by the quantity of heat produced in the MPC 2200, the greater the heat generation rate, the greater the air upflow rate.

Figure 20:
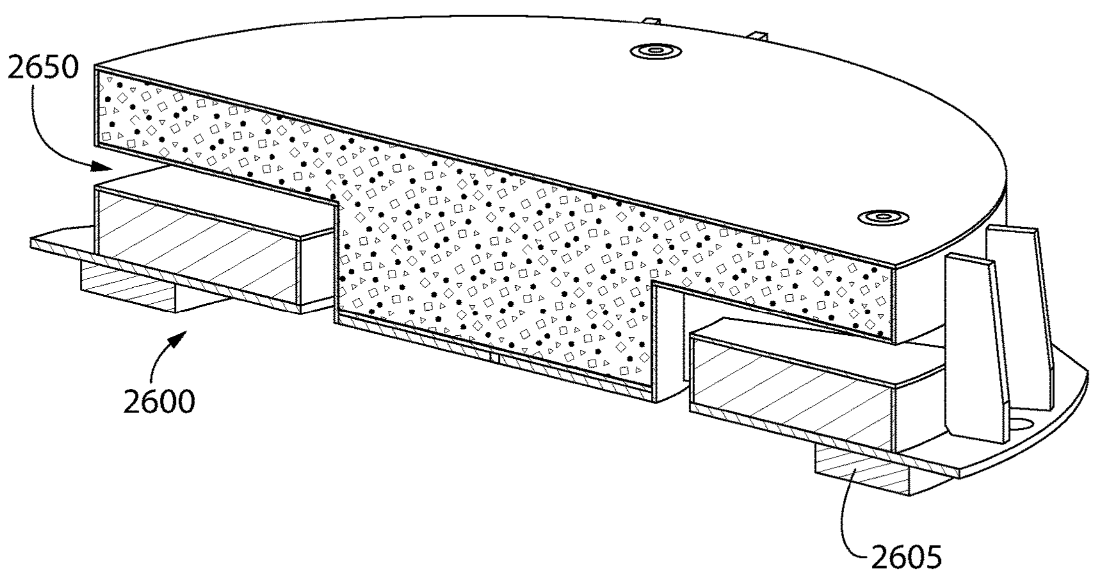
FIG. 20 is a cross-sectional view of the lid of the overpack body in accordance with a second embodiment of the present invention.

FIG. 20 illustrates another embodiment of a lid 2600 that can be used with the overpack body 2100. The lid 2600 is very similar to the lid 2500 described herein. In that regard, the lid 2600 has a shear ring 2505 and the lid 2600 defines a plurality of outlet ducts 2650. The differences in structure of the lid 2600 relative to the lid 2500 can be readily seen by viewing FIGS. 19 and 20 concurrently.

Figure 21:
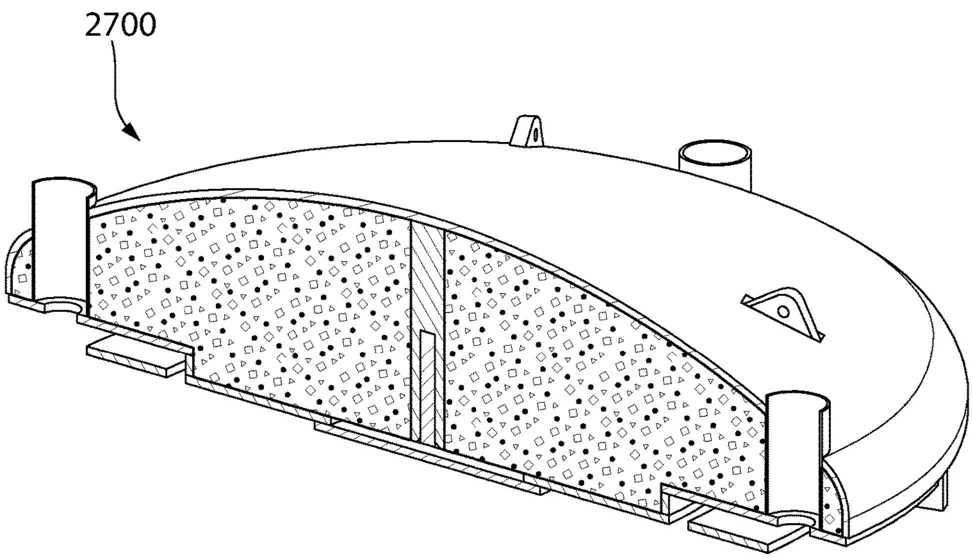
FIG. 21 is a cross-sectional view of the lid of the overpack body in accordance with a third embodiment of the present invention.

FIG. 21 illustrates yet another embodiment of a lid 2700 that can be used with the overpack body 2100. The lid 2700 is similar to the lid 2500 except as described herein. The first difference is that the lid 2700 has a dome shape. A dome shaped lid such as the lid 2700 may be used where the ventilated apparatus 21000 is required to withstand a very large downward load such as a falling missile. Further differences between the lid 2700 and the lid 2500 are also present in lid 2800 illustrated in FIG. 22A and described below.

Figure 22A:
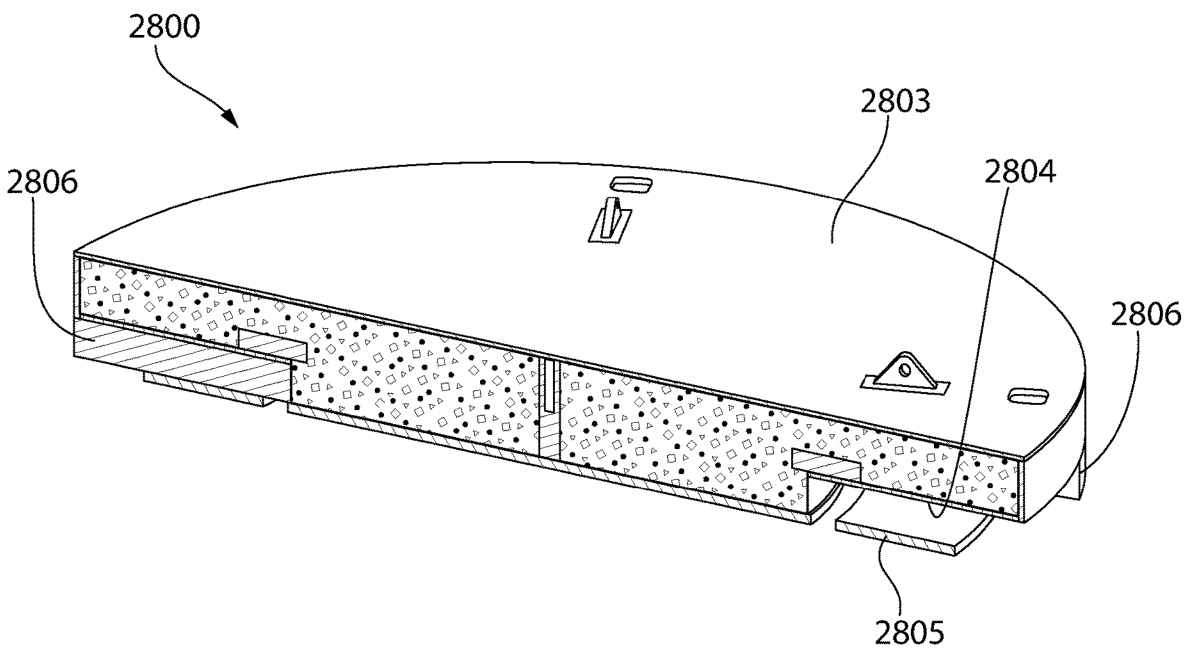
FIG. 22A is a cross-sectional view of the lid of the overpack body in accordance with a fourth embodiment of the present invention.
Figure 22B:
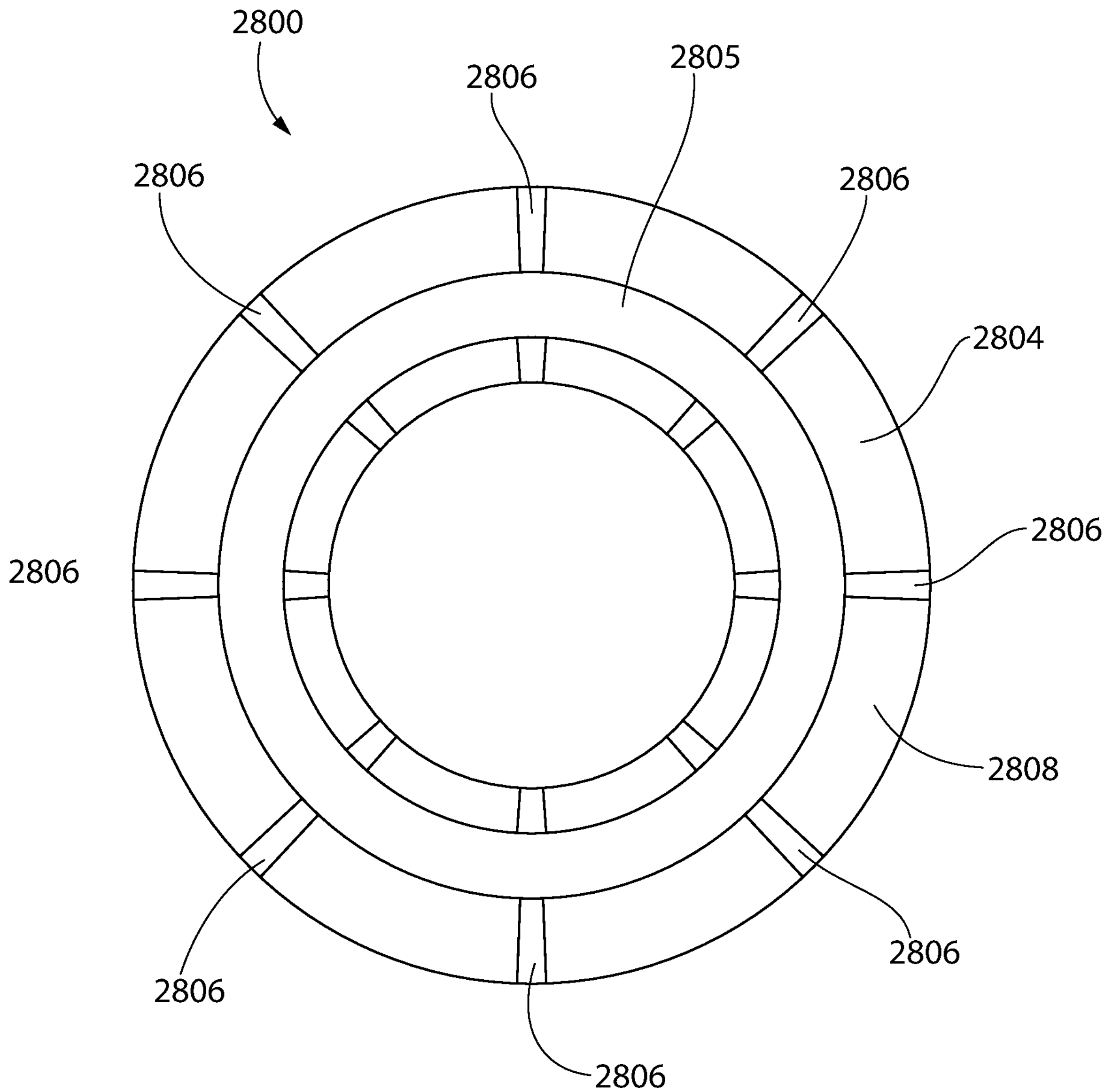
FIG. 22B is a simplified bottom view of the lid of FIG. 22A.
Figure 22C:
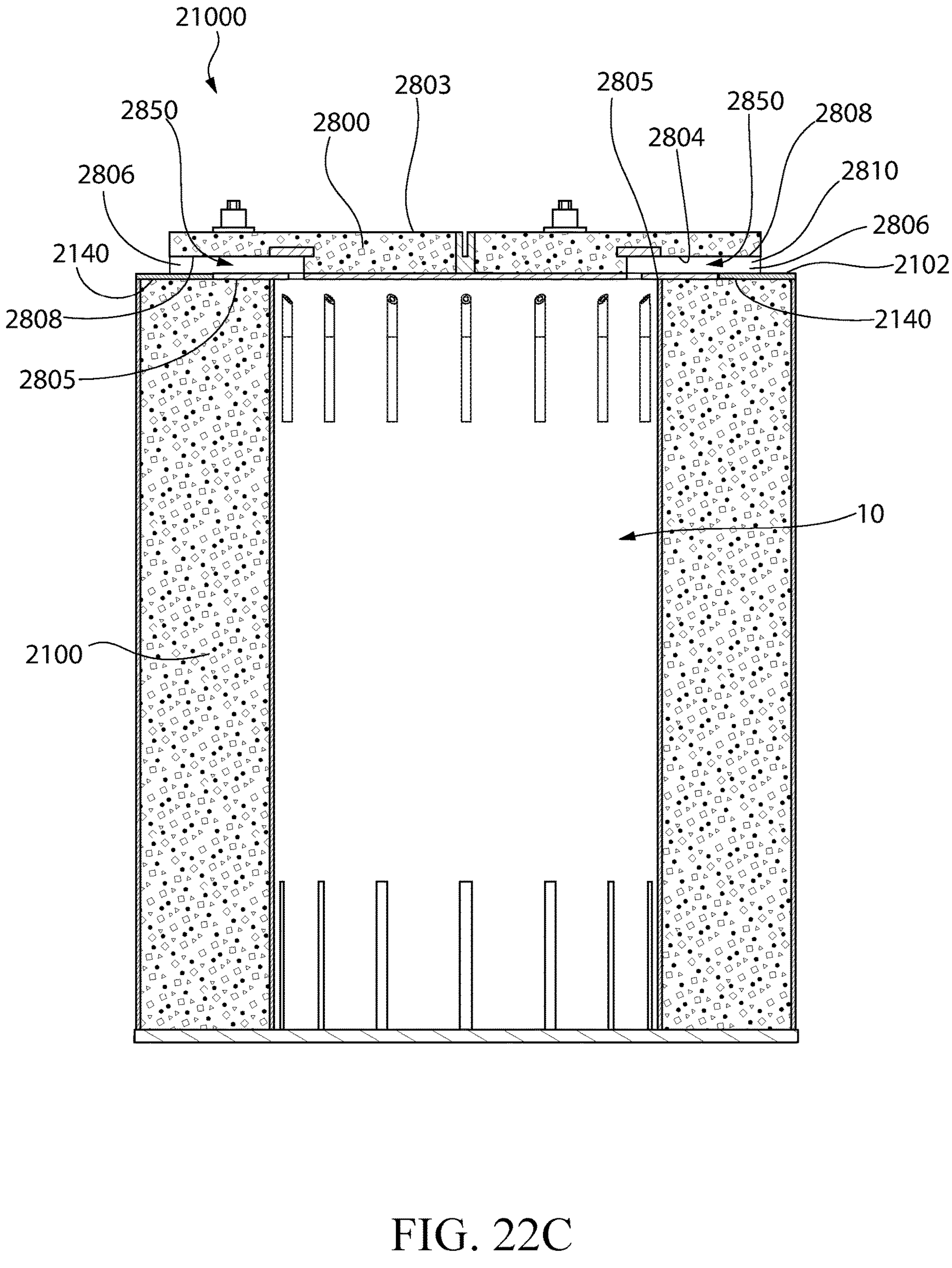
FIG. 22C is the cross-sectional view of FIG. 17A using the lid of FIG. 22A.

Referring to FIGS. 22A-22C, the lid 2800 and its cooperative structure when coupled to the overpack body 2100 will be described. The lid 2800 is similar to the lid 2500 except that the outlet passageways of the outlet ducts are at least partially defined by the interface between the lid 2800 and the overpack body 2100 rather than being formed directly into the lid. Thus, the lid 2800 does not define the entirety of the outlet ducts but they are formed once the lid 2800 is coupled to the overpack body 2100 as shown in FIG. 22C.

Specifically, as seen in FIGS. 22A and 22B, the lid 2800 comprises a bottom surface 2804 and an opposite top surface 2803. A plurality of spacers 2806 are coupled to and extend from the bottom surface 2804 of the lid 2800. Furthermore, a shear ring 2805 is coupled to the lid 2800 via the spacers 2806 such that the shear ring 2805 is coupled directly to the terminal or distal ends of the spacers 2806. Thus, the spacers 2806 ensure that there is a space between the shear ring 2805 and the bottom surface 2804 of the lid 2800.

Referring to FIG. 22C the lid 2800 is shown coupled to the overpack body 2100 described earlier. As shown, when the lid 2800 is coupled to the overpack body 2100, the shear ring 2805 of the lid 2800 abuts against the shear ring 2140 of the overpack body 2100 similar to that which was described with reference to FIGS. 15-18. Furthermore, the spacers 2806 rest directly atop the shear ring 2140 of the overpack body 2100. Thus, the spacers 2806 ensure that a space exists between the bottom surface 2804 of the lid 2800 and the shear ring 2140 of the overpack body 2100. This space forms a portion of the outlet ducts 2850. As shown in FIG. 22C, although a portion of the outlet ducts 2850 appear to be formed between the bottom surface 2804 of the lid 2800 and the shear ring 2805 of the lid 2800, a portion of the outlet ducts 2850 is also formed between the bottom surface 2804 of the lid 2800 and the top surface 2102 of the overpack body 2100 (or the shear ring 2140 of the overpack body 2100). Specifically, in the exemplified embodiment each of the air outlet passageways comprises an outlet portion 2810 that is formed by the top surface 2102 of the overpack body 2100 and a perimeter portion 2808 of the bottom surface 2804 of the lid 2800. Thus, in this embodiment the outlet ducts 2850 are at least partially defined by an interface between the lid 2800 and the overpack body 2100. Each of the air outlet ducts 2850 forms an air outlet passageway from the top portion of the cavity 10 to the external atmosphere as with the previously described embodiments.

Figure 24:
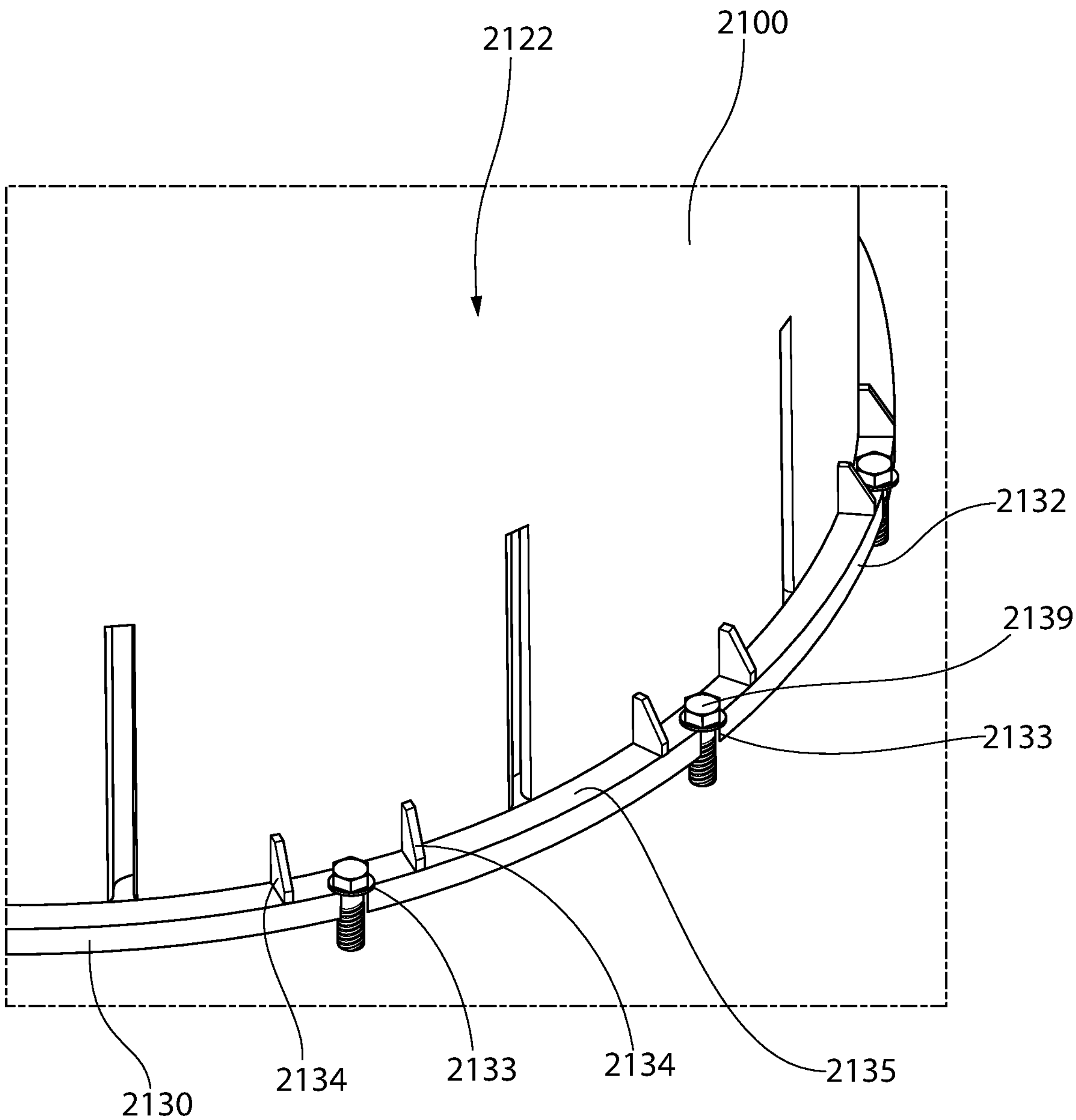
FIG. 24 is a close-up view illustrating an extended base of the overpack body in accordance with an embodiment of the present invention.

FIG. 24 is a close-up view of a portion of the bottom of the overpack body 2100 in accordance with an alternative embodiment. In some embodiments, it may be desired to restrain the ventilated apparatus 21000 from movement on the storage pad at the ISFSI. Thus, in this embodiment the base plate 2130 has been extended so as to form a flange 2132 that protrudes from the outer surface 2122 of the overpack body 2100. The flange 2132 has a plurality of apertures 2133 therethrough, each of which operates as an anchor location through which an anchor 2139 (screw, bolt, etc.) can be inserted to secure the overpack body 2100 to a storage pad or other desired surface. The anchor locations are reinforced by gussets 2134 that extend from the outer surface 2122 of the overpack body 2100 to the upper surface 2135 of the flange 2132. The radial dimension of the flange 2132 (i.e., the distance that it extends from the outer surface 2122 of the overpack body 2100) is preferably minimized to minimize movement of the flange 2132 during a cask uplift or tipping event and to facilitate its handling by a vertical cask transporter without significantly increasing the overall width dimension of the overpack body 2100.

III. Inventive Concept 3

With reference to FIGS. 25-36A, B, a third inventive concept will be described.

Referring to FIGS. 25-28 concurrently, a container 33100 for storing and/or transporting spent nuclear fuel is illustrated according to an embodiment of the present invention. The container 33100 may be configured to hold any type of radioactive materials, including radioactive waste such as spent nuclear fuel, nuclear waste, or the like, and also including other types of materials. The container 33100 may be a cask that is intended for the dry storage of spent nuclear fuel after the spent nuclear fuel has been cooled in a spent fuel pool to reduce the heat and radiation to a sufficiently low level so that the spent nuclear fuel can be transported with safety. In that regard, in some embodiments the container 33100 may be a steel structure that is welded and/or bolted closed that provides a leak-tight confinement of the spent nuclear fuel. The spent nuclear fuel within the container 33100 may be surrounded by an inert gas. During long-term storage, the container 33100 may be surrounded by additional steel, concrete, or other material to provide radiation shielding to workers and members of the public. The containers 33100 described herein are vertical dry storage casks that are intended to be placed vertically in a concrete vault during storage. However, the containers 33100 may be of the horizontal type as well. While the container 33100 is discussed herein as being used to store spent nuclear fuel, it is to be understood that the invention is not so limited and that, in certain circumstances, the container 33100 can be used to transport spent nuclear fuel from location to location if desired. Moreover, the container can be used in combination with any other type of high level radioactive waste such as high level nuclear waste, fissile materials, or the like.

The container 33100 may be designed to accept one or more canisters for storage at an Independent Spent Fuel Storage Installation ("ISFSI"). All canister types engineered for the dry storage of spent nuclear fuel can be stored in the container 33100. Suitable canisters include multi-purpose canisters ("MPCs") and, in certain instances, can include thermally conductive casks that are hermetically sealed for the dry storage of high level radioactive waste. Typically, such canisters may include a honeycomb basket or other structure to accommodate a plurality of spent nuclear fuel rods in spaced relation.

In the exemplified embodiment, the container 33100 comprises a body 3110 having an outer surface 3111 and an inner surface 3112 that defines an internal cavity 3113 within which spent nuclear fuel may be contained for storage and/or transport. The internal cavity 3113 extends from a bottom end to a top end along a longitudinal axis 3A-3A. In the exemplified embodiment, the body 3110 has a rectangular shape formed by a first sidewall 3101, a second sidewall 3102 that is opposite the first sidewall 3101, a third sidewall 3103, and a fourth sidewall 3104 that is opposite the third sidewall 3103. Each of the third and fourth sidewalls 3103, 3104 extends between the first and second sidewalls 3101, 3102. The first, second, third, and fourth sidewalls 3101-3104 collectively form a sidewall of the body 3110. Of course, shapes other than rectangular are possible in other embodiments including cylindrical (FIG. 32) and other polygonal/prismatic shapes.

Figure 27:
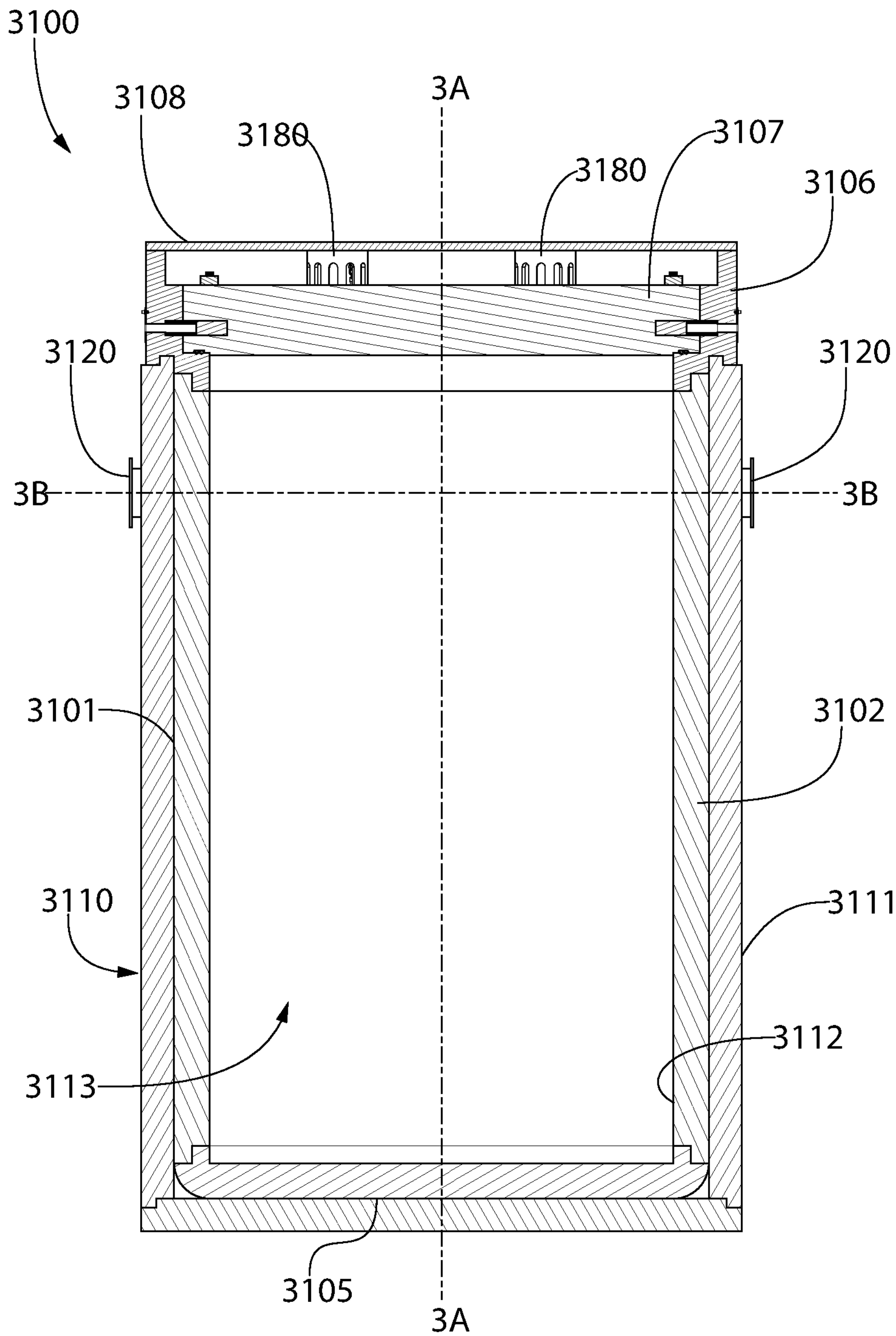
FIG. 27 is a cross-sectional view taken along line 3III-3III of FIG. 26.
Figure 28:
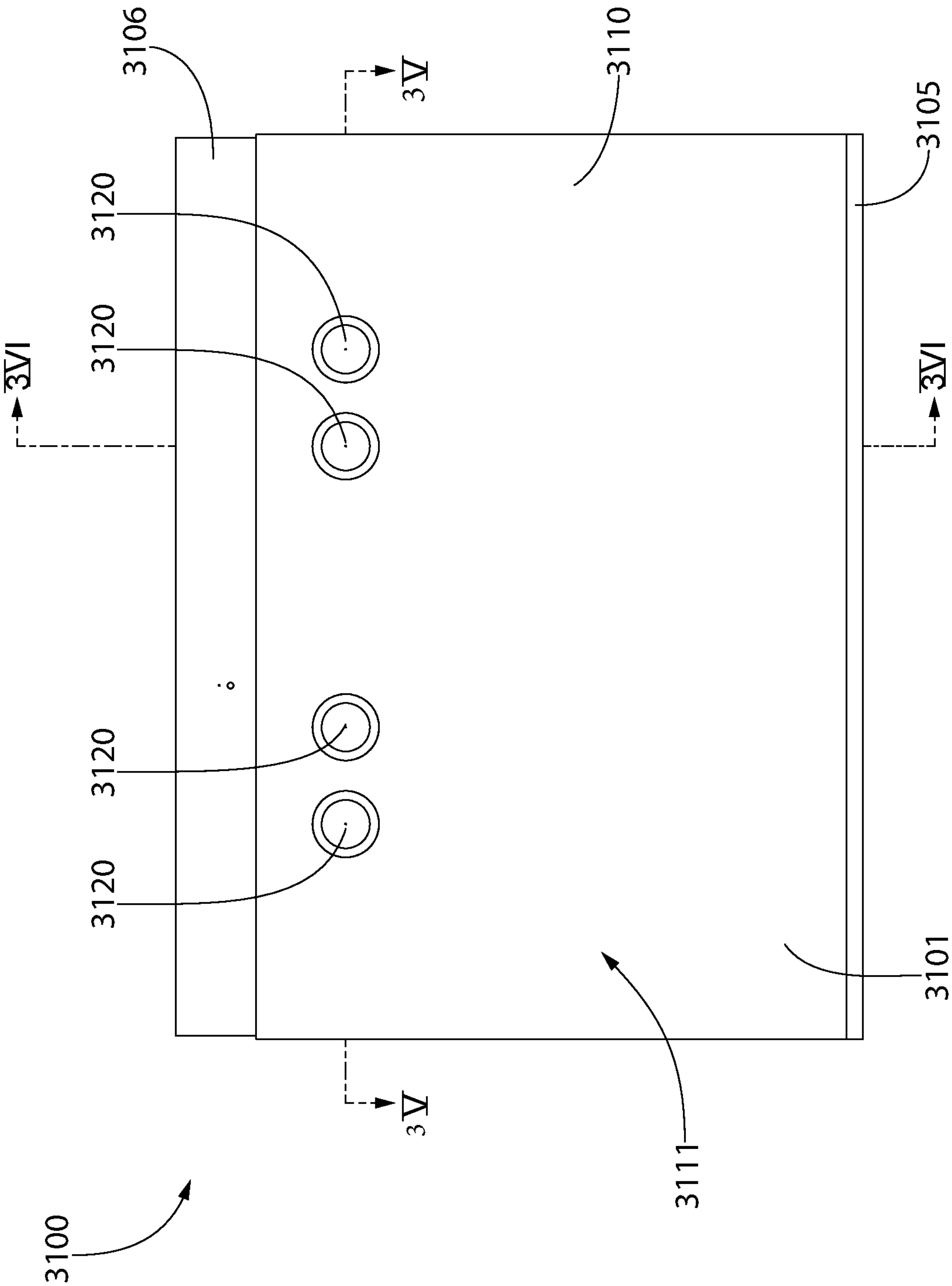
FIG. 28 is a front view of the container of FIG. 25.

Furthermore, the body 3110 comprises a base plate 3105 that connects to a bottom end of each of the first, second, third, and fourth sidewalls 3101-3104 and closes a bottom end of the internal cavity 3113. The body 3110 also comprises a lid flange 3106 extending from a top end of each of the first, second, third, and fourth sidewalls 3101-3104. An outer diameter of the lid flange 3106 may be slightly less than an outer diameter of the sidewall as best seen in FIG. 27. A lid 3107 is coupled to the lid flange 3106 to close a top end of the internal cavity 3113. Furthermore, in the exemplified embodiment a cover (also known as a secondary lid) 3108 is coupled to a top end of the lid flange 3106 above the lid 3107.

In the exemplified embodiment, each of the sidewalls 3101-3104 and the base plate 3105 comprises two layers. The inner layer is a wall formed of stainless steel that forms the containment structure of the container 3100. The outer layer is a dose blocker plate that may also be formed of stainless steel and may form a secondary containment structure of the container 3100. Each of the inner and outer layers may form a distinct hermetically sealed vessel thus providing dual-walled protection against radiation to prevent such radiation from exiting the internal cavity 3113 and entering the atmosphere. Although described herein as being formed of stainless steel, the inner and outer layers can be formed of other materials, such as austenitic stainless steel and other metal alloys including Hastelloy™ and Inconel™. The dose blocker plate may include additives or the like for radiation shielding purposes to prevent radiation emanating from the spent nuclear fuel from exiting the internal cavity 3113. Of course, in other embodiments the sidewalls 3101-3104 may have just a single layer. Furthermore, in still other embodiments the sidewalls 3101-3104 may be formed of concrete or the like instead of stainless steel.

The container 3100 also comprises a plurality of trunnions 3120 coupled to the body 3110. Specifically, in the exemplified embodiment there are four trunnions 3120 on the first sidewall 3101 and four trunnions 3120 on the second sidewall 3102. Of course, there may be more or less than four of the trunnions 3120 on each of the first and second sidewalls 3101, 3102 in alternative embodiments. Furthermore, although in the exemplified embodiment there are no trunnions 3120 on the third and fourth sidewalls 3103, 3104, in other embodiments there may be one or more trunnions 3120 on the third and fourth sidewalls 3103, 3104 in addition to or instead of the trunnions 3120 on the first and second sidewalls 3101, 3102. In some embodiments, all of the trunnions 3120 are located on one or more of the sidewalls 3101-3104 and there are no trunnions 3120 located on the lid flange 3106.

Figure 34:
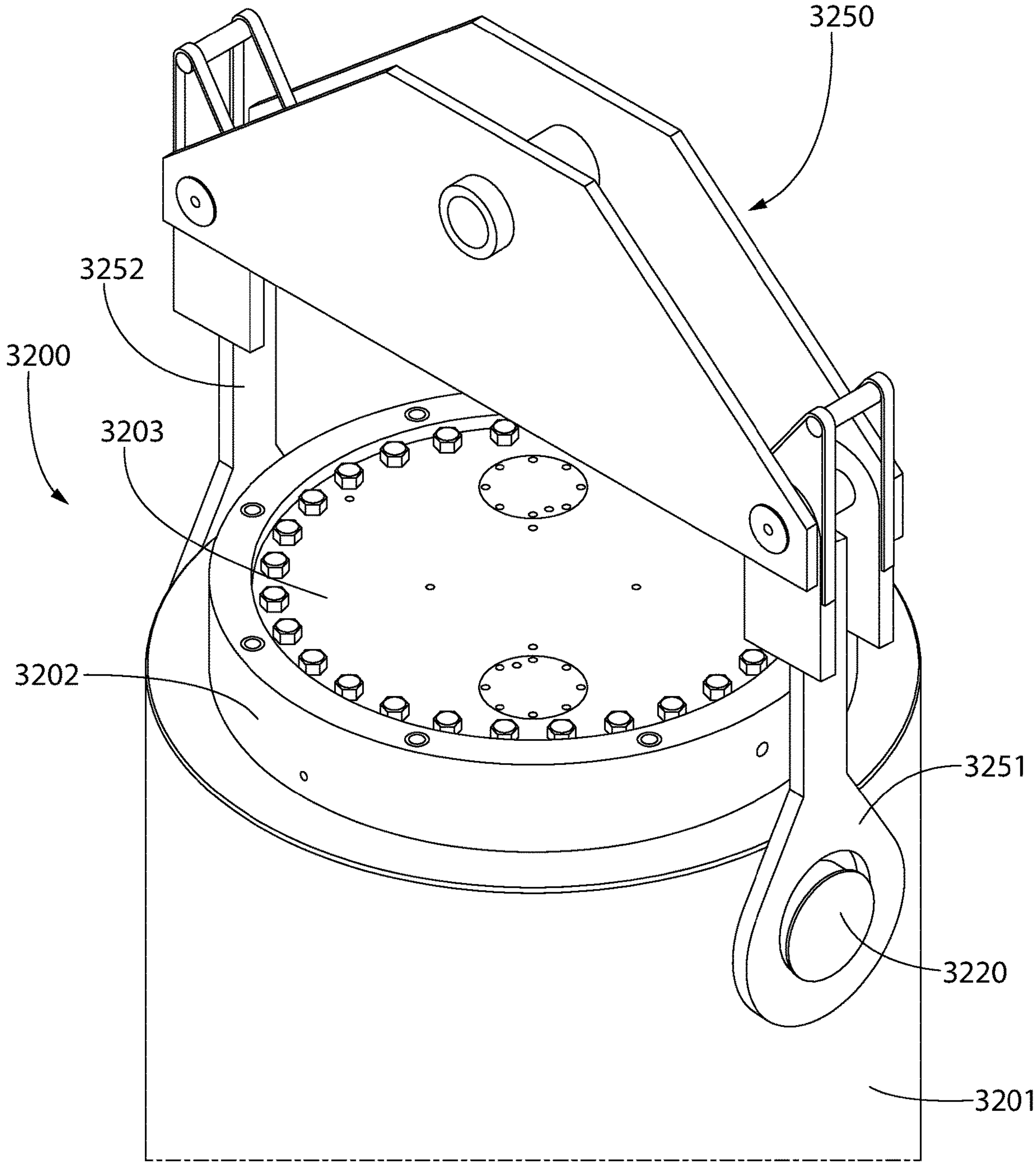
FIG. 34 is the close-up view of FIG. 33 with a lift yoke coupled to the trunnions of the container.

In the exemplified embodiment, each of the trunnions 3120 on the first sidewall 3101 is aligned with one of the trunnions 3120 on the second sidewall 3102. More specifically, the trunnions 3120 on the first and second sidewalls 3101, 3102 are aligned along a reference axis 3B-3B that is perpendicular (possibly without intersecting) to the longitudinal axis 3A-3A of the internal cavity 3113. Thus, each of the trunnions 3120 on the first sidewall 3101 is spaced the same distance from the lid 3107 and the same distance from the third sidewall 3103 as one of the trunnions 3120 on the second sidewall 3102. The purpose of the trunnions 3120 is to enable a lift yoke to engage the portion of the trunnion 3120 that protrudes out from the outer surface 3111 of the body 3110 to transport the container 3100. Thus, the lift yoke can raise the container 3100 off the ground via engagement between the lift yoke and the trunnions 3120 to move the container 3100 from one location to another. The lift yoke serves as the interface between a plant crane and the container 3100 to maneuver the container 3100 as desired. An exemplary lift yoke is illustrated in FIG. 34 and will be described briefly below.

The container 3100 is a hermetically sealed apparatus that has no openings or penetrations therein when the lid 3107 is coupled to the top ends of the sidewalls 3101-3104 to close the internal cavity 3113. Thus, there is no passageway extending from the internal cavity 3113 to the external atmosphere, which is necessary to prevent radiation from entering the atmosphere. In that regard, it is important to ensure that under no circumstances can the trunnions pierce the body 3110 and form a passageway into the internal cavity 3113. Thus, even if the container 3100 were to fall on one of its first or second sidewalls 3101, 3102, it is important that the contact between the trunnions 3120 and the ground or hard surface upon which the container 3100 falls does not cause the trunnions 3120 to pierce the body 3110 or otherwise penetrate the internal cavity 3113 of the body. As mentioned in the background, previously this was accomplished by coupling the trunnions to the body via a threaded engagement so that the trunnions could be removed when not being used to maneuver the container 3100. However, this conventional technique has disadvantages that are overcome in the present invention whereby the trunnions 3120 are formed as a collapsible structure so that during a fall event as described above, the trunnions 3120 will collapse into the body 3110 of the container 3100 rather than piercing the body 3110 of the container. Thus, the trunnions 3120 need not be removed from the body 3110 during periods of non-use because there is no possibility that the trunnions 3120 can pierce the body 3110 of the container 3100 even during an undesirable or unplanned fall or tip-over event.

In the exemplified embodiment, the trunnions 3120 are in a protruded state such that a portion of the trunnions 3120 extends/protrudes from the outer surface 3111 of the body 3110. The trunnions 3120 must be in the protruded state in order for the lift yoke to be able to engage the trunnions 3120 to move the container 3100. Specifically, as described below with reference to FIG. 34, the hooks of the lift yoke must be able to be positioned between a flange located at a distal end of the trunnions 3120 and the outer surface 3111 of the body 3110 in order for the lift yoke to lift the container 3100 by the trunnions 3120. Thus, in normal operation and use of the container 3100, the trunnions 3120 are in the protruded state.

The trunnions 3120 are configured to be alterable from the protruded state to a retracted state whereby the trunnions 3120 no longer protrude from the outer surface 3111 of the body 3110 (see FIGS. 31A and 31B, described in more detail below). The trunnions 3120 only move into the retracted state when they are forced into that state, such as by the container 3100 tipping over and landing on one of the trunnions 3120. Specifically, if the container 3100 were to tip over, contact of the trunnions 3120 with the ground or some other hard surface combined with the force created by the weight of the container 3100 pressing the trunnions 3120 into the ground or other hard surface will move the trunnion 3120 from the protruded state to the retracted state without causing any damage to the body 3110 of the container 3100. This is because, as discussed below, the trunnion 3120 or a portion thereof will simply slide within a hole in the body 3110 from which it extends, as described in more detail below.

When in the retracted state (illustrated in FIG. 31B), the lift yoke is no longer capable of engaging the trunnions 3120 because there is no surface area of the trunnions 3120 protruding from the outer surface 3111 of the body 3110 to be engaged by the lift yoke. Thus, when the trunnions 3120 are in the retracted state, the container 3100 cannot be moved via engagement between the lift yoke and the trunnions 3120 due to a lack of an engagement surface on the trunnions 3120. As stated above, in certain embodiments the trunnions 3120 may collapse from the protruded state into the retracted state upon an axial force being applied onto the portions of the trunnions 3120 that are protruding from the outer surface 3111 of the body 3110. Thus, if there were a tip-over event and the container 3100 were to fall onto one of its sidewalls 3101-3104, the weight of the container 3100 against the ground or other hard surface would cause the trunnions 3120 to be moved from the protruded state to the retracted state without the trunnions 3120 penetrating the inner surface 3112 of the body 3110. Thus, by forming the trunnions 3120 to be collapsible as described herein, the sidewalls 3101-3104 of the body 3110 that have the trunnions 3120 thereon are protected from being damaged by the trunnions 3120 without ever requiring removal of the trunnions.

Referring to FIGS. 29-31A, the container 3100 comprises a plurality of blind holes 3115 formed into the outer surface 3111 of the body 3110. In the exemplified embodiment, the number of blind holes 3115 corresponds with the number of trunnions 3120 because one of the trunnions 3120 is positioned within each of the blind holes 3115 and secured to the body 3110 within the blind hole 3115. Thus, the blind holes 3115 are formed into the first and second sidewalls 3101, 3102 of the body 3110 in the exemplified embodiment, but they may be located at any position along the body 3110 at which a trunnion 3120 is desired to facilitate lifting and maneuvering of the container 3100. As will be understood from the description below in conjunction with FIGS. 31A and 31B, the trunnions 3120 remain coupled to the body 3110, or at least located within the blind hole 3115 of the body 3110, in both the protruded and retracted states.

Each of the blind holes 3115 is defined by a floor 3116 and a sidewall 3117 extending from the floor 3116 to an opening 3118 in the outer surface 3111 of the body 3110. The blind holes 3115 do not penetrate the entire thickness of the sidewall of the body 3110 in which they are formed but rather extend a distance into the sidewall to the floor 3116 of the blind hole 3115. A portion of the sidewall of the body 3110 remains between the floor 3116 of the blind hole 3115 and the interior cavity 3113 of the body 3110. In the exemplified embodiment, the blind holes 3115 have a circular cross-sectional shape. However, the shape of the blind holes 3115 should correspond with the shape of the trunnions 3120 and thus although the blind holes 3115 and the trunnions 3120 have a circular cross-sectional shape in the exemplified embodiment, this is not required in all embodiments and other prismatic cross-sectional shapes (i.e., triangular, rectangular, or the like) may be used without affecting the function described herein.

Figure 29:
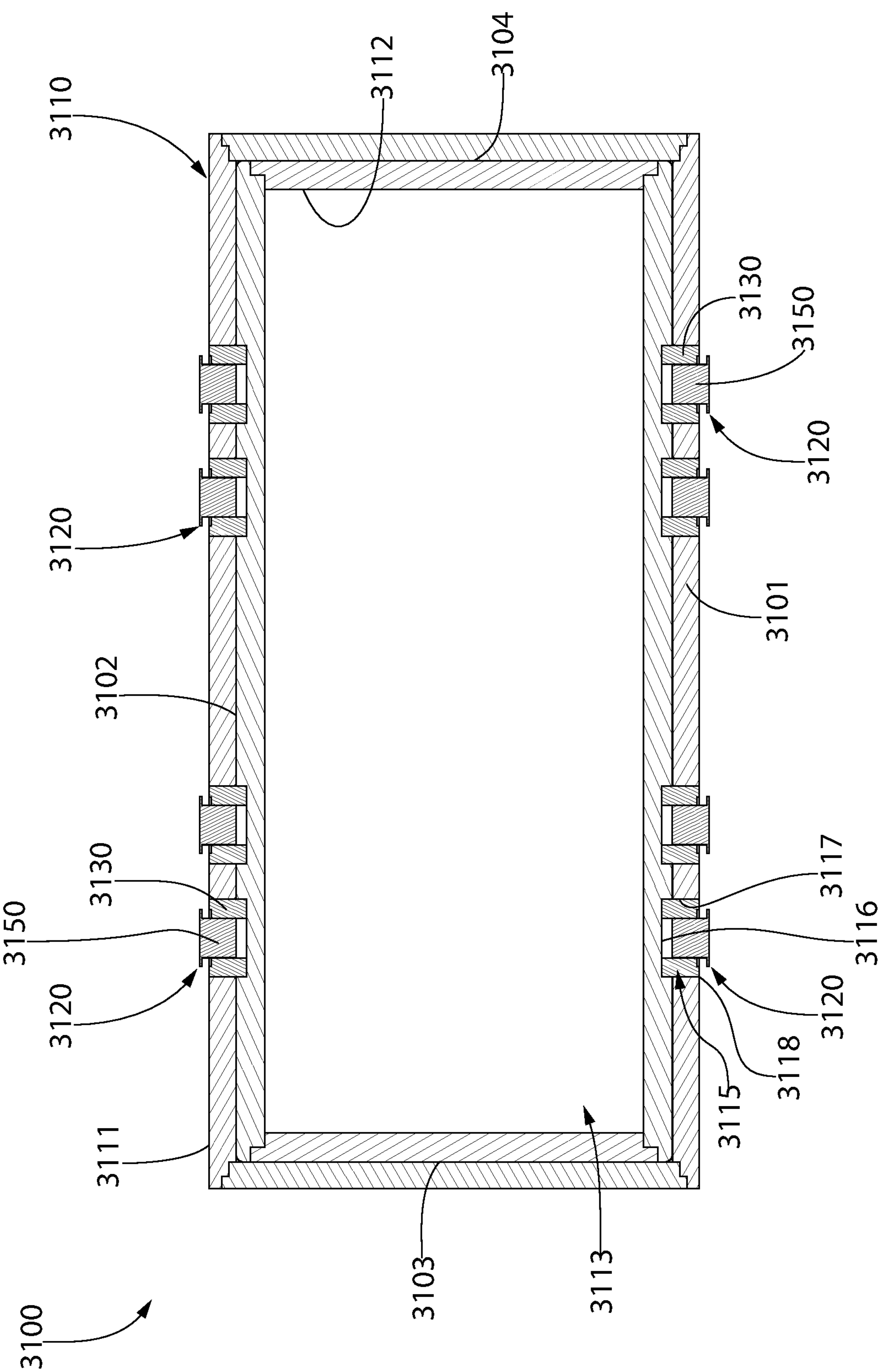
FIG. 29 is a cross-sectional view taken along line 3V-3V of FIG. 28.
Figure 30:
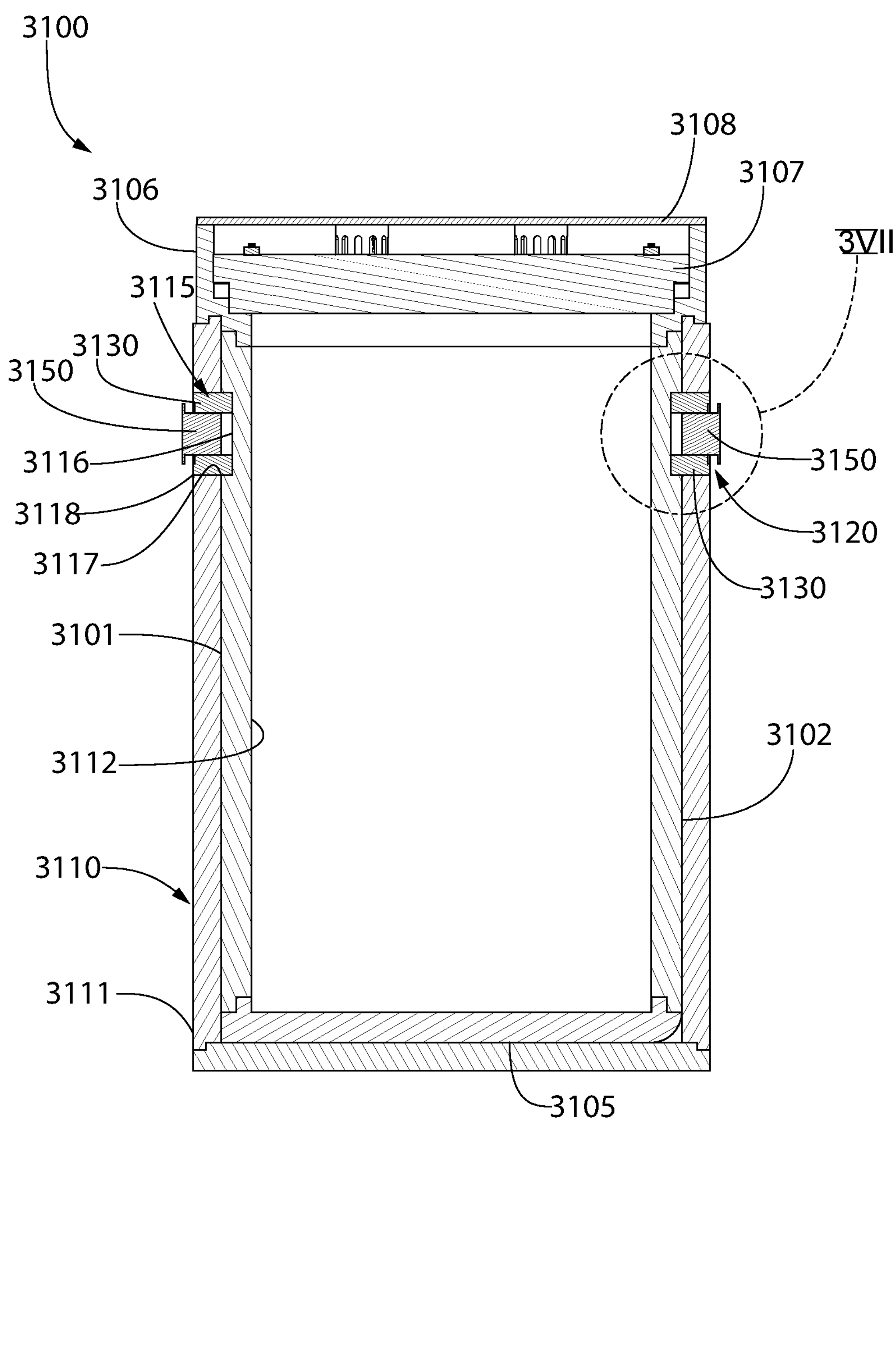
FIG. 30 is a cross-sectional view taken along line 3VI-3VI of FIG. 28.

Still referring to FIGS. 29-31A concurrently, the trunnions 3120 will be described in greater detail in accordance with an exemplary embodiment. FIGS. 29 and 30 illustrate different cross-sectional views of the container 3100 that illustrate the structural details of the each of the trunnions 3120 and FIG. 31A illustrates a close-up view of one of the trunnions 3120 in cross-section. Due to the enlarged size of the trunnion 3120 in FIG. 31A, some of the reference numerals used below to describe the structure and function of the trunnion 3120 may only be provided in FIG. 31A for clarity and to avoid clutter. However, the features referred to by these reference numerals are also illustrated in FIGS. 29 and 30 and thus those figures can be viewed in conjunction with FIG. 31A to gain a full understanding and appreciation of the teachings set forth herein.

In the exemplified embodiment, each of the trunnions 3120 has the same structure and thus the description below will be made with regard to one of the trunnions 3120, it being understood that the description is applicable to each trunnion 3120. Of course, in other embodiments some of the trunnions 3120 may have a structure different than that which is shown in the drawings and described herein. For example, some of the trunnions 3120 may be collapsible as described herein and others may be of a more conventional type that are detachable from the body 3110 via a threaded connection or the like. Additionally or alternatively, some of the trunnions may be of the type that are welded directly to the body 3110 and not detachable therefrom or collapsible. Of course, it may be preferable in some embodiments for each of the trunnions 3120 to be collapsible.

In the exemplified embodiment, the trunnions 3120 have a two-part structure comprising a first component 3130 and a second component 3150. As will be discussed in greater detail below, in some embodiments the first component 3130 may be omitted and the trunnions 3120 may have a one-part structure without changing the function described herein. In the exemplified embodiment, both the first and second components 3130, 3150 are formed of a metal such as stainless steel, although other metals and metal alloys may be used in other embodiments. The first component 3130 extends from a first end 3131 to a second end 3132 and has an outer surface 3133 and an inner surface 3134. The inner surface 3134 is smooth and free of bumps, ridges, protuberances or the like and defines a hollow interior 3135. In the exemplified embodiment, the hollow interior 3135 is open at both the first and second ends 3131, 3132 and thus the hollow interior 3135 forms a passageway through the first component 3130 from the first end 3131 to the second end 3132. However, the invention is not to be so limited in all embodiments and the first end 3131 of the first component 3130 may be closed while an opening remains in the second end 3132 of the first component 3130.

The first component 3130 is positioned within one of the blind holes 3115 so that the first end 3131 of the first component 3130 is in contact with the floor 3116 of the blind hole 3115 and the outer surface 3133 is in contact with the sidewall 3117 of the blind hole 3115. The outer diameter of the first component 3130 and the diameter of the blind hole 3115 may be selected to ensure that the first component 3130 fits snugly within the blind hole 3115 so that it can not be readily removed from the blind hole 3115 once positioned therein. In some embodiments, the first component 3130 may be welded to the body 3110 to strengthen the attachment between the first component 3130 and the body 3110. For example, an annular weld joint may be formed at the location where the inner surface 3134 of the first component 3130 meets the floor 3116 of the blind hole 3115. Alternatively, an annular weld joint may be formed at the location where the second end 3132 of the first component 3130 meets the outer surface 3111 of the body 3110. The connection between the first component 3130 and the body 3110 may be further reinforced by radial gussets extending between the inner surface 3134 of the first component 3130 and the floor 3116 of the blind hole 3115. In certain embodiments, the first component 3130 remains fixed to the body 3110 regardless of whether the trunnion 3120 is in the protruded or retracted states.

The second end 3132 of the first component 3130 comprises a first portion 3136 and a second portion 3137. The first portion 3137 of the second end 3132 of the first component 3130 is flush with the outer surface 3111 of the body 3110 when the first component 3130 is inserted into the blind hole 3115 as illustrated. The second portion 3137 of the second end 3132 of the first component 3130 is recessed relative to the first portion 3136 and recessed relative to the outer surface 3111 of the body 3110 when the first component 3130 is inserted into the blind hole 3115 as illustrated. Thus, the second end 3132 of the first component 3130 has a stepped surface. The second portion 3137 of the second end 3132 of the first component 3130 forms a nesting groove 3138 in the second end 3132 of the first component 3130 within which a portion of the second component 3150 may nest when in the retracted state as described in more detail below with reference to FIG. 31B.

In the exemplified embodiment, the second portion 3137 of the second end 3132 of the first component 3130 is annular or ring-like in shape and the first portion 3136 of the second end 3132 of the first component 3130 surrounds the second portion 3137 of the second end 3132 of the first component 3130. Of course, the invention is not to be limited by the stepped surface of the second end 3132 of the first component 3130 as illustrated and the second end 3132 of the first component 3130 may be flat or planar rather than stepped in other embodiments. Although the first portion 3136 of the second end 3132 of the first component 3130 is illustrated as being flush with the outer surface 3111 of the body 3110 in the exemplified embodiment, it may be recessed relative to the outer surface 3111 of the body 3110 in other embodiments.

While the first component 3130 of the trunnion 3120 is a hollow structure, the second component 3150 of the trunnion 3120 is a solid structure extending from a first end 3151 to a second end 3152 along a longitudinal axis 3C-3C.

Although illustrated as being an entirely solid body, the second component 3150 may have an internal cavity in other embodiments to reduce material costs so long as it does not detract from the ability 3150 of the second component 3150 to support the weight of the container 3100. Specifically, during maneuvering of the container 3100, the hooks of the lift yoke are coupled to the second component 3150 of the trunnion 3120. Thus, the second component 3150 of the trunnion 3120 must be sufficiently rigid and strong to support the entire weight of the container 3100 without bending or breaking. Forming the second component 3150 from solid steel is therefore preferable.

The second component 3150 is positioned at least partially within the hollow interior 3135 of the first component 3130 and protrudes from the outer surface 3111 of the body 3110. In that regard, the second component 3150 has an outer surface 3153 that may be in direct contact with the inner surface 3134 of the first component 3130. The second component 3150 may be coupled to the first component 3130 via a seal weld (i.e., a fillet weld) in some embodiments. In such an embodiment, the weld will create an axial load retention that will prevent the second component 3150 from sliding in its axial direction (i.e., in the direction of the longitudinal axis 3C-3C) until a force is applied onto the second component 3150 that causes the weld to break. Thus, the weld provides the trunnion 3120, and more specifically the second component 3150 of the trunnion 3120, with a limited axial load bearing capacity such that an axial load up to a predetermined threshold will not break the weld and cause the second component 3150 to slide axially. However, a force that breaks the weld will enable the second component 3150 to slide axially relative to the first component 3130. The container 3100 tipping over and falling on the trunnion 3120 would create a sufficient force to break the weld.

In other embodiments, the second component 3150 may be shrunk-fit in the hollow interior 3135 of the first component 3130. Specifically, the second component 3150 may be shrunk by cooling the second component 3150 and then inserting the cooled/shrunk second component 3150 into the hollow interior 3135 of the first component 3130. Then, when the second component 3150 returns to its normal temperature, the second component 3150 will expand back to its original size. This expansion will cause the second component 3150 to be tight-fit within the hollow interior 3135 of the first component 3130. As a result, the outer surface 3153 of the second component 3150 will be in intimate surface contact with the inner surface 3134 of the first component, thereby creating an interface pressure between the first and second components 3130, 3150. This interface pressure will provide the trunnion 3120, and more specifically the second component 3150 of the trunnion, with a limited axial load bearing capacity such that an axial load up to a predetermined threshold will not cause the second component 3150 to slide axially due to the interface pressure between the first and second components 3130, 3150. However, a force greater than the predetermined threshold will enable the second component 3150 to slide axially relative to the first component 3130. Again, the container 3100 tipping over and falling on the trunnion 3120 would create a sufficient force to overcome the interface pressure and cause the second component 3150 of the trunnion 3120 to slide axially into the hollow interior 3135 of the first component 3130. In some embodiments, the second component 3150 may be welded to the first component 3130 and shrunk-fit in the hollow interior 3135 of the first component 3130.

The second component 3150 is positioned within the hollow interior 3135 of the first component 3130 so that the first end 3151 of the second component 3150 is spaced apart from the floor 3116 of the blind hole 3115 by a gap 3155. Furthermore, the second component 3150 has a first portion 3156 that is located within the hollow interior 3135 of the first component 3130 and a second portion 3157 that protrudes from the outer surface 3111 of the body 3110. The lift yoke is able to hook onto the protruding portion of the second component 3150 during lifting/maneuvering of the container 3100. Thus, in order to move the container 3100 via engagement between the lift yoke and the trunnions 3120, the second component 3150 must protrude from the outer surface 3111 of the body 3110 to provide an engagement shoulder for the lift yoke. The gap 3155 has a length measured from the floor 3116 of the blind hole 3115 to the first end 3151 of the second component 3150 and the second portion 3157 of the second component 3130 has a length measured along the longitudinal axis 3C-3C of the second component 3150 such that the length of the gap 3155 is equal to or greater than the length of the second portion 3157 of the second component 3150. The gap 3155 having an equal or greater length than the second portion 3157 of the second component 3150 (i.e., the portion of the second component 3150 that protrudes from the outer surface 3111 of the body 3110 when the trunnion 3120 is in the protruded state) enables the second component 3150 to slide into the gap 3155 during a collapsing procedure a sufficient amount so that the second portion 3157 of the second component 3150 no longer protrudes from the outer surface 3111 of the body 3110.

The second component 3150 comprises a body portion 3160 and a flange portion 3161 extending radially from the body portion 3160 at the second end 3152 of the second component 3150. When the lift yoke is being used, the hooks of the lift yoke become trapped between the flange portion 3161 of the second component 3150 and the outer surface 3111 of the body 3110 of the container (or the second end 3132 of the first component 3130). The flange portion 3161 prevents the hook of the lift yoke from readily sliding off the trunnion 3120 during a moving operation.

Figure 31A:
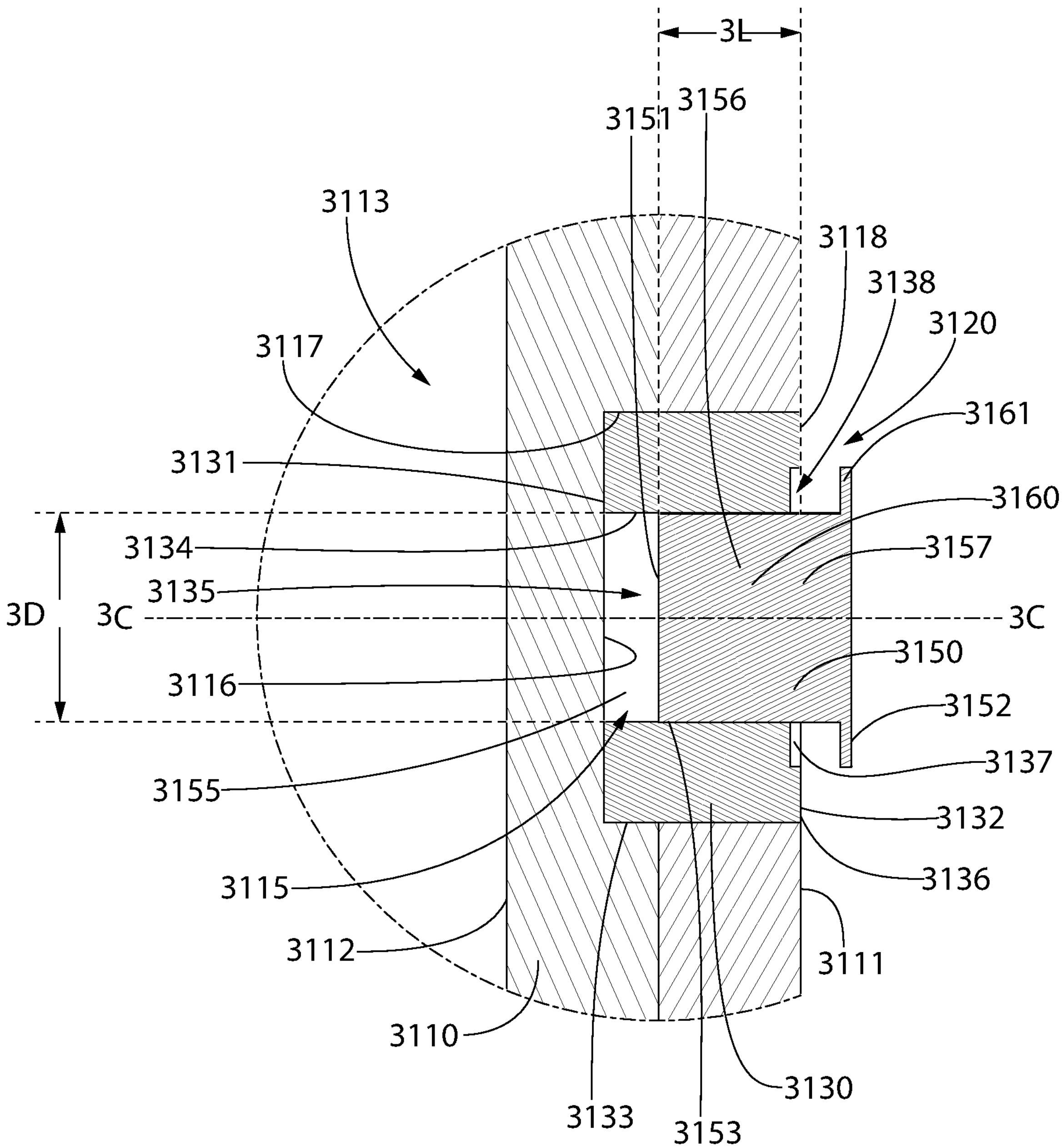
FIG. 31A is a close-up of area 3VII of FIG. 30 illustrating a trunnion of the container in a protruded state.
Figure 31B:
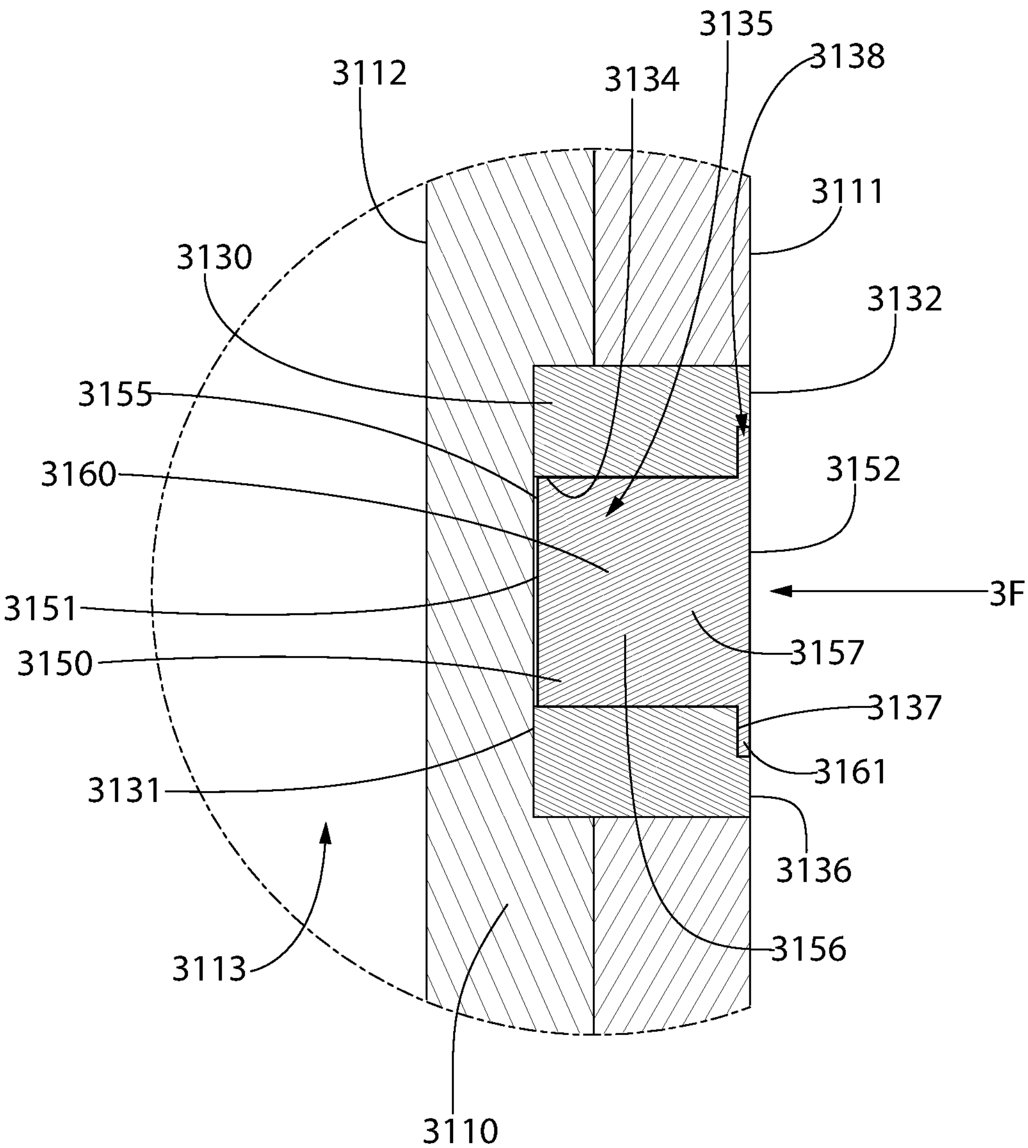
FIG. 31B is a close-up of area 3VII of FIG. 30 illustrating the trunnion of the container in a retracted state.

Referring to FIGS. 31A and 31B concurrently, the collapsible nature of the trunnion 3120 will be described. Due in part to the fact that the second component 3150 is located within the hollow cavity 3135 of the first component 3130 in a spaced apart manner from the floor 3116 of the blind hole 3115, when a sufficient axial force is applied onto the second component 3150 towards the internal cavity 3113 of the body 3110, the second component 3150 can slide axially relative to the first component 3130 into the gap 3155. The only things hindering free axial movement of the first component 3130 into the gap 3155 are the possible weld joint coupling the first and second components 3130, 3150 together and the possible interface pressure between the inner surface 3134 of the first component 3130 and the outer surface 3153 of the second component 3150. However, if a force acts on the second component 3150 that overcomes the weld joint and/or the interface pressure, the second component 3150 will slide axially into the gap 3155.

Thus, the second component 3150 of the trunnion 3120 is axially slidable relative to the first component 3130 of the trunnion 3120 between a protruded state (FIG. 31A) in which the second portion 3157 of the second component 3150 protrudes from the outer surface 3111 of the body 3110 and a retracted state (FIG. 31B) in which the second component 3150 does not protrude from the outer surface 3111 of the body 3110. In the exemplified embodiment, in the protruded state the first portion 3156 of the second component 3150 is located within the hollow interior 3135 of the first component 3130 and the second portion 3157 of the second component 3150 protrudes from the hollow interior 3135 of the first component 3130. Stated another way, in the protruded state the first portion 3156 of the second component 3150 is located within the blind hole 3115 and the second portion 3157 of the second component 3150 protrudes from the outer surface 3111 of the body 3110. Furthermore, in the exemplified embodiment, in the retracted state the first and second portions 3156, 3157 of the second component 3150 are both located within the hollow interior 3135 of the first component 3130 such that no part of the second component 3150 protrudes out of the hollow interior 3135 and from the outer surface 3111 of the body 3110. Stated another way, in the retracted state the first and second portions 3156, 3157 of the second component 3150 are both located within the blind hole 3115. Thus, in both the protruded and retracted states, at least a portion of the second component 3150 of the trunnion 3120 is located within the blind hole 3115.

As has been described above, sliding the second component 3150 from the protruded state to the retracted state occurs when a sufficient axial force 3F (i.e., one that is greater than the axial load retention capacity of the second component 3150 relative to the first component 3130) acts upon the second component 3150. This axial force 3F causes the second component 3150 to slide axially relative to the first component 3130 (and relative to the body 3110) into the gap 3155.

When the second component 3150 is in the retracted state, the flange portion 3161 of the second component 3150 nests within the nesting groove 3138 formed by the first and second portions 3136, 3137 of the second end 3132 of the first component 3130. Both the nesting groove 3138 and the flange portion 3161 may be annular shaped in some embodiments. As a result, when the second component 3150 is in the retracted state, the second end 3152 of the second component 3150 is flush with the outer surface 3111 of the body 3110. Of course, in other embodiments in the retracted state the second end 3152 of the second component 3150 may be recessed relative to the outer surface 3111 of the body 3110. This can be dictated by the length of the blind hole 3115 and the length of the second component 3150 of the trunnion 3120.

During normal use of the container 3100, the second component 3150 of the trunnion 3120 is in the protruded state such that it can be used at any time for movement of the container 3100. In order to ensure that the second component 3150 is sufficiently strong to enable it to support the weight of the container 3100, it is desirable for an adequate amount of the second component 3150 to be located within the hollow interior 3135 of the first component 3130. Stated another way, the second component 3150 is configured to project sufficiently inside the first component 3130 such that it develops the full stiffness of a cantilevered beam with the first component 3130 serving as the anchor of the cantilever.

In that regard, the first portion 3156 of the second component 3150 (which is the portion located within the hollow interior 3135 of the second component 3130) has a length 3L and a diameter D. A ratio of the diameter 3D to the length 3L is between 1:1 and 2:1. Thus, a length of the second component 3150 equal to between ½ and 1.0 of the diameter 3D of the second component 3150 is located within the hollow interior 3135 of the first component 3130 when the second component 3150 is in the protruded state. In the exemplified embodiment, when the second component 3150 is in the protruded state at least two-thirds of the length of the second component 3150 measured from the first end 3151 to the second end 3152 is located within the hollow interior 3135 of the first component 3130 (and also within the blind hole 3115). Thus, a ratio of the length of the first portion 3156 of the second component 3150 to the length of the second portion 3157 of the second component is between 2:1 and 3:1 in some embodiments, and more specifically approximately 2.5:1. The collapsible trunnion 3120 configured in this manner will have a limited axial load bearing capacity without any reduction in its load bearing capacity which derives from its bending rigidity, which is not impaired by the reduction in its axial load sustaining capacity. The collapsible trunnion 3120 is a structurally competent member in bending but a relatively weak member in axial tension or compression.

In order to facilitate the axial sliding of the second component 3150 relative to the first component 3130, the outer surface 3153 of the second component 3150 and the inner surface 3134 of the first component 3130 are preferably smooth and without ridges, protuberances, or the like. Furthermore, although in the exemplified embodiment the trunnion 3120 is illustrated and described as including both of the first and second components 3130, 3150, in some alternative embodiments the first component 3130 may be omitted. In such an embodiment, the portions of the trunnion 3120 illustrated as forming the first component 3130 will instead be formed directly by the body 3110 of the container 3100 and the second component 3150 will form the entirety of the trunnion 3120. Thus, as used herein "trunnion" may refer to the combination of the first and second components 3130, 3150 or just the second component 3150. In embodiments that omit the first component 3130, the second component 3150 may be positioned in intimate surface contact with the sidewall 3117 of the blind hole 3115 so as to be axially slidable relative to the body 3110 in the manner described herein. Thus, the first component 3130 serves as an intermediary between the body 3110 and the second component 3150 in the exemplified embodiment, but it may not be required in all embodiments.

In some embodiments the trunnion 3120 may collapse rather than slide axially. Thus, the trunnion 3120 may be configured to collapse upon itself. Furthermore, in some embodiments the trunnion 3120 may be collapsible between a non-collapsed state and a collapsed state such that in the non-collapsed state the trunnion 3120 protrudes a greater distance from the outer surface 3111 of the body 3110 than in the collapsed state. Thus, the trunnion 3120 may protrude a first distance from the outer surface 3111 of the body 3110 in the non-collapsed state and a second distance from the outer surface 3111 of the body 3110 in the collapsed state, the first distance being greater than the second distance. In some embodiments the second distance may be zero, or may be negative whereby the trunnion 3120 is recessed relative to the outer surface 3111 of the body 3110 in the collapsed state. Thus, the non-collapsed state may be equivalent or similar to the protruded state described above and the collapsed state may be equivalent or similar to the retracted state described above. Furthermore, the non-collapsed state and the protruded state may be referred to herein as a first state and the collapsed state and the retracted state may be referred to herein as a second state.

Figure 32:
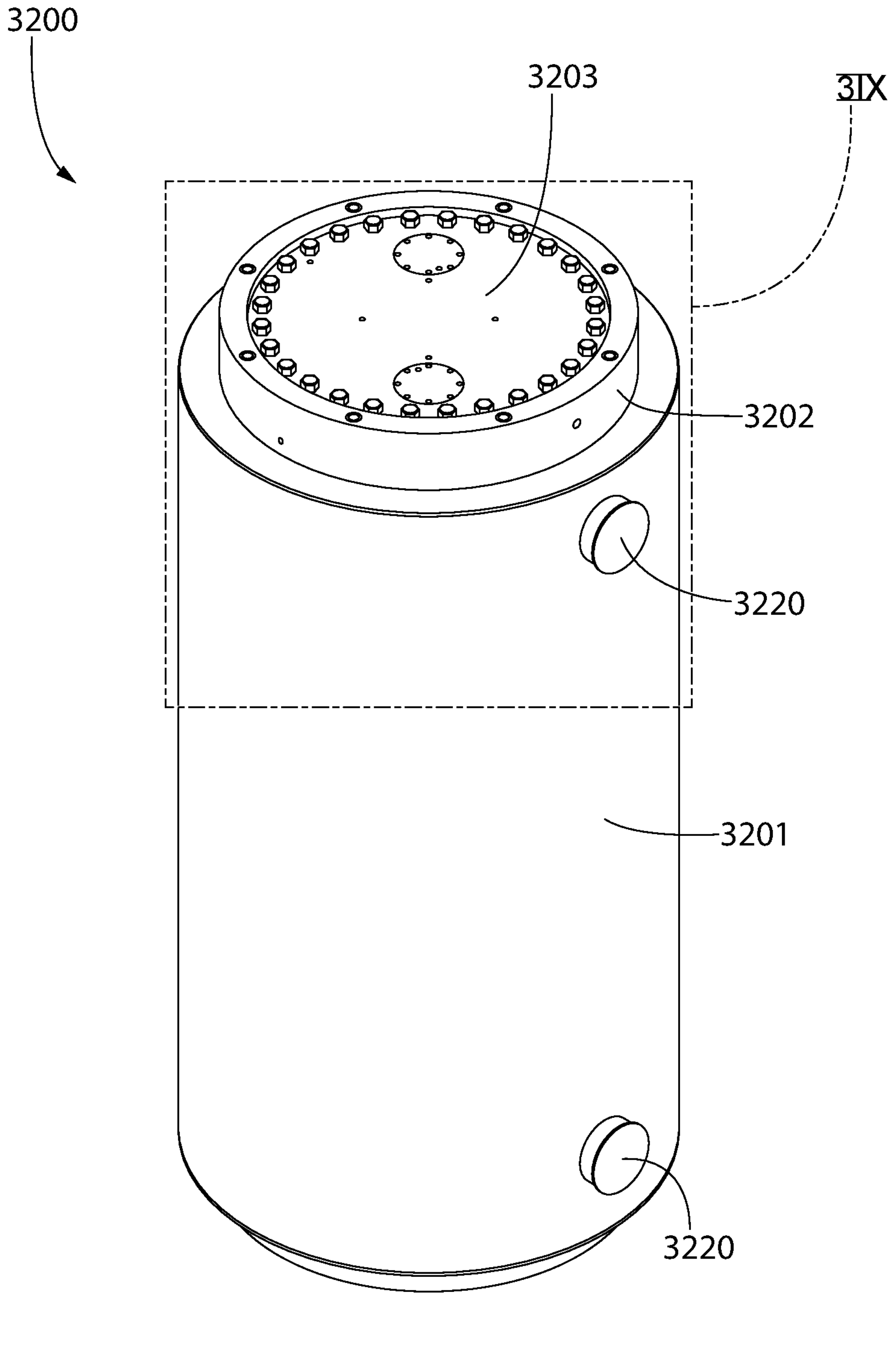
FIG. 32 is a perspective view of a container for storing and/or transporting spent nuclear fuel in accordance with another embodiment of the present invention.
Figure 33:
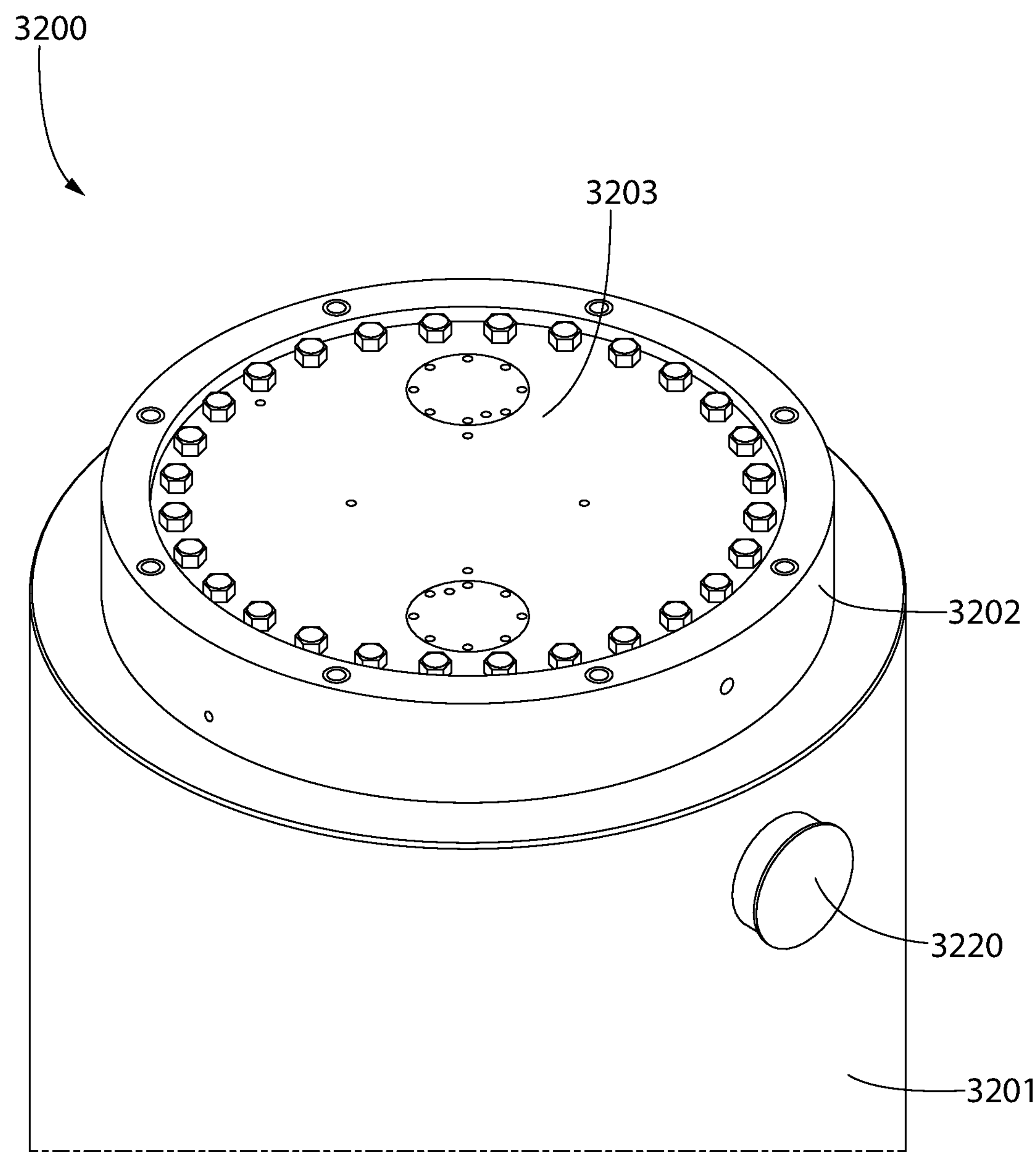
FIG. 33 is a close-up view of area 31X of FIG. 32.

Referring to FIGS. 32-34, an alternate embodiment of a container 3200 is illustrated in accordance with an embodiment of the present invention. The container 3200 is cylindrical in shape and defines a cylindrical shaped cavity for storing spent nuclear fuel. The container 3200 has a body portion 3201 and a lid flange 3202 extending from the body portion 3201. The lid flange 3202 has a smaller diameter than the body portion 3201 as shown. A lid 3203 is coupled to the lid flange 3202. Furthermore, a plurality of trunnions 3220 are coupled to the body portion 3201 of the container 3200. The trunnions 3220 are identical to the trunnions 3120 described above and thus a detailed description of their structure and function will not be described herein. Rather, the description of the trunnions 3120 above is applicable to the trunnions 3220.

FIG. 34 illustrates the container 3200 with a lift yoke 3250 coupled thereto in preparation for moving the container 3200. Thus, the lift yoke 3250 has a first hook arm 3251 and a second hook arm 3252. The first hook arm 3251 engages a first one of the trunnions 3220 and the second hook arm 3252 engages a second one of the trunnions 3220. In that regard, in the exemplified embodiment the first and second ones of the trunnions 3220 are spaced apart by approximately 180° about the circumference of the cylindrical body 3201 of the container 3200. The purpose of FIGS. 32-34 is to illustrate that trunnions of the type described herein can be used with containers of varying shapes and having varying shaped cavities.

Figure 25:
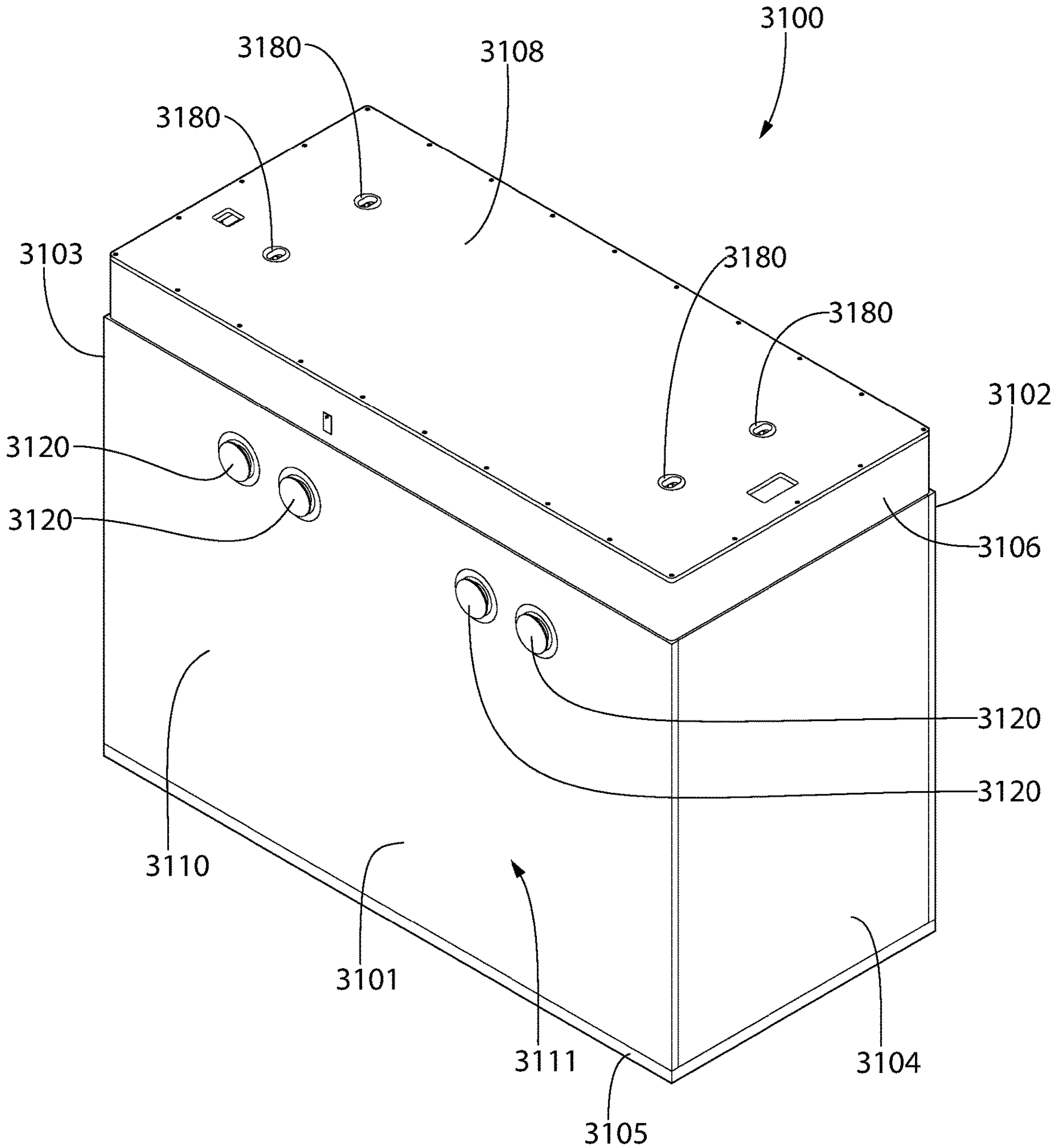
FIG. 25 is a perspective view of a container for storing and/or transporting spent nuclear fuel in accordance with an embodiment of the present invention
Figure 26:
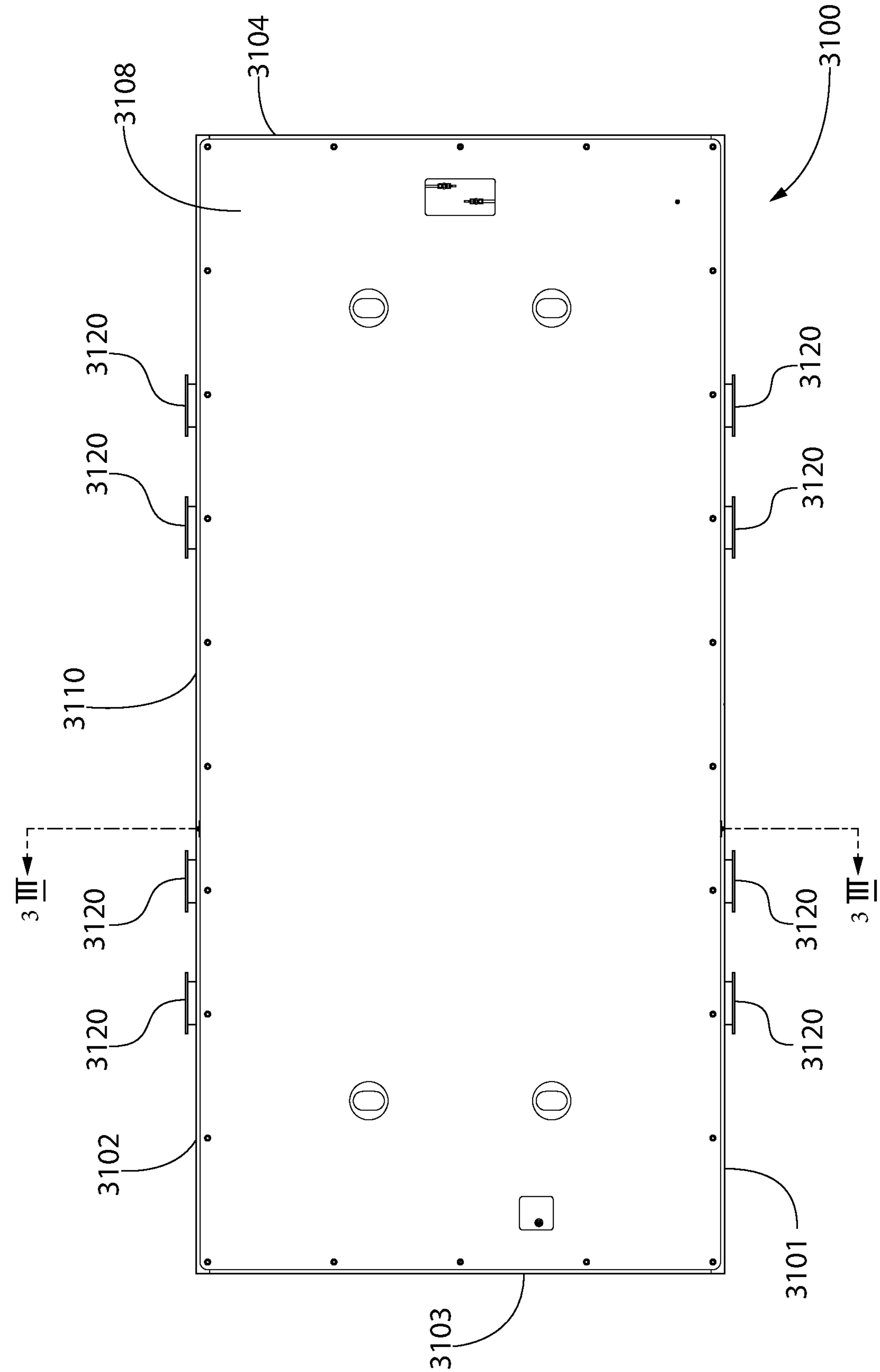
FIG. 26 is a top view of the container of FIG. 25.

Referring briefly to FIGS. 25 and 27, in the exemplified embodiment the container 3100 also includes a lifting lug 3180 coupled to the lid 3107. The lifting lug 3180 is the structural component of the container 3100 that facilitates coupling of the lid 3107 to the body 3110 of the container 3100. Specifically, a crane can be operably coupled to the lifting lug 3180 to lift the lid 3107 off from the body 3110 or place the lid 3107 onto the body 3110.

Figure 35:
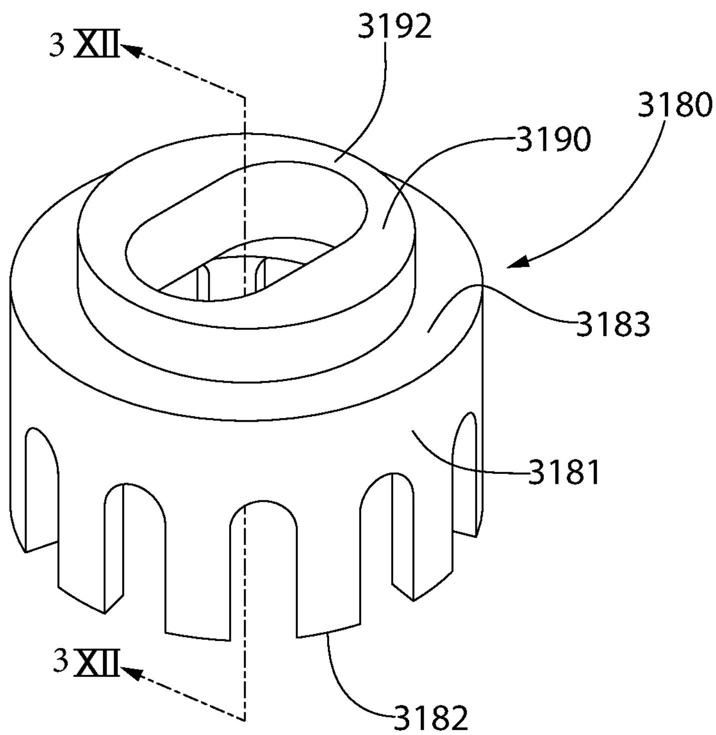
FIG. 35 is a close-up view of a lifting lug of the container of FIG. 25.
Figure 36A:
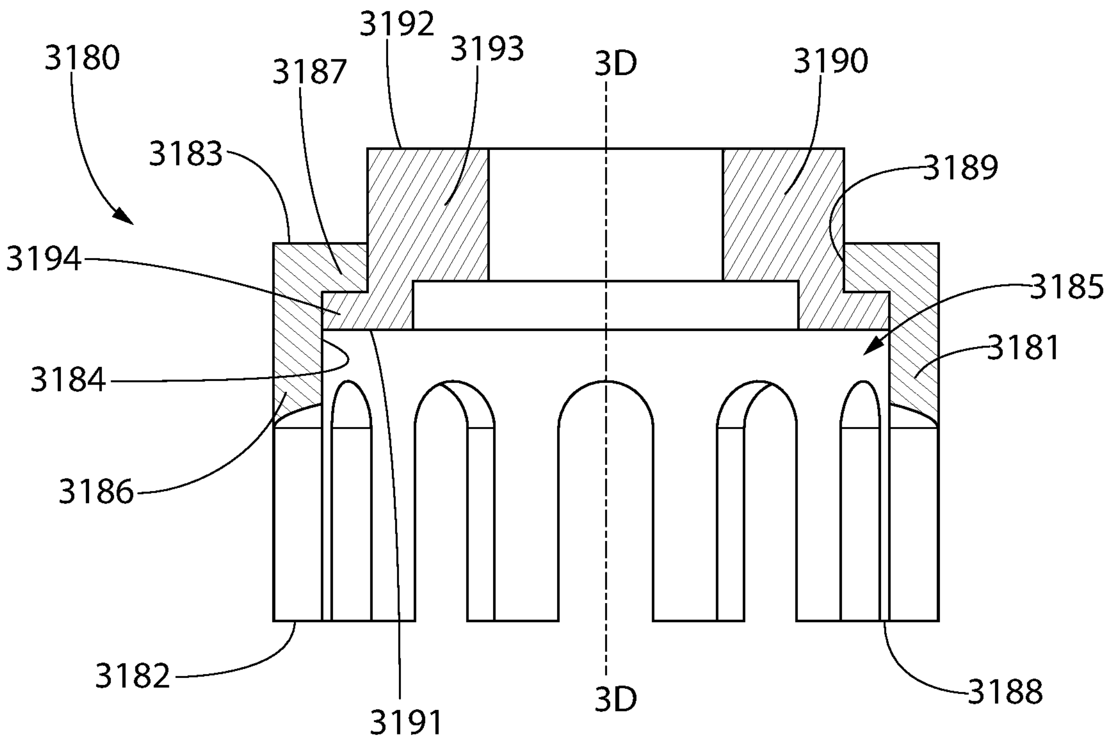
FIG. 36A is a cross-sectional view taken along line 3XII-3XII of FIG. 35 with a second component of the lifting lug in a protruded state.
Figure 36B:
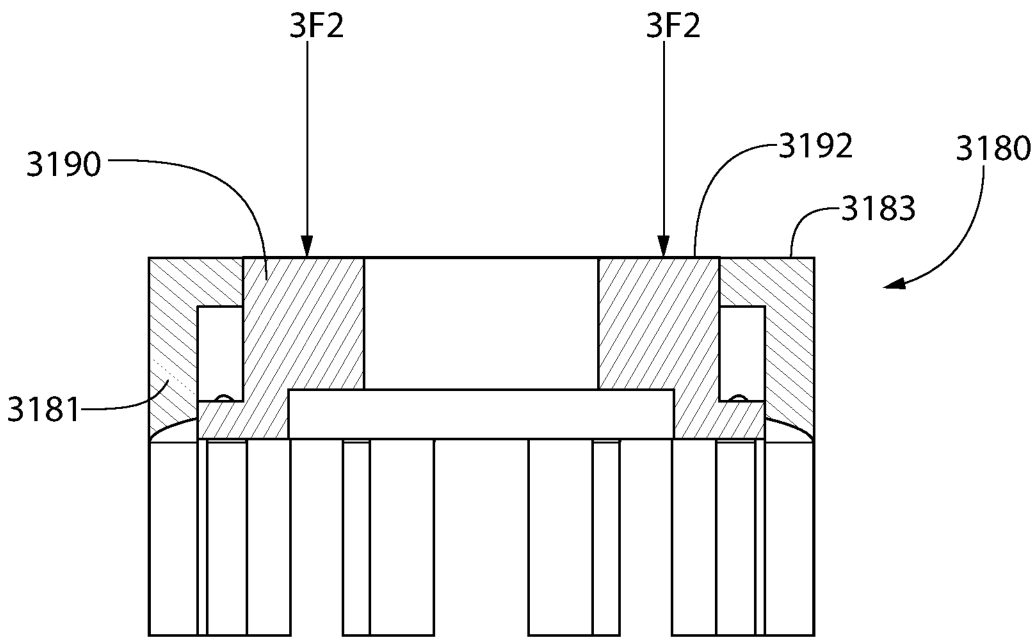
FIG. 36B is a cross-sectional view taken along line 3XII-3XII of FIG. 35 with the second component of the lifting lug in a retracted state.

Referring now to FIGS. 35 and 36A, the lifting lug 3180 is illustrated by itself and in cross section, respectively. The lifting lug 3180 comprises a first component 3181 and a second component 3190. Similar to the concepts described above with regard to the trunnions 3120, in this embodiment the second component 3190 is axially slidable relative to the first component 3181. In that regard, the first component 3181 of the lifting lug 3180 is coupled to the lid 3107 and the second component 3190 of the lifting lug 3180 is coupled to the first component 3181 in a manner that permits the second component 3190 to axially slide relative to the first component. The second component 3190 has a high tensile load bearing capability so that it can support the weight of the lid 3107 without breaking while having a low compression load bearing capability such that if a force F2 (FIG. 36B) is applied onto the second component 3190 it will cause the second component 3190 to slide axially as described further herein below.

The first component 3181 of the lifting lug 3180 protrudes from a top surface of the lid 3107 and extends from a first end 3182 to a second end 3183. The first component 3181 also has an inner surface 3184 that defines a hollow interior 3185. The first component 3181 comprises a body portion 3186 and a flange portion 3187 extending from a top end of the body portion 3186 inwardly towards the hollow interior 3185. The first end 3182 of the first component 3180 defines a first opening 3188 having a first cross-sectional area and the flange portion 3187 defines a second opening 3189 having a second cross-sectional area, the first cross-sectional area being greater than the second cross-sectional area.

The second component 3190 is coupled to the first component 3181 and extends from a first end 3191 to a second end 3192 along a longitudinal axis 3D-3D. The second component 3190 is axially slidable between a protruded state illustrated in FIG. 36A and a retracted state illustrated in FIG. 36B. Specifically, in the protruded state a first portion of the second component 3190 is located within the hollow interior 3185 of the first component 3181 and a second portion of the second component 3190 protrudes from the second end 3183 of the first component 3181. Upon application of a sufficient downward or compression force, the second component 3190 will axially slide relative to the first component 3181 form the protruded state into the retracted state illustrated in FIG. 36B.

As shown in FIG. 36A, the second component 3190 has a body portion 3193 and a flange portion 3194 extending from the body portion 3193 in a direction away from the outer surface of the body portion 3193. When the second component 3190 is located within the hollow interior 3185 of the first component 3181, the flange portion 3194 of the second component 3190 engages the flange portion 3187 of the first component 3181 so that a tensile load coupled to the second component 3190 will not separate the second component 3190 from the first component 3181.

Moreover, the body portion 3193 of the second component 3190 has a third cross-sectional area and the flange portion 3194 of the second component 3190 has a fourth cross-sectional area that is greater than the third cross-sectional area. Furthermore, the fourth cross-sectional area is equal to or less than the first cross-sectional area of the first opening 3188 and is greater than the second cross-sectional area of the second opening 3189. Thus, the second component 3190 can be inserted into the hollow interior 3185 of the first component 3181 through the first opening 3188 in the first end 3182 but not through the second opening 3189 in the second end 3183 because the flange portion 3194 will not fit through the second opening 3189. This difference in cross-sectional areas of the various regions of the first and second components 3181, 3190 also maintains the coupling of the first and second components 3181, 3190 when the second component is carrying a tensile load.

Thus, the flange portions 3187, 3194 of the first and second components 3181, 3190 of the lifting lug 3180 interact to prevent the second component 3190 from sliding relative to the first component 3181 in a first axial direction. However, a compression force acting on the second component 3190 will cause the second component 3190 to axially slide relative to the first component 3181 in a second axial direction, which is inwardly into the hollow interior 3185 of the first component 3180. The second component 3190 may be capable of being axially slid relative to the first component 3181 until the second end 3192 of the second component 3190 is flush with or recessed relative to the second end 3183 of the first component 3181.

Although described herein as it relates to the lid of a nuclear storage container, the lifting lug 3180 described herein can be used for other applications. Specifically, lifting lugs are generally used by serving as a robust tension member and they have uses outside of the nuclear storage industry for lifting a wide variety of apparatuses and equipment. Thus, the lifting lugs 3180 described herein with a retractability feature may be used in any instance in which a lifting lug is desired. In that regard, in some embodiments the invention may be directed to the lifting lug 3180 itself without regard to its specific application or the specific device to which it is coupled.

Thus, the trunnion 3120, 3220 and lifting lug 3180 designs described herein and illustrated in the drawings rely on the concept of direction-dependent stiffness that is engineered into the structure of the component. Specifically, the trunnions 3120, 3220 can carry a heavy load in a direction perpendicular to their axes but a load or force applied axially will cause the trunnions 3120, 3220 to collapse as described herein. Thus, the trunnions 3120, 3220 are a structurally competent member in bending but a weak one in axial tension or compression, which facilitates the collapsible functionality described herein. Similarly, the lifting lug 3180 can carry a heavy tensile load, but a compression load will cause the lifting lug 3180 to collapse as described herein. The term lifting device may be used herein to refer to either the lifting lug 3180 or the trunnion 3120, 3220.

There may be applications where the linear member is required to have a modest load carrying capacity in tension or compression but an assured-to-fail configuration if the applied load is large. For example, fasteners used to support a mattress of crushable material used to serve as an impact mitigator can be made of calibrated axial load carrying capacity to enable an efficient impact limited design.

IV. Inventive Concept 4

With reference to FIGS. 37-47, a fourth inventive concept will be described.

Figure 37:
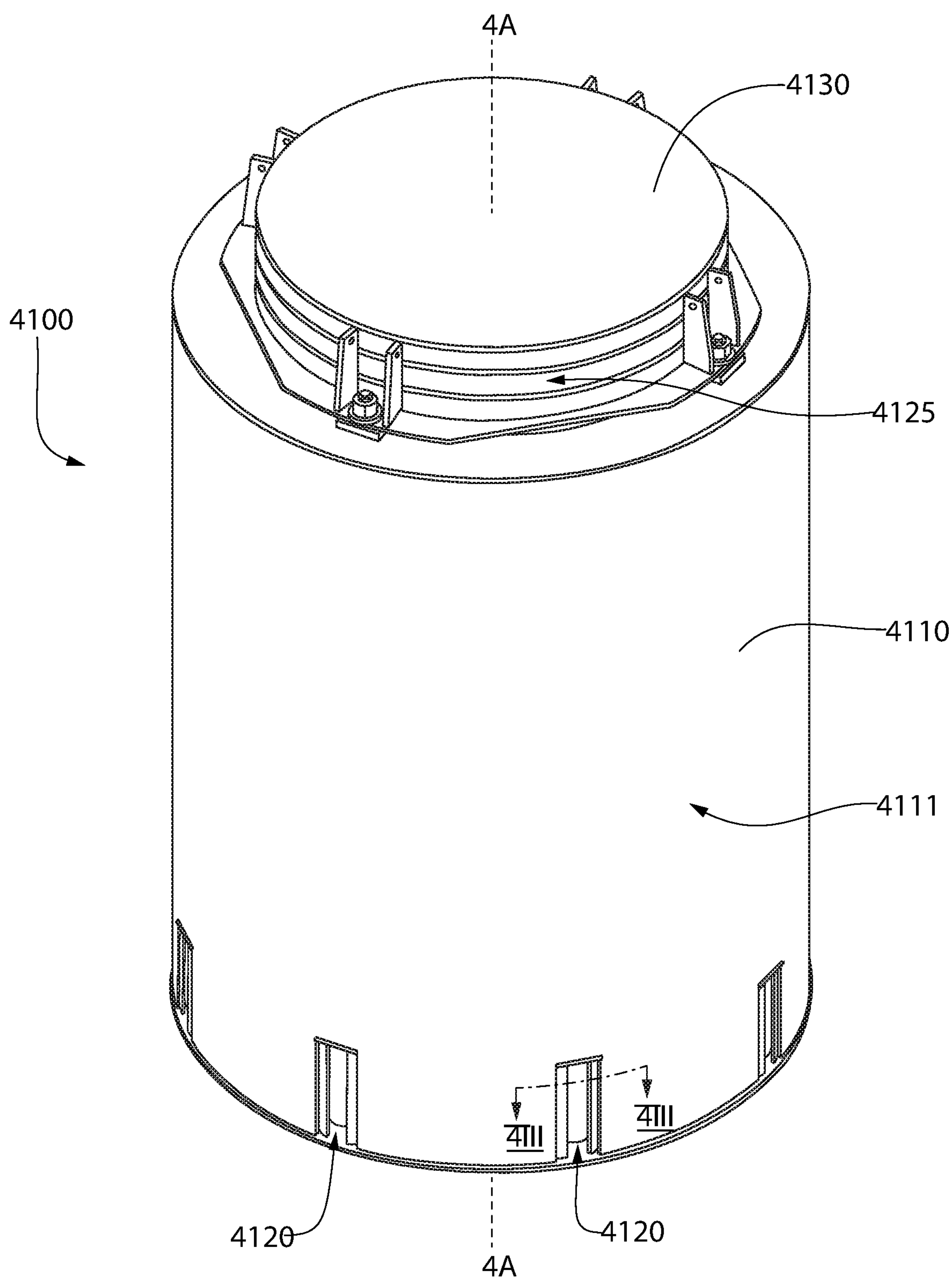
FIG. 37 is a front perspective view of a ventilated system for storing high level radioactive waste in accordance with an embodiment of the present invention.
Figure 38:
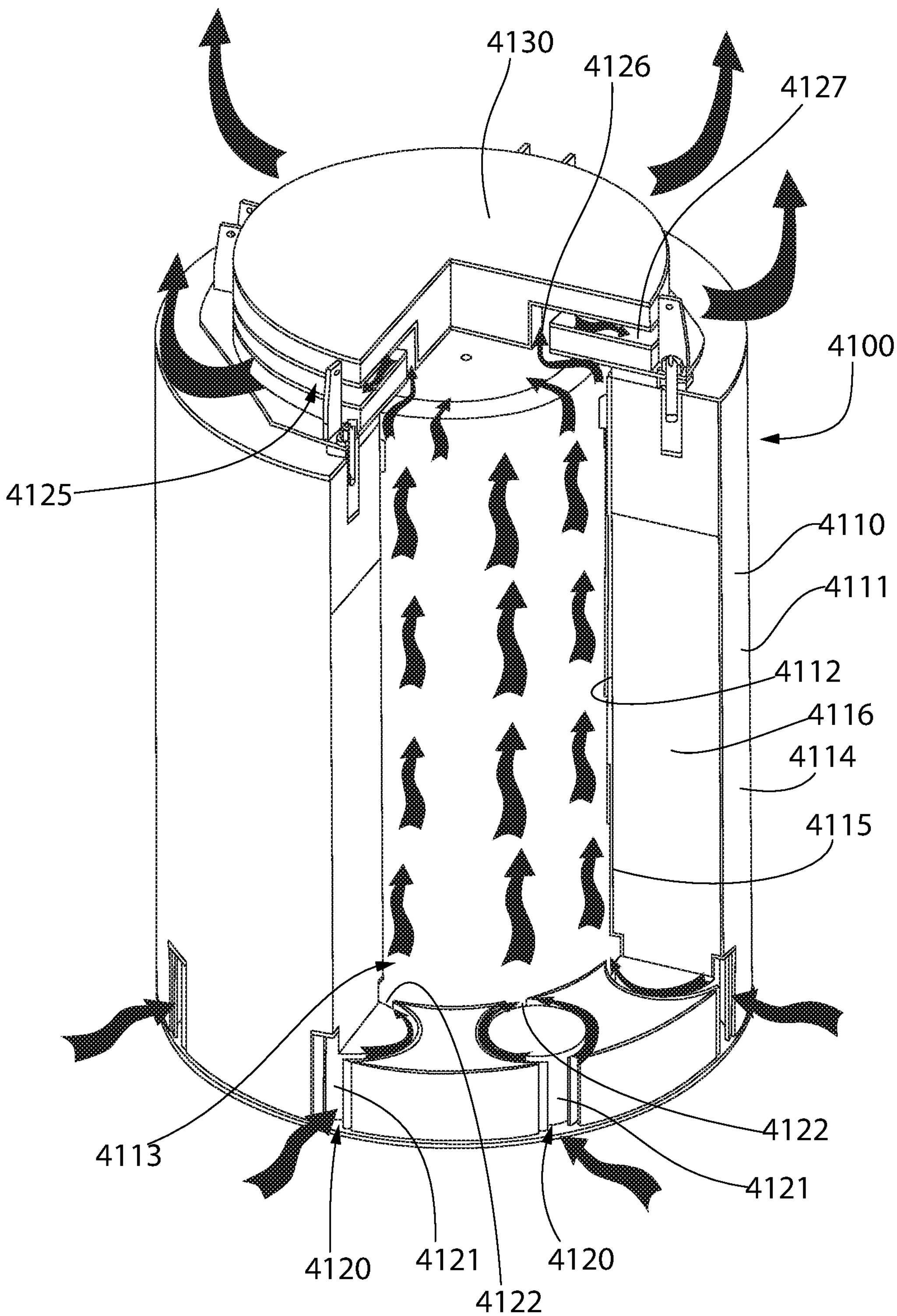
FIG. 38 is a partial cut-away view of the ventilated system of FIG. 37 illustrating the direction of ventilation air flow with arrows.
Figure 39:
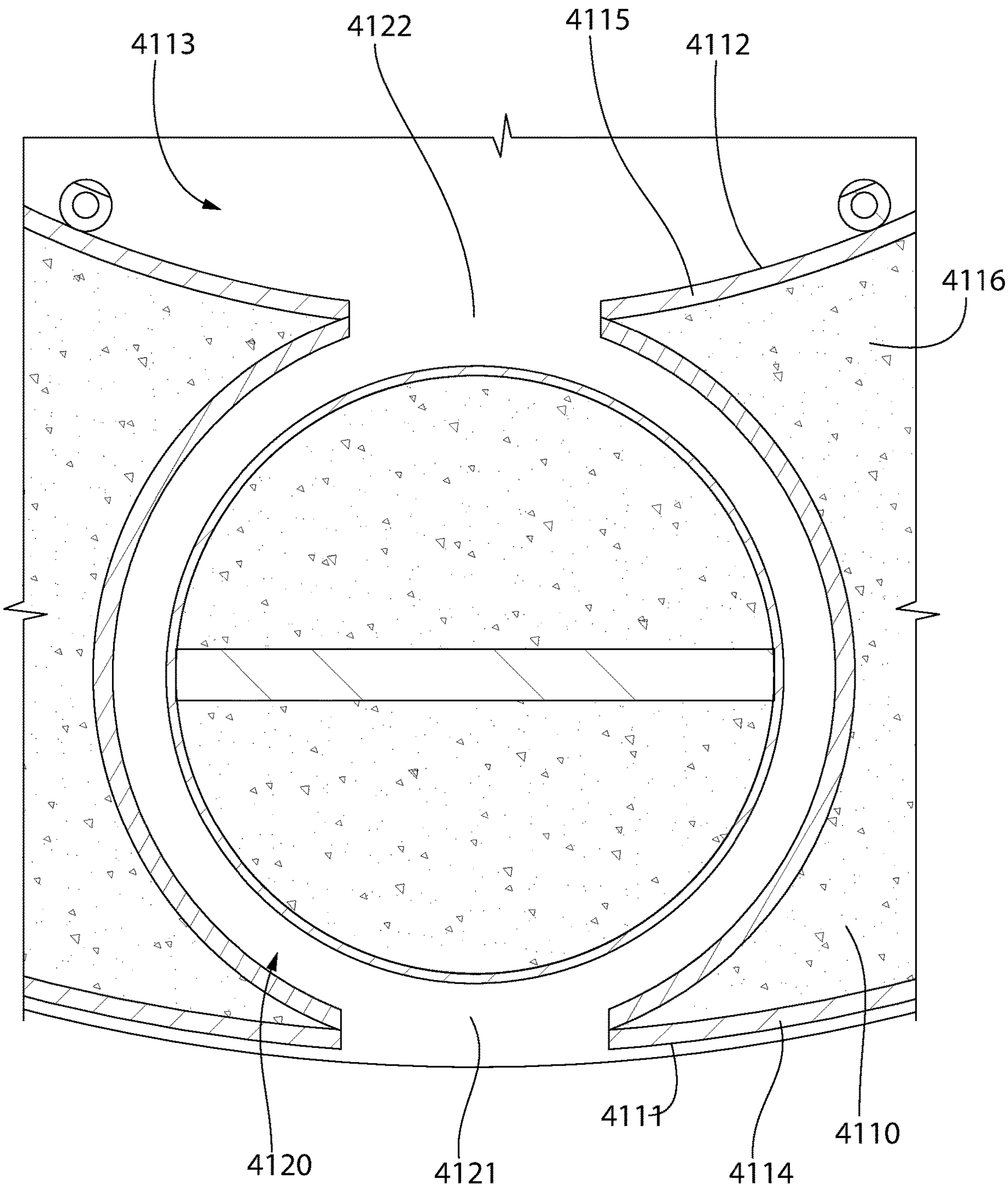
FIG. 39 is a partial cross-sectional view taken along line 4III-4III of FIG. 37.

Referring first to FIGS. 37-39 concurrently, a ventilated system 44100 for storing a canister 44200 containing high level radioactive waste will be described. The canister 44200, which is preferably formed of metal such as stainless steel, is a hermetically sealed container that holds the high level radioactive waste therein. The high level radioactive waste, also referred to as spent nuclear fuel, must be stored for long periods of time until the gamma and neutron radiation emanating therefrom is reduced down to an acceptable level. Until that time, the high level radioactive waste must be stored in various containers, such as the canister 44200 and the ventilated system 44100, which block or shield the gamma and neutron radiation from streaming into the atmosphere.

The canister 44200 forms a fluidic containment boundary about the high level radioactive waste loaded therein. Thus, the canister 44200 can be considered a hermetically sealed pressure vessel. The canister 44200, however, is thermally conductive so that heat generated by the high level radioactive waste loaded therein is conducted to its outer surface where it can be removed by convection. In one embodiment, the canister 44200 is formed of a stainless steel due to its corrosion resistant nature. In other embodiments, the canister 44200 can be formed of other metals or metal alloys. Suitable canisters include multi-purpose canisters and, in certain instances, can include thermally conductive casks that are hermetically sealed for the dry storage of high level radioactive waste. Typically, such canisters comprise a honeycomb basket, or other structure, positioned therein to accommodate a plurality of high level radioactive waste rods in spaced relation. An example of a multi-purpose canister that is particularly suited for use in the ventilated system 44100 is disclosed in U.S. Pat. No. 5,4898,4747, issued to Singh on Apr. 27, 41999, the entirety of which is hereby incorporated by reference. Another multi-purpose canister that is particularly suited for use in the ventilated system 44100 is disclosed in U.S. Pat. No. 8,4135,4107, issued to Singh et al. on Mar. 13, 42012, the entirety of which is hereby incorporated by reference.

The canister 44200 containing the high level radioactive waste is stored within a ventilated system 44100. Specifically, the ventilated system 44100 comprises a cask body 44110 and a cask lid 44130 positioned atop the cask body 44110. The cask body 44110 comprises an outer surface 44111 and an inner surface 44112 that defines a storage cavity 44113 for holding the canister 44200. When the canister 4200 is positioned in the storage cavity 4113, an annular space exists between the outer surface of the canister 4200 and the inner surface 4111 of the cask body 4110 so that ventilation air can flow through the storage cavity 4113 along the outer surface of the canister 4200. As will be discussed further below, the ventilation system 4100 is configured so that heat generated by the high level radioactive waste causes a natural convective flow of air through a ventilation passageway of the ventilation system 4100 (which includes the annular space noted above as well as inlet and outlet ducts described below).

The cask lid 4130 is positioned atop the cask body 4110 to enclose the open top end of the storage cavity 4113. He cask lid 4130 is a weldment of steel plates filled with a plain concrete mass that provides neutron and gamma attenuation to minimize skyshine. The cask lid 4130 is secured to a top end of the cask body 4110 by a plurality of bolts that extend through bolt hole s formed into a lid flange. When secured to the cask body 4110, surface contact between the cask lid 4130 and the cask body 4110 forms a lid-to-body interface. The cask lid 4130 is preferably non-fixedly secured to the cask body 4110 and encloses the top end of the storage cavity 4113 formed by the cask body 4110.

The cask body 4110 is a rugged, heavy-walled cylindrical vessel that holds the canister 4200 therein. In the exemplified embodiment, the cask body 4110 comprises an outer shell 4114 and an inner shell 4115 that are spaced apart from one another. Furthermore, a concrete mass 4116 is positioned within the space between the outer and inner shells 4114, 4115. The main structural function of the cask body 4110 is provided by the inner and outer shells, which may be formed from carbon steel or the like, while the main radiation shielding function is provided by the concrete mass. While the principal function of the concrete mass 4116 is to provide shielding against gamma and neutron radiation, the concrete mass 4116 also helps enhance the performance of the ventilated system 4100 in other respects as well. The cask lid 4130 has a similar structure with a concrete core and a metal sheath or cover.

The ventilated system 4100 comprises a plurality of inlet ducts 4120 and at least one outlet duct 4125. The inlet ducts 4120 are located near a bottom of the cask body 4110 to allow ambient air from the atmosphere to flow into the storage cavity 4113 at a bottom of the storage cavity 4113. In the exemplified embodiment, there are a plurality of the inlet ducts 4120 arranged in a circumferentially spaced apart manner along the bottom of the cask body 4110. However, in other embodiments there could be just a single continuous inlet duct extending annularly around the circumference of the cask body 4110. Furthermore, although the inlet ducts 4120 have a specific shape in the exemplified embodiment, the invention is not to be so limited and the inlet ducts 4120 may take on other shapes so long as it does not allow radiation to stream therethrough as noted below. Thus, variations and modifications to the inlet ducts 4120 are certainly possible and fall within the scope of the invention described and claimed herein.

In the exemplified embodiment, each of the inlet ducts 4120 extends from a first opening 4121 in the outer surface 4111 of the cask body 4110 to a second opening 4122 in the inner surface 4112 of the cask body 4110 with the inlet ducts 4120 extending continuously from the first opening 4121 to the second opening 4122. Thus, each of the inlet ducts 4120 forms a passageway through the cask body 4110 so that ambient air can enter the storage cavity 4113 as ventilation air for ventilating the storage cavity 4113 and cooling the canister 4200 and the high level radioactive waste stored therein over time. As used herein, the term inlet ducts 4120 is used to refer to the open space or passageway that extends through the cask body 4110, not to the structures that define this open space or passageway. Thus, the inlet ducts 4120 are merely open spaces or passageways within a solid structure.

As best seen in FIGS. 38 and 39, in the exemplified embodiment each of the inlet ducts 4120 comprises two semi-circular arcuate paths extending from the first opening 4121 to the second opening 4122. Specifically, there is a cylindrical member 4124 located between the first and second openings 4121, 4122 that defines the shape of the inlet ducts 4120. The main purpose of this is to ensure that a clear line of sight does not exist from the second opening 4122 to the first opening 4121 because if there were a clear line of sight it would be possible for gamma and/or neutron radiation to stream therethrough and into the atmosphere. By creating the inlet ducts 4120 with a non-linear path as shown, radiation does not have a clear line path to the atmosphere without contacting and being shielded by a mass of concrete. The exact shape of the inlet ducts 4120 is not to be limited to that which is shown in the exemplified embodiment. Thus, the inlet ducts 4120 may take on any shape, pattern, or path so long as a clear line of sight does not exist from the storage cavity 4113 to the atmosphere through the inlet ducts 4120. Thus, the exemplified embodiment is just one of countless possible configurations for the inlet ducts 4120. Furthermore, in some embodiments various ones of the inlet ducts 4120 may have different configurations or shapes than others of the inlet ducts 4120. Thus, while all of the inlet ducts 4120 may be identical in some embodiments, this is not required in all embodiments.

In the exemplified embodiment, the outlet duct 4125 is formed into the cask lid 4130 of the ventilated system 4100. The outlet duct 4125 has a vertical portion 4126 and a horizontal portion 4127, which is intended to prevent a clear line of sight from existing through the outlet duct 4125 to the atmosphere for the same reasons as described above with regard to the inlet ducts 4120. In the exemplified embodiment, the outlet duct 4125 is a single, uninterrupted duct extending annularly along the cask lid 4130. However, the invention is not to be so limited and the outlet duct 4125 could be separated into a plurality of outlet ducts 4125. Furthermore, although in the exemplified embodiment the outlet duct 4125 is formed into the cask lid 4130, the invention is not to be so limited and in other embodiments the outlet duct 4125 could be formed into a space between the cask lid 4130 and the cask body 4110 or the outlet duct 4125 could be formed partially or entirely in the cask body 4110 rather than or in addition to being formed in the cask lid 4130.

FIG. 38 illustrates the flow of air through the storage cavity 4113 of the ventilated system 4100. When the canister 4200 is loaded with high level radioactive waste and positioned within the storage cavity 4113, an annular space is formed between an outer surface of the canister 4200 and an inner surface of the cask body 4110 that forms the storage cavity 4113. When so positioned, heat generated b the high level radioactive waste within the canister 4200 conducts to the outer surface of the canister 4200. This heat then warms the air located within the annular space. As a result of being heated, this warmed air rises within the annular space and eventually exits the ventilated system 4100 via the outlet vents 4125 as heated air. Due to a thermosiphon effect created by the exiting heated air, cool air is drawn into the inlet vents 4125. This cool air flows through the inlet vents 4125 and is the drawn upward into the annular space where it becomes heated and begins to rise, thereby creating a continuous cycle, known as the chimney-effect.

Thus, the heat generated by the high level radioactive waste within the canister 4200 causes a natural convective flow of air through a ventilation passageway of the ventilated system 4100. In the exemplified embodiment, the ventilation passageway is collectively formed by the inlet vents 4120, the annular space, and the outlet vents 4125. In the exemplified embodiment, the ventilated system 4100 is free of forced cooling equipment, such as blowers and closed-loop cooling systems. The rate of air flow through the ventilation passageway of the ventilated system 4100 is governed, in part, by the heat generation rate of the high level radioactive waste within the canister 4200. The greater the heat generation rate, the greater the natural convective flow of air through the ventilation passageway. Thus, due to the heat generated by the decaying of the high level radioactive waste, a natural convective flow of air into, through, and out of the storage cavity 4113 occurs. Cool air enters the storage cavity 4113 through the inlet ducts 4120, becomes heated and rises as a result, and then exists the storage cavity 4113 via the outlet duct 4125.

The heat generation rate of the high level radioactive waste decreases/subsides over time due to the passage of time and to the convective cooling described herein. Thus, if no changes are made to the inlet ducts 4120 and the outlet duct 4125 over time, the rate at which the ventilation air flowing through the storage cavity 4113 heats up will decrease. As a result, the surface temperature of the canister 4200 will also decrease, which will make the canister 4200 prone to stress corrosion cracking or SCC. In some embodiments, the invention is directed to a method of mitigating the risk of stress corrosion cracking in the stainless steel canisters 4200 that are stored in the ventilated systems 4100 by progressively closing the inlet and/or outlet ducts 4120, 4125 so that the amount of air entering the storage cavity 4113 is reduced and the heating rate of the ventilation air that is flowing through the storage cavity 4113 is maintained above a predetermined threshold. The heating rate of the ventilation air is the rate at which the ventilation air heats up as it flows within the storage cavity 4113. Thus, for example, the heating rate could have units of ° C./second or ° F./second or the like. Although the method is described herein with reference to a specific structural embodiment of the ventilated system 4100, the invention is not to be so limited. The steps described below are applicable to other ventilated systems having other arrangements of inlet and outlet ducts. Thus, the structural embodiment of the ventilated system 4100 is provided herein as one example only and there is no intention to limit the invention to the specific structural embodiment shown and described herein.

Each of the inlet ducts 4120 has a cross-sectional area which may be constant or may vary depending upon the location at which the cross-sectional area is measured. In some embodiments, the cask body 4110 extends along a longitudinal axis 3A-3A and the cross-sectional area described herein may be measured along a plane that is parallel to the longitudinal axis 3A-3A. However, the invention is not to be so limited in all embodiments and it is possible for the cross-sectional area described herein to be measured along a plane that is oblique to the longitudinal axis 3A-3A. However, in preferred embodiments, if the plane upon which the cross-sectional area is measured were a solid object, such plane would completely block air flow through the inlet duct 4120. Thus, the plane upon which the cross-sectional area is measured is not perpendicular to the longitudinal axis 3A-3A and does not pass through either of the first and second openings 4121, 4122 because such plane would not completely block air flow through the inlet duct 4120. Whether the cross-sectional area is measured along a plane that is vertical or angled relative to the vertical is not necessarily important so long as it is measured along a plane that, if a solid object, would completely block air flow through the inlet duct 4120. In some embodiments, the cross-sectional area described herein may be measured along the first opening 4121 of the inlet ducts 4120 or along the second opening 4122 of the inlet ducts 4120, although the cross-sectional area could certainly be measured at other locations along the inlet ducts 4120 in other embodiments.

Additionally, in the exemplified embodiment the at least one outlet duct 4125 also has a cross-sectional area measured along a plane that, if solid, would completely block air flow through the at least one outlet duct 4125. Thus, similar to the cross-sectional area of the inlet ducts 4120 described above, for purposes of the invention described herein and the claims, the specific location at which the cross-sectional area of the at least one outlet duct 4125 is measured is not to be limiting of the present invention. Rather, the cross-sectional area may be measured at any location and along any plane so long as the plane would completely block air flow through the at least one outlet duct 4125.

In the invention described herein, the cross-sectional area of the inlet duct 4120 and/or of the at least one outlet duct 4125 is reduced over time as a function of the heating rate of the ventilation air and/or a function of the decay of the heat generation rate of the high level radioactive waste to maintain the metal canister 4200 above a threshold temperature. Thus, as the heating rate of the ventilation air flowing through the storage cavity 4113 decreases, the cross-sectional areas of the inlet ducts 4120 and/or of the at least one outlet duct 4125 are reduced and possibly eventually closed completely to make sure that the heating rate of the ventilation air is maintained above the predetermined threshold.

As noted above, the inlet ducts 4120 and the outlet duct 4125 are open spaces or passageways formed into the cask body 4110 and/or the cask lid 4130. Thus, the cross-sectional area of the inlet ducts 4120 and/or the cross-sectional area of the outlet duct 4125 can be reduced or decreased by positioning a structure in the inlet ducts 4120 and/or the outlet duct 4125 that is solid or has solid portions that will block air flow through parts of the inlet and/or outlet ducts 4120, 4125. Positioning such structures into the inlet ducts 4120 and/or the outlet duct 4125 will result in a reduction in the cross-sectional area of the inlet duct 4120 and/or the outlet duct 4125 in which it is positioned, which will reduce the amount of air entering and/or exiting the storage cavity 4113, which will facilitate the maintenance of the heating rate of the ventilation air above the predetermined threshold.

Figure 40A:
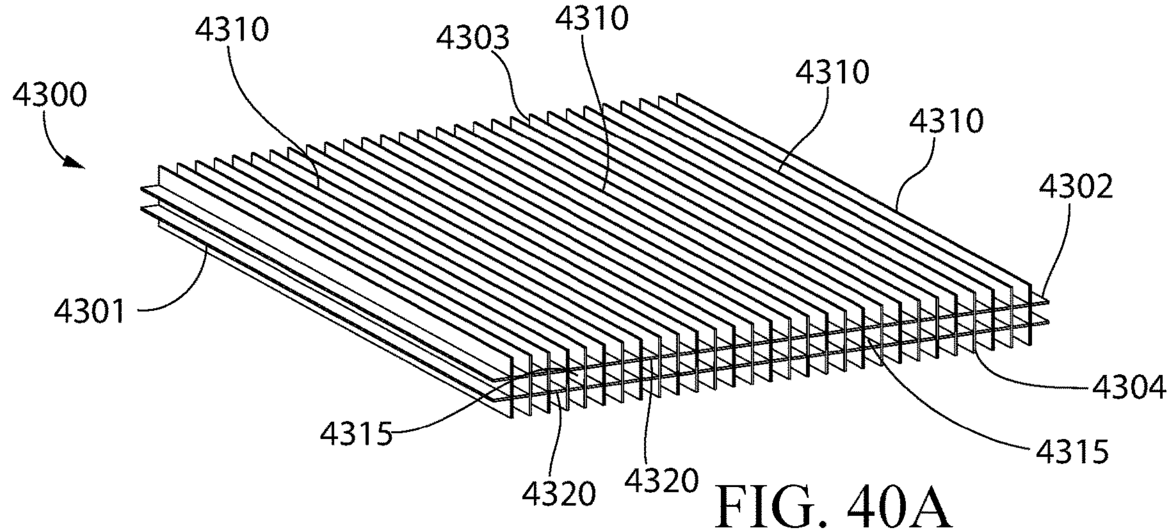
FIGS. 40A-40C illustrate various air flow adjustment members in accordance with an embodiment of the present invention.
Figure 40B:
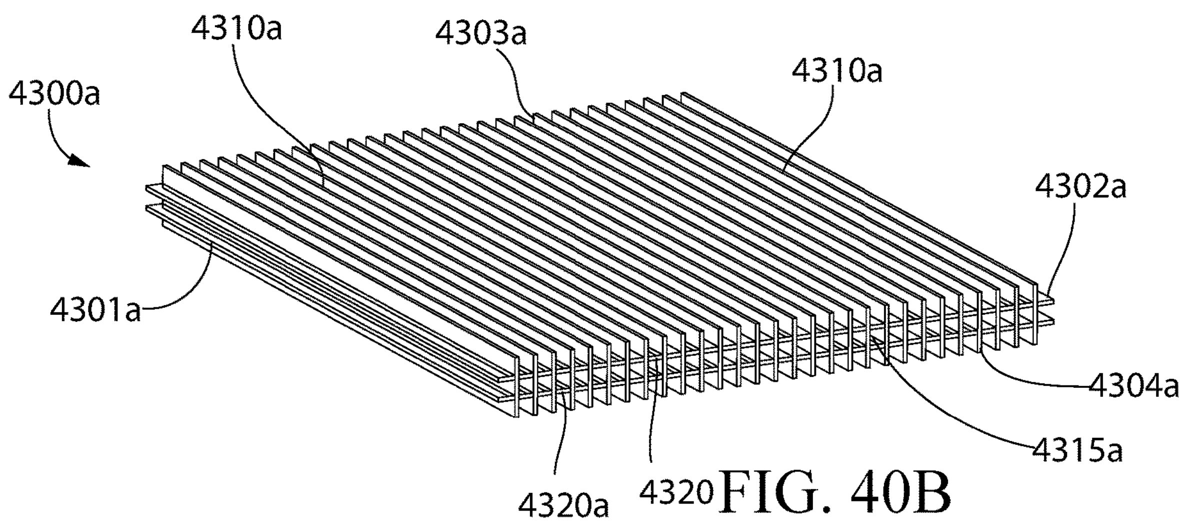
Figure 40C:
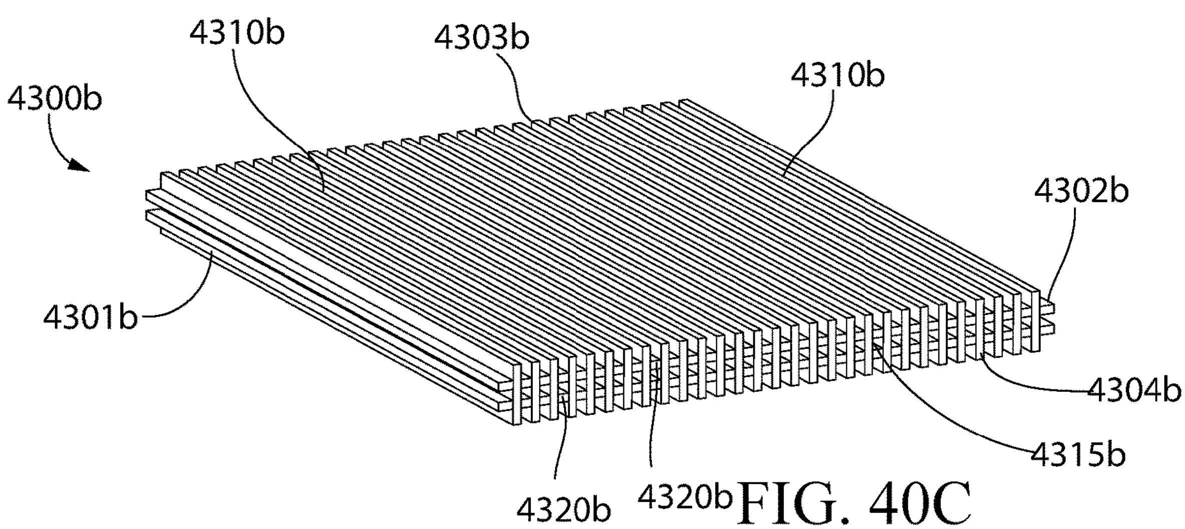

Referring to FIGS. 40A-40C, three different versions of a particular type of air flow adjustment member 4300, 4300*a*, 4300*b* are illustrated in accordance with an embodiment of the present invention. The invention is not to be limited by the air flow adjustment members 4300, 4300*a*, 4300*b* depicted in FIGS. 40A-40C in all embodiments, but these represent exemplary versions of a structure that can be used to modify the cross-sectional areas of the inlet and/or outlet ducts 4120, 4125 as described herein.

Referring first to FIG. 40A, the air flow adjustment member 4300 comprises a gridwork of plates that form a plurality of open cells 4315 that are divided by the plates. Specifically, the air flow adjustment member 4300 comprises a plurality of first plates 4310 and a plurality of second plates 4320. The plurality of first plates 4310 and the plurality of second plates 4320 may be welded together into a grid like formation. The plurality of first plates 4310 are arranged in a spaced apart manner and oriented parallel to one another to form a first set of parallel plates. The plurality of second plates 4320 are arranged in a spaced apart manner and oriented parallel to one another to form a second set of parallel plates. In the exemplified embodiment, each of the first plates 4310 is oriented orthogonal relative to each of the second plates 4320. Thus, the empty spaces bounded by two adjacent ones of the first plates 4310 and two adjacent ones of the second plates 4320 form the open cells 4315. The first and second plates 4310, 4320 may be formed from sheet steel or other metal materials in various embodiments described herein.

In the exemplified embodiment, the air flow adjustment member 4300 is square or rectangular in shape and comprises a first edge 4301, a second edge 4302, a third edge 4303, and a fourth edge 4304. Of course, the shape of the air flow adjustment member 4300 can be modified as desired so ensure that the air flow adjustment member 4300 can fit within the air inlet ducts 4120 and/or the air outlet ducts 4125. For example, if one of the air inlet ducts 4120 has a triangular cross-sectional shape, then the air flow adjustment member designed to fit within that particular air inlet duct may also have a triangular shape. However, correlating the shape of the air flow adjustment member with the shape of the cross-section of the air inlet ducts 4120 may not be necessary in all embodiments to achieve the purpose described herein.

As can be appreciated, a cross-sectional area of the air flow adjustment member 4300 comprises a plurality of open portions defined by the open spaces 4315 and a plurality of closed portions defined by the first and second plates 4310, 4320. Thus, if the air flow adjustment member 4300 were positioned within one of the inlet ducts 4120, the air flow adjustment member 4300 would reduce the cross-sectional area of the inlet duct 4120 when the cross-sectional area is measured along a plane that intersects each of the first, second, third, and fourth edges 4301-4304 of the air flow adjustment member 4300.

FIGS. 40B and 40C illustrate air flow adjustment members 4300*a*, 4300*b* that are identical to the air flow adjustment member 4300 except with regard to the thickness of the first and second plates 4310, 4310*a*, 4310*b*, 4320, 4320*a*, 4320*b* and also with regard to the dimensions of the open portions 4315, 4315*a*, 4315*b*. Specifically, the air flow adjustment members 4300, 4300*a*, 4300*b* are designed so that the thicker the first and second plates 4310, 4310*a*, 4310*b*, 4320, 4320*a*, 4320*b*, the smaller the dimensions or cross-sectional area of the open portions 4315, 4315*a*, 4315*b*. The air flow adjustment members 4300, 4300*a*, 4300*b* are all the same overall size, the only difference being that the air flow adjustment member 4300*a* uses first and second plates 4310*a*, 4320*a* that are thicker than the first and second plates 4310, 4320 of the air flow adjustment member 4300 and the air flow adjustment member 4300*b* uses first and second plates 4310*b*, 4320*b* that are thicker than the plates 4310*a*, 4320*a* of the air flow adjustment member 4300*a*. Thus, the open portions 4315*b* of the air flow adjustment member 4300*b* is larger than the open portions 4315*a* of the air flow adjustment member 4300*a*, which are larger than the open portions 4315 of the air flow adjustment member 4300. Thus, if there is a need/desire to reduce the cross-sectional area of one of the inlet ducts 4320 or the outlet duct 4325 by a small amount/percentage, then the air flow adjustment member 4300 may be used. However, if there is a need/desire to reduce the cross-sectional area of one of the inlet ducts 4320 or the outlet duct 4325 by a larger amount/percentage, than the air flow adjustment member

4300*a* or the air flow adjustment member 4300*b* may be used. This will be described in greater detail below with reference to FIGS. 41A-43B.

As noted above, the invention may be directed to a method of storing high level radioactive waste and controlling/regulating the heating rate of the ventilation air flowing through the storage cavity 4113 (and therefore also controlling the temperature of the canister 4200 in the storage cavity 4113). This may be achieved, in some embodiments, by positioning the air flow adjustment members 4300, 4300*a*, 4300*b* in one or more of the inlet ducts 4120 and/or in the outlet duct 4125. In fact, in some embodiments this may be done in a progressive manner to progressively reduce the cross-sectional area of one or more of the inlet ducts 4120 and/or the outlet duct 4125 over time. Specifically, as more time passes, it may be necessary to continue to reduce the cross-sectional area of the one or more inlet ducts 4120 and/or the outlet duct 4125. Thus, when the high level radioactive waste is first placed in the canister 4200 and the canister 4200 placed in the storage cavity 4113, there may not be any of the air flow adjustment members 4300, 4300*a*, 4300*b* used. However, at time T1 after the initial storage date, it may be determined that the heating rate of the ventilation air and the temperature of the canister 4200 has decreased below a predetermined threshold such that the canister 4200 is at risk of stress corrosion cracking. At such time T1, one of the air flow adjustment members 4300 may be positioned within one or more of the inlet ducts 4120 and/or in the air outlet duct 4125.

Then, at a time T2 that is after the time T1, it may once again be determined that the heating rate of the ventilation air and the temperature of the canister 4200 has decreased below the predetermined threshold such that the canister 4200 is again at risk of stress corrosion cracking. This might occur despite the fact that the air flow adjustment member 4300 is located within one or more of the inlet ducts 4120 and/or the outlet duct 4125. At such time, if some of the inlet ducts 4120 and/or the outlet duct 4125 still do not have one of the air flow adjustment members 4300 therein, then the air flow adjustment members 4300 can at that time be positioned within those inlet ducts 4120 and/or outlet duct 4125. However, if at that time T2 all of the inlet ducts 4120 and/or the outlet duct 4125 already have one of the air flow adjustment members 4300 positioned therein, then for at least one or more of the inlet ducts 4120 and/or the outlet duct 4125, the air flow adjustment member 4300 may be removed and replaced with one of the air flow adjustment members 4300*a*.

In some embodiments, calculations may be made using computational fluid dynamics to determine the amount or percentage that the cross-sectional areas of the inlet ducts 4120 and/or the outlet duct 4125 should be reduced in order to maintain the heating rate and/or the canister 4200 temperature above the threshold while also ensuring that there is sufficient air flow through the storage cavity 4113 to prevent an overheating situation. After such calculations are performed, an air flow adjustment member may be designed and created such that when it is positioned within one of the inlet ducts 4120 (or a plurality of them are positioned in different ones of the inlet ducts 4120 and/or the outlet duct 4125), the cross-sectional area of the inlet and/or outlet ducts 4120, 4125 is decreased the desired amount to ensure that the heating rate of the ventilation air (or the temperature of the canister 4200) is maintained above the threshold. In some embodiments, modifications to the cross-sectional areas of the inlet and/or outlet ducts 4120, 4125 are done to ensure that the temperature of the canister 4200 stays above 85° C.

In some embodiments, the inlet ducts 4120 may have a combined cross-sectional area and the reduction in the cross-sectional area described herein may be done on the basis of the combined cross-sectional area of all of the inlet ducts 4120 rather than on the basis of the individual cross-sectional areas of each of the inlet ducts 4120. For example, it may be determined that the combined cross-sectional area of all of the inlet ducts 4120 should be reduced by 5% in order to ensure that the heating rate of the ventilation air and the temperature of the canister 4200 remain above their respective predetermined thresholds to prevent stress corrosion cracking of the canister 4200. If there are ten inlet ducts 4120 each having an identical cross-sectional area, then the 5% reduction in the combined cross-sectional area may be achieved by reducing the cross-sectional area of just one of the inlet ducts 4120 by 50%. Alternatively, each of the inlet ducts 4120 may have its cross-sectional area reduced by 5%, or five of the ten air inlet ducts 4120 may have their cross-sectional areas reduced by 10%. Thus, as can be seen, there is an infinite amount of variation that can be used to achieve the desired results.

In some embodiments, the concept involves progressively reducing the combined cross-sectional area of all of the inlet ducts 4120 over time, which may involve progressively reducing the cross-sectional area of one of the inlet ducts 4120 over time, may involve progressively reducing the cross-sectional area of all of the inlet ducts 4120 over time, or may involve progressively reducing the cross-sectional areas of several, but not all, of the inlet ducts 4120 over time, or may involve progressively reducing the cross-sectional area of the inlet duct 4125 over time. In some embodiments, the cross-sectional area of the inlet ducts 4120 and/or the outlet ducts 4125 are only reduced over time, but never later increased. However, in other embodiments it may be necessary to increase the cross-sectional areas of the inlet and/or outlet ducts 4120, 4125 at a later time. For example, ambient temperatures play a role in the heating rate of the ventilation air and the temperature of the canister 4200. Thus, if the ambient temperature gets too high for an extended period of time, it may be necessary to increase the cross-sectional area of the inlet and/or outlet ducts 4120, 4125 to prevent overheating.

Figure 41A:
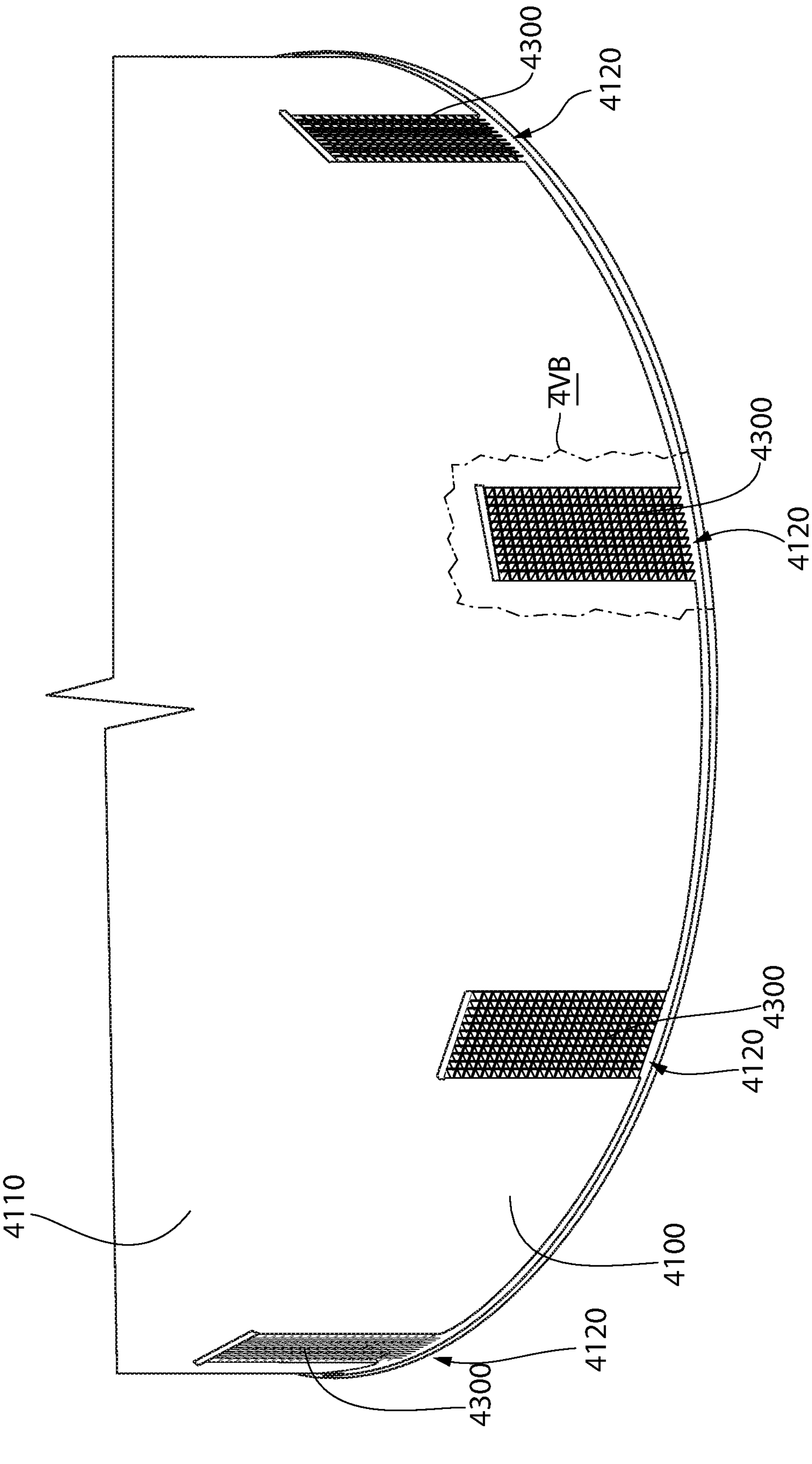
FIG. 41A illustrates a lower portion of the ventilated system of FIG. 37 with a first type of air flow adjustment member in inlet ducts thereof.
Figure 41B:
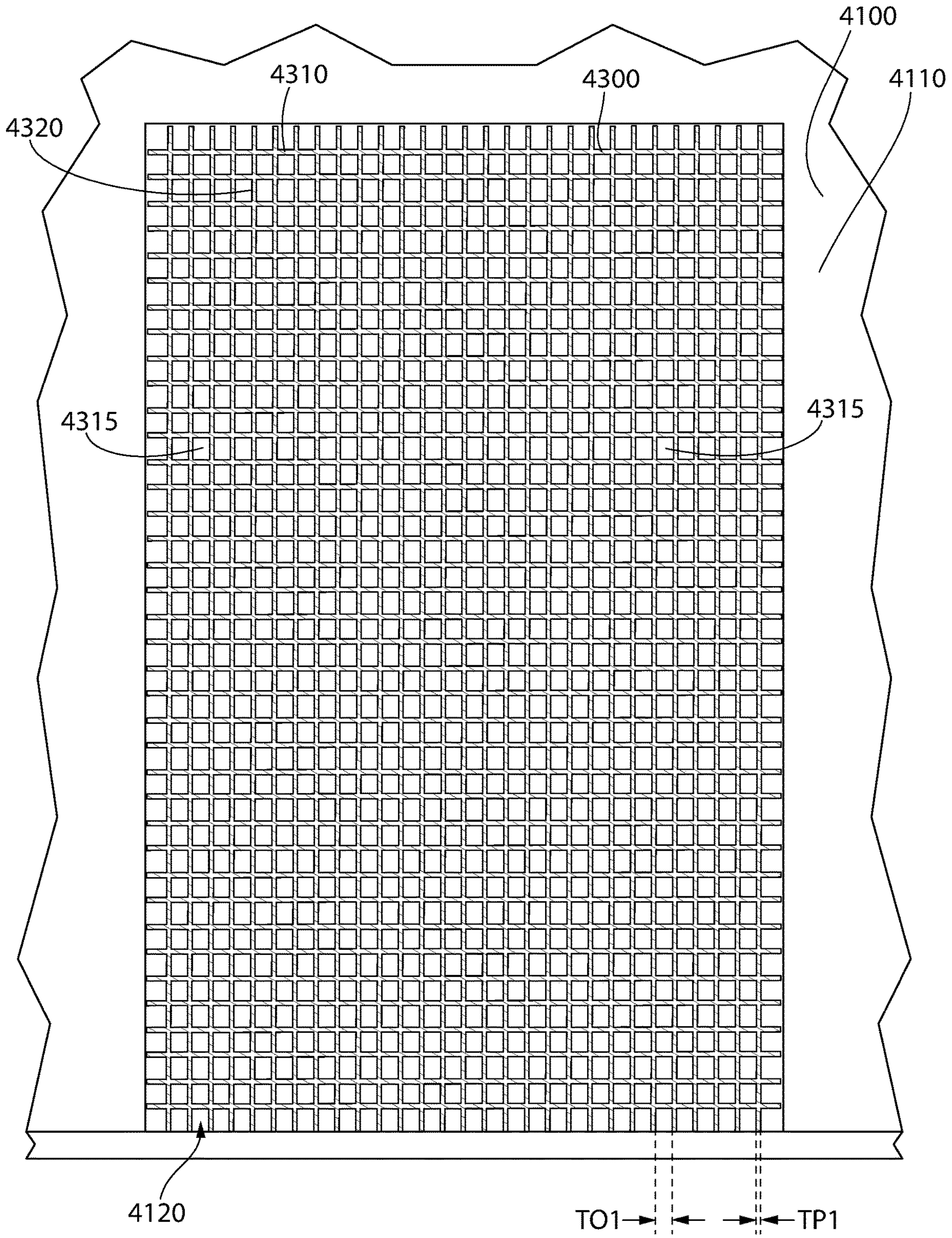
FIG. 41B is a close-up view of area 4VB of FIG. 41A.

Referring to FIGS. 41A and 41B, an embodiment is illustrated wherein one of the air flow adjustment members 4300 is positioned within each of the inlet ducts 4120 to reduce the combined cross-sectional area of the plurality of inlet ducts 4120. Of course, as noted above the air flow adjustment member 4300 may be positioned in just one of the inlet ducts 4120 or more than one but less than all of the plurality of inlet ducts 4120 in some embodiments. Furthermore, although in FIGS. 41A and 41B the same air flow adjustment member 4300 is positioned within each of the inlet ducts 4120, in other embodiments different ones of the air flow adjustment members 4300, 4300*a*, 4300*b* (and others not specifically depicted herein) may be positioned within different ones of the plurality of inlet ducts 4120 as desired or needed to achieve the proper reduction in the combined cross-sectional area of the plurality of inlet ducts 4120.

In FIG. 41B, the air flow adjustment member 4300 is depicted with hatching to indicate that the illustration includes a cross-sectional view of the inlet duct 4120 at a location at which the air flow adjustment member 4300 is positioned. As noted previously, the plurality of first plates 4310 and the plurality of second plates 4320 collectively define a plurality of open cells or open cell portions 4315 of the air flow adjustment member 4300. Each of the plates 4310, 4320 has a thickness TP1 and each of the open cells 4315 has a thickness TO1. In this particular embodiment, the thickness TO1 of the open cells 4315 is greater than the thickness TP1 of the plates 4310, 4320. Although in the exemplified embodiment each of the plates 4310, 4320 has the same thickness TP1 and each of the open cells 4315 has the same thickness TO1 and cross-sectional area, this is not required in all embodiments. The thicknesses of the plates 4310, 4320 and the open cells 4315 and the cross-sectional area of the open cells 4315 may be varied within a single air flow adjustment member 4300 in other embodiments.

With the air flow adjustment member 4300 positioned within one of the inlet ducts 4120 as shown, air can flow through the open cells 4315 but is prevented from flowing through the other portions of the inlet duct 4120 (i.e., through the plates 4310, 4320). Each of the open cells 4315 has a cross-sectional area. When the air flow adjustment member 4300 is positioned within one of the inlet ducts 4120, the sum of the cross-sectional areas of the open cells 4315 forms the reduced cross-sectional area of the inlet duct 4120. Specifically, if the air flow adjustment member 4300 were removed, the inlet duct 4120 would have a cross-sectional area equal to a length of opening times a width of the opening. With the air flow adjustment member 4300 positioned in the inlet duct 4120, the cross-sectional area is the sum of the cross-sectional area of the open cells 4315, which is less than the cross-sectional area of the inlet duct 4120 without the air flow adjustment member 4300 therein. Thus, positioning the air flow adjustment member 4300 into one, or multiple, of the inlet ducts 4120 will reduce the cross-sectional area of that particular inlet duct 4120 and also reduce the combined cross-sectional area of all of the inlet ducts 4120.

Figure 42A:
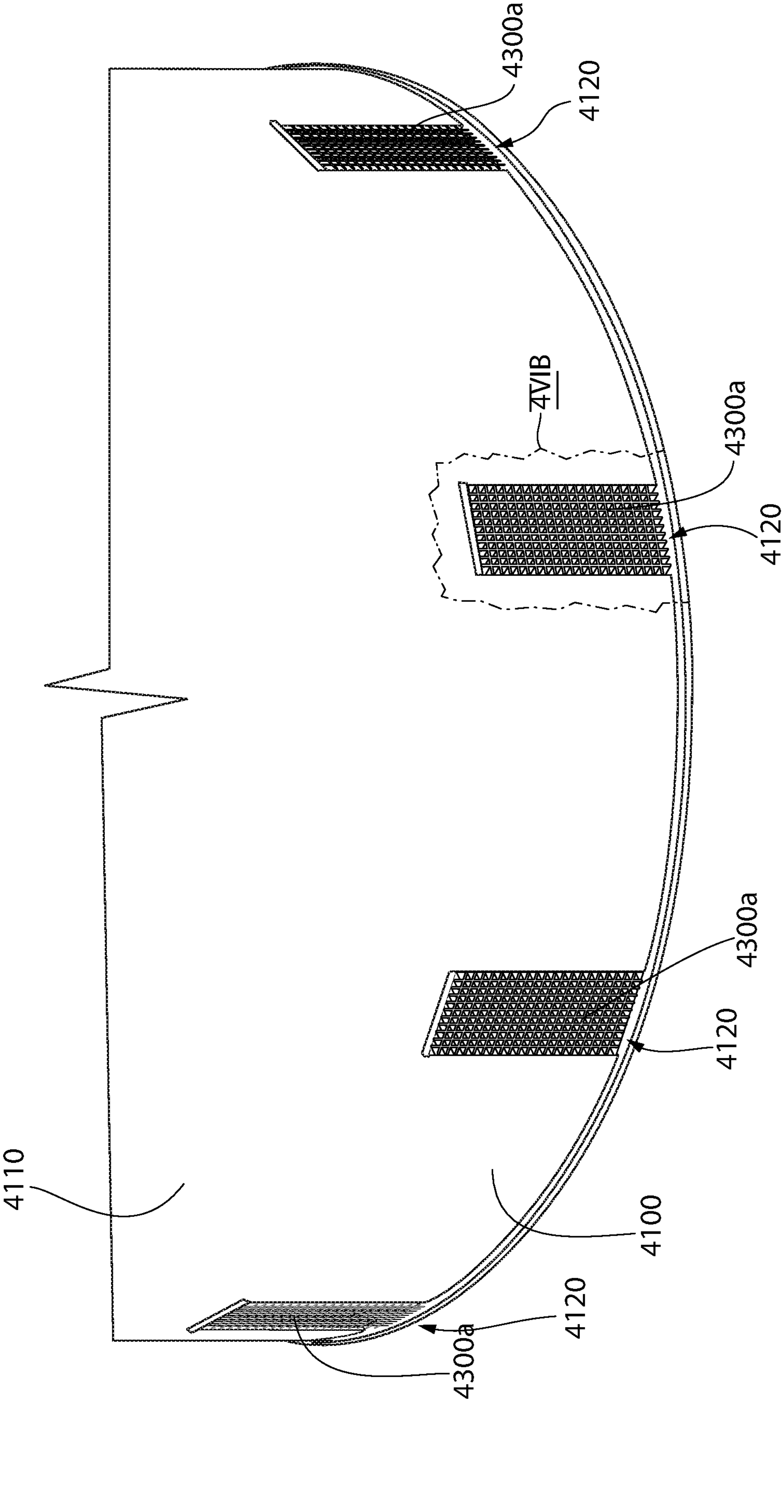
FIG. 42A illustrates a lower portion of the ventilated system of FIG. 37 with a second type of air flow adjustment member in inlet ducts thereof.
Figure 42B:
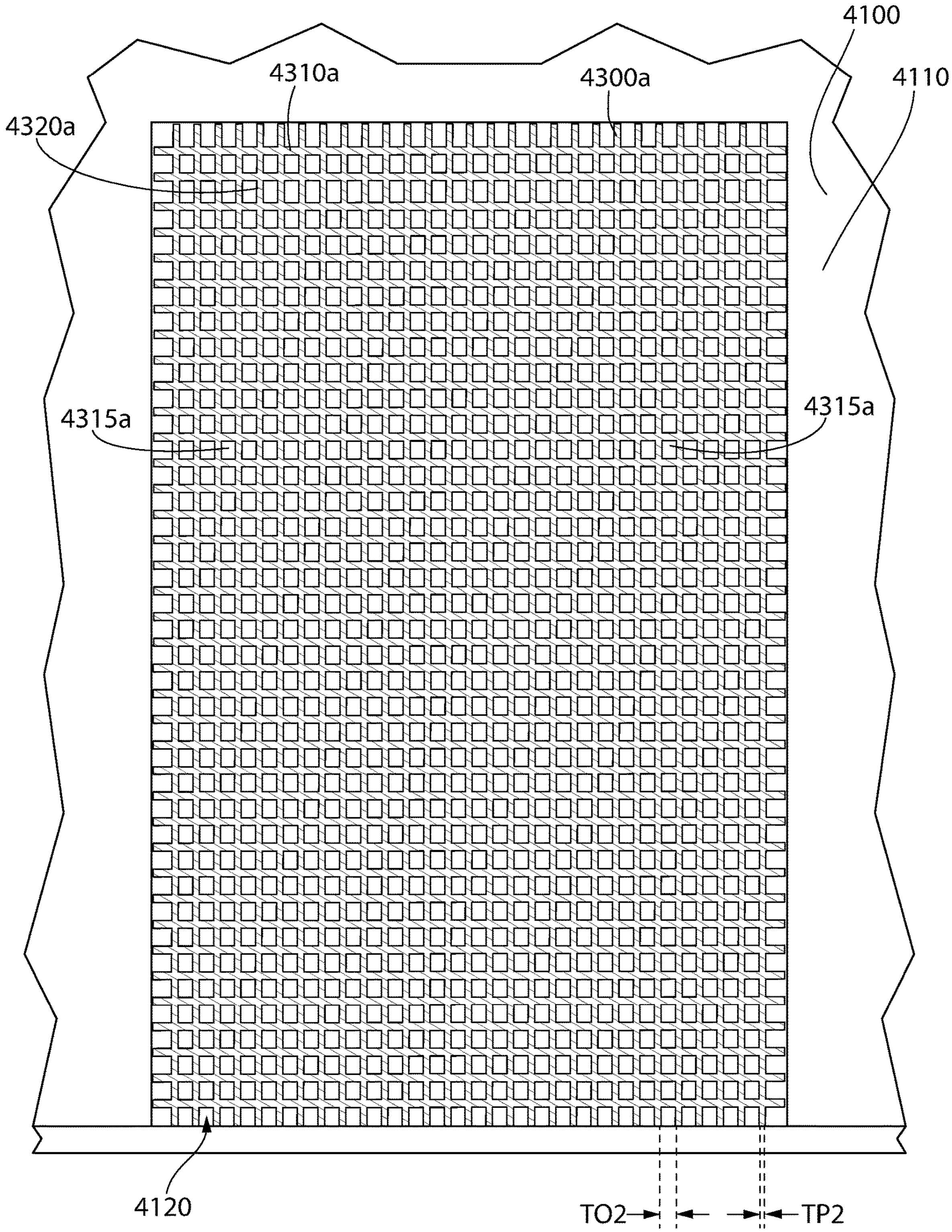
FIG. 42B is a close-up view of area 4VIB of FIG. 42A.

Referring to FIGS. 42A and 42B, an embodiment is illustrated wherein one of the air flow adjustment members 4300*a* is positioned within each of the inlet ducts 4120 to reduce the combined cross-sectional area of the plurality of inlet ducts 4120. Again, although one of the air flow adjustment members 4300*a* is positioned within each of the inlet ducts 4120 in the exemplified embodiment, this is not required in all embodiments. Rather, one of the air flow adjustment members 4300*a* may be positioned in one or more of the inlet ducts 4120 while others of the inlet ducts 4120 are completely open and free of an air flow adjustment member therein, or where different types of air flow adjustment members (such as the air flow adjustment members 4300, 4300*b*) are positioned in others of the inlet ducts 4120.

In FIG. 42B, the air flow adjustment member 4300*a* is depicted in cross-section to indicate that the illustration includes a cross-sectional view of the inlet duct 4120 at a location at which the air flow adjustment member 4300*a* is positioned. As noted previously, the plurality of first plates 4310*a* and the plurality of second plates 4320*a* collectively define a plurality of open cells or open cell portions 4315*a* of the air flow adjustment member 4300*a*. Each of the plates 4310*a*, 4320*a* has a thickness TP2 and each of the open cells 4315*a* has a thickness TO2 and a cross-sectional area. For comparison with the air flow adjustment member 4300, the thickness TP2 of the plates 4310*a*, 4320*a* is greater than the thickness TP1 of the plates 4310, 4320 and thus the thickness TO2 (and cross-sectional area) of the open cells 4315*a* is less than the thickness TO1 (and cross-sectional area) of the open cells 4315. Although in the exemplified embodiment each of the plates 4310*a*, 4320*a* has the same thickness TP2 and each of the open cells 4315*a* has the same thickness TO2 and cross-sectional area, this is not required in all embodiments. The thicknesses of the plates 4310*a*, 4320*a* and the open cells 4315*a* may be varied in other embodiments.

With the air flow adjustment member 4300*a* positioned within one of the inlet ducts 4120 as shown, air can flow through the open cells 4315*a* but is prevented from flowing through the other portions of the inlet duct 4120 (i.e., through the plates 4310*a*, 4320*a*). Each of the open cells 4315*a* has a cross-sectional area. When the air flow adjustment member 4300*a* is positioned within one of the inlet ducts 4120, the sum of the cross-sectional areas of the open cells 4315*a* forms the reduced cross-sectional area of the inlet duct 4120. Specifically, if the air flow adjustment member 4300*a* were removed, the inlet duct 4120 would have a cross-sectional area equal to a length of opening times a width of the opening. With the air flow adjustment member 4300*a* positioned in the inlet duct 4120, the cross-sectional area is the sum of the cross-sectional area of the open cells 4315*a*, which is less than the cross-sectional area of the inlet duct 4120 without the air flow adjustment member 4300*a* therein. Thus, positioning the air flow adjustment member 4300 into one, or multiple, of the inlet ducts 4120 will reduce the cross-sectional area of that particular inlet duct 4120 and also reduce the combined cross-sectional area of all of the inlet ducts 4120.

Figure 43A:
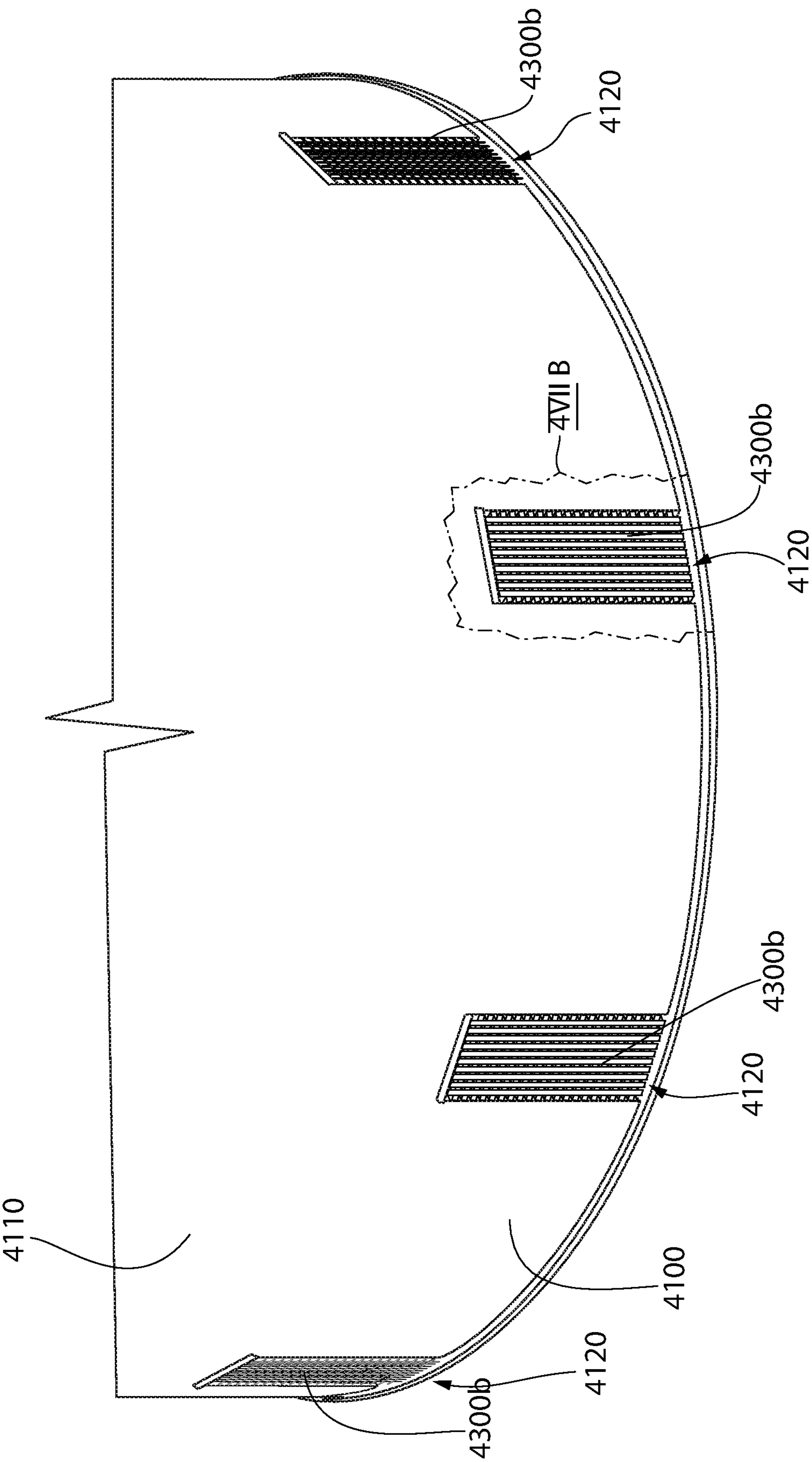
FIG. 43A illustrates a lower portion of the ventilated system of FIG. 37 with a third type of air flow adjustment member in inlet ducts thereof.
Figure 43B:
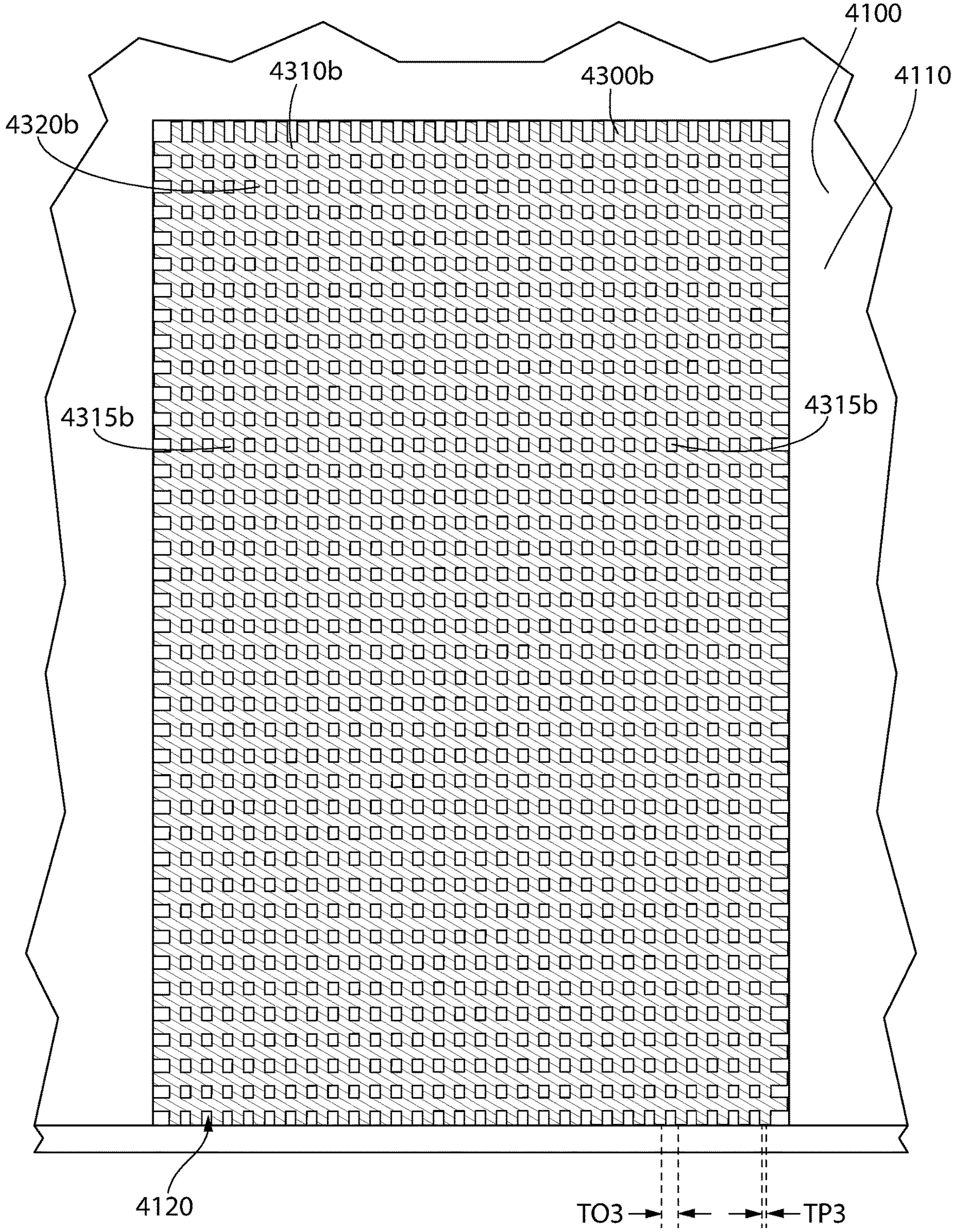
FIG. 43B is a close-up view of area 4VIIB of FIG. 43A.

In FIGS. 43A and 43B, an embodiment is illustrated wherein one of the air flow adjustment members 4300*b* is positioned within each of the inlet ducts 4120 to reduce the combined cross-sectional area of the plurality of inlet ducts 4120. FIGS. 43A and 43B illustrate the same thing as FIGS. 41A and 41B and FIGS. 42A and 42B, except utilizing the air flow adjustment member 4300*b*. Thus, the description of FIGS. 41A-42B above is applicable, except for the differences noted here.

In FIG. 43B, the air flow adjustment member 4300*b* is depicted in cross-section to indicate that the illustration includes a cross-sectional view of the inlet duct 4120 at a location at which the air flow adjustment member 4300*b* is positioned. As noted previously, the plurality of first plates 4310*b* and the plurality of second plates 4320*b* collectively define a plurality of open cells or open cell portions 4315*b* of the air flow adjustment member 4300*b*. Each of the plates 4310*b*, 4320*b* has a thickness TP3 and each of the open cells 4315*b* has a thickness TO3 and a cross-sectional area. For comparison with the air flow adjustment member 4300*a*, the thickness TP3 of the plates 4310*b*, 4320*b* is greater than the thickness TP2 of the plates 4310*a*, 4320*a* and thus the thickness TO3 (and the cross-sectional area) of the open cells 4315*b* is less than the thickness TO2 (and the cross-sectional area) of the open cells 4315*a*. Although in the exemplified embodiment each of the plates 4310*b*, 4320*b* has the same thickness TP3 and each of the open cells 4315*b* has the same thickness TO3, this is not required in all embodiments. The thicknesses of the plates 4310*b*, 4320*b* and the open cells 4315*b* may be varied in other embodiments.

The combined cross-sectional area of the open cells 4315*b* of the air flow adjustment member 4300*b* is less than the combined cross-sectional area of the open cells 4315*a* of the air flow adjustment member 4300*a*, which is less than the combined cross-sectional area of the open cells 4315 of the air flow adjustment member 4300. This is achieved in the exemplified embodiment by making the plates 4310*b*, 4320*b* thicker than the plates 4310*a*, 4320*a*, which are thicker than the plates 4310, 4320. This could also be achieved by utilizing more plates while maintaining the air flow adjustment members with the same overall dimensions such that the plates are positioned more closely together. Thus, if at time T1 the air flow adjustment member 4300 is positioned in one of the inlet ducts 4120, the cross-sectional area of the inlet duct 4120 will be reduced a first percentage. If at time T2 the air flow adjustment member 4300*a* is positioned in one of the inlet ducts 4120, the cross-sectional area of the inlet duct 4120 will be reduced a second percentage that is greater than the first percentage. If at time T3 the air flow adjustment member 4300*b* is positioned in one of the inlet ducts 4120, the cross-sectional area of the inlet duct 4120 will be reduced a third percentage that is greater than the second percentage. Therefore, first positioning the air flow adjustment member 4300 in one of the inlet ducts 4120 and then later swapping the air flow adjustment member 4300 for one of the air flow adjustment members 4300*a* and then still later swapping the air flow adjustment member 4300*a* for one of the air flow adjustment members 4300*b* will result in a progressive reduction in the cross-sectional area of the inlet duct 4120 over time. Furthermore, even if just one of the inlet ducts 4120 goes through the progression of having the air flow adjustment members 4300, 4300*a*, 4300*b* positioned therein sequentially over time while the other inlet ducts 4120 remain open and free of any air flow adjustment members therein, the combined cross-sectional area of the plurality of inlet ducts 4120 will be reduced in a progressive manner.

Figure 44A:
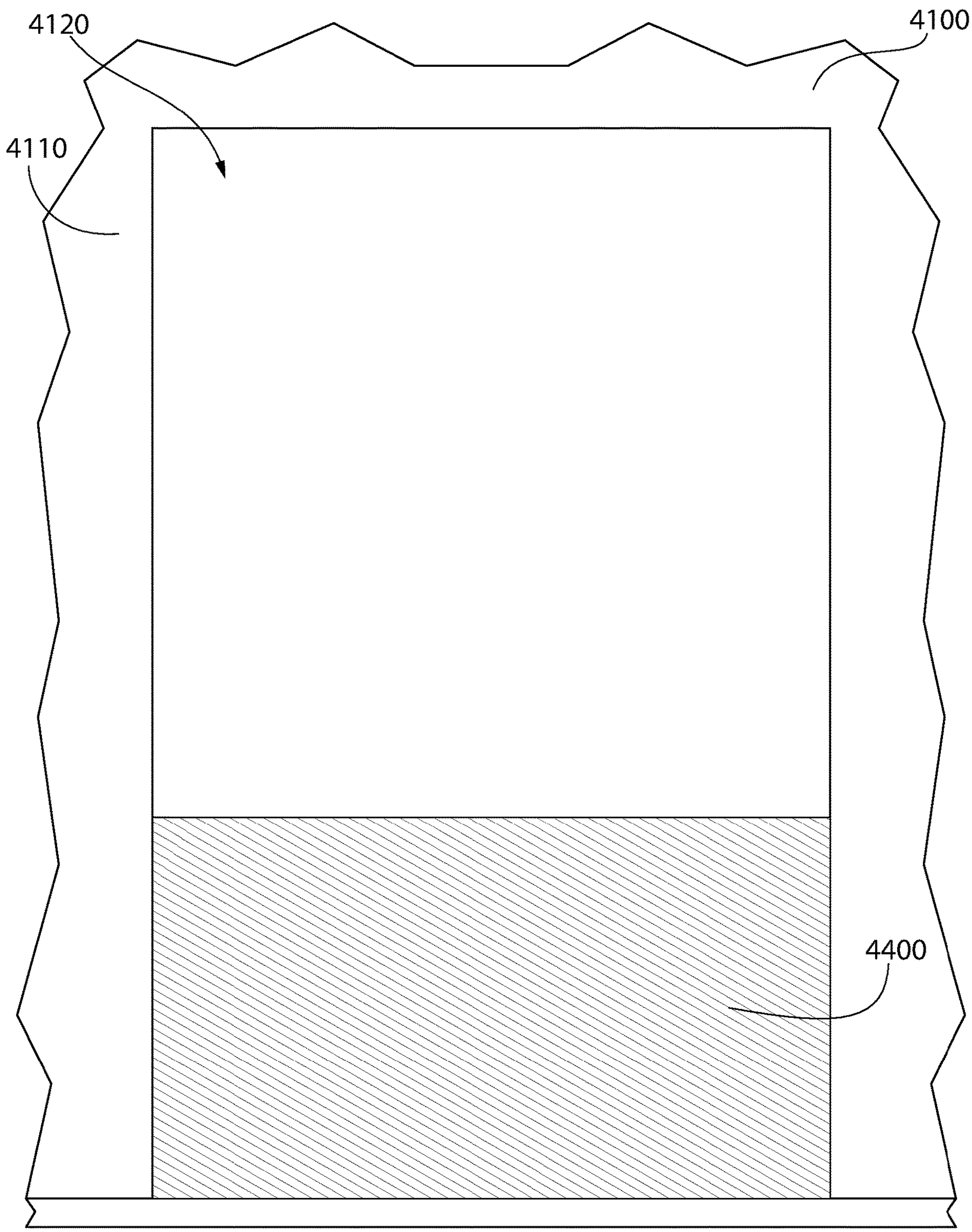
FIG. 44A is a close-up view of area 4VIIB of FIG. 43A in accordance with a first alternative embodiment of the present invention.
Figure 44B:
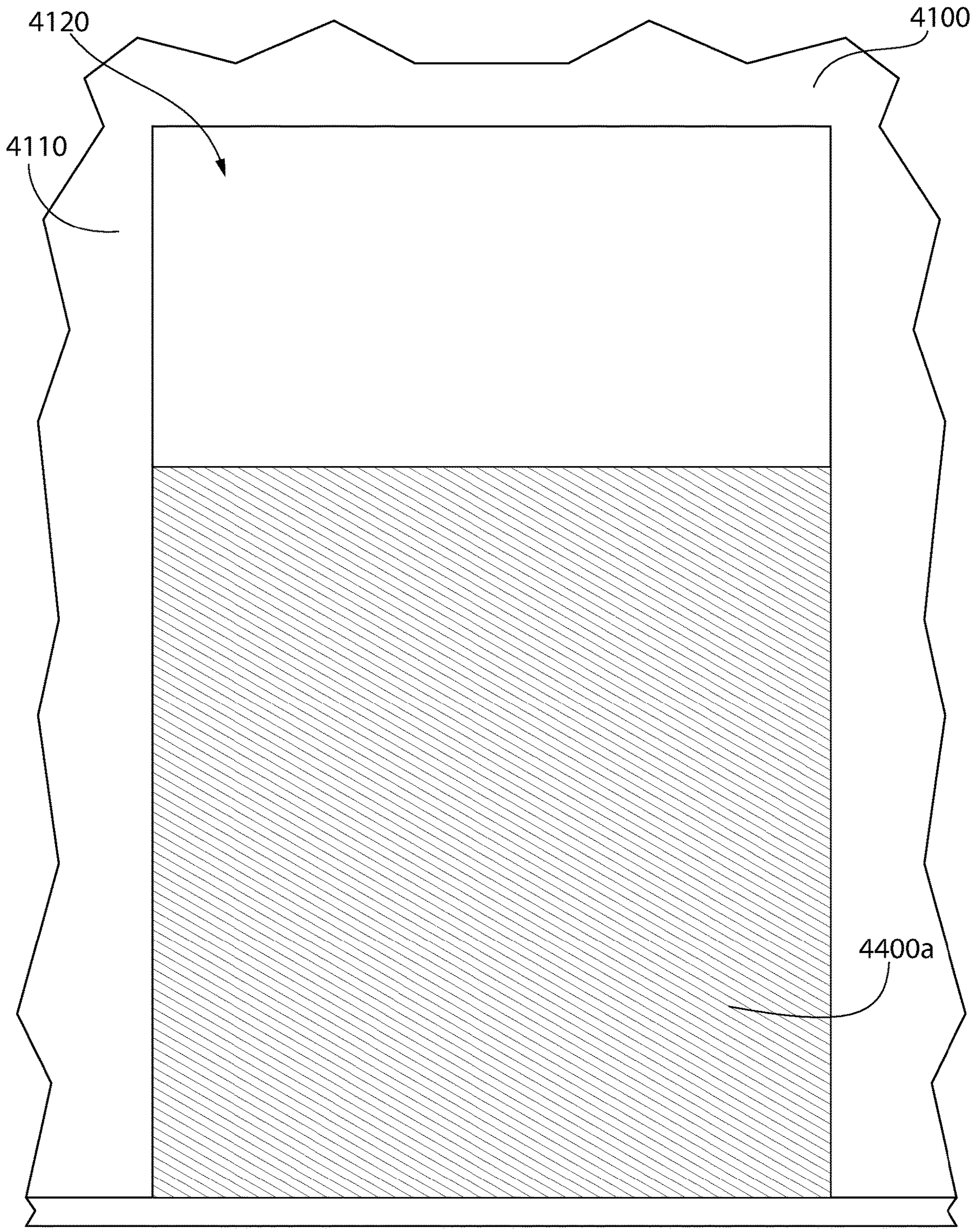
FIG. 44B is a close-up view of area 4VIIIB of FIG. 43A in accordance with a second alternative embodiment of the present invention.

Referring to FIGS. 44A and 44B, alternative air flow adjustment members 4400, 4400*a* are illustrated positioned in one of the inlet ducts 4120. In the embodiment of FIG. 44A, the air flow adjustment member 4400 is a solid plate having a height that is less than a height of the inlet duct 4120. Thus, the air flow adjustment member 4400 completely blocks or closes a bottom portion of the inlet duct 4120 while leaving a top portion of the inlet duct 4120 completely open. Of course, the air flow adjustment member 4400 could just as easily block the top portion of the inlet duct 4120 while leaving the bottom portion of the inlet duct 4120 open. In other embodiments, the air flow adjustment member 4400 may have a height that is equal to the height of the inlet duct 4120 while having a width that is less than the width of the inlet duct 4120 to achieve the same effect. The exact height and/or width of the air flow adjustment member 4400 may be modified as desired or necessary to ensure that when it is positioned within the inlet duct(s) 4120 the heating rate of the ventilation air is maintained at or above the predetermined threshold required to ensure that stress corrosion cracking of the canister 4200 is prevented.

FIG. 44B illustrates the air flow adjustment member 4400*a* positioned in the inlet duct 4120. The air flow adjustment member 4400*a* is a solid plate having a height that is greater than the height of the air flow adjustment member 4400 but less than the height of the inlet duct 4120. Thus, the air flow adjustment member 4400*a* reduces the cross-sectional area of the inlet duct 4120 a greater percentage or amount than does the air flow adjustment member 4400. Similar to the description of the air flow adjustment members 4300, 4300*a*, 4300*b*, the air flow adjustment members 4400, 4400*a* can be used to progressively decrease the cross-sectional areas of the inlet ducts 4120.

Figure 45:
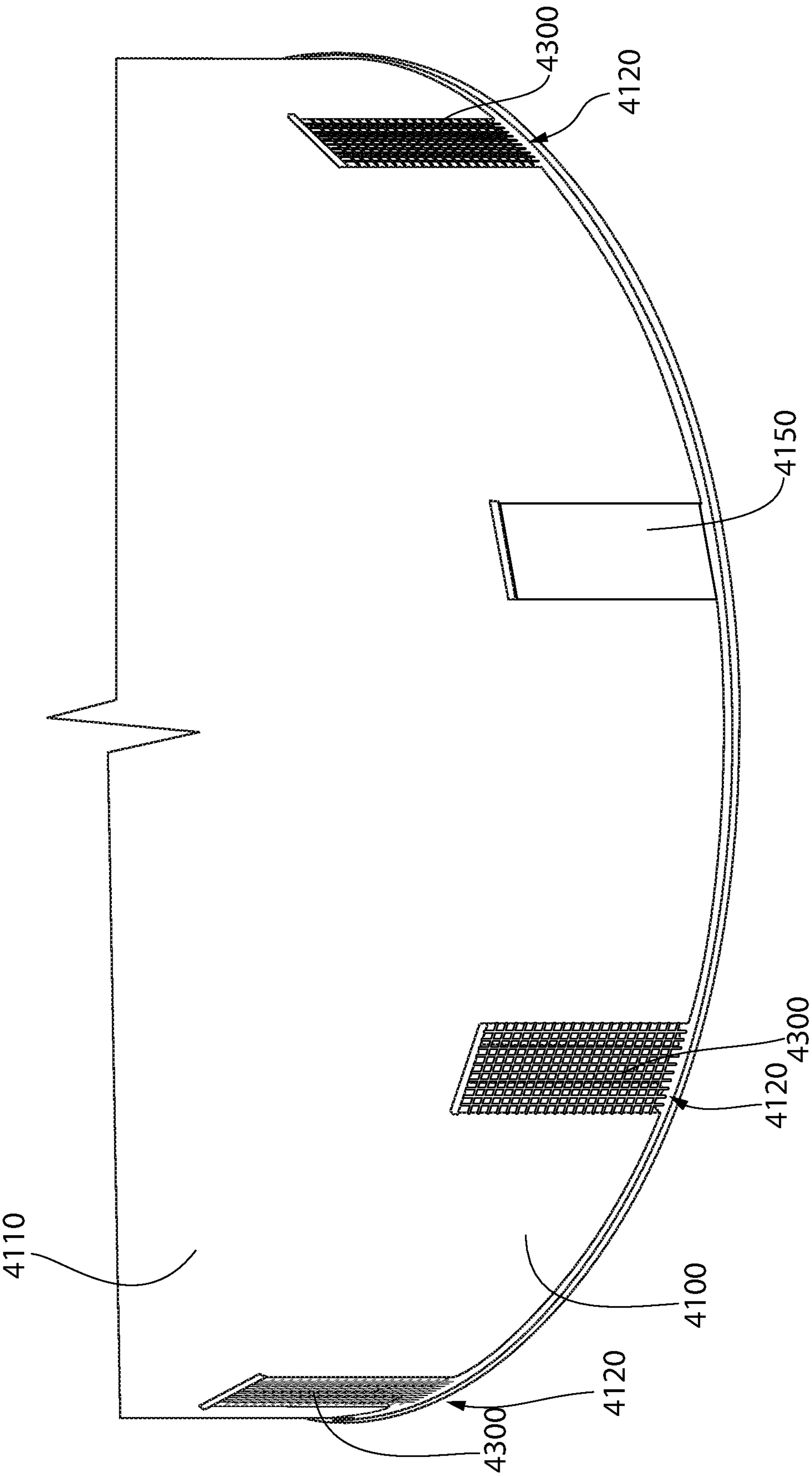
FIG. 45 illustrates a lower portion of the ventilated system of FIG. 37 with one of the inlet ducts thereof completely closed.

FIG. 45 illustrates an embodiment whereby one of the air flow adjustment members 4300, 4300*a*, 4300*b* is positioned within several of the inlet ducts 4120 and another one of the inlet ducts 4120 is completely closed by blocking the opening into the inlet duct 4120 with a plate member 4150. In cold ambient temperatures and after many years of decay, it may be necessary to begin completing closing some of the inlet ducts 4120 to ensure that the heating rate of the ventilation air and the temperature of the canister 4200 remains above the desired threshold level to prevent stress corrosion cracking. Thus, as time continues to pass, more than one of the inlet ducts 4120 may be blocked with one of the plate members 4150. It is entirely conceivable that all of the inlet ducts 4125 may eventually be capped. Furthermore, in some embodiments the outlet duct 4125 may also eventually be capped. After the need for ventilation no longer exists, it may be prudent to fill the annular gap between the canister 4200 and the inner surface 4111 of the cask body 4110 with inert gas (e.g., nitrogen) to permanently banish the specter of SCC and hermetically seal the storage cavity 4113 of the cask body 4110.

Figure 46:
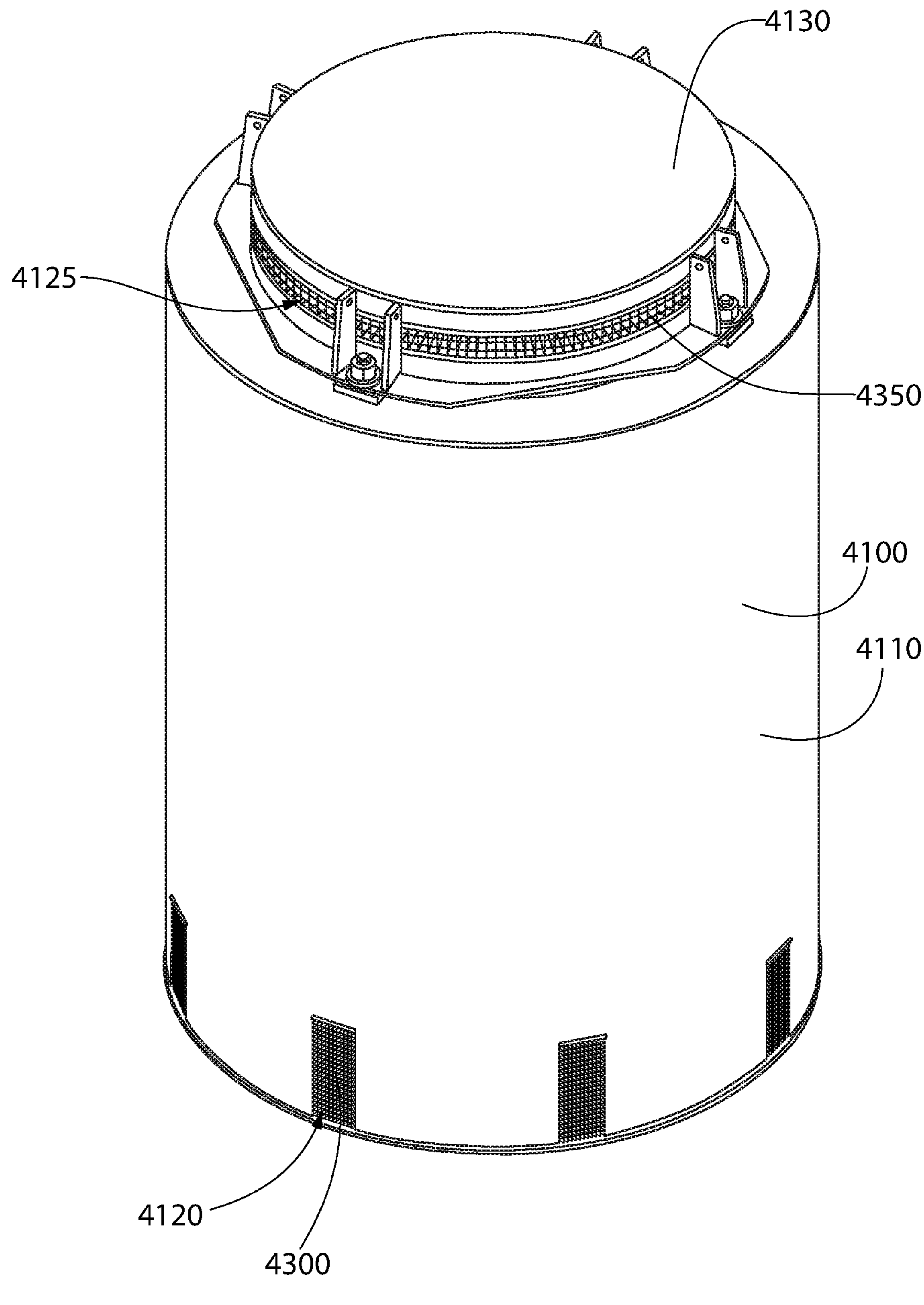
FIG. 46 is a perspective view of the ventilated system of FIG. 37 with air flow adjustment members in the inlet and outlet ducts thereof.

Referring to FIG. 46, the ventilated system 4100 is illustrated with various air flow adjustment members 4300, 4300*a*, 4300*b* positioned in all of the inlet ducts 4120 and an air flow adjustment member 4350 positioned in the outlet duct 4125. The main purpose of this figure is to illustrate that an air flow adjustment member 4350 may be positioned in the outlet duct 4125 in addition to being positioned in the inlet ducts(s) 4120. In fact, in some embodiments and depending on external factors, it may be desirable at certain times to position one of the air flow adjustment members 4350 in the outlet duct 4125 without having any air flow adjustment members 4300, 4300*a*, 4300*b* in the inlet ducts 4120. Although it is intuitively apparent that the partially or entirely blocking of the inlet ducts 4120 would be more effective at maintaining the heating rate of the ventilation air above the predetermined lower threshold, it should be appreciated that adjusting the flow area in both the inlet and outlet ducts 4120, 4125 can be employed to maintain the outer surface of the canister 4200 at a desired temperature in order to control, mitigate, and/or prevent stress corrosion cracking. Just as with the air flow adjustment members 4300, 4300*a*, 4300*b*, there may be several different versions of the air flow adjustment member 4350 for purposes of reducing the cross-sectional area of the outlet duct 4125 varying amounts/percentages.

Figure 47:
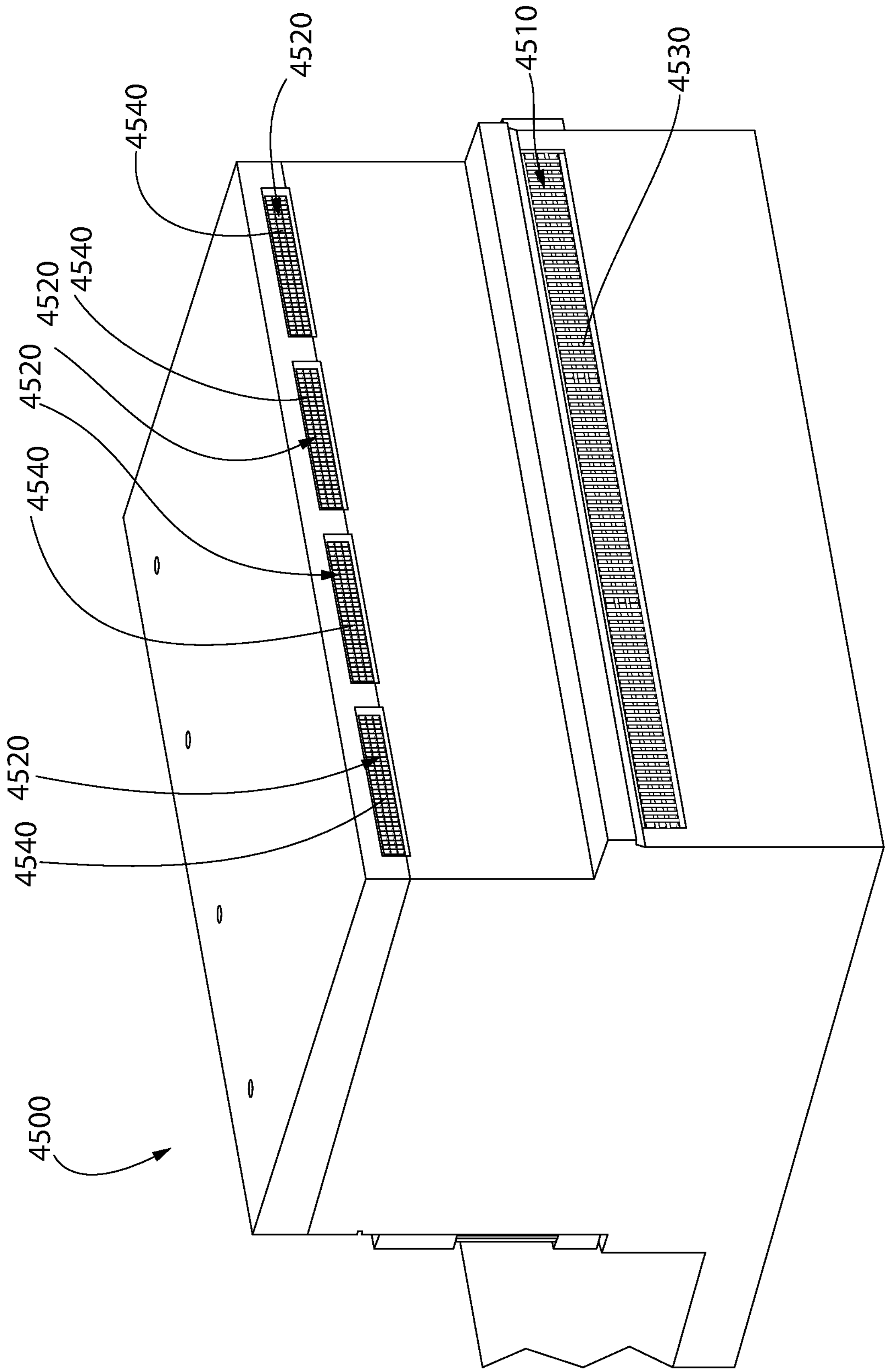
FIG. 47 is a perspective view of another type of ventilated system with air flow adjustment members in the inlet and outlet ducts thereof.

FIG. 47 illustrates a ventilated system 4500 for storing a canister containing high level radioactive waste in accordance with another embodiment of the present invention. In FIG. 47, the ventilated system 4500 is a horizontally oriented structure, which differs from the ventilated system 4100 which is a vertically oriented structure. Thus, in the embodiment of FIG. 47, a canister much the same as the canister 4200 described above is positioned within the storage cavity of the ventilated system 4500. However, in this embodiment the canister is positioned horizontally rather than vertically. Generally, the heat rejection in horizontally oriented ventilated systems such as the ventilated system 4500 are less efficient than with vertically oriented ventilated systems such as the ventilated system 4100 because the ventilation air must flow across the curved surface of the canister shell causing the thermally ineffective Strouhal eddies in the wake zone. Nonetheless, the ventilation air in the horizontally oriented ventilated system 4500 gets heated just the same.

In FIG. 47, the ventilated system 4500 comprises an inlet duct 4510 and a plurality of outlet ducts 4520. Of course, the ventilated system 4500 could include multiple inlet ducts 4510 instead of just a single inlet duct 4510 in alternative embodiments. Furthermore, the ventilated system 4500 could include a single outlet duct 4520 instead of multiple outlet ducts 4520 in some embodiments. As shown, an air flow adjustment member 4530 is positioned within the inlet duct 4510 and an air flow adjustment member 4540 is positioned within each of the outlet ducts 4540. The air flow adjustment members 4530, 4540 generally have a similar structure to the air flow adjustment members 4300, 4300*a*, 4300*b* described above, in that they comprise a gridwork of plates that form open portions for the air to flow through. The plates forming the air flow adjustment members 4530, 4540 may have varying thickness to vary the cross-sectional area of the inlet and outlet ducts 4510, 4520 when the air flow adjustment members 4530, 4540 are positioned therein. Thus, the methods and techniques described herein are as applicable to a horizontally oriented module as they are to a vertically oriented module.

Positioning the various air flow adjustment members in the inlet and/or outlet ducts 4120, 4125 as described herein increases the obstruction percentage of those ducts, which decreases the natural convective flow of the ventilation air through the ventilation passageway, thereby decreasing the heat rejection rate of the ventilated system 4100. As a result, the temperature of the components of the ventilated system 4100 and the canister 4200 stored therein is increased, thereby mitigating and stress corrosion cracking. To the contrary, decreasing the obstruction percentage of the inlet ducts 4120 (or the outlet ducts 4125 as the case may be) increases the natural convective flow of the air through the ventilation passageway, thereby increasing the heat rejection rate of the ventilated system 4100. As a result, in such a circumstance the temperature of the components of the ventilated system 4100 and the canister 4200 stored therein is decreased.

V. Inventive Concept 5

With reference to FIGS. 48-56, a fifth inventive concept will be described.

Figure 48:
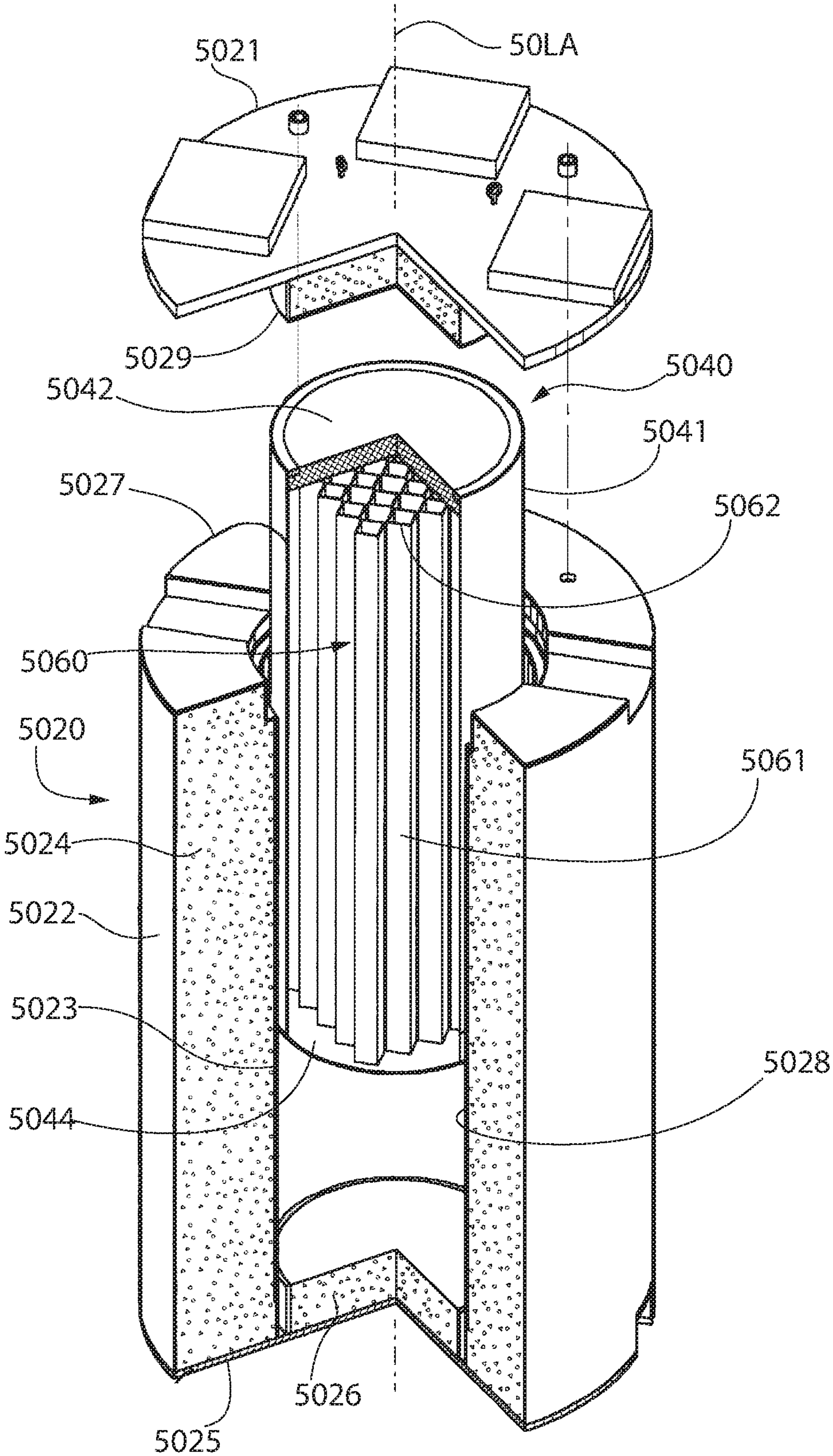
FIG. 48 is a perspective view of a storage system for spent nuclear fuel comprising an outer transport or storage cask and inner fuel storage canister with basket assembly.

FIG. 48 depicts a nuclear fuel storage system with spent fuel assembly storage canister having radiation attenuation inserts (dose attenuation devices) according to the present disclosure. Referring to FIG. 48, the system includes an outer overpack or cask 5020 may be a double-walled vessel including cylindrical outer shell 5022, inner shell 5023, and a concrete mass or liner 5024 disposed in an annular space therebetween for radiation blocking. A vertically-extending central cavity 5028 of cylindrical configuration extends along a vertical centerline VA defined by the vertically elongated cask body. Cask 5020 includes at its bottom end a circular bottom wall 5025 which includes a cylindrical concrete base plug 5026 having an upward facing top surface exposed to the cavity 5028, and an open top end 5027. A removable circular lid 5021 is coupled to the top end 5027 which closes the normally upwardly open cavity 5028 when in place. A concrete top plug 5029 is secured to the underside of the lid 5021. The base plug 5026 and top plug 5029 provide radiation shielding in the vertical direction, whereas the concrete liner 5024 provides radiation shielding in the lateral direction.

Figure 49:
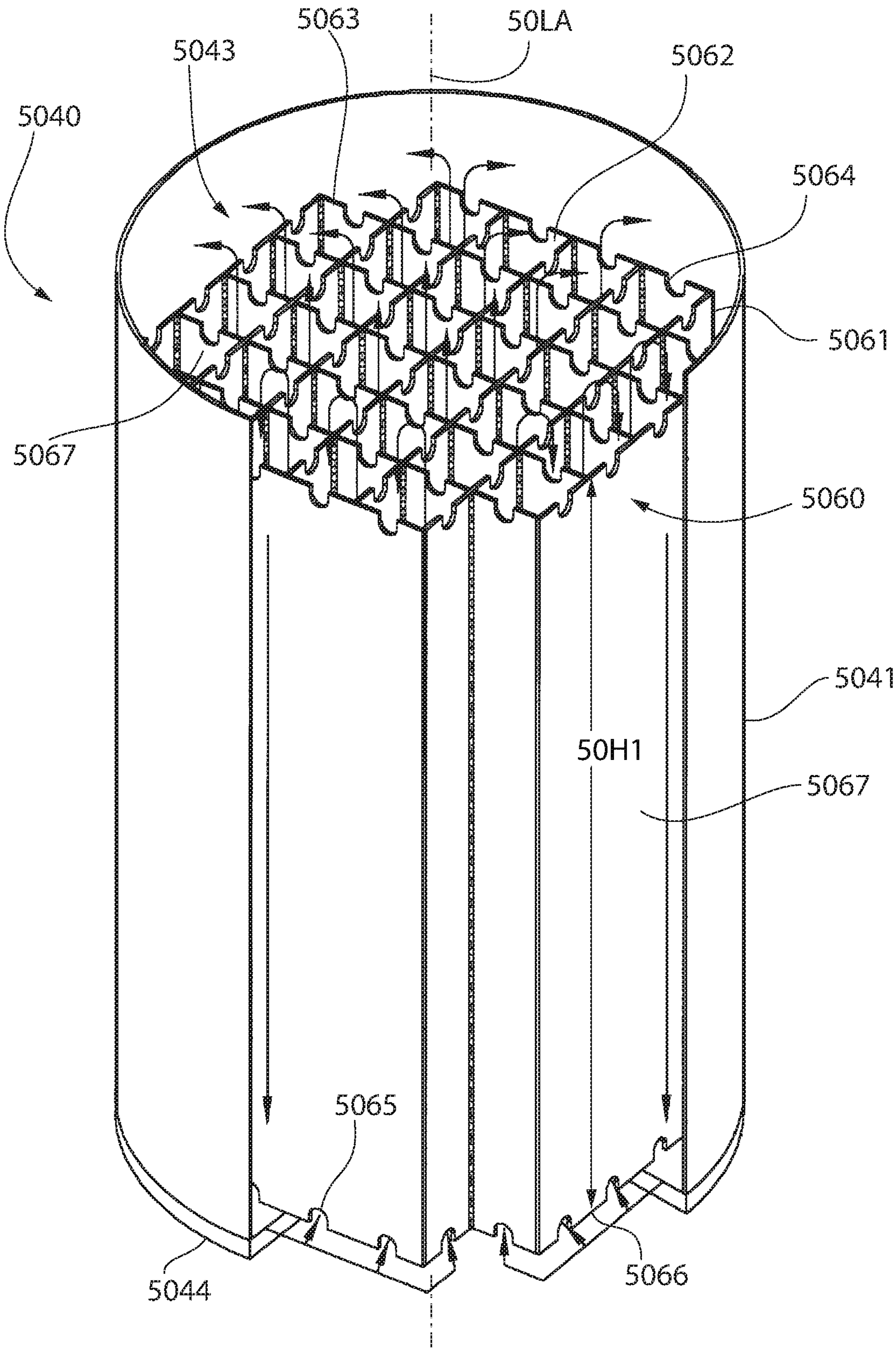
FIG. 49 is a perspective view of the canister and fuel basket.
Figure 50:
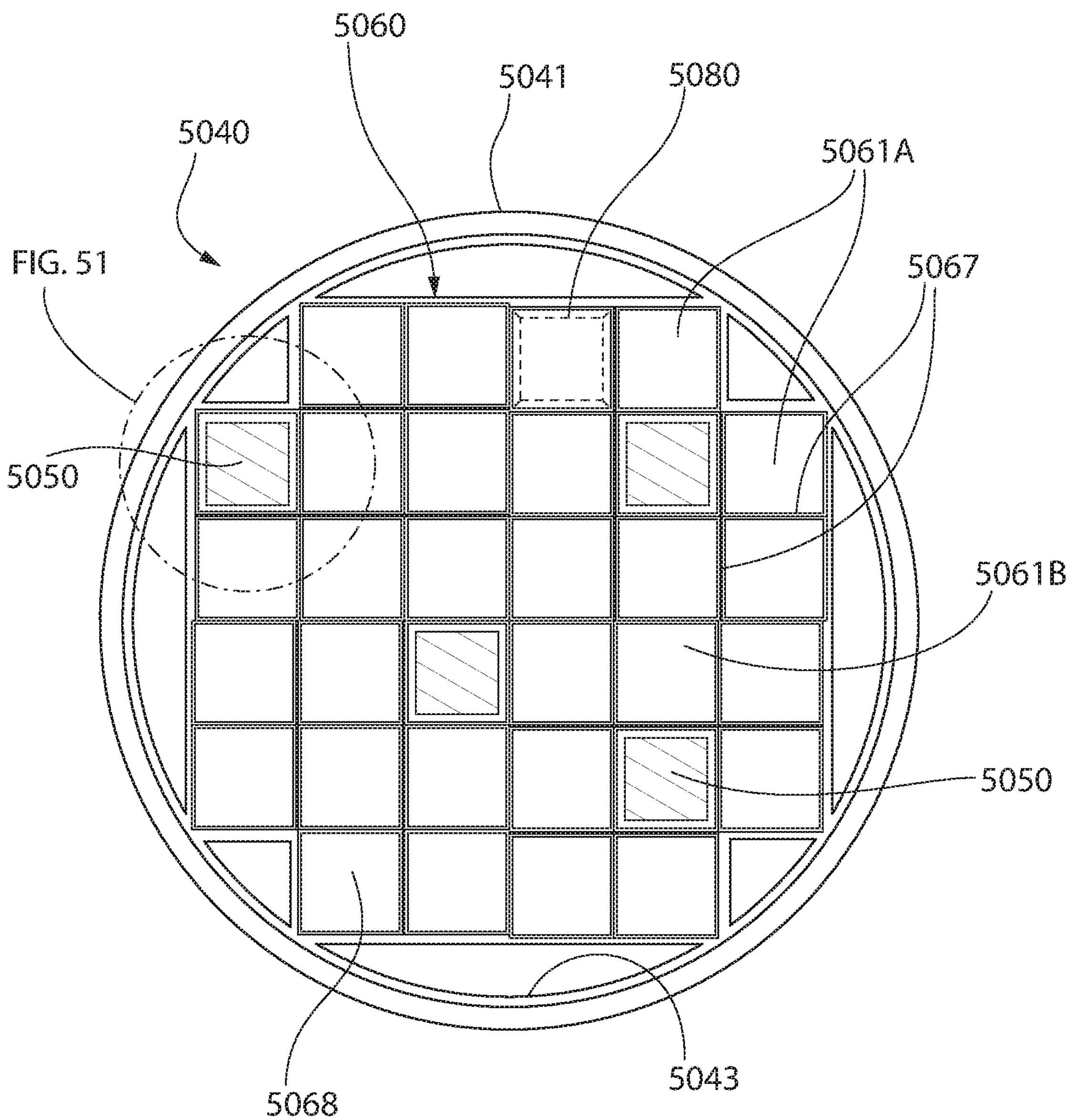
FIG. 50 is top plan view thereof.

Fuel assembly storage canister 5040 is shown removably inserted and disposed in central cavity 5028 of the outer cask 5020. Referring to FIGS. 48-50, canister 5080 generally comprises a vertically elongated cylindrical shell 5041, baseplate 5044 at bottom, and sealable/weldable lid 5042 at top, which collectively form the confinement boundary for the stored fuel assemblies 5050 (see, e.g. FIG. 53). The confinement boundary may be a completely seal-welded hermetically closed enclosure of all stainless steel construction in one embodiment to resist corrosion.

Figure 53:
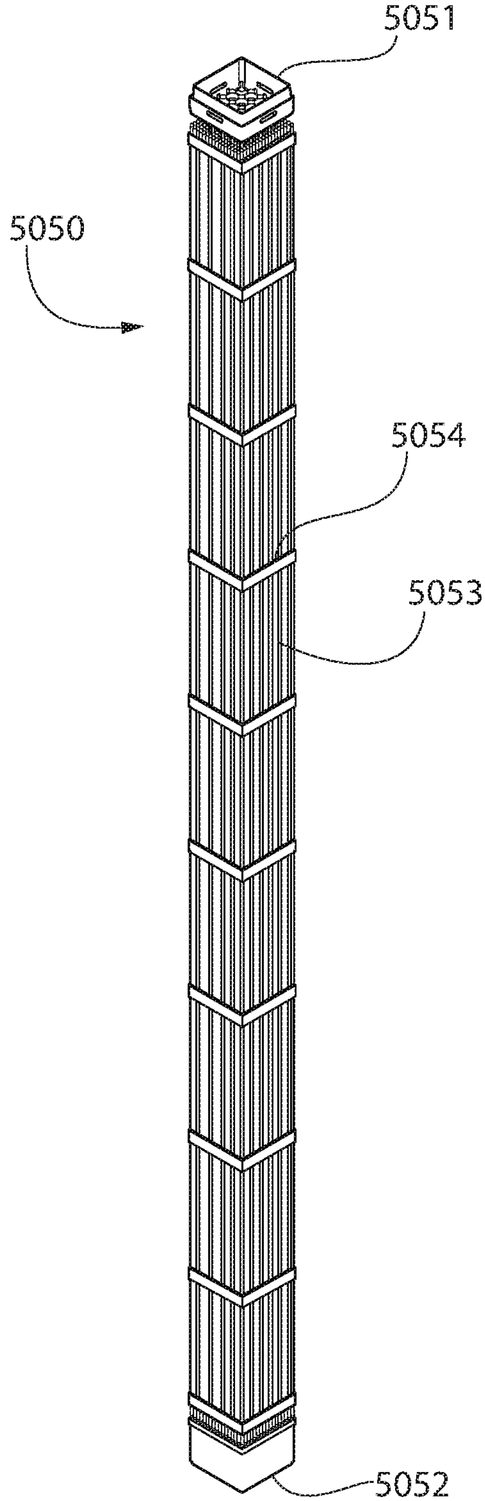
FIG. 53 is a perspective view of a typical fuel assembly storage in the tubes and cells of the fuel basket.

Nuclear fuel assemblies 5050 shown in FIG. 53 are well known in the art. They are vertically elongated box-like assemblies of square cross-sectional configuration generally comprising a top nozzle box 5051, bottom nozzle box 5052, and a plurality of fuel rods extending therebetween which contain the uranium fuel pellets. The assembly is held together generally by a plurality of vertically spaced bands 5054.

The canister 5040 defines a vertically-extending internal cavity 5043 which holds a fuel basket 5060 having a composite cell structure with a rectilinear honeycomb-like construction. In one embodiment, basket 5060 may be formed by a plurality of tightly packed adjacent elongated open prismatic tubes 5061 of rectangular cuboid shape and square transverse cross section. The tubes 5061 may be formed by individual tubular elements as shown in FIG. 48, or by a welded rectilinear array of plates assembled and arranged to collectively form the tubes as shown in FIG. 5049. In other embodiments, the tubes 5061 may be formed by slotted interlocking plates as shown in commonly-owned U.S. Pat. Nos. 5,898,747 and 8,712,001, which are incorporated herein by reference. Accordingly, there are numerous ways that may be used to form the prismatic tubes which are not limiting of the invention and use of the radiation attenuation inserts disclosed herein.

The tubes 5061 each define elongated open top fuel assembly storage cells 5062 therein each having a rectilinear square transverse cross section configured and dimensioned to insert and hold a single fuel assembly 5050. The tubes 5061 are supported by baseplate 5044 at their bottom ends as further described herein. The fuel assemblies 5050 may be inserted into the cells 5062 and transferred from a fuel storage rack submerged in a spent fuel pool of a nuclear reactor containment structure to the canister 5040 while underwater in the pool 5060 to minimize radiation levels. The canister 5040 may be a multi-purpose canister (MPC), which are further described in commonly-owned U.S. Pat. Nos. 7,096,600 and 5,898,747, which are incorporated herein by reference.

Referring to FIGS. 48-50, fuel assembly storage canister 5040 defines a vertical longitudinal axis SOLA and comprises a grid array of closely packed open storage cells 5062 formed by the closely spaced storage tubes 5061. The plurality of adjacent elongated storage tubes 5061 are arranged in parallel axial relationship to each other. The fuel basket 5060 comprises peripherally arranged exterior or outboard tubes 5061A forming an annular array of tubes which define a perimeter of the fuel basket, and interior or inboard tubes 5061B located in a central region of the basket inside the outboard tubes. Tubes 5061A-B are coupled at their bottom ends to the planar top surface of baseplate 5044 as previously described herein, and extend upwards in a substantially vertical orientation therefrom. In this embodiment, the vertical or central axis of each tube 5061 is not only substantially vertical and parallel to longitudinal axis SOLA and each other, but also substantially perpendicular to the top surface of the baseplate 5044. In one embodiment, tubes 5061 may be fastened to baseplate 5044 by welding and/or mechanical coupling such as bolting, clamping, threading, etc.

Tubes 5061 include an open top end 5063 for insertion of fuel assemblies into the internal cavity 5068 formed by the inner surfaces of the tube sidewalls 5067 (cell walls), bottom end 5066, and a plurality of longitudinally extending vertical sidewalls 5067 ("cell walls") between the ends and defining a tube or cell height. Each tube 5061 defines an internal cell cavity 5068 extending longitudinally between the top and bottom ends 5063, 5066. In the embodiment shown, four perpendicularly oriented tube sidewalls 5067 are arranged in rectilinear polygonal relationship forming either a square tube as shown or rectangular tube in other embodiments in lateral or transverse cross section (i.e. transverse or orthogonal to longitudinal axis SOLA as seen in FIG. 50). Fuel assembly storage cells 5062 and their internal cell cavities 5068 accordingly have a corresponding rectilinear configuration in lateral cross section. Tubes 5061 have a complementary configured transverse cross section to the fuel assemblies 5050.

Fuel assembly storage tubes 5061 may be made of any suitable preferably corrosion resistant metallic material, such as without limitation stainless steel or others. Baseplate 5044, shell 5041, and lid 5042 may be made of the same or a different preferably corrosion resistant metal.

It will be appreciated that each tube 5061 of the fuel basket 5060 can be formed as a single unitary structural component that extends the entire desired total height 50H1 of the tube, or can be constructed of multiple partial height tubes that are vertically stacked and connected together such as by welding or mechanical means which collectively add up to the desired total height. It is preferred that the height 50H1 of the tubes 5061 be sufficient so that the entire height of a fuel assembly 5050 may be contained completely within the tube when the fuel assembly is inserted. The top ends 5063 of tubes 5061 may preferably but not necessarily terminate in substantially the same horizontal upper reference plane (defined perpendicular to longitudinal axis SOLA) so that the tops of the tube are level with each other. The baseplate 5044 at the bottom ends 5066 of the tubes terminate at and define a second horizontal lower reference plane.

Figure 52:
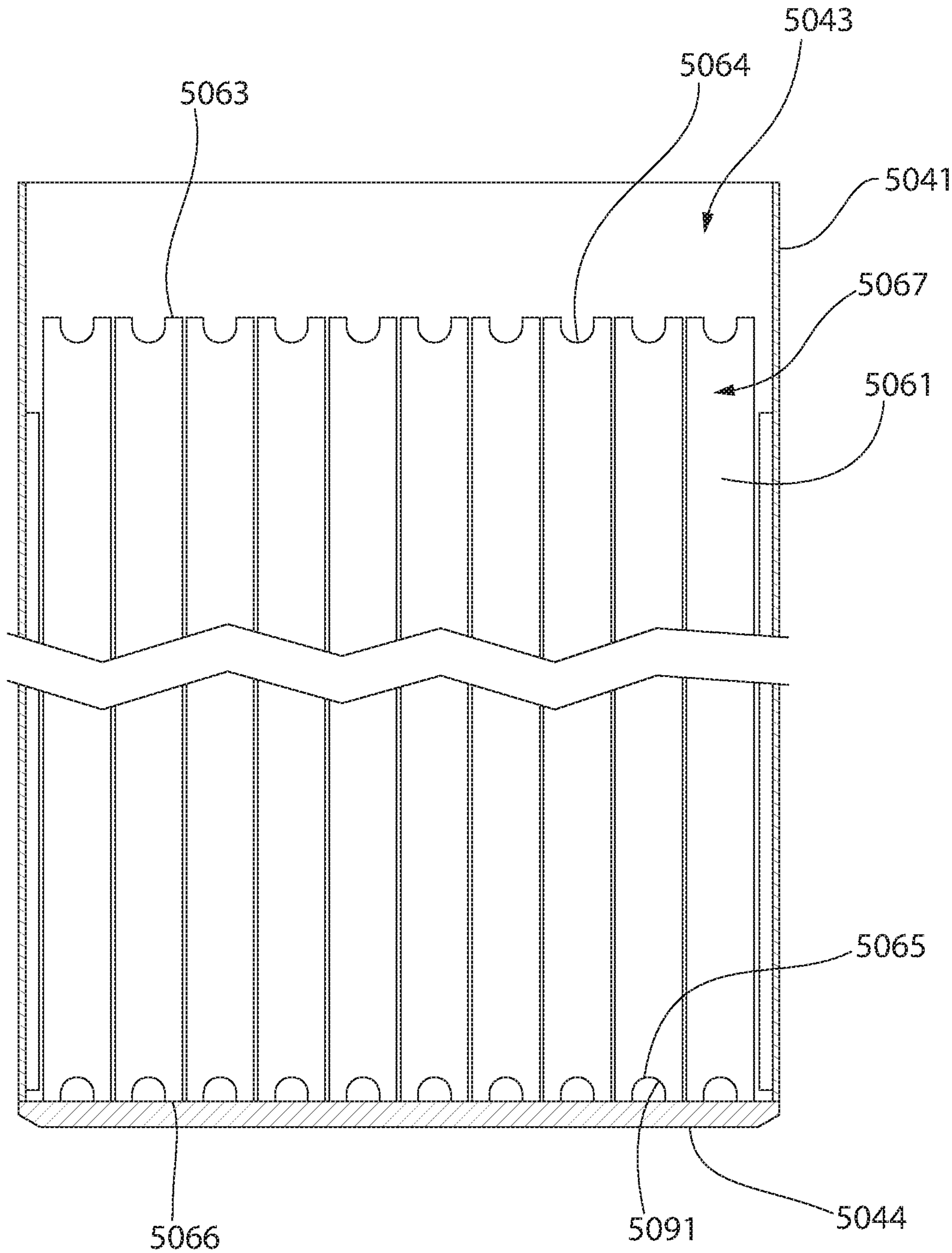
FIG. 52 is side cross-sectional view of the storage canister showing an array of fuel assembly storage tubes.

In one embodiment as shown in FIGS. 49 and 52, the top ends 5063 of each tube sidewall 5067 (cell walls) may be castellated or scalloped to define an upper flow cutout 5064 used to initially dry the wetted canister 5040 and fuel assemblies stored therein via air or an inert gas flow (e.g. nitrogen) after loading and removal of the assemblies from the spent fuel pool. The bottom ends 5066 of tubes 5061 may also similarly include air or gas lower flow cutouts 5065. The flow cutouts 5064, 5065 may be upwardly and downward open respectively, as shown. In one embodiment, the cutouts may be semi-circular or arcuate in shape as shown; however, any suitable shaped cutouts may be used. In other embodiments, the cutouts may have a non-rectilinear polygonal (e.g. triangular, hexagonal, etc.) or rectilinear polygonal configuration such as a square or rectangular shape somewhat similar to the square cutouts in the radiation attenuation inserts seen in FIG. 54. A combination of shapes may be used for the flow cutouts. Gas dehydration systems suitable for drying the canister 5040 include commonly-owned U.S. Pat. No. 7,210,247, which is incorporated herein for reference.

The metallic radiation attenuation insert 5080 (dose attenuation device) will now be further described with reference to FIGS. 50-51 and 54-56. Attenuation insert 5080 has a vertically elongated prismatic tubular body and shape comprising an open top end 5081, open bottom end 5082, and four perpendicularly arranged vertically elongated sidewalls 5083 extending between the ends. Insert 5080 is completely closed-sided by the sidewalls 5083 with no gaps therein forming a complete lateral enclosure for the fuel assembly 5050. An internal chamber 5084 defined by the sidewalls 5083 extends preferably for the full length or height 50H2 of insert from end to end. Chamber 5084 is configured and dimensioned in transverse cross section to hold a single fuel assembly 5050. Height 50H2 of the attenuation insert 5080 is preferably substantially coextensive with the height 50H1 of the fuel basket tubes 5061 for full lateral radiation shielding. The bottom ends 5082 of each attenuation insert 5080 are preferably flat and linear to rest on the flat top surface of the baseplate 5044 of the canister 5040 adjacent to and inside the bottom ends of the tubes 5061 in which the inserts are placed. The bottom ends of the inserts 5080 and tubes 5061 therefore terminate in the same horizontal plane defined by the top surface of the baseplate 5044.

Attenuation insert 5080 preferably has a rectangular box-like or cuboid configuration with rectilinear transverse cross section complementary configured to the cross section of the tube 5061 in which it is inserted. Each attenuation insert is configured to be inserted into and nest inside the perimetrically extending annular square gap 50G formed between a fuel assembly 5050 and the inner surface of the vertical sidewalls 5067 (cell walls) of each tube within its cell cavity 5068 which forms the fuel assembly storage cell 5062 (best shown in FIGS. 50 and 51). The attenuation insert 5080 therefore functions as a thin liner a fuel basket tube 5061 or cell 5062 which takes advantage of the available space or gap 50G between the fuel assembly 5050 and cell walls to attenuate radiation. The vertical centerline of the insert 5080 is coaxial with the vertical centerline of the storage tube 5061 when positioned therein. In some preferred embodiments, the insert 5080 has a sidewall thickness which may be less than the thickness of the tube sidewalls 5067 (see, e.g. FIG. 56). This is possible because the liner do not provide the majority of support for the fuel assembly 5050 in contrast to the fuel basket tubes 5061. In some examples, the thickness of the insert sidewalls 5083 may be from about and including 10-gauge to 16-gauge (metal gauge). The tube sidewalls 5067 are thus thicker than the insert gauge selected. The thickness of the insert sidewalls 5083 will vary depending on the available cavity 5068 to fuel assembly 5050 clearance gap G, and the allowable weight of the waste fuel.

Figure 54:
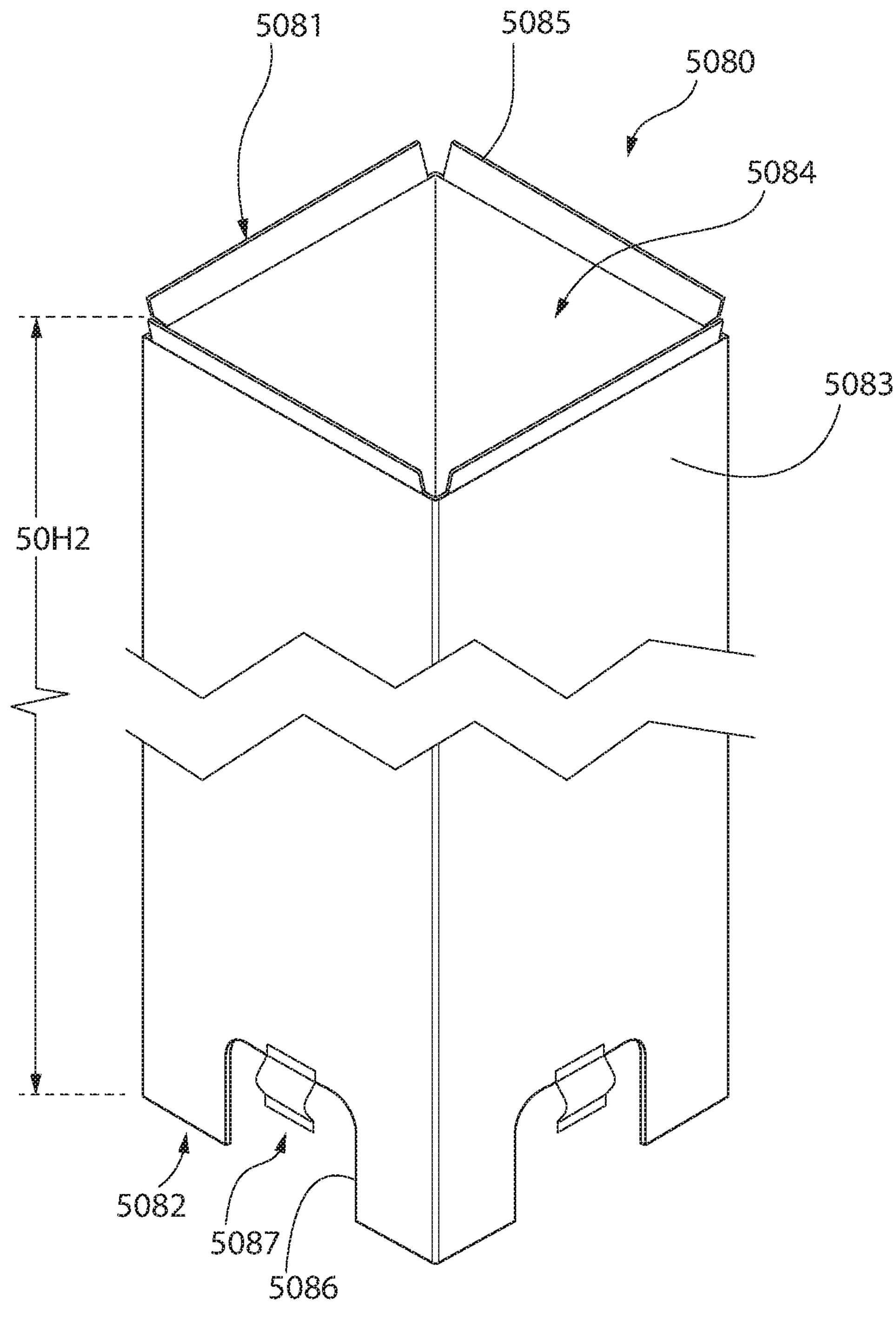
FIG. 54 is a perspective view of the radiation attenuation insert according to the present disclosure.
Figure 55:
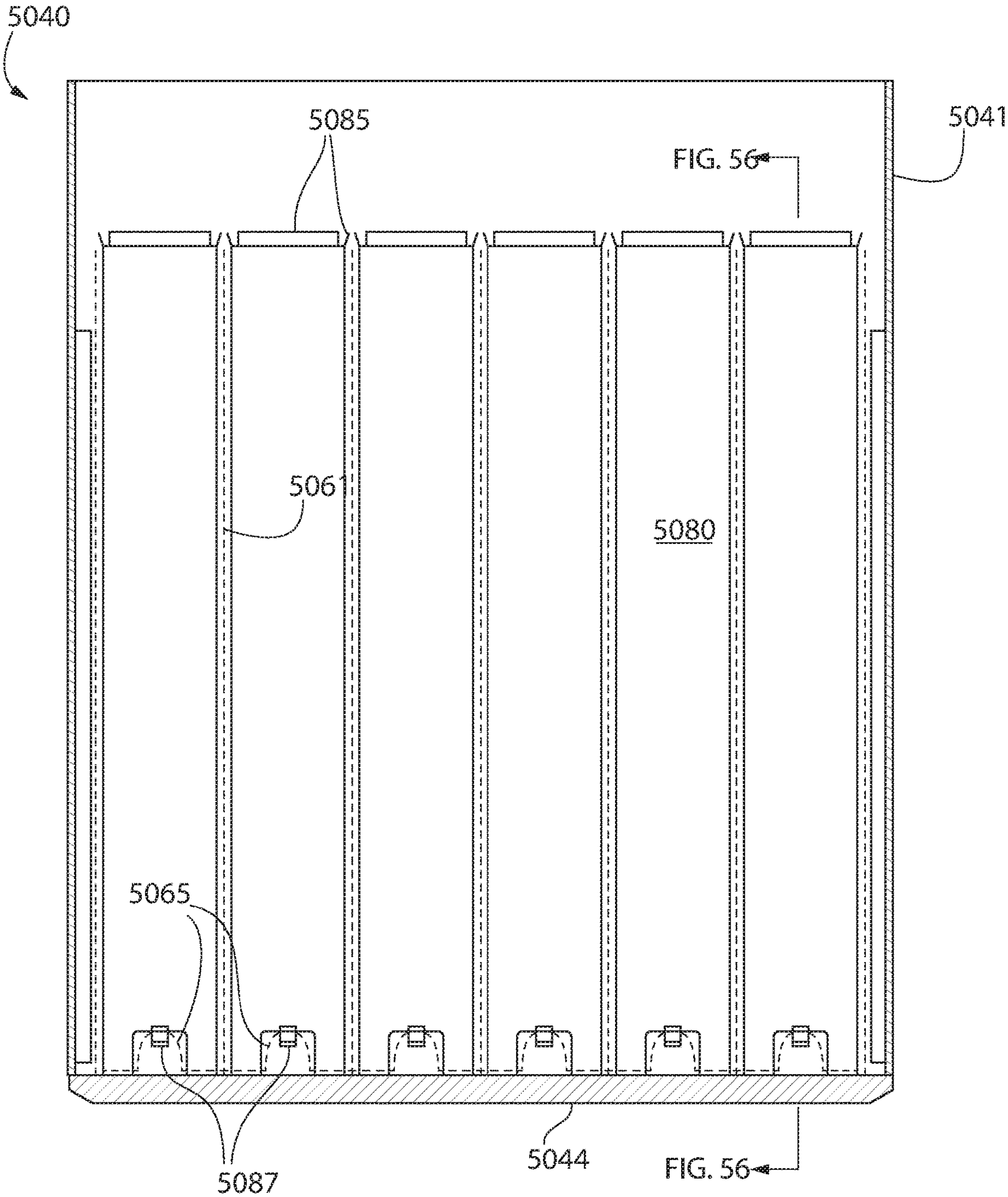
FIG. 55 is a side cross-sectional view of the storage canister showing an array of the radiation attenuation inserts therein and supported on a baseplate of the canister.
Figure 56:
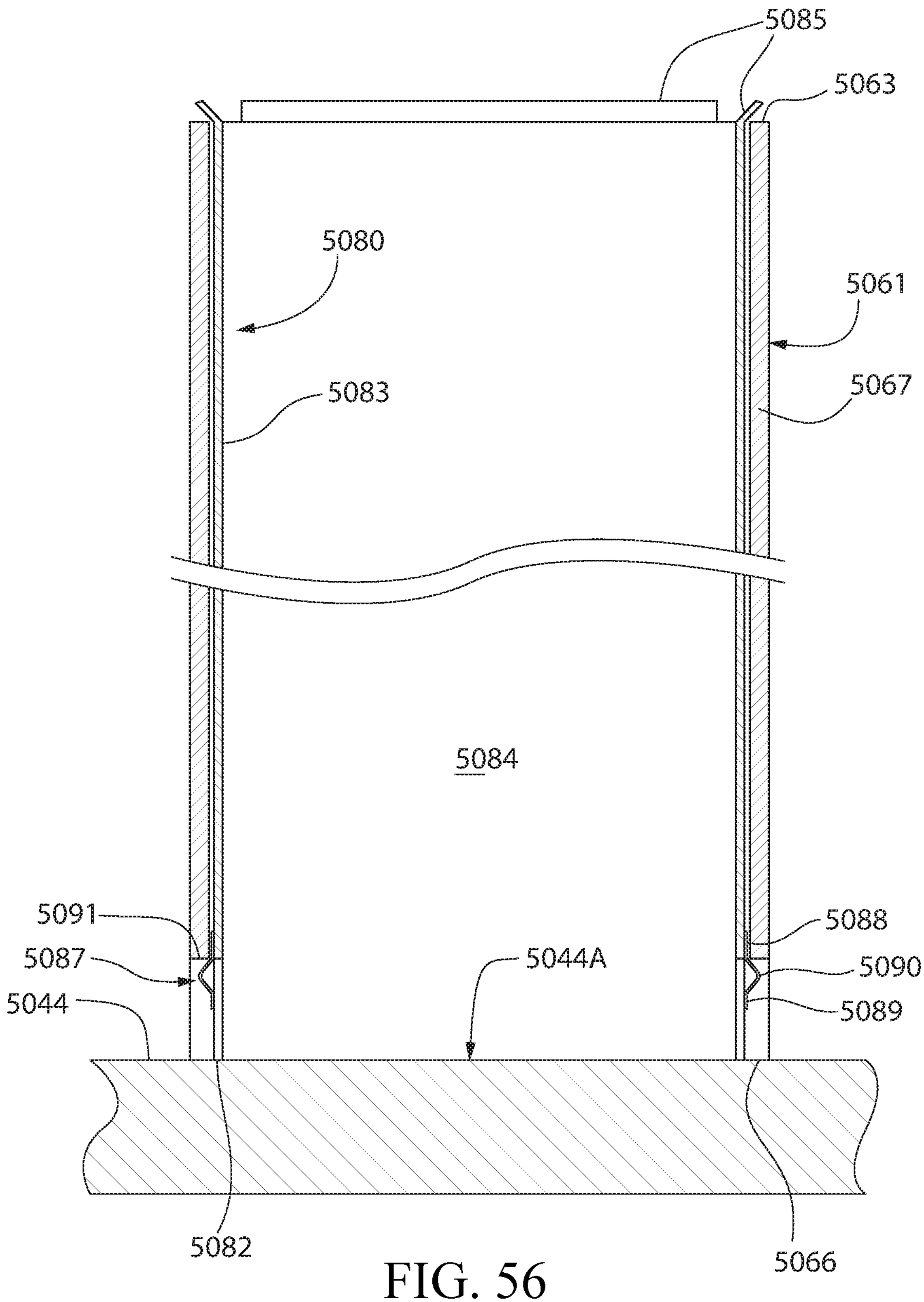
FIG. 56 is a cross-sectional view of one of the storage cells of the fuel basket assembly showing a radiation attenuation insert installed in a storage tube.
Figure 57:
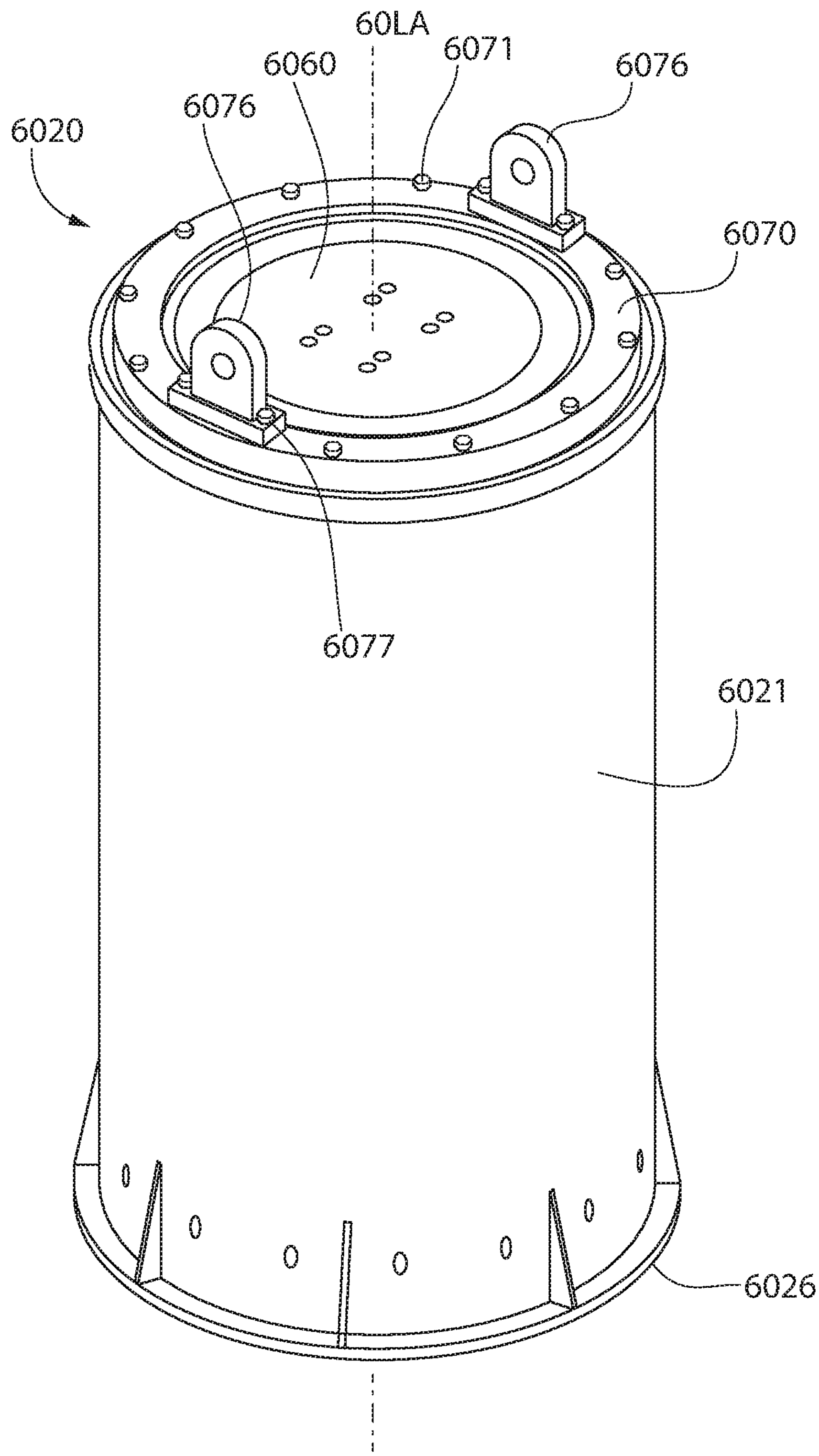
FIG. 57 is a perspective view of a multi-component transfer cask system for storage and transport of spent nuclear fuel according to the present disclosure.
Figure 58:
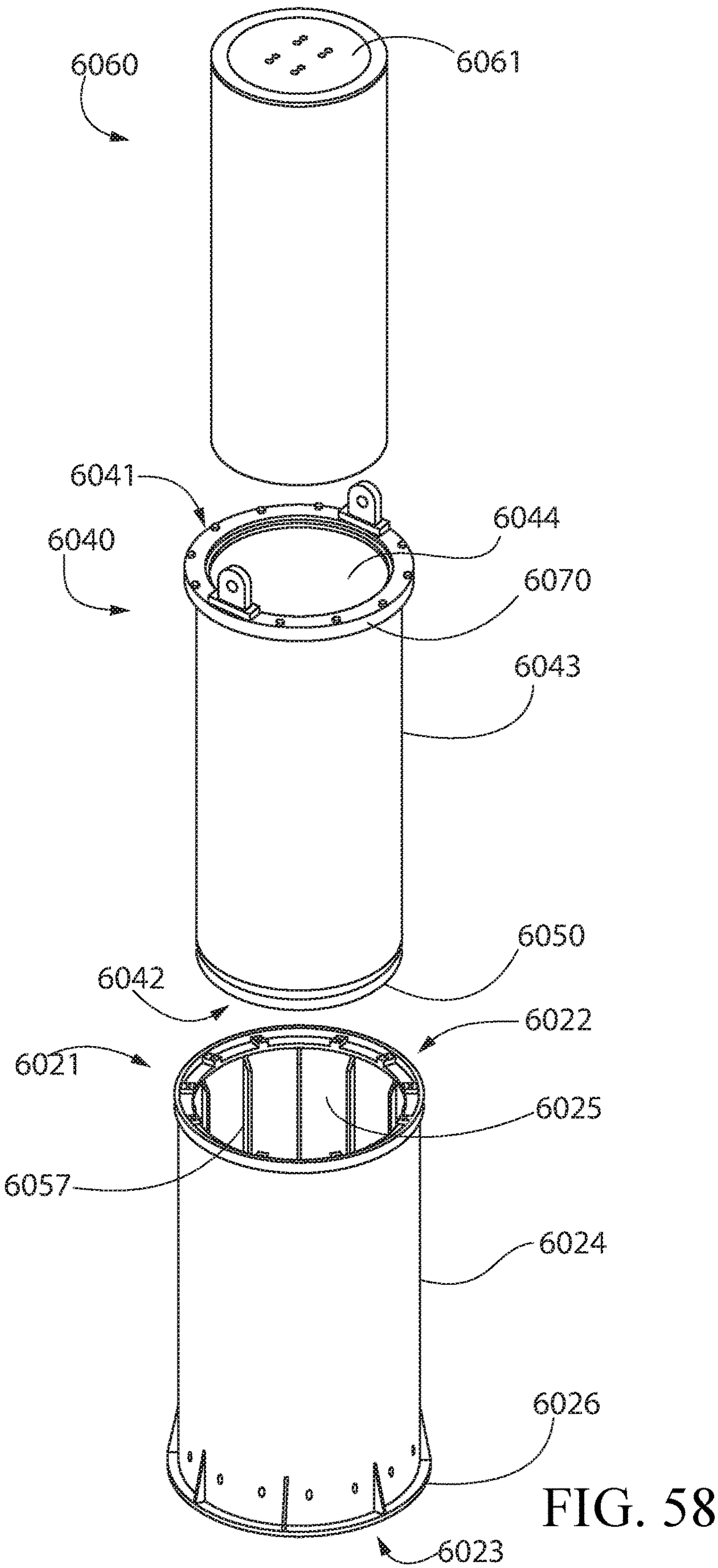
FIG. 58 is an exploded perspective view thereof.

To secure the attenuation insert 5080 in axial position within and relative to its respective fuel basket storage tube 5061, each insert includes an upper and lower axial retention or securement feature configured to engage and retain the insert in position inside the tube. In one embodiment, the upper axial securement feature may be formed by outwardly flared and angled securement flanges 5085 extending generally upwards from the top end of the attenuation insert sidewalls 5083 as best shown in FIGS. 54-56. The outwardly flared flanges 5085 are arranged to engage the top edges of the fuel assembly storage tubes 5061 at the top end 5063 of each cell 5062, thereby effectively locking the attenuation insert 5080 in vertical axial position inside and relative to the cell. In one preferably construction, each attenuation insert sidewall 5083 has a securement flange 5085 to secure the top end of the insert to the storage tube 5061 of the fuel basket 5060. The inclined or sloped surfaces defined by the angled securement flanges further facilitates sliding entry of the fuel assembly 5050 into the radiation attenuation insert 5080 when lowered by overhead equipment. This helps center the fuel assembly relative to the insert.

The lower securement feature of the attenuation inserts 5080 in one embodiment may include one or more axial restraints configured to further lock and fixate the bottom end of each insert in vertical axial position within the storage cells 5062 of the fuel basket 5060. Referring to FIGS. 52 and 7-9, the axial restraints in one non-limiting embodiment may each be formed by elastically and resiliently deformable locking members which may be in the form of a metal leaf spring angle clips 5087. Angle clips 5087 each have an elongated and undulating body formed of corrosion resistant spring steel. Clips 5087 each include an upper fixed end portion 5088 rigidly attached to the exterior surface of an attenuation insert sidewall 5083 and an opposite resiliently movable and cantilevered lower free-end locking portion 5089. Fixed end portion 5088 may be substantially flat and parallel to the longitudinal axis SOLA and insert sidewall 5083. Fixed end portion 5088 is fixedly attached to the exterior surface of the insert sidewall 5083 by any suitable means, such as without limitation welding, riveting, brazing, or threaded or un-threaded fasteners (e.g. screws, rivets, etc.) in some non-limiting examples.

Locking portion 5089 of angle clip 5087 extends downwardly from fixed end portion 5088 and includes an obliquely angled locking protrusion 5090 configured to engage the lower end portion of storage tube 5061. The lower-most end of locking portion 5089 may be substantially flat and parallel to the longitudinal axis SOLA and insert sidewall 5083. Locking protrusion 5090 may be located between this lower-most end and upper fixed end portion 5088 as shown in some embodiments.

Locking protrusion 5090 of angle clip 5087 may be generally triangular shaped in some embodiments as shown and projects laterally outwards from and beyond the sidewall 5083 of the attenuation insert 5080 to engage the storage tube 5061. The triangular shape of the locking protrusion 5090 advantageously allows it to automatically and detachably engage the storage tube 5061 when fully inserted therein, and to be axially withdrawn (in a direction parallel to longitudinal axis SOLA) when a dedicated and sufficient axial force is applied to pull the insert upwards out of its storage tube. This also beneficially permits the radiation attenuation inserts 5080 to be readily removed, re-used, and changed in position within a different cell 5062 of the fuel basket 5060 as needed based on the lateral radiation emission rates from different areas of the basket.

The locking spring angle clips 5087 are positioned on the lower half of the attenuation insert 5080 and arranged to engage an available locking surface or edge 5091 disposed on the lower half of the fuel assembly storage tubes 5061 in the fuel basket 5060. In one embodiment, the angle clips 5087 may be proximate to and spaced above the bottom end 5082 of the insert 5080. Clips 5087 are located and in a position to detachably but lockingly engage a free bottom locking edge 5091 of the storage tube 5061 when the insert is fully inserted into its respective storage tube 5061 and abuts the top surface 5044A of the common baseplate 5044. In one embodiment, the bottom locking edge 5091 of the tube 5061 may be defined by its lower flow cutouts 5065 (see also FIG. 52). Spring angle clips 5087 may be laterally/horizontally centered between the vertical edges of each attenuation insert sidewall 5083 as shown in FIGS. 54-56. In the illustrated embodiment, this coincides with the centered position of the flow cutouts 5065. In one embodiment, the angle clips 5087 are mounted proximate to the bottom end 5082 of the attenuation insert 5080 just above and at a downwardly open flow cutout 5086. Angle clips 5087 are vertically aligned with the flow cutouts 5086. Each sidewall 5083 of the radiation attenuation insert 5080 may include a flow cutout 5086 to promote uniform air or inert gas flow throughout the fuel basket 5060 when the fuel assemblies 5060 are dried after removal from the wet spent fuel pool. Preferably, the flow cutouts 5086 are horizontally/laterally aligned with and overlap a respective lower flow cutout 5065 formed in the storage tubes 5061. This advantageously forms a continuous substantially linear lateral air/gas flow path through the sidewalls of the tube 5061 and radiation attenuation insert 5080 into the interior chamber 5084 of each radiation attenuation insert from all sides in which the fuel assembly 5060 to be dried is positioned. Accordingly, the placement of the flow cutouts 5086 in radiation attenuation inserts 5080 is one important feature which does not impede the flow of drying air/gas through the fuel basket assembly of tubes 5061.

FIG. 49 depicts air/gas flow arrows showing the direction thereof during normal drying of a wet fuel assembly storage canister 5040. Air/gas is typically forced or drawn into the canister 5040 through tube or valve fittings in the canister lid 5042, and then flows downwards in the annular space between the fuel basket 5060 and inner surface of the canister shell 5041 as shown (see vertical flow arrows). The air/gas reaches the bottom of the canister 5040 (baseplate 5044), and then flows radially inwards through the lower flow cutouts 5065 in the tube sidewalls 5067 and mating through flow cutouts 5086 in the radiation attenuation inserts 5080 therein (not visible in FIG. 49). The air/gas flows upwards through the radiation attenuation inserts and fuel assemblies 5050 eventually exiting the tops of the inserts and tubes 5061 as shown from whence the air/gas is extracted back through the lid 5042 to the dehydration or vacuum drying system as previously described herein.

In one configuration, the radiation attenuation insert flow cutouts 5086 may be substantially rectilinear in shape as seen in the illustrated embodiment (some rounding of the corners may be used as shown to eliminate stress concentration factors in the insert metal which could lead to cracking at these locations). The angle clip 5087 protrudes downwards into the opening formed by flow cutout 5086 to engage the locking edge 5091 of the fuel assembly storage tube 5061. Other shaped flow cutouts 5086 may be used including any suitable non-rectilinear polygonal and non-polygonal configurations.

It bears noting that the use of the insert flow cutouts 5086 advantageously allows the radiation attenuation insert 5080 to have a height substantially coextensive with the height of the tubes 5061 in which the inserts are placed for optimum lateral radiation shielding, and further to be supported by the common canister baseplate 5044 along with the tubes.

Any suitable number of spring angle clips 5087 may be provided. In one embodiment, each sidewall 5083 of the attenuation insert 5080 has a respective angle clip as shown for maximum securement of the bottom end 5082 of the attenuation insert 5080 to its respective storage tube 5061. In other possible embodiments, however, only some of the sidewalls 5083 may include an angle clip 5087. If each sidewall 5083 does not have its own angle clip, preferably at least two angle clips 5087 are provided; each one being on opposite sidewalls of the insert 5080 for balanced securement.

The locking protrusion or spring angle clip 5087 is resiliently movable and deformable between an inward deflected and retracted position for sliding the attenuation insert 5080 into and vertically along the fuel assembly storage tube 5061 or cell 5062 in cavity 5068, and an outward undeflected and extended position for engaging the locking edge 5091 of storage tube 5061.

Figure 51:
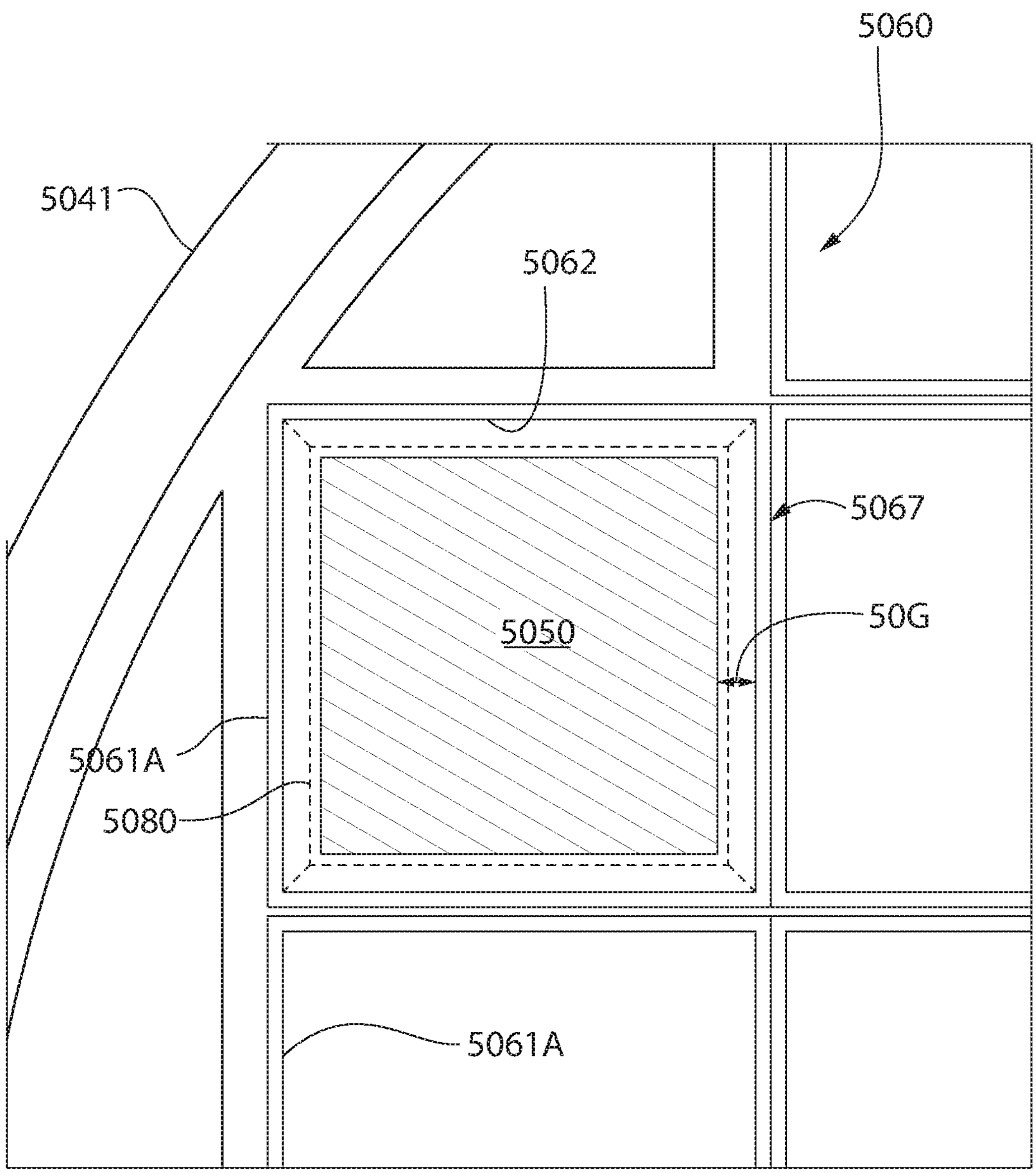
FIG. 51 is an enlarged detail taken from FIG. 50 showing a fuel assembly and radiation attenuation insert according to the present disclosure disposed in a peripheral cell of the fuel basket.

As previously described herein, the radiation attenuation inserts 5080 are preferably inserted and secured in only the outermost peripheral outboard tubes 5061A in one embodiment (see, e.g. FIGS. 50 and 51 showing inserts in some of the outboard tubes as an example). Because most of the radiation emanating from the fuel basket 5060 in the lateral direction is from the fuel assemblies 5050 located in these peripheral outboard tubes 5061A and cells 5062, the insert may be installed only in those peripheral cells that have a measured high radiation emission rate. This may include some of the outboard tubes 5061A, or all of the outboard tubes in various embodiments to form a complete radiation barrier around the entire perimeter of fuel basket 5060 to absorb radiation emanating in the lateral direction from the basket 5060. In some embodiments, certain ones of the inboard tubes 5061B may also have a radiation attenuation insert 5080 if they appear problematic from a lateral radiation emission standpoint in addition to some or all of the outboard tubes 5061A.

Operation of the attenuation insert securement features including the locking protrusion or spring clip 5087 and angled flanges 5085 will become evident by describing a method for installing the tubular radiation attenuation insert 5080 in an example storage cell 5062 of fuel basket 5060. A suitable peripheral cell 5062 candidate may first be selected for locking the insert 5080 in the outboard tube 5061A of the fuel basket 5060 (see, e.g. FIG. 51). The canister 5040 and fuel basket 5060 may be still submerged in the spent fuel pool in some embodiments and radioactively active. In the following scenario, the fuel assembly 5050 has not yet been installed in the selected outboard tube 5061A, or if already present may first be removed. However, in other embodiments, the present attenuation insert 5080 may advantageously be installed in a tube 5061 with the fuel assembly 5050 already positioned in the cell 5062 if necessary. It bears noting that the following operations are typically performed by heavy equipment in the nuclear facility such as an overhead crane and/or hoist used to handle and maneuver the canister 5040 with preinstalled fuel basket tubes 5061, fuel assemblies 5050, and radiation attenuation inserts.

A radiation attenuation insert 5080 is first positioned over and axially aligned with the selected peripheral outboard tube 5061 and its storage cell 5062. The locking spring angle clips 5087 are initially in their outward undeflected and extended position (see, e.g. FIG. 54). An overhead hoist or crane may be used to deploy and maneuver the insert 5080. The insert 5080 is then slowly lowered vertically into the tube 5061 and its cell cavity 5068 through the open top end 5063 of the tube. After the bottom end 5082 of the attenuation insert 5080 passes downward and through the tube top end 5063, the locking spring angle clips 5087 (locking portion 5089) slideably engage the top end. This causes the angle clips 5087 to compress and elastically deform inwards to the deflected and retracted positions against the inner surface of the storage tube sidewalls 5067. As the absorber insert 50400 continues to be lowered and slide farther downwards into the cell 5062, the locking portions 5089 of angle clips 5087 remains in the compressed retracted position. When the angle clip locking portions 5089 (i.e. locking protrusion 5090) eventually passes beneath the locking edge 5091 of storage tube 5061A in the lower portion of the tube, the spring angle clips 5087 will each snap back outwards via their elastic memory to their initial extended positions, thereby catching and lockingly engaging the locking edges 5091 of the tube 5061A formed by the tube's lower flow cutouts 5065 (see, e.g. FIGS. 55 and 56). This locking engagement between the tube 5061A and locking portion 5089 of each angle clip 5080 resists axially withdrawing the attenuation insert 5080 from the storage tube 5061A and cell 5062 when not applying an intentionally strong upward pulling force on the attenuation insert 5080 via the crane or hoist with the intention of removing the insert from the fuel basket 5060. The bottom end 5082 of the radiation attenuation insert 5080 engages the top surface 5044A of the canister baseplate 5044 inside the bottom end 5066 of the storage tube 5061A (see, e.g. FIG. 56).

In other possible embodiments, the radiation attenuation insert 5080 may be provided with locking angle clips 5087 and instead permanently installed inside the storage tube 5061 via any suitable means, such as welding, soldering, brazing, fasteners such as rivets or screws/bolts, etc.

As previously described herein, the gamma radiation attenuation insert 5080 in some embodiments may preferably be formed of a non-boron containing material and non-ferrous metal due to their high specific gravity and concomitant high densities in contrast to other materials. A preferred metallic material selected also further preferably has a high thermal conductivity to dissipate heat emitting by the decaying nuclear fuel in the fuel basket. The material selected should preferably also be sufficiently rigid to form a self-supporting tubular construction for the gamma radiation attenuation inserts. In one preferred embodiment, copper may be used for insert 5080 due to both its high thermal conductivity and high specific gravity which makes it more efficient at radiation attenuation and heat dissipation than other metals. If heat dissipation is not a major concern or criteria, however, then the insert 5080 may be made of other less thermally conductive materials such as austenitic stainless steel which is not as good a conductor of heat and has a lower density (e.g. 7.5-8.0 g/cc) than copper (e.g. 8.9 g/cc). Other possible metallic materials which may be used as candidates for insert 5080 if heat dissipation is not an overriding concern include Inconel® (e.g. 8.5 g/cc), Monel® (e.g. 8.4-8.8 g/cc), aluminum bronze (7.7-8.7 g/cc), Admiralty brass (e.g. 8.53 g/cc), copper-nickel alloy (cupronickel (e.g. 8.9 g/cc), and precipitation-hardened stainless steel (e.g. 7.8 g/cc). The foregoing densities are representative and not necessarily absolute values of all grades or alloys of the listed materials.

While the inventive concepts described herein have been illustrated with a spent fuel assembly fuel basket formed of square shaped storage tubes/storage cells and complementary configured radiation attenuation inserts, the fundamental design concept disclosed herein is also applicable to fuel cells of different cross-sectional shapes such as for example without limitation rectangular, other polygonal cross-sectional shapes such as triangular, hexagonal, and non-polygonal cross-sectional shapes. An example of a fuel storage assembly with circular fuel tubes/cells is shown for example in commonly-owned U.S. Pat. No. 8,929,504 which is incorporated herein by reference. An example of a fuel storage assembly with hexagonal shaped tube for hexagonal shaped fuel assemblies commonly used in Russian PWRs is shown for example in commonly-owned U.S. Pat. No. 9,728,284, which is incorporated herein by reference. Regardless of the cross-sectional shape of the radiation attenuation inserts, they may include the same features such as the outwardly flared flanges and spring clips disclosed herein, or other retention/securement features.

VI. Inventive Concept 6

With reference to FIGS. 57-70, a sixth inventive concept will be described.

FIGS. 57-69 depict a system for storing and transporting radioactive spent nuclear fuel comprising a cask 6020. Cask 6020 is vertically elongated defining a vertical longitudinal axis 60LA and includes outer neutron shield cylinder 6021 (NSC) and inner gamma blocker cylinder 6040 (GBC) detachably and removably positioned and inserted inside the outer cylinder. These cylinders may be variously referred to herein by their abbreviations/acronyms, full names, or simply inner and outer cylinders.

Outer NSC 6021 has an elongated body including a top end 6022, a bottom end 6023, cylindrical sidewall 6024 extending between the ends, and an internal cavity 6025. Cavity 6025 extends completely through the cylinder 6021 along the longitudinal axis from the top to bottom end. Cylinder 6021 includes an interior surface 6030 and opposing exterior surface 6030. NSC 6021 may be comprised of a single long cylinder body, or alternatively may be formed by a plurality of axially aligned and vertically stacked cylinder segments seal welded together at the joints between the segments to collectively form the cylinder body The bottom end 6023 of neutron shield cylinder 6021 may include a gusseted annular radial bottom support flange 6026 for support of the NSC and stiffening of the sidewall 6024 of the cylinder. The flange 6026 may extend radially/laterally completely from the interior surface 6030 of cylinder to the outer exposed exterior surface 6031 in one non-limiting embodiment (see, e.g. FIG. 63). The flange 6026 is configured and arranged to engage a platform 6073 surrounding a receptacle 6074 of a self-propelled wheeled or tracked vertical cask transport vehicle or crawler 6075 used to transport the fully loaded cask 6020 with loaded fuel canister, GBC, and NSC (represented schematically in FIGS. 69 and 70). Such cask transporters are well known in the art and commercially available from manufacturers such as Enerpac Heavy Lifting Technology and others. When the inner gamma block cylinder 6040 loaded with a fuel canister 6060 is mounted inside the outer NSC 6021, the bottom end of the GBC projects downwards below support flange 6026 into the upwardly open receptacle 6074 and may not engage any structural surface of the transport vehicle for support. Accordingly, the bottom support flange 6026 of the outer NSC supports the entire weight of the cask 6020 and spent fuel therein.

The top end 6022 of the cylinder 6021 may include an annular radial top flange 6027 defining an upwardly open top recess 6028. The flange 6027 is configured to form a vertically-extending annular lip 6027-1 extending circumferentially around the top end of the cylinder 6021. In one embodiment, the flange 6027 may be formed by an L-shaped metallic structural angle comprising a horizontal section 6027-2 and adjoining vertical section which defines the annular lip 6027-1 that defines a perimeter of the flange (see, e.g. FIG. 62). Both the top and bottom flanges 6026 and 6027 are rigidly coupled to the sidewall 6024 of the neutron shield cylinder 6021 such as via seal welding. Each flange 6026, 6027 may further protrude radially outward beyond the sidewall 6024 of neutron shield cylinder 6021 as shown in one non-limiting embodiment.

Figure 60:
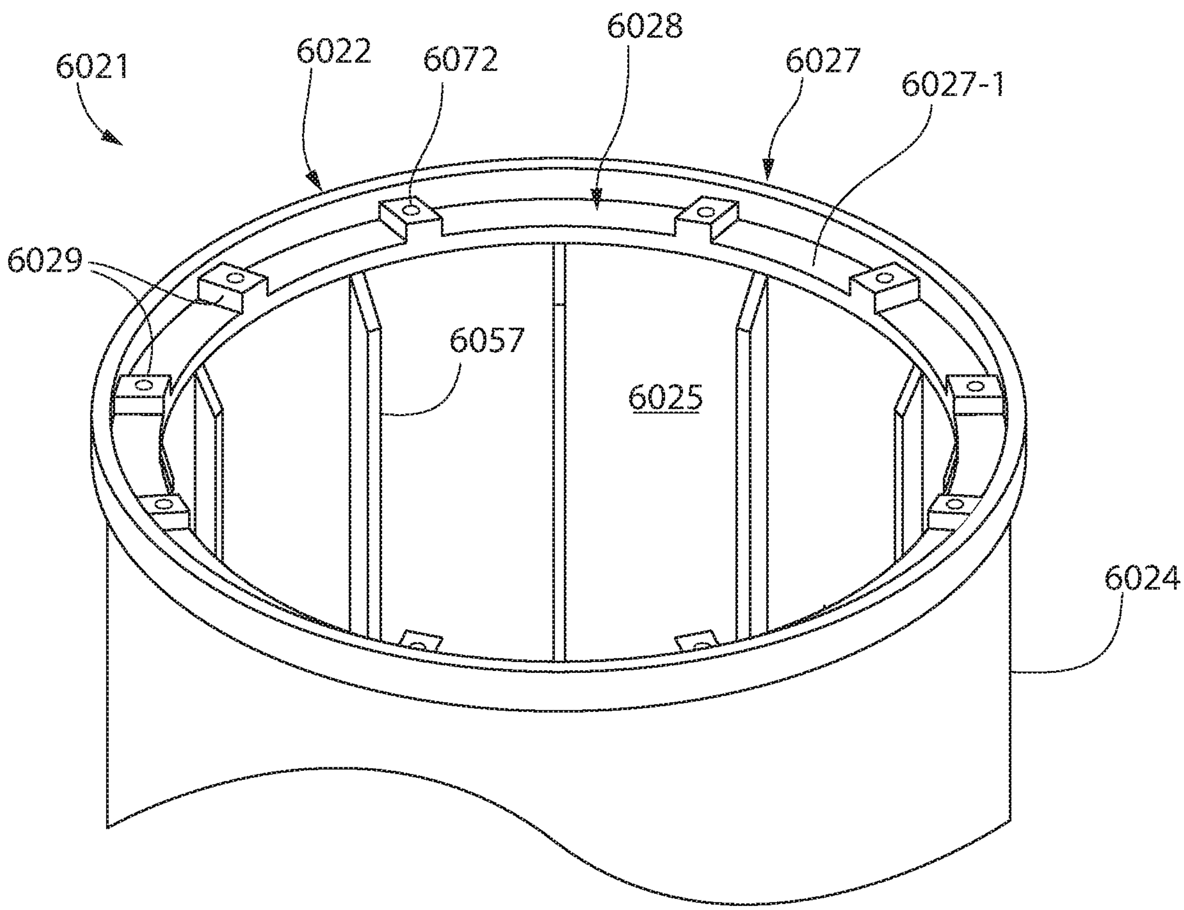
FIG. 60 is an enlarged top perspective view of the top of the neutron shield cylinder showing longitudinal guide splines and other features.

In one embodiment, the top end 6022 of the outer neutron shield cylinder 6021 may be castellated in configuration including a plurality of castellations formed by raised spacer blocks 6029 disposed in the top recess 6028 of the cylinder created by top mounting flange 6027 (see, e.g. FIG. 60). The spacer blocks 6029 extend vertically upwards from a planar upward facing surface 6027-1 of the top flange 6027. Spacer blocks 6029 may be rectangular or square cuboid in shape. Blocks 6029 may be circumferentially spaced apart on the top flange 6027 at preferably regular intervals in one embodiment to uniformly engage the mounting flange 6070 of the inner gamma blocking cylinder 6040 and support the cylinder, as further described herein.

Figure 63:
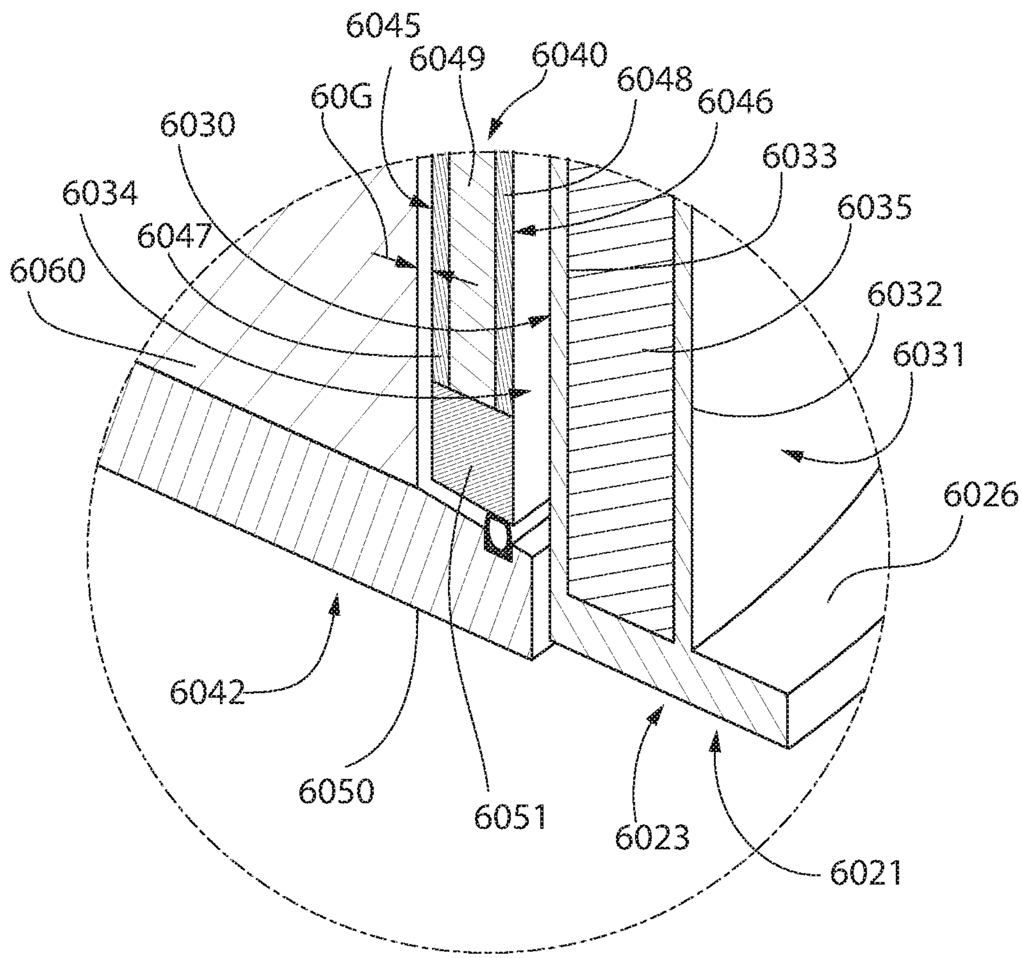
FIG. 63 is an enlarged bottom detail of the cask taken from FIG. 61.

In one embodiment, the neutron shield cylinder 6021 may have a composite wall construction including an inner cylindrical shell 6033 and outer cylindrical shell 6032 with a neutron attenuation shielding media 6035 sandwiched therebetween (best shown in FIG. 63). The shells may be formed of a suitable metal of sufficient structural strength and thickness such as without limitation stainless steel for corrosion protection. The neutron shielding media 6035 may be a boron-containing material for neutron attenuation. In one embodiment, the neutron shielding may be a solid material such as Holtite™ available from Holtec International of Camden, N.J. which is formulation comprising hydrogen rich polymer impregnated with uniformly dispersed boron carbide particles. Other boron containing materials may be used. In other embodiments, the neutron shielding media 6035 may be liquid such as water containing boric acid. In either the case of a solid or liquid neutron shielding media, the media may be completely enclosed or encased between the walls 6032, 6033 and the top and bottom flanges 6027, 6026 of cylinder 6021 as shown.

The inner gamma blocking cylinder 6040 will now be further described. Referring generally to FIGS. 57-69, the inner cylinder 6040 has an elongated body including a top end 6041, a bottom end 6042, sidewall 6043 extending between the ends, and an internal cavity 6044. Sidewall 6043 may be cylindrical with circular transverse cross section in some embodiments to match the cylindrical shape of the fuel canister 6060. However, other non-cylindrical shaped sidewalls such as hexagonal or other for example.

Cavity 6044 of gamma block cylinder 6040 extends completely through the body of the cylinder 6040 along the longitudinal axis 60LA from the top to bottom ends 6041, 6042. Cavity 6044 is configured to hold and support the nuclear spent fuel canister 6060 therein. The cavity 6044 of the gamma block cylinder 6040 preferably has a transverse cross-sectional area configured to hold no more than a single spent nuclear fuel canister 6060, which in turn holds a plurality of spent fuel assemblies which each contain the fuel rods. Canister 6060 includes a sealable lid 6061 to provide access to the interior of the canister and fuel assemblies stored therein. A typical nuclear fuel canister may hold approximately 6089 fuel assemblies at full capacity. The inner cylinder 6040 further includes an interior surface 6045 and opposing exterior surface 6046. The gamma block cylinder 6040 may be comprised of a single long cylinder body, or alternatively may be formed by a plurality of axially aligned and vertically stacked cylinder segments seal welded together at the joints between the segments to collectively form the cylinder body.

In one embodiment, the GBC 6040 may have a composite wall construction including an inner cylindrical shell 6047 and outer cylindrical shell 6048 with a gamma blocking liner 6049 interposed and sandwiched therebetween (best shown in FIG. 63). An annular bottom closure ring 6051 may be provided to enclose and support the bottom ends of the two shells and liner. The shells 6047, 6048 may be formed of a suitable metal of sufficient structural strength and thickness such as without limitation stainless steel for corrosion protection. The gamma blocking liner 6049 material is preferably constructed of a high density and high thermally conductive metallic material(s) selected and operable to block gamma radiation. Suitable materials which may be used that meet those criteria include steel, lead, or copper as some non-limiting examples. In one implementation, the composite wall construction may be steel/lead/steel—all of which serve to block gamma radiation emitted by the decaying nuclear fuel held inside the fuel canister 6060 disposed in cavity 6044 of the GBC.

Figure 61:
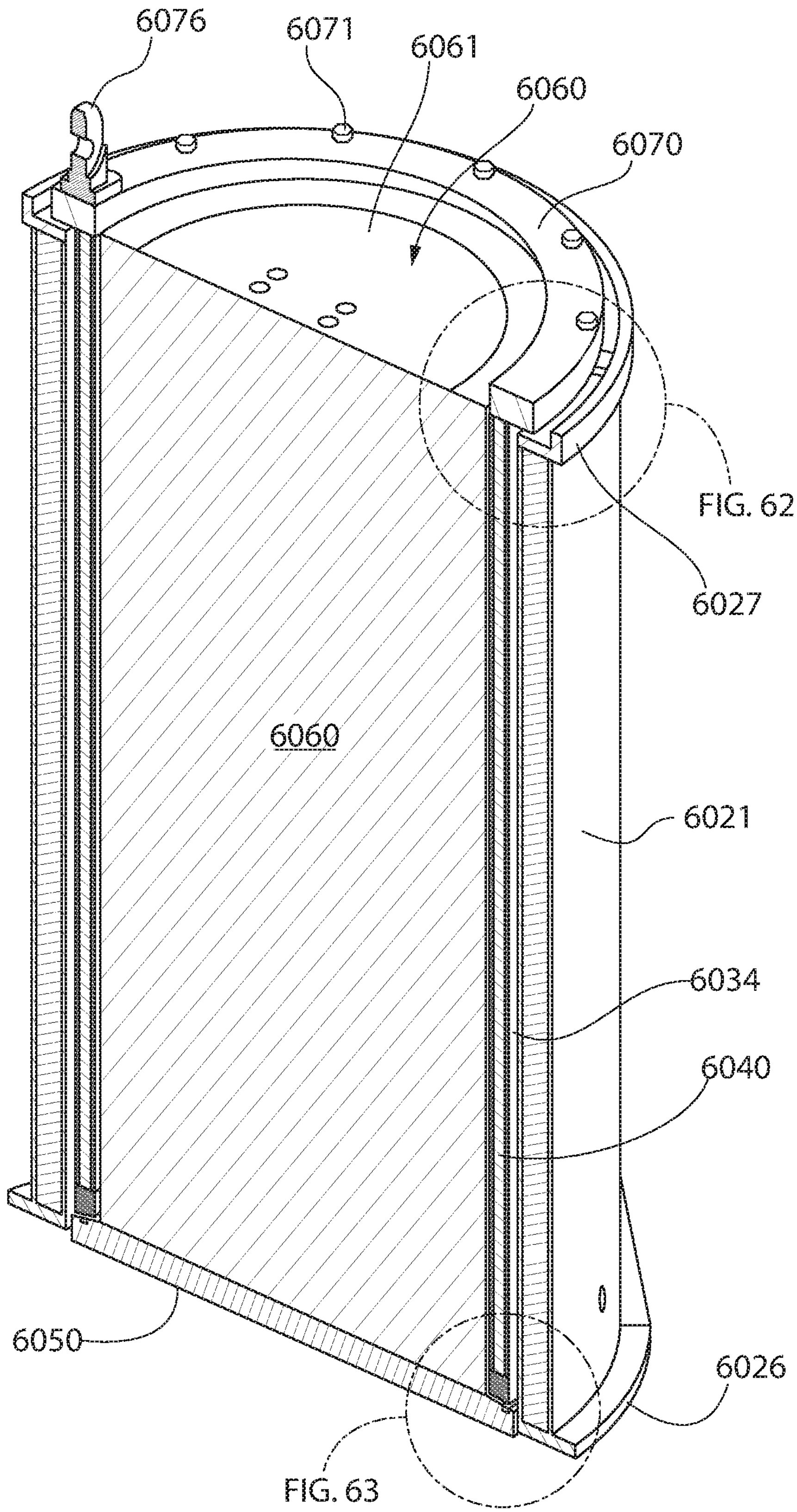
FIG. 61 is a side cross-sectional perspective view of the transfer cask.
Figure 64:
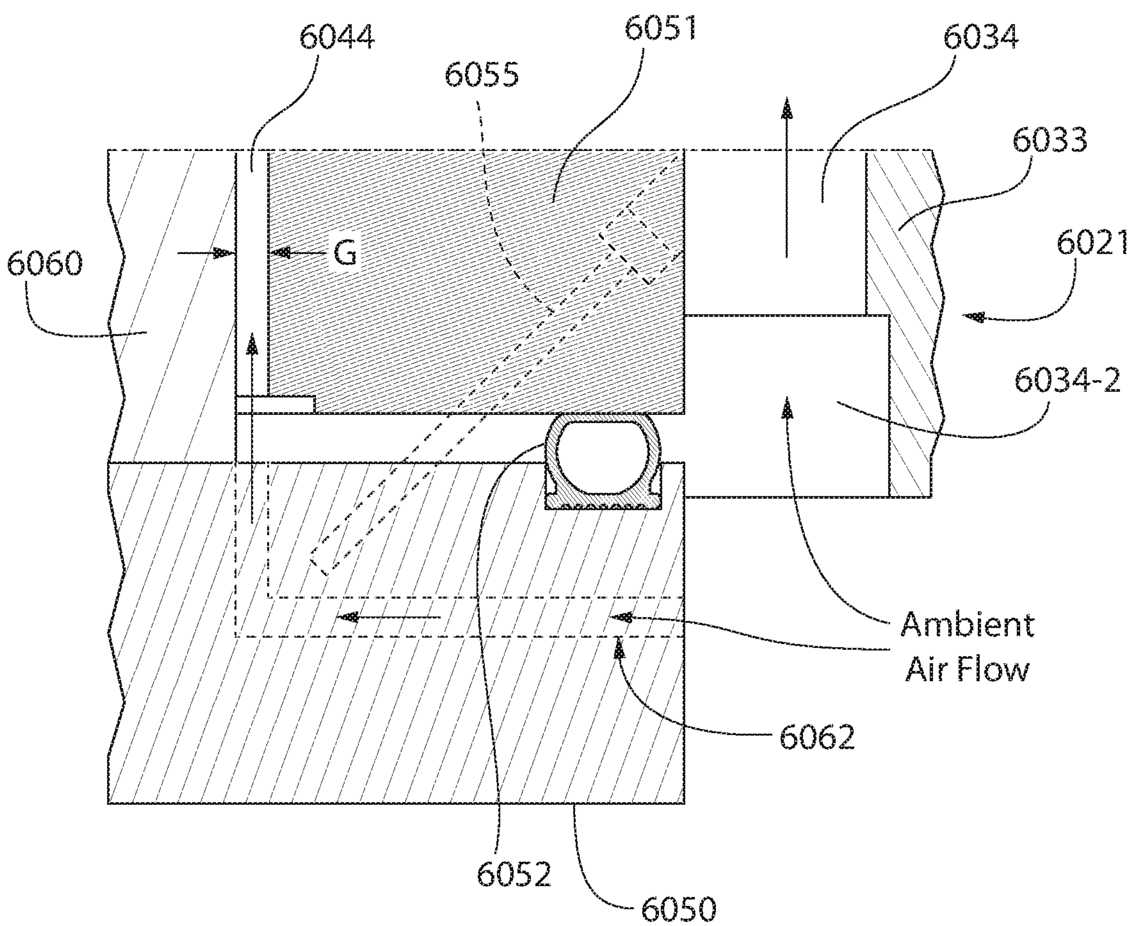
FIG. 64 is an enlarged side view detail of the bottom portion of the cask showing sealing and air flow patterns.

The cavity 6044 at the bottom end 6042 of GBC 6040 may be closed by a detachable bottom lid 6050 best shown in FIGS. 61, 63, and 64. Lid 6050 protrudes vertically downwards below the bottom support flange 6026 and bottom end 6023 of the outer neutron shield cylinder 6021 when the inner gamma block cylinder 6040 is placed therein.

The lid 6050 is constructed to support the spent fuel canister 6060 which rests on the planar horizontal top surface of lid, which is of suitable thickness for this purpose without undue deflection from the weight of the canister.

Figure 65:
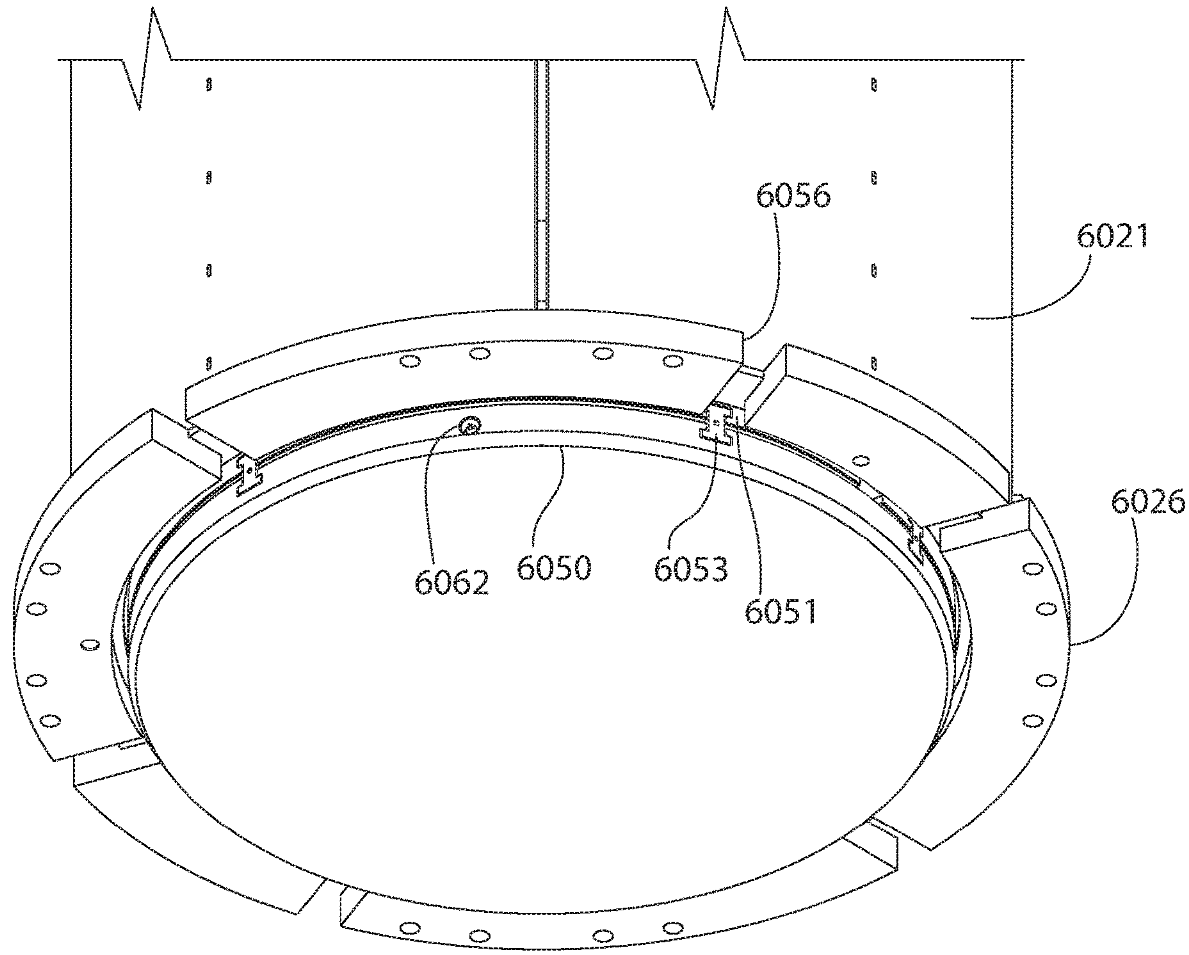
FIG. 65 is a bottom perspective view of the cask shown a mounting mechanism for attaching a bottom lid to the inner gamma block cylinder.
Figure 66:
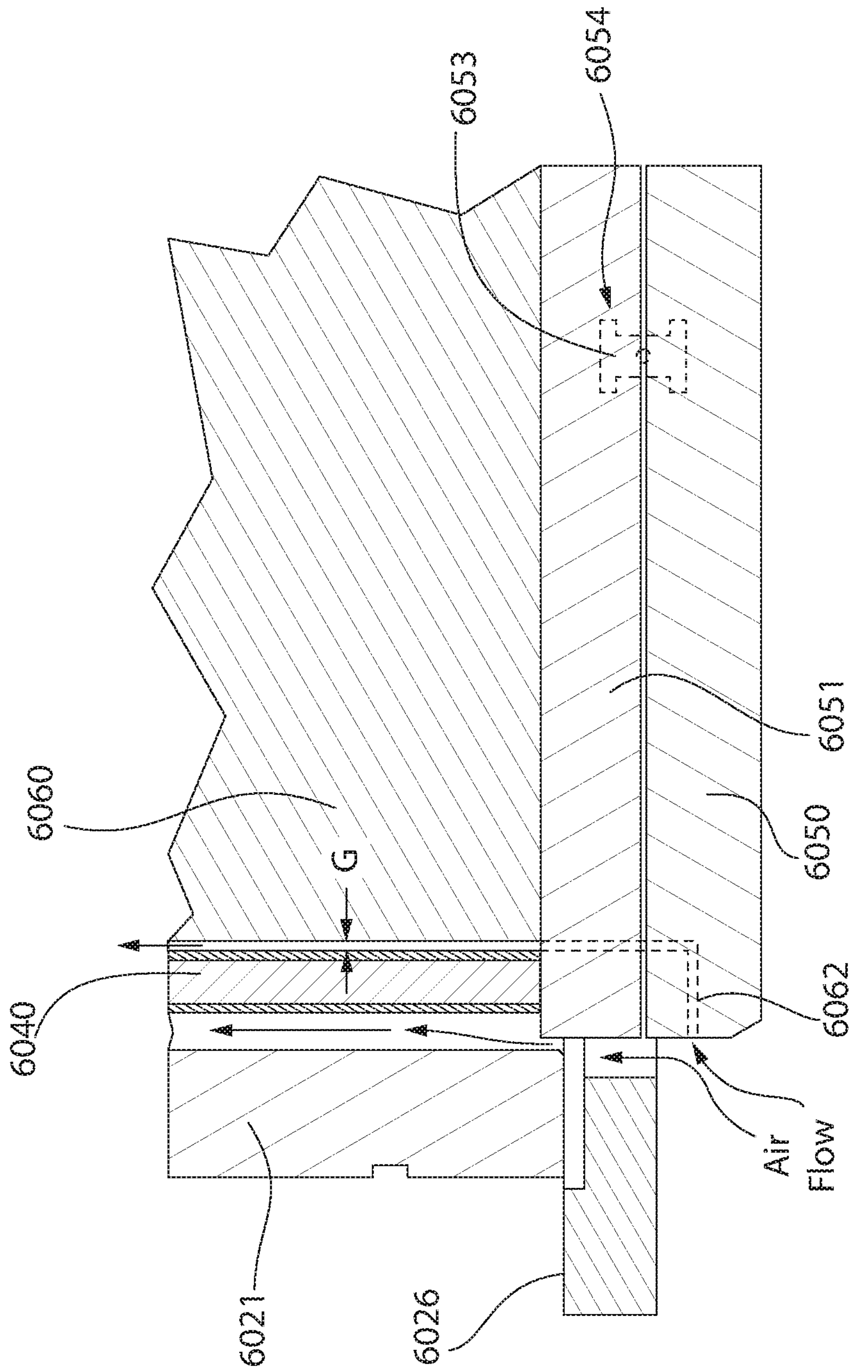
FIG. 66 is an enlarged detail of the bottom portion of the cask showing the mounting mechanism of FIG. 65.
Figure 67:
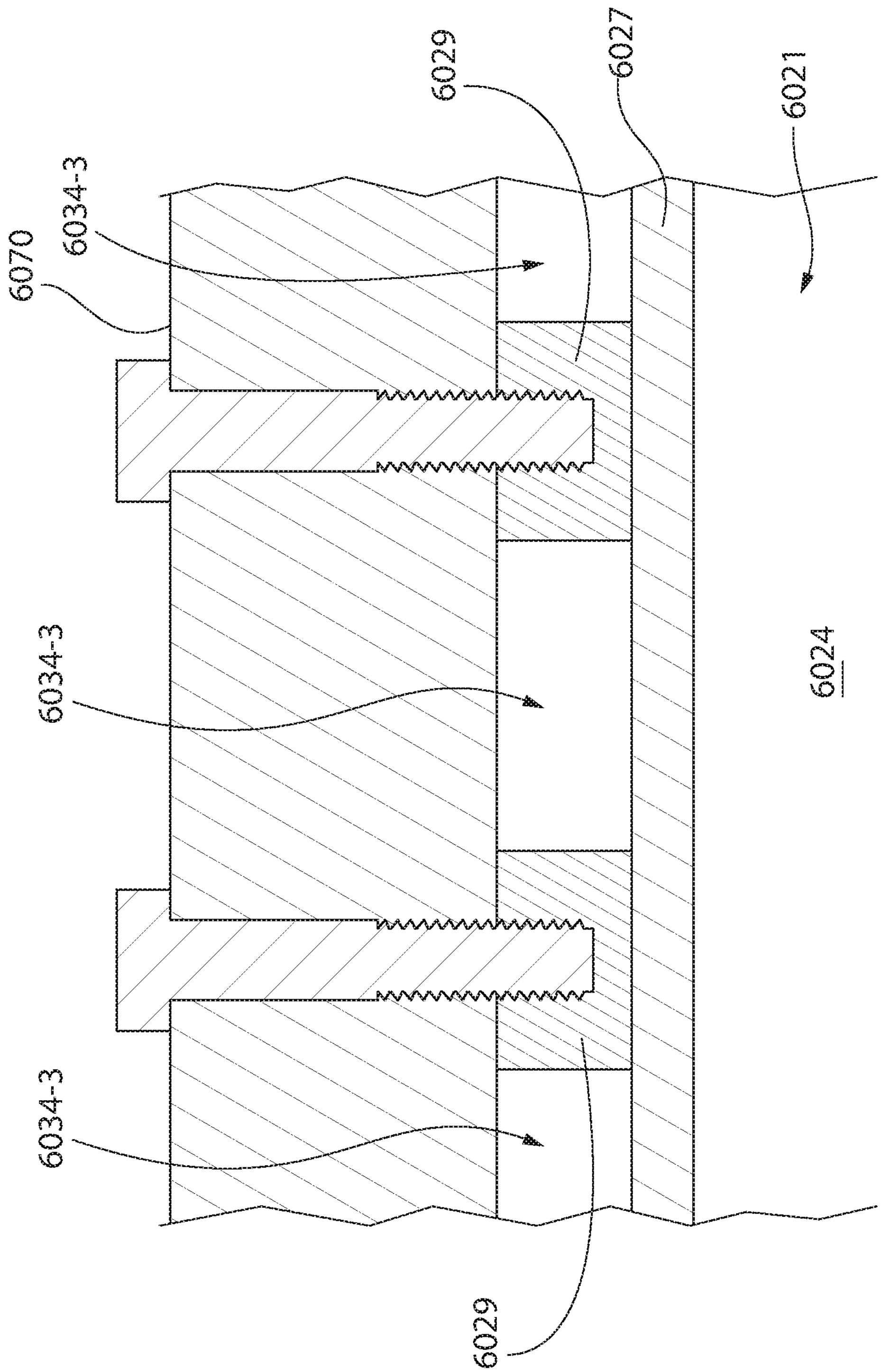
FIG. 67 is an enlarged side cross-sectional view showing a mechanism for coupling the mounting flanges of inner gamma block cylinder to the outer neutron shield cylinder.
Figure 68:
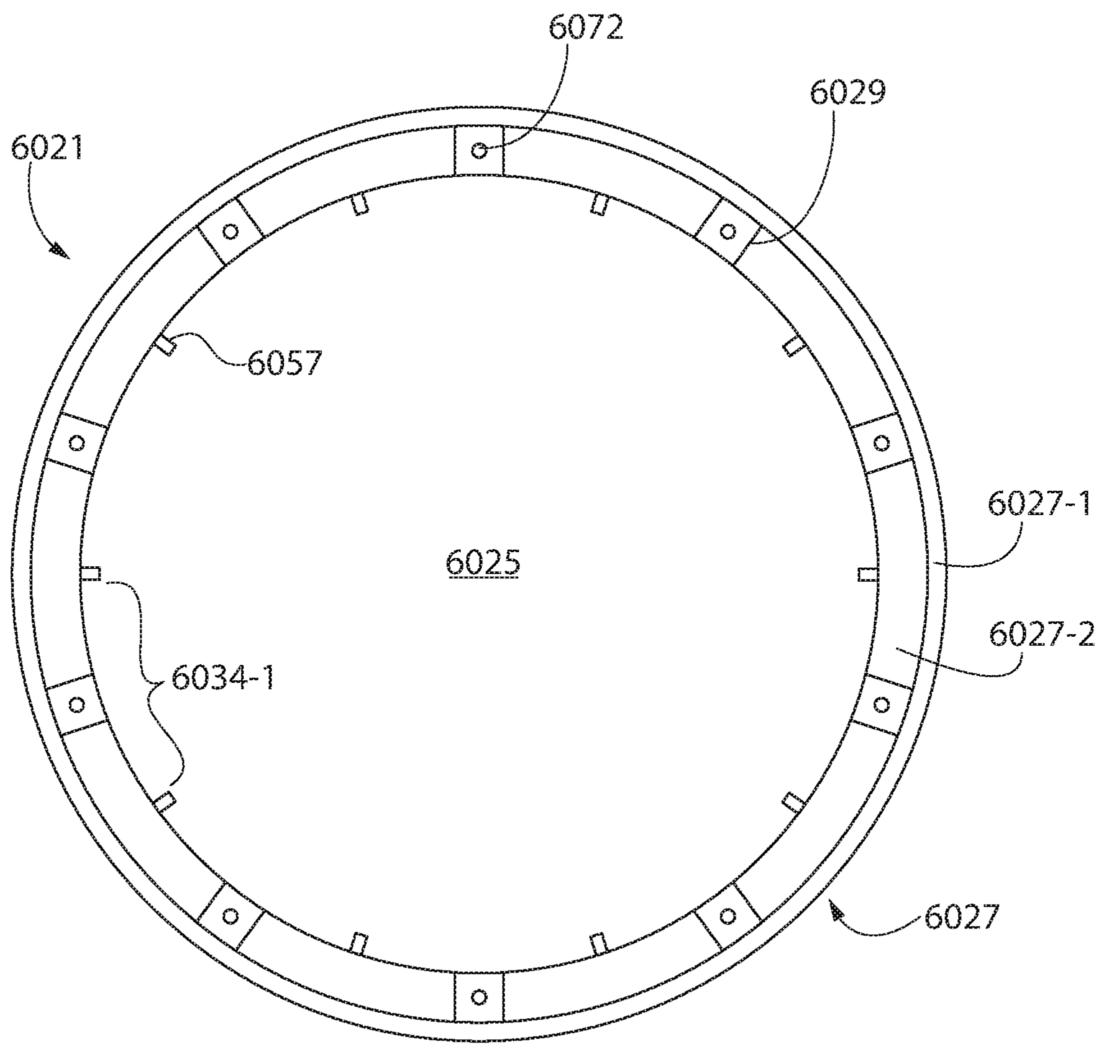
FIG. 68 is a top view of the neutron shield cylinder.
Figure 69:
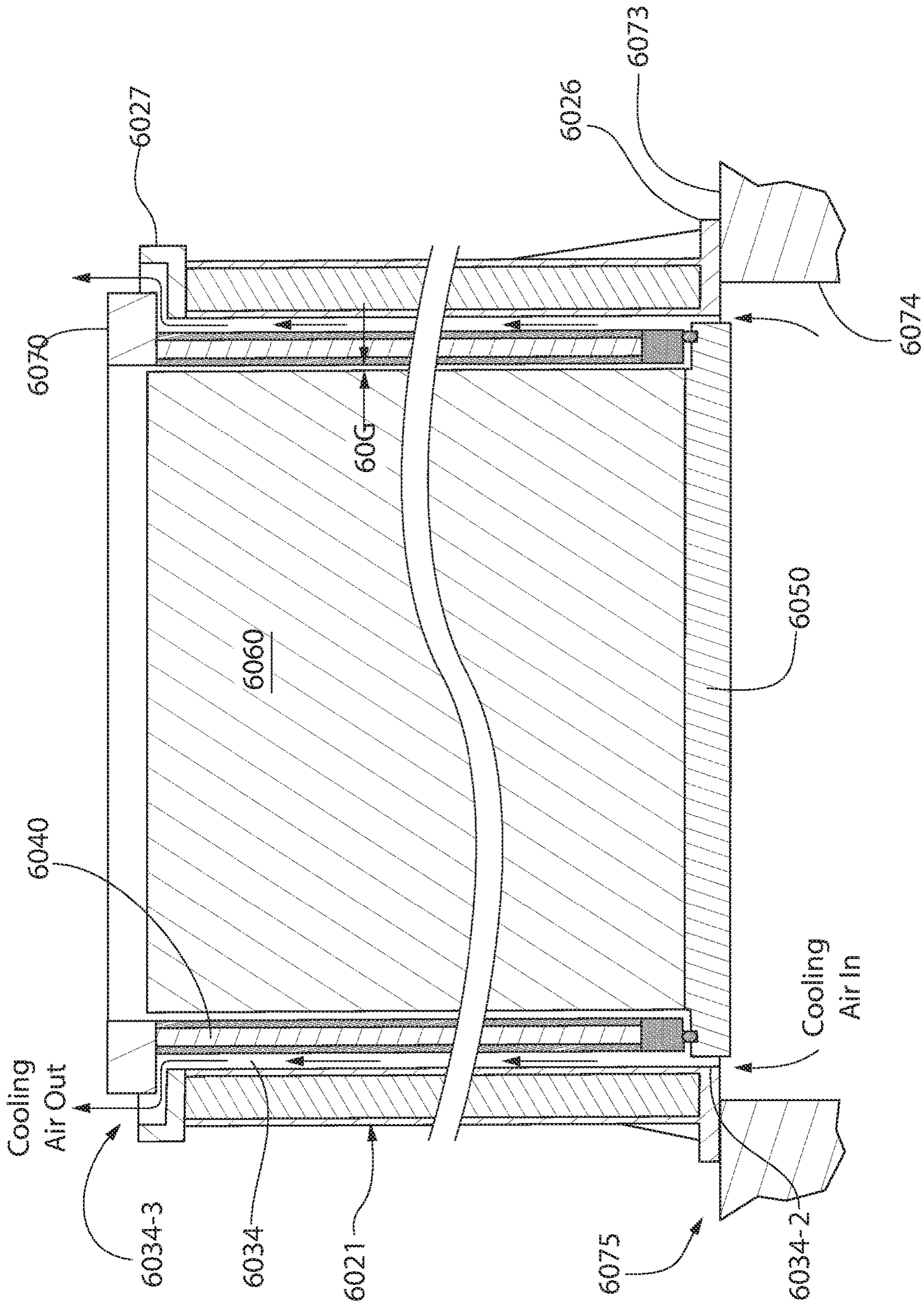
FIG. 69 is a cross-sectional side view showing the air ventilation system of the cask.

Lid 6050 may be removably coupled to the bottom closure ring 6051 of cylinder 6040 by suitable fasteners selected to form an interlocked arrangement between the ring and lid. In one embodiment, as best seen in FIGS. 65 and 66, a plurality of locking keys 6053 at circumferentially spaced intervals around the perimeter of cylinder 6040 and lid 6050 may be used to couple the lid to the closure ring 6051. The keys 6053 are inserted into complementary configured locking slots 6054; a half-portion of the slots being formed in each of the adjoining bottom closure ring 6051 and lid 6050 which collectively define the shape of the locking slot. Slots 6054 are laterally open and extend radially inwards into the cylinder 6040 towards longitudinal axis 60LA for a suitable distance. The keys 6053 may be polygonal shaped, and preferably rectilinear polygon shaped in one non-limiting embodiment. In one embodiment, the keys 6053 and mating slots 6054 may be I-shaped as shown. Other shaped keys including non-polygonal shapes however may be used so long as an interlocked arrangement is formed between the bottom closure ring 6051 and lid 6050 of the GBC. The shape of the key is not limiting of the invention.

To provide access to locking keys 6053 when the inner gamma blocker cylinder 6040 is inserted in the outer neutron shield cylinder 6021, a plurality of radially extending and laterally open access slots 6056 may be formed in the bottom flange 6026 of the outer cylinder 6021 (best shown in FIG. 65). Each key 6053 has an associated access slot 6056.

In other possible implementations, threaded fasteners 6055 (represented in dashed lines in FIG. 64) such as bolts may be used to detachably couple the lid 6050 to the bottom closure ring 6051 of the GBC. The fasteners 6055 may be inserted at a diagonal orientation relative to the closure ring and lid as shown. In one embodiment, the interface between the lid 6050 and bottom closure ring 6051 may be sealed by an annular gasket or seal 6052 formed of a suitable resiliently compressible elastomeric material or rubber. The seal is selected and configured to seal the internal cavity 6044 of the gamma blocker cylinder 6040 which holds the nuclear waste fuel canister 6060 in an air-tight and liquid-tight manner.

The bottom lid 6050 preferably does not extend beyond the sidewall 6043 of the gamma blocker cylinder 6040 as best shown in FIG. 64. This provides unimpeded insertion of cylinder 6040 into the outer neutron shield cylinder 6021 and maintains clearances for formation of the cooling air ventilation annulus 6034 between the inner and outer cylinders further described herein. To facilitate centering and insertion of the inner cylinder 6040, a plurality of longitudinal guide ribs or splines 6057 may provide on the interior surface 6030 of the outer cylinder 6021 in cavity 6025. Guide splines 6057 are circumferentially spaced and vertically elongated extending longitudinally along the longitudinal axis 60LA for preferably a majority or more preferably substantially the entirety of the longitudinal length of the cavity 6025. Splines 6057 extend radially inwards into the cavity 6025 a short distance beyond the inner diameter of the NSC top flange 6027 which circumscribes the top opening of the outer neutron shield cylinder 6021 to ensure engagement with and guidance of the inner cylinder 6040 as it is lowered therein. The top ends of the splines 6057 may be obliquely angled to facilitate centering and entry of the inner cylinder 6040 into the outer cylinder cavity 6025, and smoothly engage the peripheral edges of the bottom lid 6050 of the inner cylinder if not perfectly aligned coaxially with the longitudinal axis 60LA of the cask when lowered into the outer cylinder by a crane. It bears noting that the guide splines 6057 further serve an important function of maintaining a substantially uniform cooling air ventilation annulus 6034 between the inner and outer cylinders 6040, 6021. The guide splines 6057 may be permanently attached to the outer neutron shield cylinder 6021 by welding in one embodiment.

Figure 62:
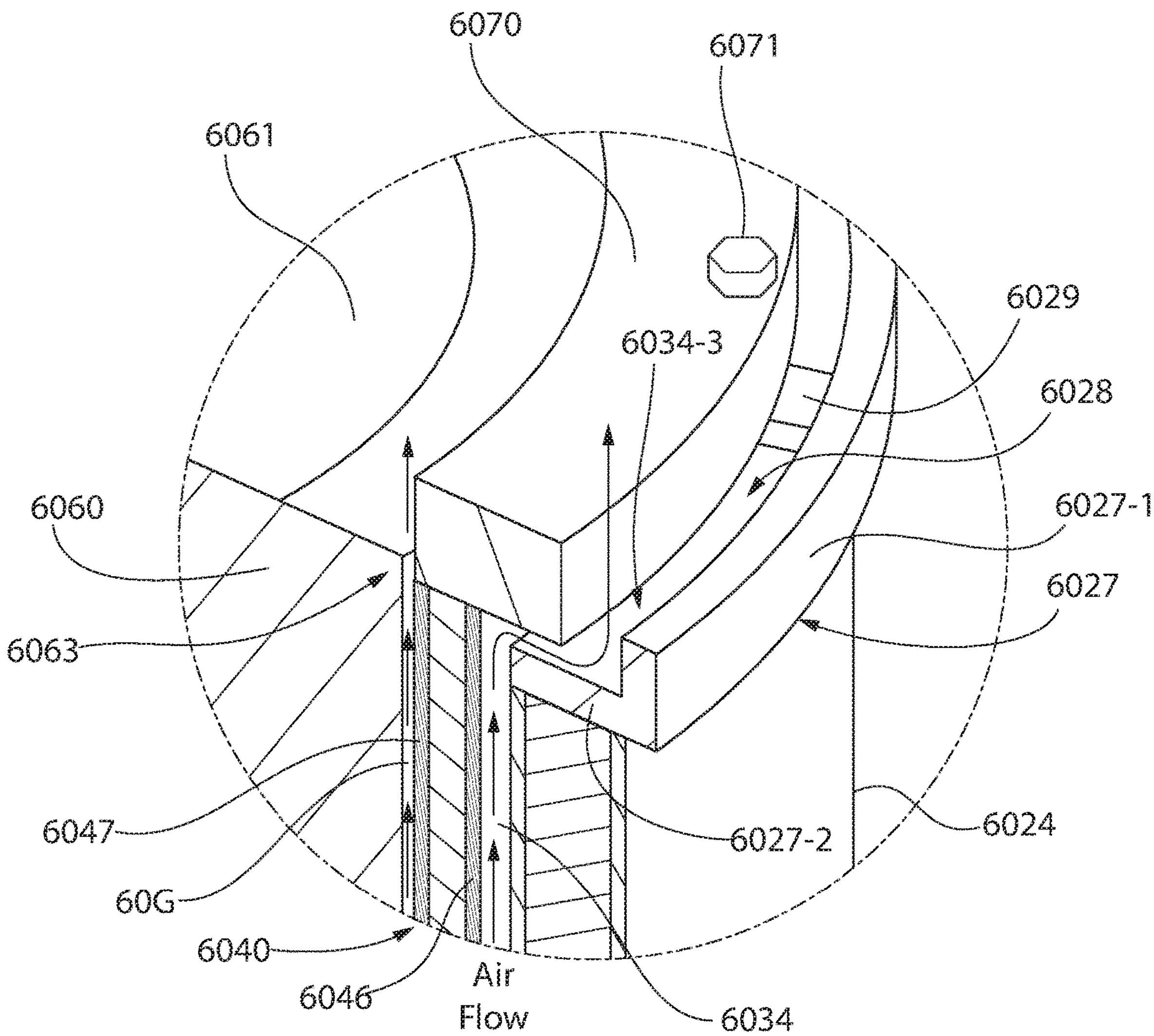
FIG. 62 is an enlarged top detail of the cask taken from FIG. 61 showing a mounting flange arrangement and cooling air flow paths designated by arrows.

With continuing reference generally to FIGS. 57-69, the top end 6041 of the inner gamma block cylinder 6040 may be terminated by an annular top mounting flange 6070. Flange 6070 projects radially/laterally outwards beyond the sidewall 6043 of gamma blocker cylinder 6040 (GBC) to engage the top flange 6027 of the outer neutron shield cylinder 6021 (NSC) as shown in FIGS. 61 and 62. The GBC mounting flange 6041 is detachably mounted to the NSC top flange 6027 by a plurality of mounting fasteners 6071 such as threaded bolts in one non-limiting embodiment, thereby detachably coupling the inner and outer cylinders together (see also FIGS. 6060 and 6067). Fasteners 6071 extend vertically completely through GBC mounting flange 6070 and engage corresponding upwardly open threaded bores 6072 formed in the NSC top flange 6027. In one embodiment, the threaded bores 6072 may be formed in spacer blocks 6029 as best shown in FIG. 60. The spacer blocks 6029 advantageously provide additional purchase or thickness of material to secure the mounting fasteners 6071 to the NSC top flange 6027 for structural strength.

When the inner gamma block cylinder 6040 is mounted in the outer neutron shield cylinder 6021, the entire weight of the inner cylinder 6040 with loaded spent fuel canister 6060 therein is fully supported by the outer cylinder 6021 in a cantilevered manner via engagement between the mounting flange 6070 and top flange 6027. This allows the inner cylinder 6040 directly heated by the heat emitting fuel canister 6060 therein to thermally grow in length independently of the outer neutron shield cylinder 6021 to avoid cracking caused by differential thermal expansion. The bottom support flange 6026 of outer neutron shield cylinder 6021 in turn is supported by the vertical cask transport crawler or vehicle 6075 described elsewhere herein.

In one construction, the entire fully-loaded cask 6020 including the outer neutron shield cylinder 6021 and inner gamma block cylinder 6040 with spent fuel canister 6060 may be raised and lifted via the GBC mounting flange 6070 and bolting alone. The flange 6070 therefore has a sufficiently robust structure and thickness to support the entire cask weight. To lift the cask, at least one pair of lifting lug assemblies 6076 shown in FIGS. 57-59 may be detachably mounted to the top of the mounting flange 6070 via threaded lug fasteners 6077 such as bolts. More lugs assemblies may be used in other embodiments depending on the desired rigging arrangement. In various embodiments, existing mounting fasteners 6071 used to secure the mounting flange 6070 to outer neutron shield cylinder 6021 may be used as the lug fasteners. In other embodiments, separate threaded lug fasteners 6077 may be used.

Figure 59:
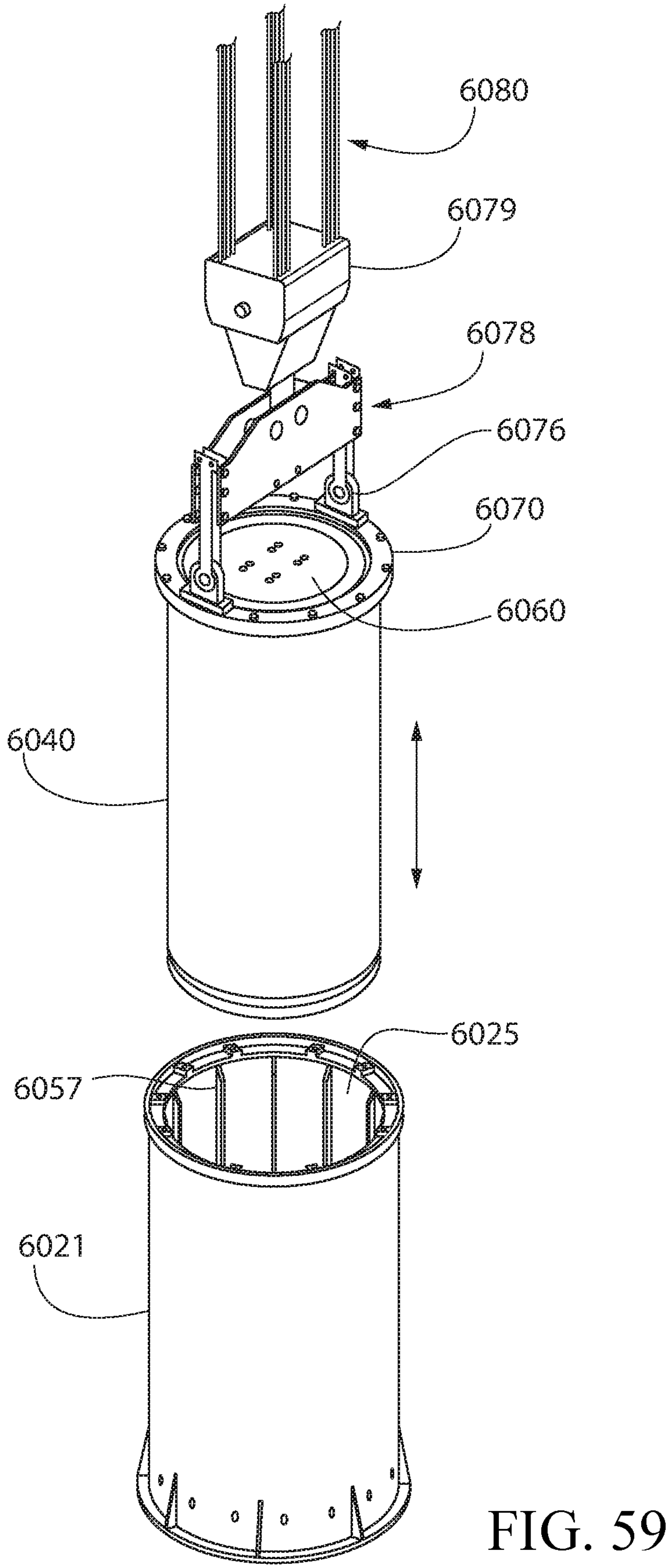
FIG. 59 is an exploded perspective view showing the inner gamma block cylinder uncoupled and separated from the outer neutron shield cylinder.

FIG. 59 shows inner gamma block cylinder 6040 in the process of being raised or lowered via the hoist 6079 of a crane 6080 to remove or insert cylinder 6040 into outer neutron shield cylinder 6021. A lifting harness 6078 is coupled to the hoist above and to the lifting lug assemblies 6076 below mounted to the gamma block cylinder. When the inner gamma block cylinder 6040 is mounted to the outer neutron shield cylinder 6021 via mounting fasteners 6071 as noted above, the entire cask 6020 will be lifted or lowered in the same manner shown. It bears noting that the crane 6080 shown may be one inside the reactor containment structure with access to the nuclear spent fuel pool, or the one mounted on the vertical cask transporter vehicle 6075 (see, e.g. FIG. 70).

The inner gamma block cylinder 6040 which holds the spent fuel canister 6060 is heated by decay heat emanating from the spent nuclear fuel, which can be significant for a fairly long period of time. Provisions must therefore be made to effectively remove the decay heat to maintain the structural integrity of the cask components and its nuclear fuel contents.

According to one aspect of the invention, a cooling air system is provided which utilizes available ambient cooling air and natural flow circulation created via the chimney effect which is induced by the heat emitted by the decaying nuclear fuel assemblies via the inner gamma block cylinder 6021 vertical sidewall 6043. Referring to FIGS. 61-64, 67, and 69, an open vertically-extending cooling air ventilation annulus 6034 is provided by a space or gap between the exterior surface 6046 of vertical sidewall 6043 of the inner gamma block cylinder 6040 and the interior surface 6030 of the vertical sidewall 6024 of the outer neutron shield cylinder 6021. Cooling air ventilation annulus 6034 extends for the full height of the cask 6020 and circumferentially around the entire interface between the inner and outer cylinders 6040, 6021. As previously described herein, the air ventilation annulus 6034 may have a substantially uniform transverse cross-sectional area created by the longitudinal splines 6057 affixed to the interior surface of the outer neutron shield cylinder 6021 (see also FIGS. 60 and 68). Air flows vertically upwards through the cooling air ventilation annulus 6034 between the splines 6057 which create a plurality of longitudinally-extending air passages 6034-1 defined by the splines.

Because the inner gamma block cylinder 6040 is fully supported inside the outer neutron shield cylinder 6021 from the top via engagement between the GBC mounting flange 6070 and the NSC top flange 6027, this allows the air ventilation annulus to extend completely through the bottom end of cask. This forms an annular lower cooling air inlet opening 6034-2 into the air ventilation annulus 6034 between the cylinders at the bottom of the cask (best shown in FIGS. 63-64). Air inlet opening 6034-2 may be continuously open and uninterrupted for a full 360 degrees in some embodiments.

Seating the top mounting flange 6070 of the gamma block cylinder 6040 on the spacer blocks 6029 of the neutron shield cylinder top flange 6027 in the manner previously described herein further forms a plurality of upper cooling air outlet openings 6034-3 between the vertically spaced apart mating flanges which are in fluid communication with the air ventilation annulus 6034 between the gamma block cylinder 6040 and neutron shield cylinder 6021. The vertically protruding raised annular lip 6027-1 of the neutron shield cylinder top flange 6027 and angled cross-sectional shape of the flange creates a circuitous air L-shaped outlet path which advantageously prevents direct streaming of neutrons to the external environment through the upper air outlet openings 6034-3. This there is no direct line of sight from outside through the air outlet openings 6034-3 into the interior portions of the cask 6020 to prevent neutron streaming.

In operation of the cooling air system, ambient cooling air enters the annular lower air inlet opening 6034-2 vertically and flows vertically into and upwards through the air ventilation annulus 6034 to the top of the cask 6020 (parallel to longitudinal axis 60LA). The air in the open annulus 6034 is directly heated by the inner gamma block cylinder sidewall 6043. This draws the air inwards into the cask 6020 via the lower air inlet opening 6034-2 by natural convention. The heated cooling air then flows upwards in the air ventilation annulus, flows radially/laterally through the upper air outlet openings 6034-3 (perpendicular to longitudinal axis 60LA), then tarns vertically upwards flowing past the annular lip 6027-1 of the outer NSC cylinder 6021 and is discharged to the ambient atmosphere and environment.

Referring to FIGS. 63 and 64, a circumferentially-extending radial annular space or gap 60G may preferably also be provided at the interface between the fuel canister 6060 and the interior surface 6045 of the gamma block cylinder 6040. For optimal thermal and ALARA performance, the ability to keep this annular gap 60G either filled with water (for additional shielding) or air ventilated (for additional heat rejection capacity) is desirable during different stages the fuel loading scenario. The bottom lid 6050 of the gamma block cylinder 6040 may include a plurality of air inlet holes 6062 configured to provide a passage for introducing ambient cooling ventilation upwards into annular gap 60G (see, e.g. FIGS. 63 and 65). Although air inlet holes 6062 are formed in the lateral sides of the portion of the lid 6050 which extend beneath the bottom support flange 6026 of the neutron shield cylinder 6021. Air inlet holes 6062 may have an L-shape configuration, the holes may in other embodiments be vertically straight and drilled directly through the underside of the lid 6050 and extend upwards to fluidly coupled to annular gap 60G.

The air inlet holes 6062 in the bottom lid are designed to be readily plugged, if needed, to keep the annular gap 60G instead filled with water if needed during certain phases of the cask fuel loading and handling operations. Thus, the drainable annular gap 60G surrounding the canister can be used to promote air ventilation or to keep filled with water, as needed, during the fuel loading and transfer operations. The annular gap 60G is upwardly open at the interface between the gamma block cylinder 6040 and canister 6060 forming an annular air outlet 6063 (best shown in FIG. 62). Water can be introduced into the annular gap 60G via the air outlet 6063 to cool the canister 6060 if needed for additional neutron shielding instead of air cooling, as previously described above. If the canister 6060 requires further active cooling to dissipate heat generated by the decaying nuclear fuel, the drainable annulus (gap 60G) advantageously provides the facility to spray water on the canister lid using gravity fed water drip to efficiently remove heat from the canister without resorting to an active cooling system.

The physically detachable outer neutron shield cylinder 6021 (NSC) separable at strategic times from the inner gamma block cylinder 6040 (GBC) as previously described herein offers several advantages.

One advantage is that by separating the thermally low conductivity part of transfer cask (i.e., NSC) from the thermally high conductive GBC, it is now possible to incorporate an air ventilation annulus 6034 previously described herein between them. The hot external surface of the GBC, heated by the decay heat from fuel in the canister inside the GBC, drives an efficient natural convection air ventilation action to keep fuel from heating excessively.

Another advantage is that in some cases (e.g., during the canister drying operation), it may desirable to keep the cask as hot as possible. In such a case, having the high thermal inertia neutron shield of the NSC separated from the GBC of the cask body or the ability to physically block the air ventilation is helpful in accelerating the drying operation.

Another advantage is that the permissible weight of most transfer casks is limited by the rated lift capacity of the cask handling crane or the size of the cask loading area in the spent fuel pool. Under the present separable GBC and NSC approach, the GBC is made as heavy and as large in diameter as possible within the constraints of the plant's architecture and crane capacity. The NSC is likewise made as large as possible within the constraints of the load lifting device used to handle the transfer cask typically having a higher rated load lifting capacity than the cask handling crane in the nuclear facility cask loading area. These two features combine in a way to optimize the transfer cask's shielding performance.

Yet another advantage is that the NSC may be made in the form of a single or multiple section annular cylinder containing water or a solid resinous neutron shielding material therein, such as Holtite™, contained in a steel exterior. Boric acid may be added to the water mass of the NSC for enhanced neutron capture.

Figure 70:
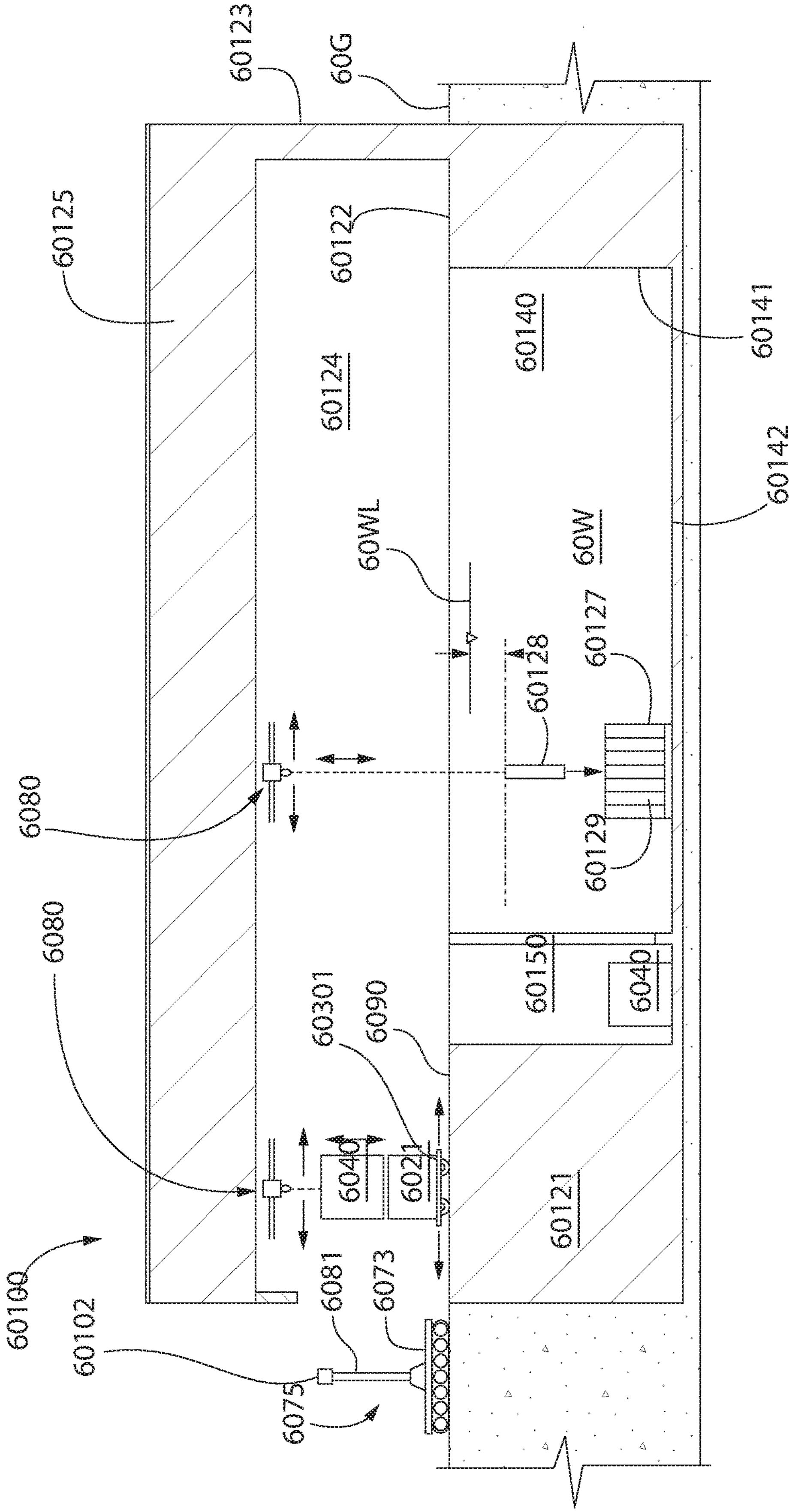
FIG. 70 is a schematic diagonal showing a nuclear fuel storage and loading facility utilizing the cask system of FIG. 57.
Figure 71:
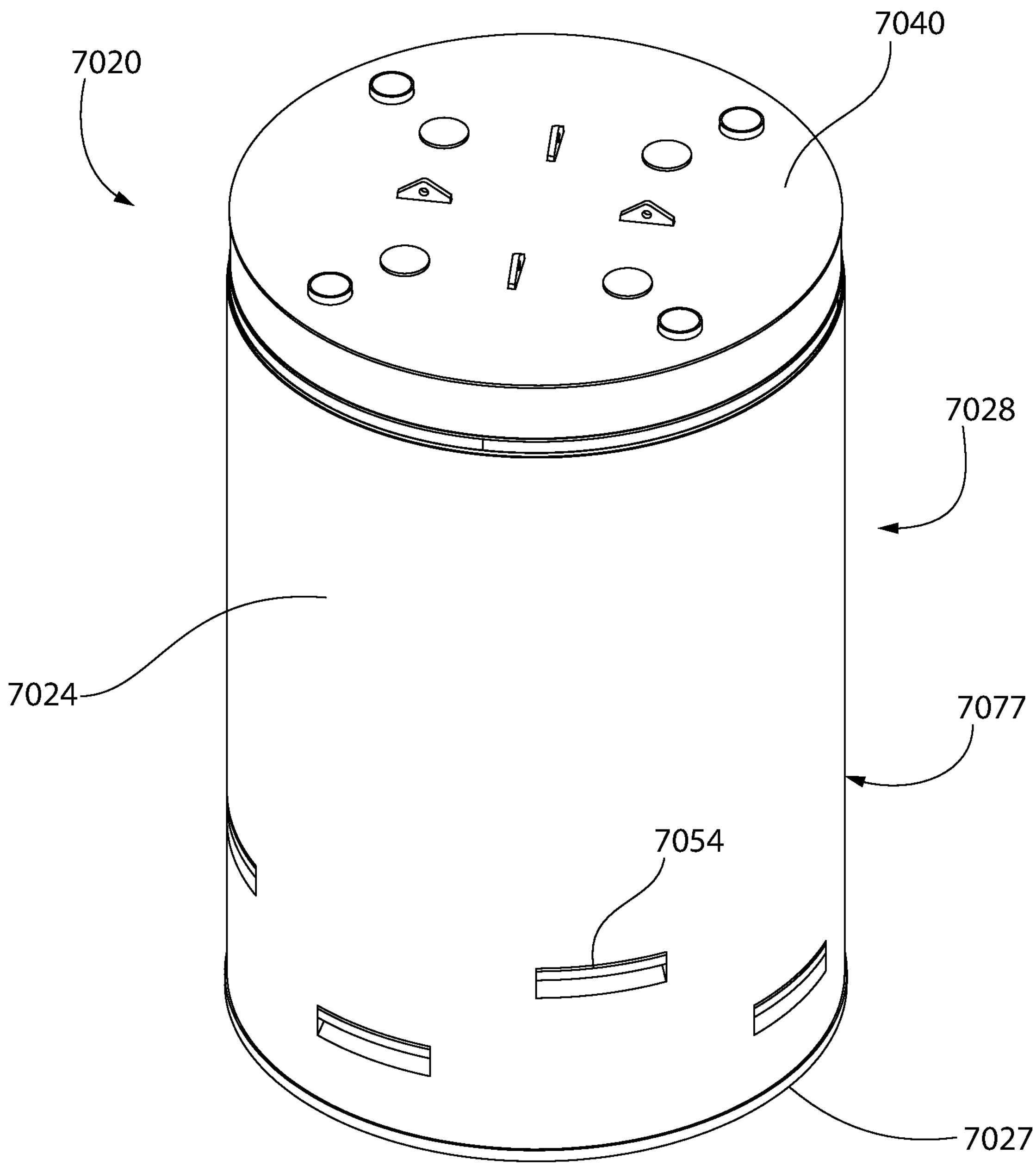
FIG. 71 is a perspective view of a storage system in the form of a radiation-shielded ventilated module for storing spent nuclear fuel including cooling air inlet and outlet ducts for passive cooling of the fuel.

FIG. 70 is a schematic diagram of an example of a "wet" spent nuclear storage facility 60100 for temporary holding of spent nuclear fuel—not to be confused with a "dry" independent spent fuel storage installation (ISFSI) for the longer interim storage of spent nuclear fuel. Wet storage facility 60100 includes a structural building enclosure with roof 60125, walls 60123, and a steel reinforced concrete base mat 60121 that defines a substantially horizontal operating deck 60122 surrounding and extending over portions of a spent fuel pool 60140 impounded with water W. Deck 60122 may be at surrounding ground level or grade 60G to facilitate movement of motorized cask vehicles or carts into and out of the facility. An access bay 6090 is defined by deck 60122 adjacent to the fuel pool 60140 for staging the present fuel transport cask 6020 comprises of the outer neutron shield cylinder 6021 and inner gamma block cylinder 6040 as shown. In some embodiments, the building enclosure may be a reactor containment enclosure structure.

Fuel pool 60140 includes a base or floor 60142 and plural vertical sidewalls 60141 extending upwards therefrom to the operating deck 60122. A water level 60WL is formed in the pool. Submerged in the pool 60140 is a fuel storage rack 60127 comprising a plurality of upwardly open storage cells 60129 each configured to hold a single used or spent nuclear fuel assembly 60128 removed from the reactor. The fuel assembles themselves comprise a plurality of fuel rods and upper and lower flow nozzles for primary coolant flow in the reactor; the design of the fuel assembly being well known to those skilled in the art without undue elaboration herein. A portion of the fuel pool 60140 defines a cask loading area 60150 for loading fuel assemblies from rack 60127 into the canister 6060 located inside the gamma block cylinder 6040 as further described below. For the fuel assembly to canister loading operation and manipulating the transfer cask 6020 components (GBC, NSC) and fuel canister, one or more overhead trolley cranes 6080 previously described herein may be provided which are operable to lift a load and traverse the wet storage facility 60100.

A process or method for transferring and transporting spent nuclear fuel will now be briefly summarized with initial reference to FIG. 70. The first step is providing a nuclear fuel transport cask 6020 comprising an outer neutron shield cylinder 6021 having an internal first cavity 6025 and an inner gamma block cylinder 6040 having an internal second cavity 6044. Initially, the gamma block cylinder is detachably coupled to and nested inside the first cavity of the neutron shield cylinder at the start of the process describe below. The cask 6020 may be transported to the dry spent fuel storage facility 60100 via the self-propelled wheeled or tracked crawler 6075 having an overhead high lifting capacity crane 60102 mounted high above platform 6073 of the crawler by a pair of vertical columns 6081 with the crane supported by a beam between the columns. Such cask transporters are well known in the art.

The cask 6020 may be moved via the heavy duty crawler 6075 (e.g. about 60170 ton lifting capacity) to a staging spot immediately outside the fuel storage facility 60100 as shown. The tall height and weight of the crawler generally precludes it from entering the fuel storage facility. In one scenario, the entire cask 6020 may be placed on a low profile wheeled cask transport cart 60301 which typically move along a pair of continuous rails supported at ground level 60G outside the facility and the operating deck 60122 inside the facility. The cask 6020 is then moved inside the facility enclosure to the access bay 6090 alongside the fuel pool 60140. The next step in the process is separating the gamma block cylinder 6040 from the outer neutron shield cylinder 6021 using inside crane 6080 as shown in FIG. 70. This is accomplished by first unbolting the mounting flange 6070 of the gamma block cylinder 6040 from the top flange 6027 of the outer neutron shield cylinder 6021. The gamma block cylinder 6040 is then lifted/raised with the crane 6080 and separated from neutron shield cylinder 6021 via the lifting harness 6078 and lifting lugs 6078 attached to the top mounting flange 6070 of the gamma block cylinder. An available empty fuel canister 6060 may then be lifted by crane 6080 and inserted vertically downwards into the gamma block cylinder 6040 either outside of or in the fuel pool 60140 (if not already placed therein previously). Alternatively, the canister may be placed inside the gamma block cylinder 6040 before separation from the neutron shield cylinder 6021.

In an alternate possible but less preferred scenario, the gamma block cylinder 6040 may be uncoupled and removed from the neutron shield cylinder 6021 outside the fuel storage facility 60100 by the crawler crane 60102. The gamma block cylinder may then be moved alone on the cask transport cart 60301 and moved into the facility.

Next, the inside overhead crane 6080 then lifts/raises the gamma block cylinder 6040 and canister 6060 assembly (assuming the canister is inserted in cylinder 6040 outside the fuel pool 60140), and places/lowers the assembly into the fuel pool 60140 onto a support surface (e.g. fuel pool floor 60142) in the cask loading area 60150 of the pool. Water fills both the gamma block cylinder and canister (which has its lid 6061 removed). The gamma block cylinder and canister 6060 are submerged under water 60W to a depth sufficient to keep the fuel assembles 60128 beneath the water level 60WL when loaded into the canister by crane 6080. The fuel assemblies are then loaded into the canister and gamma block cylinder one at a time.

After loaded with fuel assemblies, the next step is using crane 6080 to lift/raise the loaded gamma block cylinder 6040 and fuel canister 6060 assembly out of the fuel pool 60140. The gamma block cylinder 6040 and fuel canister 6060 assembly is maneuvered over top of the neutron shield cylinder 6021 on the cart 60301, and then lowered/inserted into the neutron shield cylinder. Because the neutron shield cylinder 6021 is now in place for neutron radiation shielding, the canister may be optionally dewatered at this time. The next step is bolting the inner gamma block cylinder 6040 to the outer neutron shield cylinder 6021 via the mating mounting and top flanges 6070, 6026 of each vessel, respectively. The cart 60301 with now fully re-assembled cask 6020 is then moved back out of the facility. Using the crawler crane 60102, the next step is lifting the cask 6020 back onto the crawler 6075 for further closure operations and transport to the dry storage facility.

It bears noting that at the time of the gamma block cylinder 6040 and canister 6060 removal from the spent fuel pool 60140, the water in the canister provides the necessary neutron shielding (the gamma block cylinder providing the gamma radiation shielding). The lift weight of gamma block cylinder and water filled canister (without the neutron shield cylinder 6021) is within the allowable facility crane 6080 lifting capacity. Once the gamma block cylinder 6040 with water-laden canister 6060 are inserted into the outer re-coupled neutron shield cylinder 6021, the transfer cask 6020 has the requisite neutron shielding to commence with the canister dewatering, closure, and transfer operations. The neutron shield cylinder 6021 is thus preferably installed prior to the dewatering of the canister 6060 to assure no lapse in neutron shielding. Prior to lifting the entire fully assembled transfer cask 6020, now consisting of the gamma block cylinder 6040, neutron shield cylinder 6021, and canister 6060, the now dewatered canister reduces the casks overall/cumulative lift weight to within the capacity of the crawler 6075 crane (or other lifting device). Variations in the foregoing sequence of steps may be used in practice in other embodiments and does not limit the invention.

VII. Inventive Concept 7

With reference to FIGS. 71-87, a seventh inventive concept will be described.

FIGS. 71-75 depict a nuclear fuel storage system comprising a passively cooled and ventilated outer storage module 7020 configured to hold a single fuel canister loaded with spent nuclear fuel (SNF) assemblies emitting radioactive decay heat. Module 7020 may be a double-walled vessel in one embodiment having an elongated module body 7028 including cylindrical outer shell 7024, inner shell 7023, and radiation shielding which may comprise a concrete mass or liner 7072 in one exemplary construction which is disposed in an annular space therebetween for radiation blocking. Other shielding materials may be used in addition to or instead of concrete including lead for radiation shielding, including for example boron containing materials (e.g. Metamic® or others), steel, lead, and others typically used for such purposed in the art. Inner shell 7023 defines an interior surface 7076 and outer shell 7024 defines an exterior surface 7077 of the module. Surfaces 7076, 7077 may be cylindrical and arcuately curved in one embodiment. The passively cooled storage module 7020 may be vertically elongated and oriented as shown in the illustrated embodiment; however, other orientations such as horizontal may be used with the same features described herein. The inner and outer shells 7023, 7024 may be formed of a suitable metallic material, such as without limitation steel (e.g. carbon or stainless) which may be epoxy painted/coated in one embodiment for corrosion protection. Shells 7023, 7024 may each have representative thickness of about ¾ inches as one non-limiting example.

A vertically-extending central cavity 7026 extends along a centerline or longitudinal axis 70LA defined by the vertically elongated module body 7028. Cavity 7026 may be of cylindrical configuration in one embodiment; however, other shaped cavities may be used including polygonal shapes and other non-polygonal shapes (e.g. rectilinear, hexagon, octagonal, etc.). A metal baseplate 7027 seal welded to the bottom end 7024 of the module 7020 closes the bottom of the cavity. Baseplate 7027 is configured for placement on a preferably flat concrete support pad which provides radiation shielding in the vertical downwards direction. Baseplate 7027 may be made of a similar material to the shells 7023, 7024. In one embodiment, baseplate may be about 3 inches thick.

Figure 73:
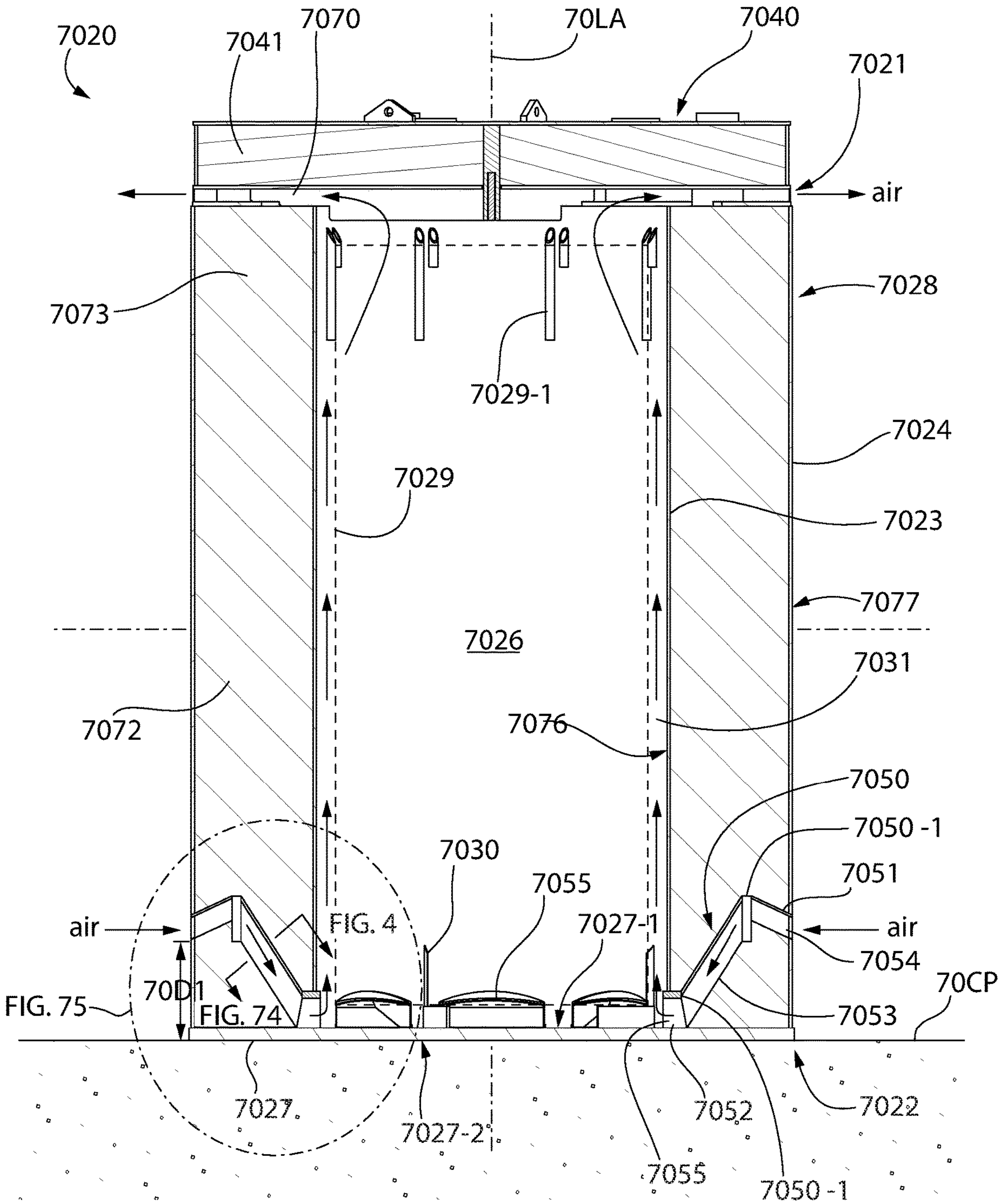
FIG. 73 is side cross-sectional view thereof.

Cavity 7026 of module 7020 has a configuration and height suitable for holding a single SNF canister 7029 therein (represented by dashed lines in FIG. 73). The diameter of cavity 7026 is intentionally larger than the diameter of the fuel canister 7029 by a smaller amount to form a ventilation annulus 7031 between the canister and inner shell 7023 of the module. The width of annulus 7031 preferably is sufficient to draw heat generated by the SNF within the canister away from the canister as the cooling air flows upwards alongside the canister. A typical airflow annulus may be in the range of about and including 2-6 inches in width as a non-limiting example depending the estimated heat load of the fuel canister 7029. The annulus 7031 extends vertically for the full height of the canister which may terminate at top adjacent to the top ends of guide tubes 7029-1 (see, e.g. FIG. 73). Accordingly the canister 7029 has a height approaching the height of the cavity 7026, and at least greater than ¾th the height of the cavity as shown.

A plurality of radially and vertically extending support brackets 7030 are disposed at the bottom of cavity 7026 which are configured to engage and center the canister 7029 to maintain the ventilation annulus 7031. Brackets 7030 are interspersed between some the air inlet ducts 7050 and configured to elevate the bottom of the canister above the top surface 7027-1 of baseplate 7027. This allows ambient cooling air to circulate beneath the canister.

Support brackets 7030 may be L-shaped in one embodiment as shown and preferably are made of steel (e.g. carbon or stainless). Brackets 7030 may have a typical thickness of about ¾ inches in one embodiment and are integrally attached to the baseplate 7027 and preferably also inner shell 7023 as well such as via welding. Brackets 7030 each have a horizontal portion 7031 which extends radially inwards from the inner shell 7023 towards centerline longitudinal axis 70LA of module 7020 and a vertical portion 7032 which extends vertically upwards from the baseplate along the interior surface 7076 of inner shell 7023 and parallel to the longitudinal axis. Horizontal portions 7031 may be about 5 inches high in one non-limiting embodiment. The vertical portions 7032 of brackets 7030 may have a height suitable to effective center the canister 7029 when inserted in cavity 7026 and maintain the ventilation annulus 7031 between the canister and inner shell 7023 (e.g. about 2 feet or less in some embodiments). The top ends of the vertical portions 7032 of brackets 7030 may be angled or chamfered to create a lead-in which facilitates guiding and centering the canister 7029 when through the open top end 7021 of the module in cavity 7026 via a crane or hoist. The baseplate equipped with the steel support brackets 7030 advantageously serves to stiffen the baseplate 7027 and support the fuel-bearing canister 7029 in a manner that minimizes the bending stress in the baseplate since a portion of the dead weight of the canister is carried by the inner shell 7023. The vertical portions of each bracket 7030 further restrains the canister from moving laterally when the storage module 7028 is being lifted and carried by a crane and/or cask handling crawler, or during a seismic even which rattles the module 7020.

The top of the canister 7029 may be centered in module cavity 7026 by plural circumferentially spaced apart guide tubes 7029-1 rigidly attached to the interior surface 7076 of the inner shell 7023 proximate to its top end such as via welding. Guide tubes 7029-1 are provided around the entire inner shell for full 360 degree coverage. The inward sides guide tubes are configured to abuttingly engage and prevent the canister from excessively moving laterally or rattling if vibrated during a seismic event or when lifted by a crane or hoist.

Module 7020 further includes a top end 7021, bottom end 7022, and longitudinally-extending sidewall 7077 extending between the ends. A baseplate 7027 is seal welded to bottom end 7022 of the module to prevent the ingress of water into the cavity 7026. Baseplate 7027 may be circular and flat in configuration in one embodiment and defines an upward facing flat top surface 7027-1 exposed to cavity 7026. The flat bottom surface 7027-2 of the baseplate is intended for placement on a concrete support pad 70CP. Baseplate 7027 may be formed a suitable metal compatible for welding to the bottom ends of the inner and outer shells 7023, 7024, such as steel (e.g. carbon or stainless).

Referring to FIGS. 73 and 77-81, a removable lid 7040 is detachably coupled to the module top end 7021 which closes the normally upwardly open cavity 7026 when in place. Lid 7040 may be a hollow circular structural shell filled with a radiation shielding material such as a concrete plug or liner 7041. Other shielding materials may be used in addition to or instead of concrete. Lid 7040 provides radiation shielding in the vertical direction, whereas the concrete liner 7072 disposed in the sidewall 7077 of the module provides radiation shielding in the lateral or horizontal direction.

In one embodiment, lid 7040 may have a generally circular structure including an outer shell comprising a top cover 7043, bottom cover 7045, and a circumferentially-extending peripheral ring wall 7048. Concrete liner 7041 is encased inside the top and bottom covers and the ring wall which are welded together to form a permanently joined assembly, such as via seal welding in one embodiment. The opposing top and bottom major surfaces of each of the covers 7043, 7045 may be parallel to each other and flat as shown.

A pair of lifting ribs or beams 7049 are at least partially embedded in the concrete liner 7041 of the shell. The lifting beams 7049 may each have an interlocked X-shaped arrangement oriented perpendicularly to each other. Each beam may be a strong flat vertically oriented metallic plate (e.g. steel) arranged perpendicularly to each other as shown. The beams 7049 are interlocked to each other via mating vertical slots 7049-2 as shown and welded together. One slot opens upwardly and the other downwardly such that the bottom edges of the beams 7049 lie in the same horizontal reference plane when the beam assembly is completed.

The lifting beam 7049 plates extend laterally/horizontal for the full diameter of the lid and may abut the inner surface of the peripheral ring wall 7048. The lifting beam plates extend vertically from the bottom surface of the top cover 7043 downwards through the bottom cover 7045 via an X-shaped slot 7045-1 formed in the bottom cover. The slot is complementary configured to the lifting beam plates (best shown in FIG. 82). The lower portions 7049-3 of the lifting beams 7049 thus are exposed and protrude vertically below the bottom major surface of the lid's bottom cover 7045. In one embodiment, the exposed lower portions of beams 49 may have a multi-stepped configuration and project downward farther than the annular outlet vent screen 7046. One purpose is to protect the screen from damage when the lid is placed on a flat surface during the canister loading operations.

According to a notable aspect of the lid 7040, the centralmost and vertically deepest/highest part of the exposed beam lower portions 7049-3 may further project downwards into the cavity below the top end 7021 of the module body 7028 when the lid 7040 is seated on top of the module. This feature, along with the vertically shallower/shorter outer peripheral portions of the exposed stepped lower portions 7049-3 of lifting beams 7049, advantageously provide enhanced radiation attenuation and shielding to minimize block radiation escape through the cooling air outlet vents 7070 (see, e.g. FIG. 85). This downward projection of the lifting beam lower portion 7049-3 causes neutron scatter and interferes with the radial streaming and scattering of radiation out of the air outlet vents 7070. Beneficially, use of the metallic lifting beams plates to block neutron stream instead of a solid concrete plug used in some lid designs make the present lid 7040 lighter in weight, easier to handle, and eliminates the need for complexly configured air venting arrangements formed through lid which adds to fabrication costs. Additionally, the stepped lower portions 7049-3 of lifting beams 7049 also as act as shear support under side impact forces or lateral vibrations induced by seismic events. This keeps the lid 7040 centered on the module 7020 and reduces shearing forces on the closure fasteners 7042.

Another unique aspect of the downwardly protruding exposed lower portion 7049-3 of the lifting beam 7049 plates is that it divides the circumferentially-extending radial cooling air outlet 7070 into four quadrants beneath the lid at the lid-to-module body interface. The quadrant-shaped air outlet ducts 7070 act as wind breaks or shields to block and mitigate the adverse impacts of wind blowing against on the radial discharge direction of heated cooling air emitted from the module. Accordingly, because the wind typically blows from one direction, only heated cooling air flow discharged from the windward single or pair of air outlet quadrant might be impeded due to the increased backpressure caused by the wind since the lower portion of the lifting beam plates generally shields the other remaining leeward quadrants from the wind to maintain their normal discharge airflow rate. It further bears noting that the quadrant-shaped air outlet ducts 7070 further provide a greater air discharge flow area with full 360 degree outflow from the module 7020 than multiple individual smaller ducts which create a greater resistance to air flow that impedes heat removal from the SNF canister in the module cavity 7026. The cavity is thus fully open to the underside of the lid without requiring the heated cooling air to be funneled into smaller diameter or sized outlet ducts with concomitant reduction in discharge of heat air from the module.

When the lid 7040 is emplaced on the storage module 7020, it bears noting that the shallower outer peripheral portions of the exposed stepped lower portions 7049-3 of lifting beams 7049 are configured to engage the top end 7021 of the module body 7028 which supports the weight of the lid. This engagement also eliminates annular gaps between the stepped lower portion 7049-3 and module to enhance radiation shielding and wind blocking. Accordingly, it is apparent to one skilled in the art that the unique lifting beams 7049 configuration disclosed herein provides a multitude of benefits beyond simply providing a lifting structure for the lid.

Each lifting beam 7049 further includes a pair of upwardly protruding lifting lug 7049-1 which extend upwards through slots 7043-1 in the top cover 7043. Each lifting lug includes a hole for coupling rigging thereto to raise and lower the lid with a crane or hoist. The lifting beams 7049 and lid have a sufficiently robust structure and thicknesses to allow the entire storage module 7020 with loaded SNF canister 7029 therein to be lifted via the lifting beams. The X-shaped lifting beam arrangement ensures that the weight of the lid 7040 is carried evenly to prevent distortion when lifted.

Figure 72:
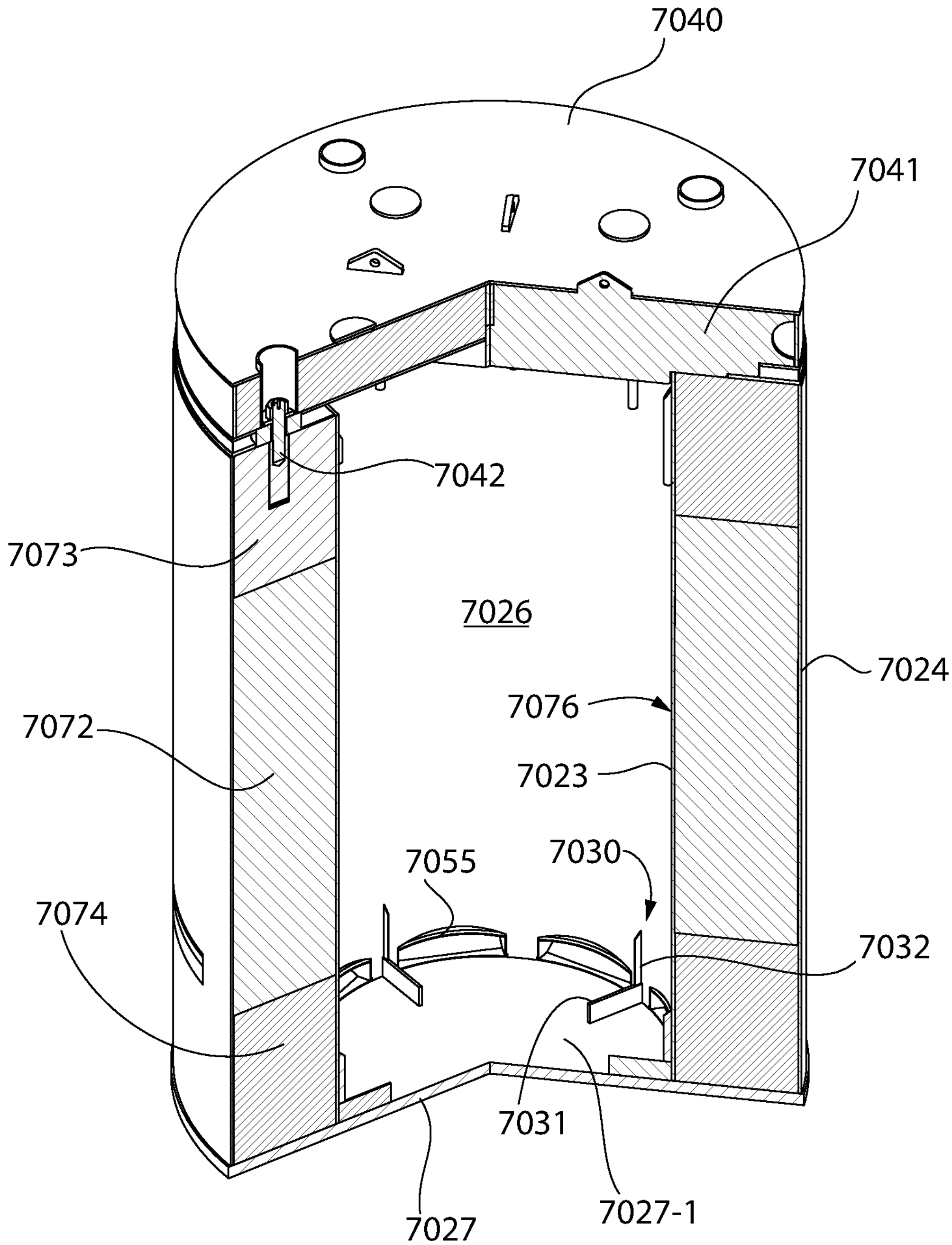
FIG. 72 is a cross-sectional perspective view thereof.

To secure the lid to the module body 7028 in a manner which allows the module to be lifted via the lid 7040 and lifting beams 7049, the lid 7040 may be bolted to the top end 7021 of the module body via a plurality of threaded closure fasteners 7042 (see, e.g. FIG. 72). Four fasteners may be used in one representative construction. The fasteners 7042 may be one piece or comprise an assemblage of a threaded stud and heavy hex nut. The module body 7028 includes internally threaded mounting sleeves 7042-1 rigidly mounted in its top end 7021 which threadably engage the fasteners 7042. In one embodiment, the mounting sleeves 7042-1 may be welded to metallic upper radial shell interconnector plates 7073 rigidly affixed to the inner and outer shells 7023, 7024 of the module 7020 (further described below). The interconnector plates 7073 form part of the module's superstructure. Upwardly open mounting slots 7073-1 may be formed in plates 7073 which receive the sleeves for welding thereto.

To maintain a vertical opening through lid 7040 for the bolting, a plurality of tubular collars 7044 may be rigidly mounted via welding to the top and/or bottom covers 7043, 7045 of the lid to form passages through the concrete liner for the closure fasteners 7042. The collars 7044 may protrude slightly above the top surface of the lid's top cover 7043. In the unlikely event that the nuclear fuel storage module 7020 might tip over on the concrete support pad 70CP when being maneuvered via the crane, the collars would take the brunt of the force from the fall and transfer it to the robust body of the module to prevent or minimize structural damage to the lid. In various embodiments, the lid 7040 may also be seal welded to the module 7020 in addition to bolting or instead of bolting; however, the module may be lifted with reliance on the bolting assembly alone for support and strength.

The top end 7021 of storage module 7020 may further include a top plate ring 7047 which partially closes the top end of the module body 7028 and sidewall 7077. Top plate ring 7047 has a circular horizontally flattened body with flat top and bottom surfaces and a height substantially less than a width. Plate ring 7047 may be secured to the outer shell 7024 via welding, and optionally the tops of the upper interconnector plates 7073 thereby forming an integral part of the module body structure.

A plurality of annular lid spacers 7042-2 are provided; one spacer 7042-2 for each closure fastener 7042. The fasteners extend completely through the spacers which are interspersed between the bottom cover 7045 of the lid 7040 and the top end 7021 of the module. Each spacer 7042-2 nests partially inside a semi-circular cutout 7047-1 in the top plate ring 7047 of the module 7020 which helps locate the spacers on the module. The spacers 7042-2 form and maintain a vertical air gap 70G at the interface between the bottom cover 7045 of the lid 7040 and the top end 7021 of the module 7020 to form the radial cooling air outlet ducts 7070. Gap 70G may be about 3 inches as one representative non-limiting example.

The gap 70G is closed at its periphery by a perimetrically and circumferentially extending annular outlet vent screen 7046. The screen 7046 may be comprise a metallic plate ring (e.g. steel) which includes a plurality of radial through perforations or holes forming open area for venting heated cooling air radially outwards between the bottom of lid 7040 and top end 7021 of the module body 7028 from gap 70G. This defines the cooling air outlet ducts 7070. The annular outlet screen 7046 may be welded to the bottom cover 7045 of lid 7040 and protrudes downwardly therefrom for a distance co-extensive in height to and enclosing otherwise radially open gap 70G.

With exception of the concrete liner, the foregoing lid-related components are preferably all formed of a metal such as without limitation steel (e.g. carbon or stainless).

The vertical nuclear fuel storage module 7020 includes a natural circulation cooling air ventilation system. Referring generally to FIGS. 71-84 as applicable, the ventilation provisions include a plurality of cooling air inlet ducts 7050 to introduce ambient cooling air into the module cavity 7026, and cooling air outlet ducts 7070 to expel the air heated from the cavity (which flows vertically upwards alongside the sidewall of the heat-emitting fuel canister 7029) back to atmosphere. Both the air inlet and outlet ducts may generally be radially oriented as shown in the illustrated embodiment. In a one non-limiting preferred embodiment, the air inlet ducts 7050 are disposed in the lower portion of module 7020 proximate to the bottom end 7022 of the module and cavity 7026, and the air outlet ducts 7070 are disposed proximate to the top end 7021 of the module and cavity.

Each air inlet duct 7050 extends completely through the sidewall 7077 of module 7020 from the outer shell 7024 to the inner shell 7023. The ducts 7050 define an air inlet passageway which places the lower portion of the module cavity 7026 in fluid communication with ambient atmosphere and cooling air. In one embodiment, the air inlet ducts 7050 may have a multi-angled circuitous configuration designed to both advantageously prevent the ingress of rain or standing water into the cavity and to prevent straight line neutron streaming to the ambient environment. Each duct 7050 includes an exterior inlet end opening 7054 forming an opening penetrating the outer shell 7024 and an interior outlet end opening 7055 forming an opening penetrating the inner shell 7023 into the module cavity 7026. The outlet end openings of each air inlet duct 7050 are arranged to introduce ambient cooling air directly into the bottom of the ventilation annulus 7031 between the canister 7029 and inner shell 7023, and preferably adjacent to the top surface of the baseplate 7027. The inlet end opening includes a top 70102 and opposing bottom 70103. The outlet end opening includes a top 70104 and opposing bottom 70105. No portion of the air inlet ducts 7050 extend below the baseplate, but instead extend only through the sidewalls in the described embodiments.

Figure 74:
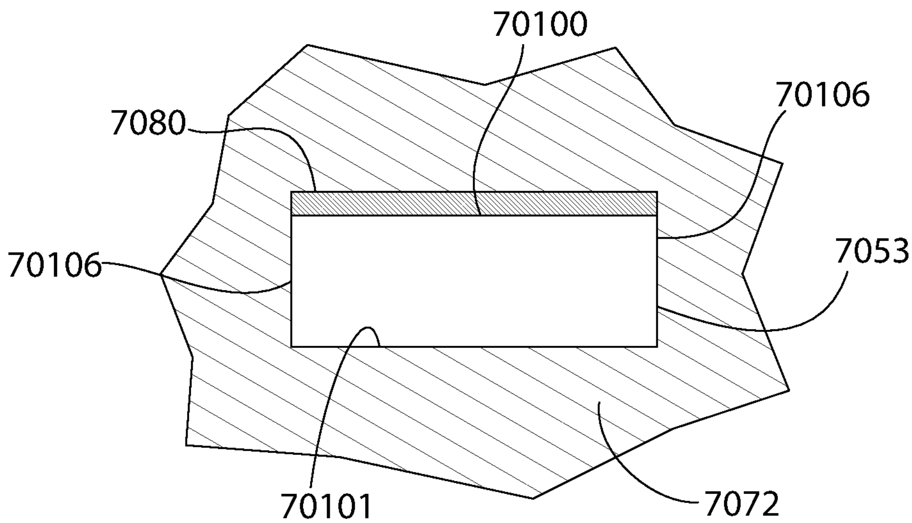
FIG. 74 is cross section through a cooling air inlet duct taken from FIG. 73.
Figure 75:
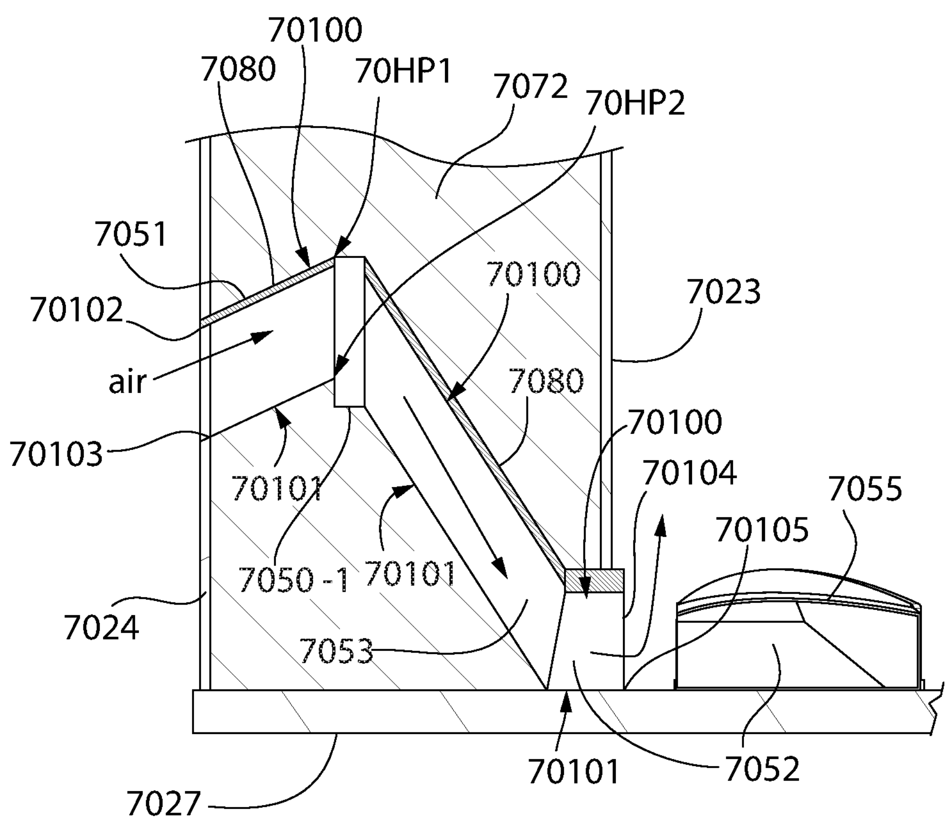
FIG. 75 is an enlarged detail taken from FIG. 73.
Figure 76:
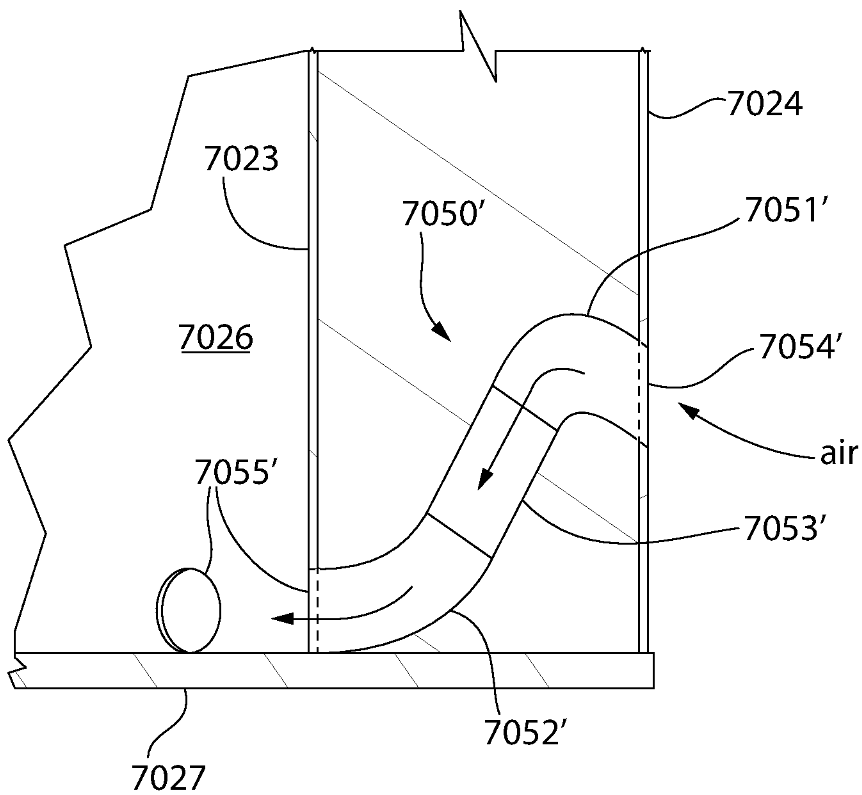
FIG. 76 is a side view of a first alternative air inlet duct construction utilizing circular cross section flow conduits.
Figure 77:
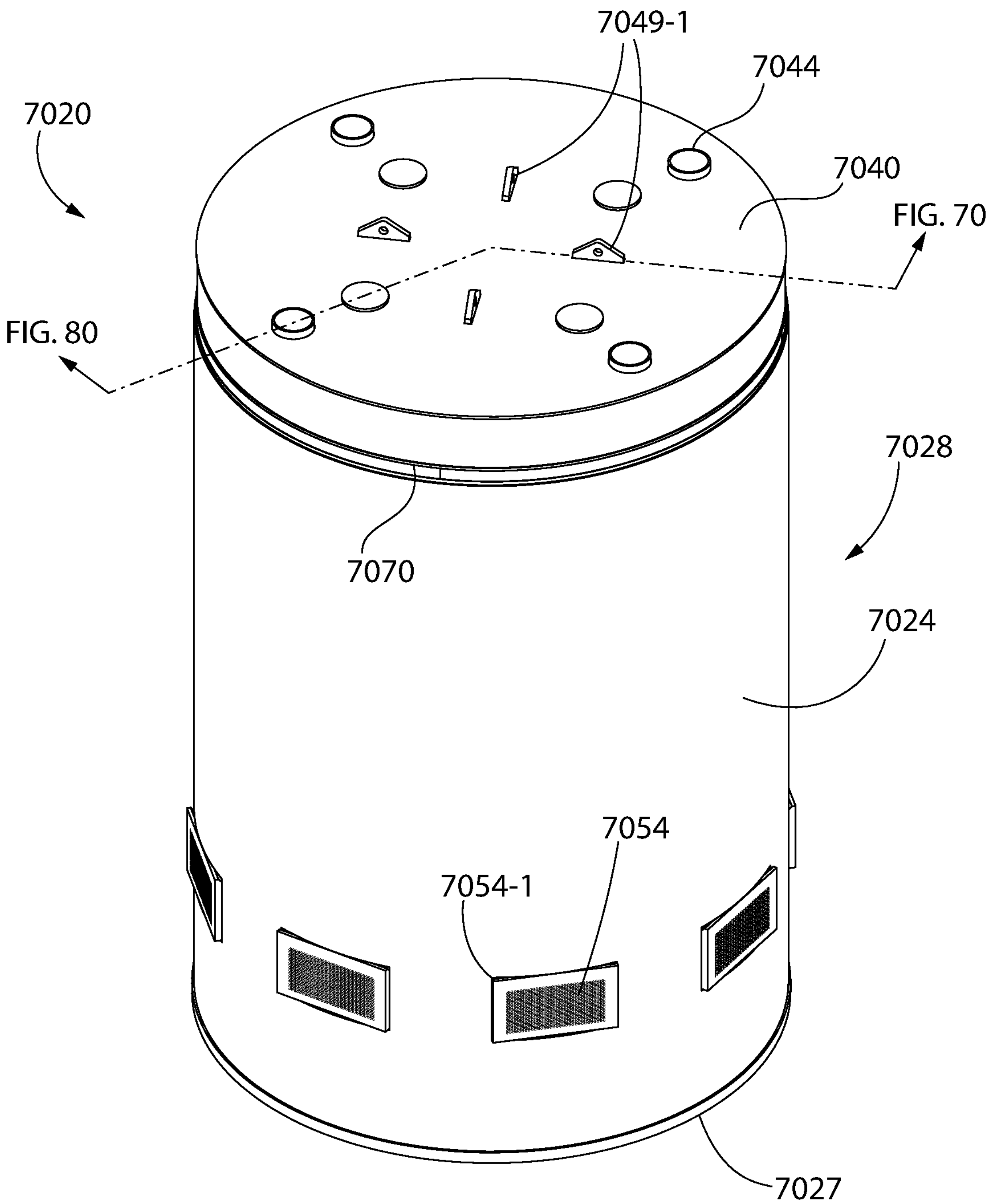
FIG. 77 is a perspective view of the ventilated module of FIG. 71 having a second alternative air inlet duct construction and layout.
Figure 78:
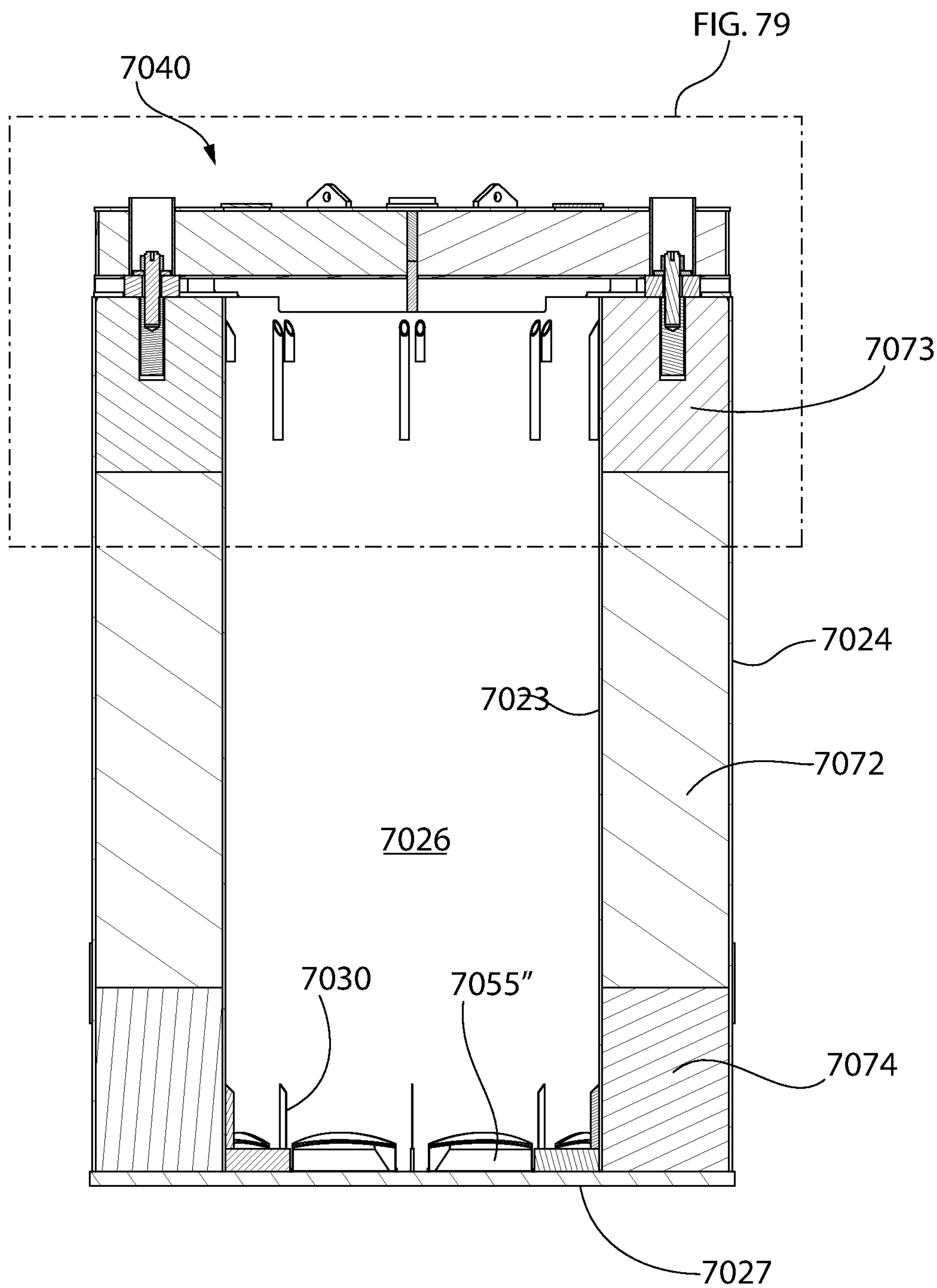
FIG. 78 is a first side cross-sectional view thereof.
Figure 79:
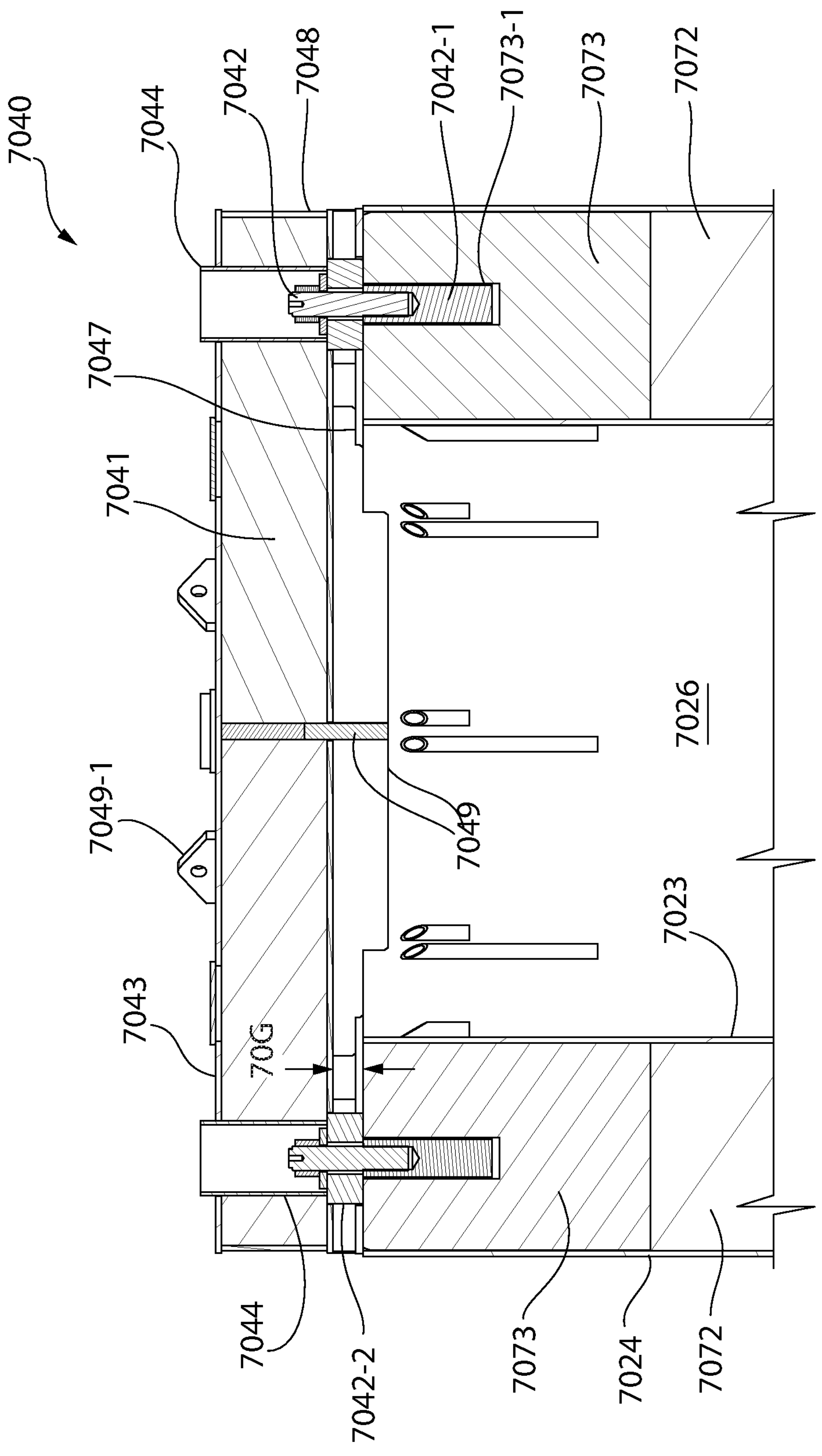
FIG. 79 is an enlarged detail taken from FIG. 78.
Figure 80:
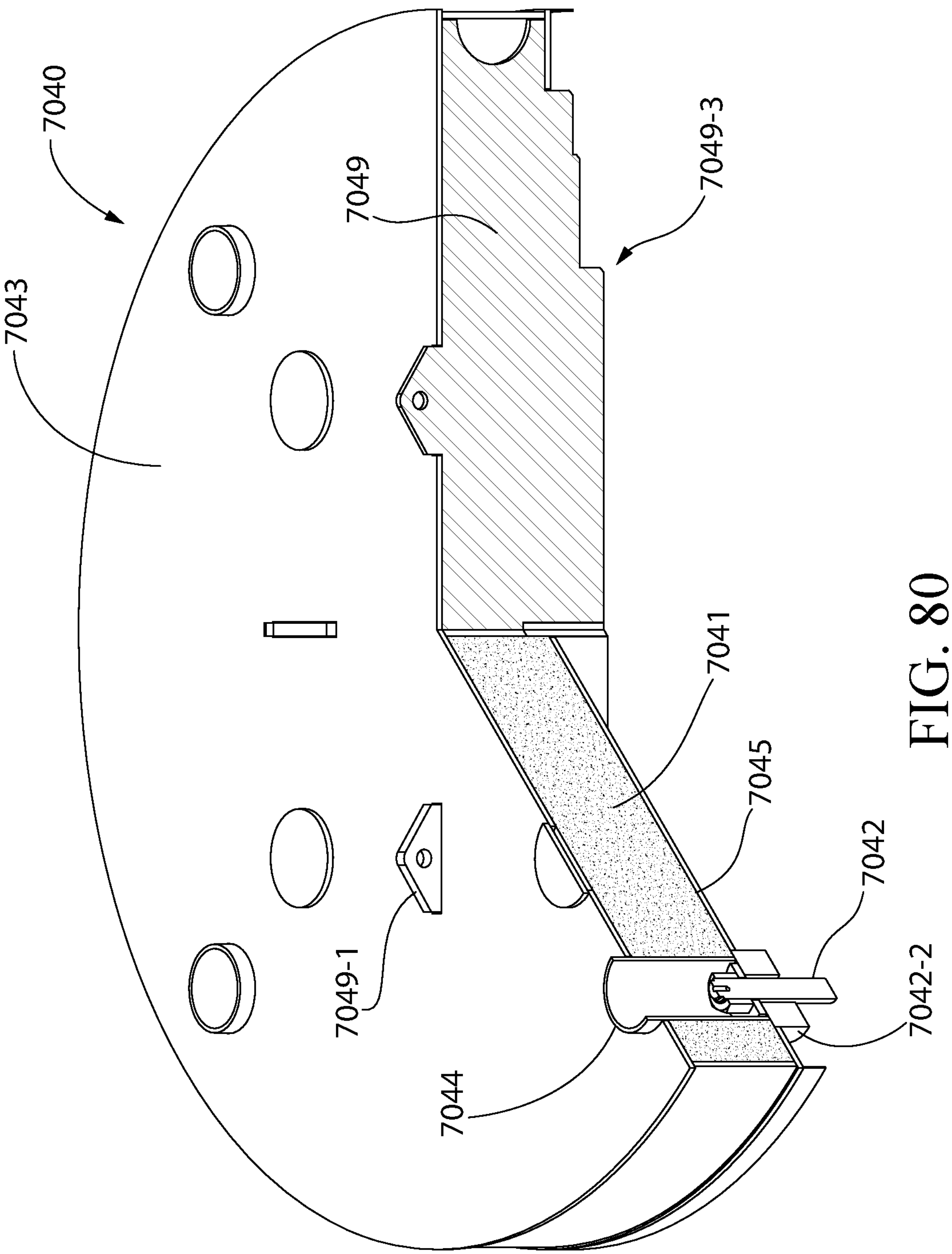
FIG. 80 is a perspective cross-sectional view of the lid of the module of FIGS. 71 and 77.
Figure 81:
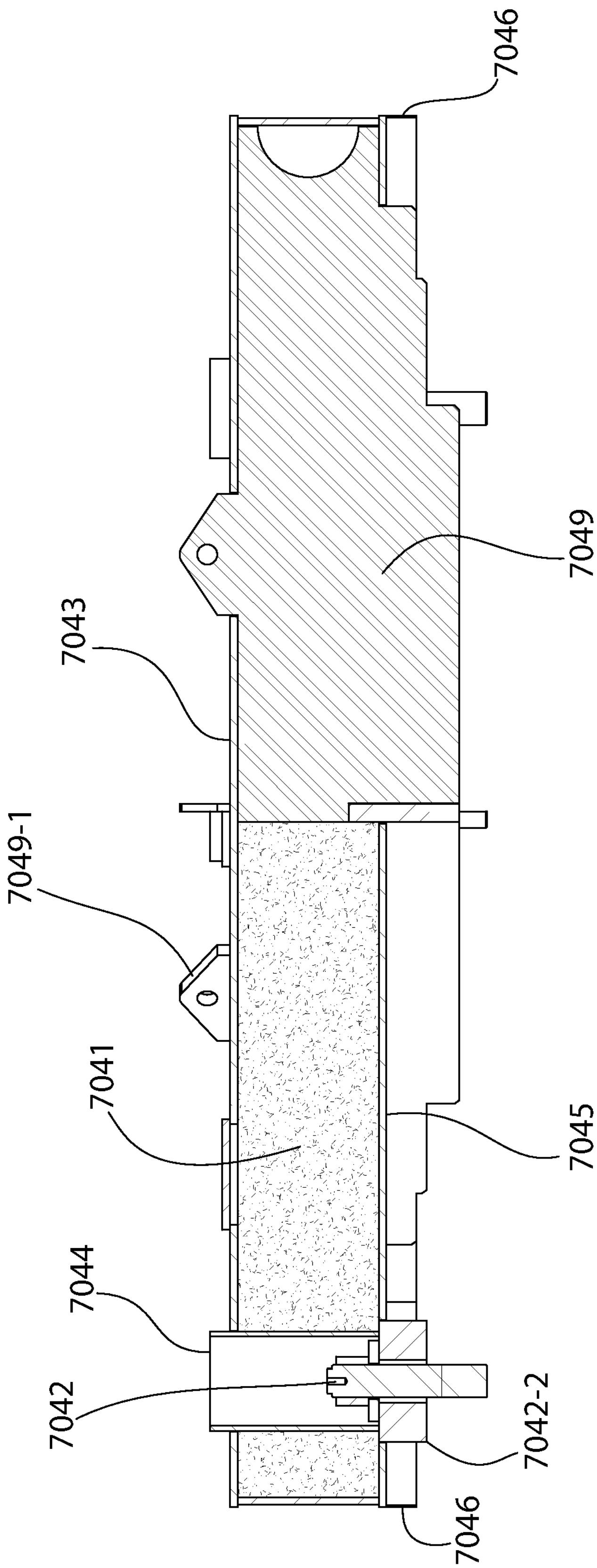
FIG. 81 is the side cross-sectional view thereof.
Figure 82:
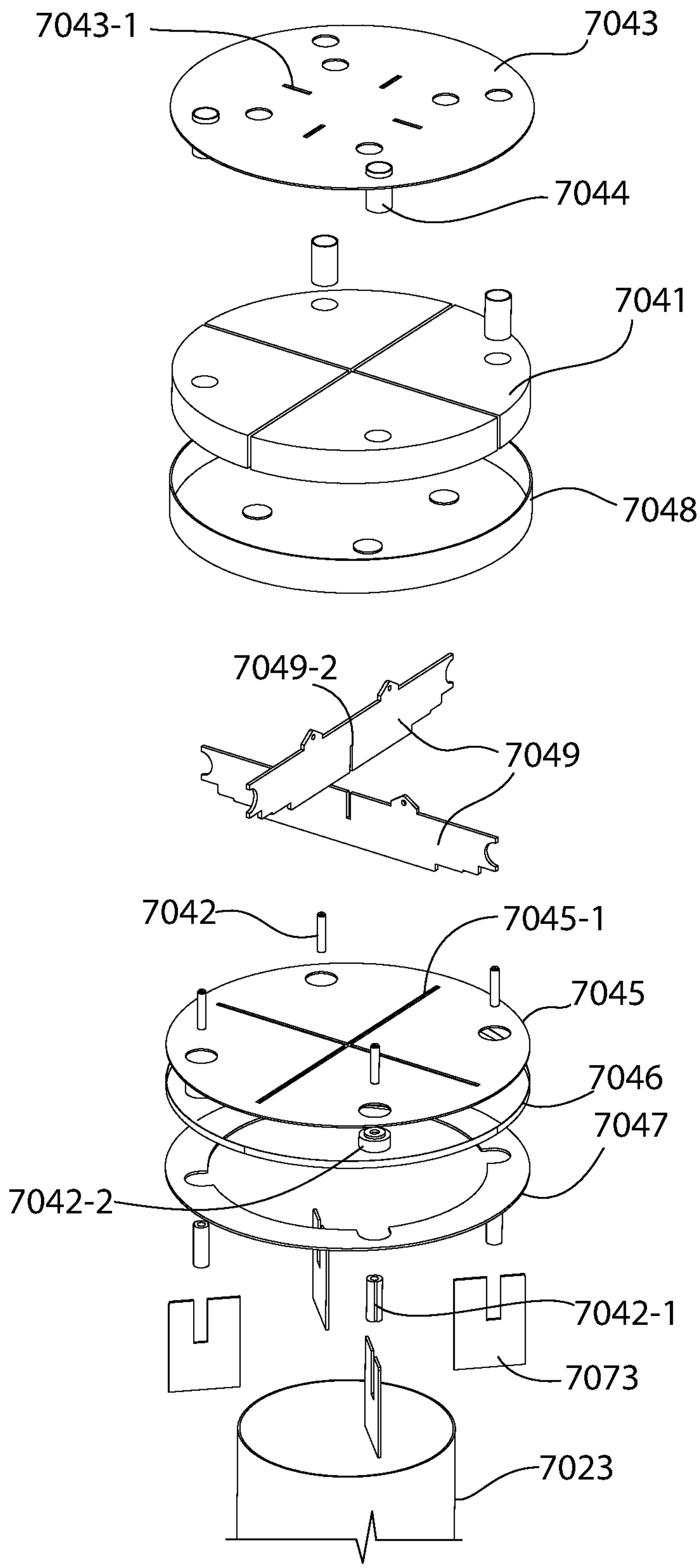
FIG. 82 is an exploded perspective view of the top closure lid assembly of the modules of FIGS. 71 and 77.
Figure 83:
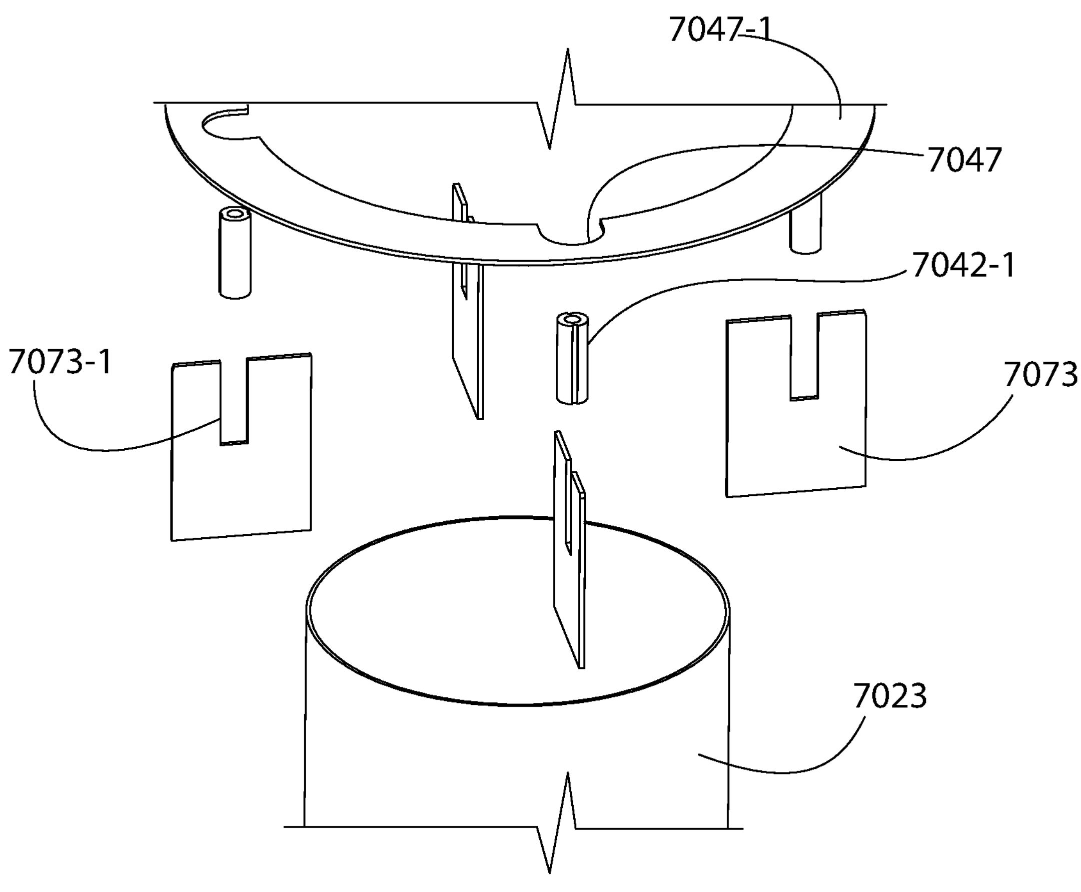
FIG. 83 is an enlarged detail taken from FIG. 82.
Figure 84:
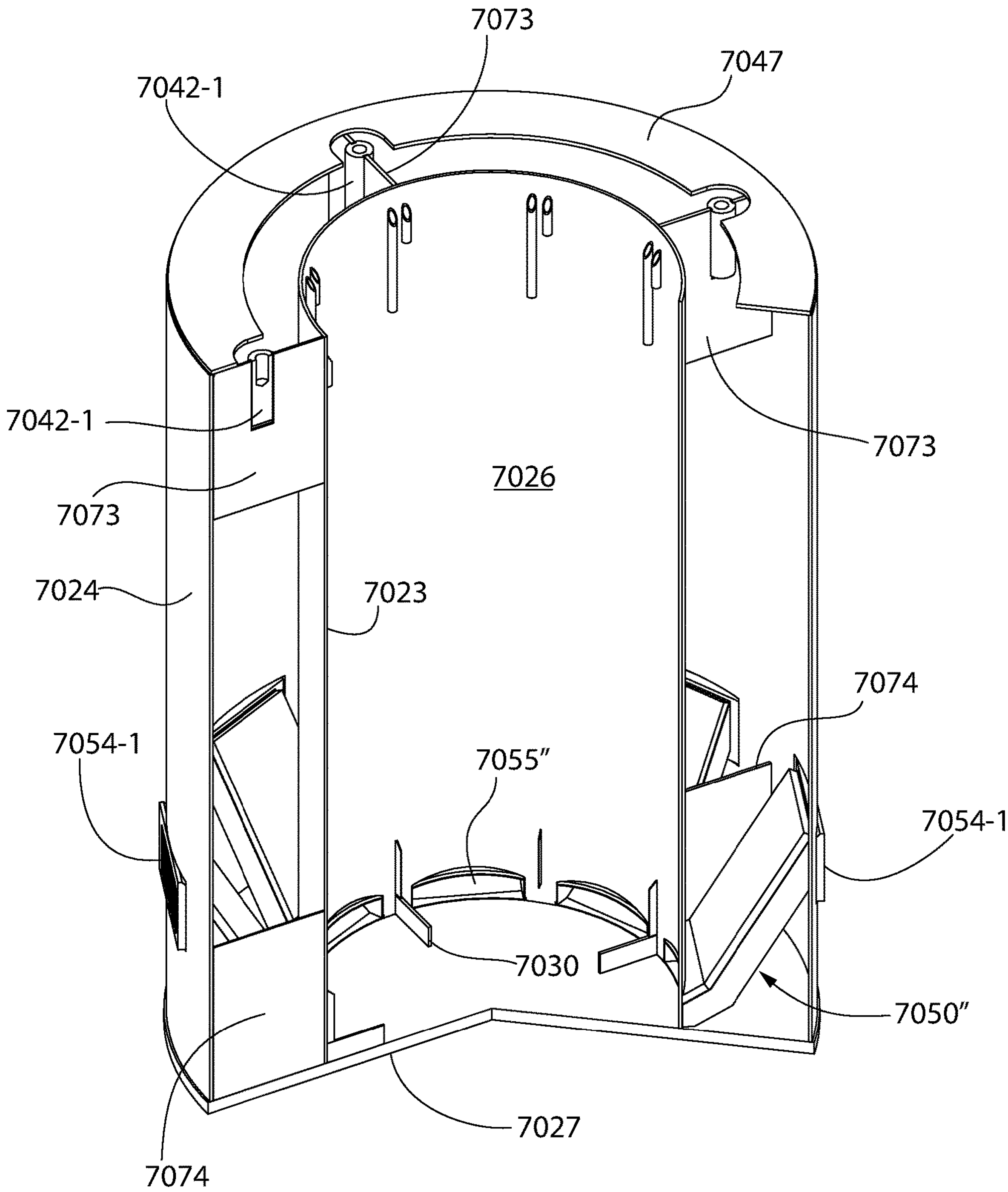
FIG. 84 is a perspective cross sectional view of the module of FIG. 77.
Figure 85:
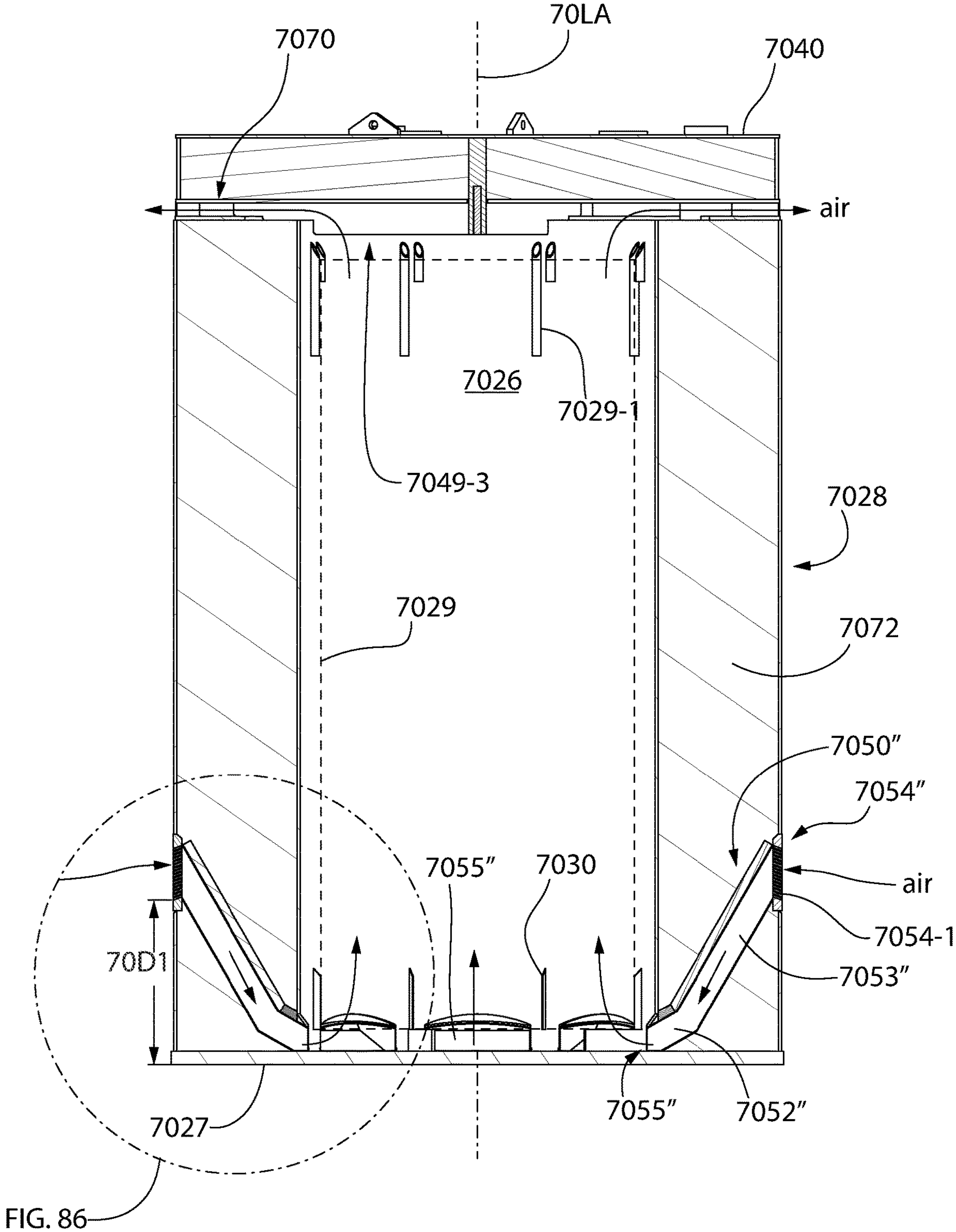
FIG. 85 is a side cross sectional view thereof showing the cooling air inlet and outlet ducts.
Figure 86:
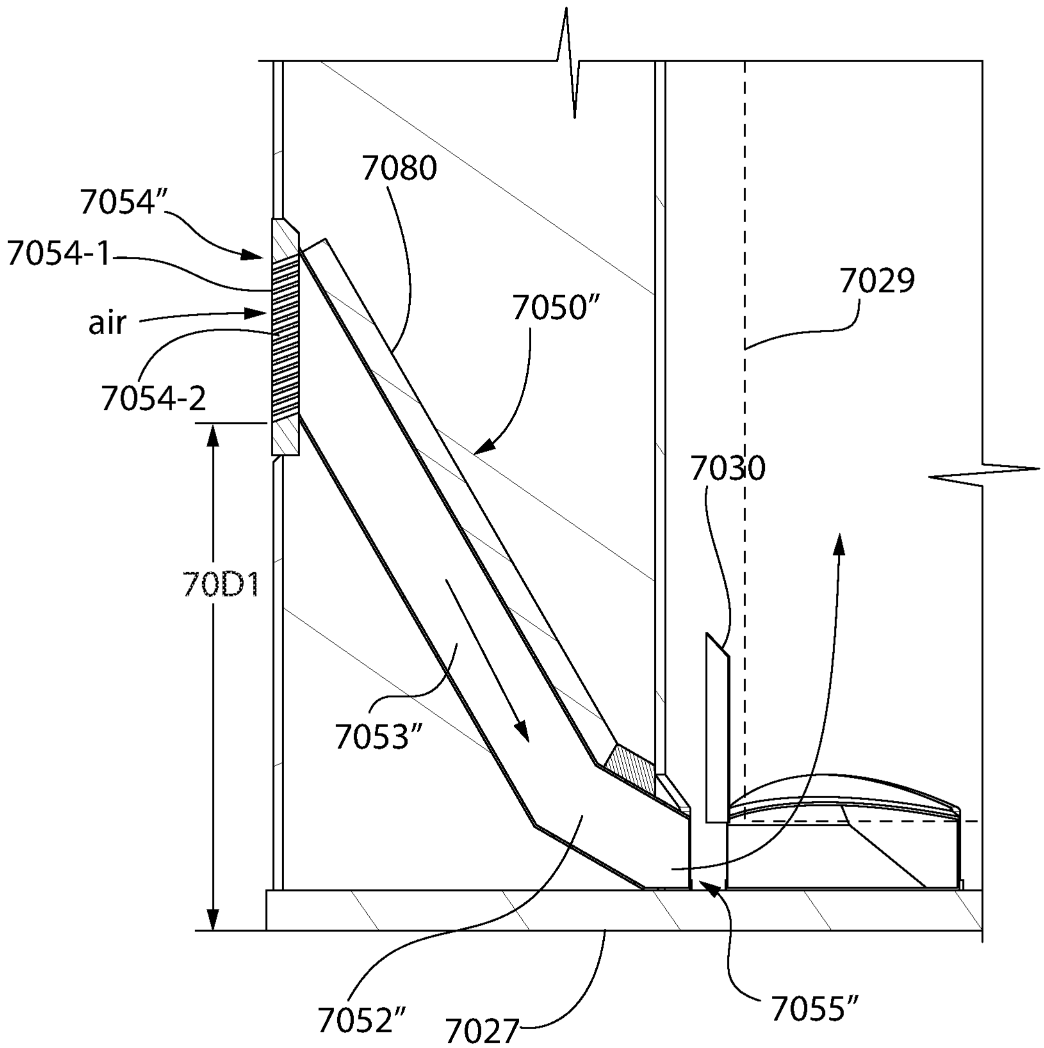
FIG. 86 is an enlarged detail taken form FIG. 85.
Figure 87:
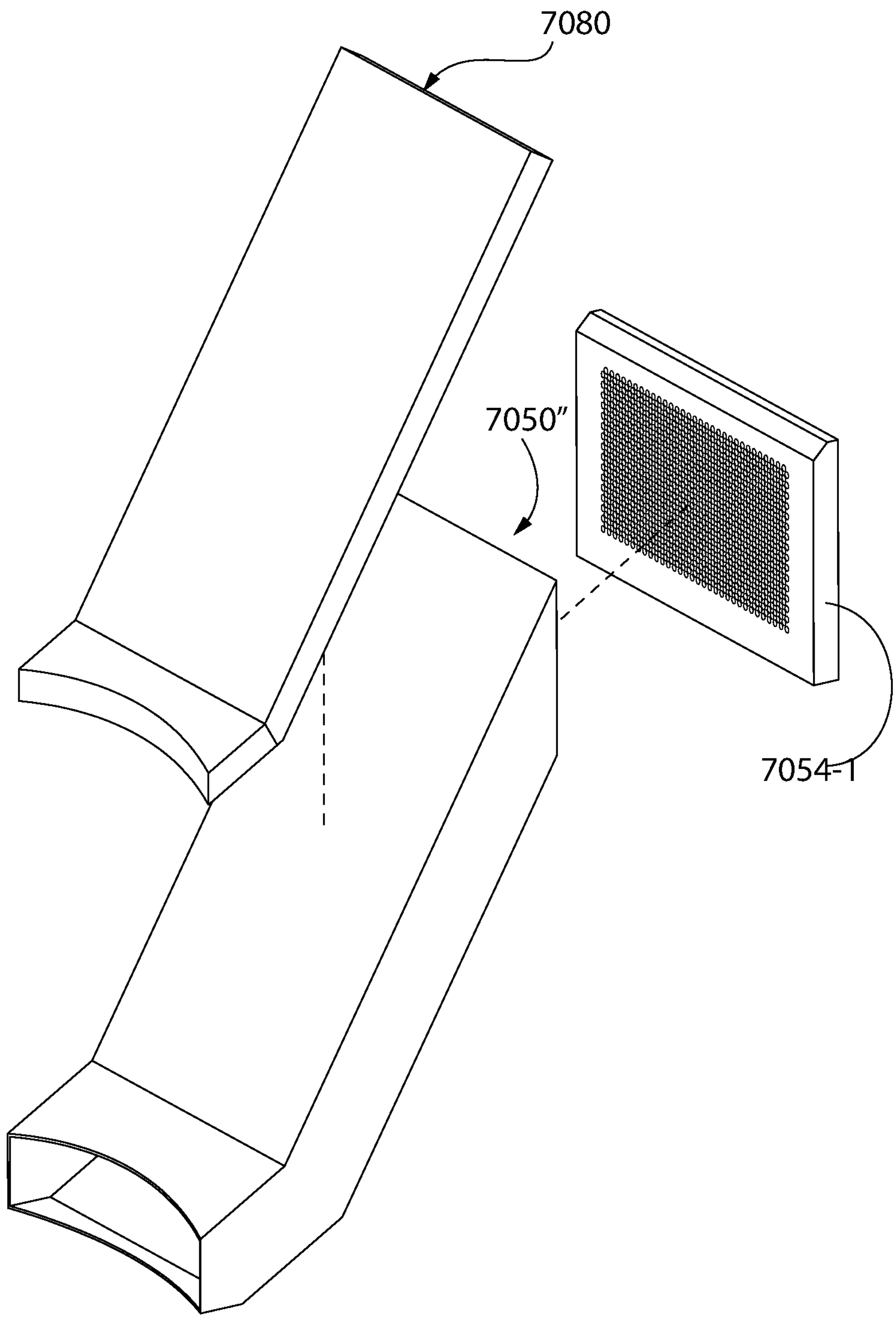
FIG. 87 is an exploded view of one cooling air inlet duct assembly components thereof.

Referring to FIGS. 73-75, the air inlet ducts 7050 in one non-limiting embodiment includes an inlet section 7051 adjacent to the inlet end opening 7054, an outlet section 7052 adjacent the outlet end opening 7055, and an intermediate section 7053 extending radially between the inlet and outlet sections. In one embodiment, the air inlet ducts 7050 may have a rectilinear transverse cross-sectional configuration such as rectangular (best shown in FIG. 74). Ducts 7050 may be horizontally elongated having a greater width than height to produce a slim profile. Each duct 7050 includes a roof wall 70100, opposing floor wall 70101, and pair of lateral sidewalls 70106 extending therebetween. Each wall or sidewall is perpendicularly oriented to its adjoining walls or sidewalls. Ducts 7050 may be embedded in the concrete liner 7072 of the sidewall 7077 of the module body. In fabrication, the inlet end opening 7055 of each duct 7050 is seal welded to the outer shell 7024 and the outlet end opening 7054 is seal welded to the inner shell 7023 of the module. This not only seals the ducts to shell interfaces, but also supports the ducts 7050 in position until the concrete liner is poured around the ducts to complete the embedment.

The inlet section 7051 of duct 7050 penetrates the module outer shell 7024 to form the flow inlet end opening 7054. Inlet section 7051 may be obliquely angled upwards relative to the longitudinal axis 70LA of the module and baseplate 7027 such that the innermost end of inlet section 7051 at the joint to intermediate section 7053 of duct 7050 is higher than its outermost end. This defines the highest point 70HP1 of the roof wall 70100 of the air inlet duct 7050, which preferably is higher in elevation than the top 70102 of the inlet end opening 7054. Such an arrangement advantageously resists the ingress of rainwater into the duct 7050 from the ambient environment. To prevent choking off the cooling air flow through the duct 7050 to the canister in cavity 7026 of the module 7020 as the surround water level rises during a flood event, the highest point 70HP2 of the floor wall 70101 of duct 7050 preferably is lower in elevation than the top 70102 of the air inlet end opening 7054. This maintains a flowpath for the cooling air to flow through the air inlet duct 7050 to the canister in the module to continue air cooling until the water level rises above the top end 70102 of the inlet air opening 7054. In that case, water will enter the duct 7050 and module cavity 7026 to water cool the canister and prevent overheating and degradation of the SNF stored inside and its fuel shielding.

Intermediate section 7053 of the cooling air inlet duct 7050 may be obliquely angled downwards relative to the longitudinal axis 70LA such that the innermost end of intermediate section 7053 is lower than its outermost end adjoining the inlet section of the duct 7050 at the joint. The intermediate section may be longer in length than the inlet and/or outlet sections 7051, 7052. The upwardly angled inlet section 7051 advantageously prevents ingress of rainwater into the inlet duct 7050. Outlet section 7052 may be horizontal and perpendicularly oriented relative to longitudinal axis 70LA in one embodiment as illustrated. The outlet section 7052 penetrates the module inner shell 7023 to form a flow outlet opening. Obliquely angled joints 7050-1 may be formed between the duct sections 7051, 7052, and 7053 as shown. In some possible constructions, the outlet section may be omitted and the intermediate section 7053 may be directly seal welded to and penetrates the inner shell 7023 of module 7020 to form the outlet opening.

To prevent standing water or particularly floodwater from entering the cooling air inlet ducts 7050 at flood prone nuclear fuel storage sites, the inlet end openings 7054 of the ducts in the outer shell 7024 are preferably spaced by a sufficient preselected vertical distance 70D1 above the bottom of the baseplate 7027 which rests on the concrete support pad 70CP. Distance 70D1 is measured to the bottom 70103 of inlet end openings 7051 of air inlet ducts 7050 from the bottom of the baseplate 7027 (see, e.g. FIG. 73). Some representative non-limiting examples of a minimum value of 70D1 is at least 1 foot, and preferably at least 3 feet in some flood resistant embodiments. Distance 70D1 may be selected and adjusted as needed based on the prevailing or historic flood levels anticipated at the nuclear fuel storage site.

In one embodiment, the inlet end openings 7054 of the cooling air inlet ducts 7050 are located at a higher elevation than the outlet end openings 7055. The inlet end openings are located on a lower half or portion of the module below the module vertical midline ML defined at half a height of the module (measured from top end 7021 to bottom of the baseplate 7027 integrally attached to the bottom end 7022 of the shells 7023, 7024). In one embodiment, the inlet end openings 7054 are located on the lower portion of the module at 7025 percent or less than the height of the module below the midline ML. The air inlet ducts 7050 are configured to draw cooling air radially inwards into each duct through the inlet end openings 7054 and direct the cooling air then downwards in the air inlet duct to its respective outlet end opening 7055 and into cavity 7026. Cooling air is therefore radially discharged into the internal cavity of the module from the outlet end openings of each air inlet duct 7050. It bears noting that the inlet end openings 7054 of the air inlet ducts are radially open directly to ambient atmosphere without any additional extension piping or ducting which adversely increases resistance to flow and decreases the cooling air flow into the module cavity 7026.

In one embodiment, the inlet end openings 7054 of the air inlet ducts 7050 may have a vertically staggered arrangement in which the elevation of the inlet end of each inlet air duct is at a different elevation and distance 70D1 above concrete support pad 70CP than the inlets end of each adjacent inlet air duct on either side as shown. This staggered arrangement advantageously prevents each inlet duct 7050 from drawing ambient cooling air from the same elevation to maximize cooling effectiveness and eliminate potential temperature stratification of available cooling air surrounding the storage module 7020. It bears noting that the lowest inlet end openings 7054 of the air inlet ducts 7050 in the staggered arrangement if used may meet the foregoing elevation criteria previously described herein for placement in accordance with vertical spacing distance 70D1 above the baseplate 7027 and concrete support pad 70CP to prevent the ingress of standing water or floodwater. In other possible embodiments shown in FIGS. 77 and 82, however, the inlet end openings 7054 of the air inlet ducts may be at the same elevation and spacing 70D1 above the concrete support pad 70CP.

The outlet end openings 7055 of the cooling air inlet ducts 7050 are preferably located in the inner shell 7023 adjacent to the top surface 7027-1 of baseplate 7027. This introduces cooling air radially into the lowermost part of the module cavity 7026 and ventilation annulus 7031 to maximize cooling efficiency and heat removal from the canister 7029.

In one non-limiting embodiment as illustrated, the air inlet ducts 7050 may have a mitered construction formed of sections of ducting seal welded together at joints formed between the inlet, outlet, and intermediate sections 7051-7053 of the ducts. The ducts may be formed a suitable metal such as steel (e.g. carbon or stainless) in one embodiment. The inlet ducts 7050 emulate the shape of a periscope with the angles of the mitered sections selected as needed for installation and neutron streaming blocking.

It bears noting that the seal welding mentioned herein refers to continuous welds that form hermetically sealed joints that are water and gas/air tight.

The welded mitered joints of the mitered duct 7050 allows radiation attenuation shields 7050-1 to be placed transversely in the ducts to the air flow direction at the joints to enhance neutron streaming blocking (see, e.g. FIGS. 73 and 75). In one embodiment, perforated steel plates 7056 may be used for shields 7050-1 at least at the mitered joint between the inlet and intermediate sections 7051, 7053 of each mitered joint. In other embodiments, a shield 7050-1 may be also be disposed at the joint between the intermediate and outlet sections 7053, 7052 of the ducts 7050 (e.g. two total at the joints between the intermediate section 7053 and adjoining inlet and outlet sections 7051, 7052). The perforations allow cooling air to flow through neutron blocking plates, but reduces neutron streaming. In other embodiments, external radiation shields 7080 may also be attached to the exterior of the inlet air ducts 7050 (see, e.g. FIG. 75) which are further described herein.

In other constructions contemplated, the inlet ducts 7050 may have the same design described above but can be formed by a single monolithic unitary tube of rectilinear cross-sectional shape hot bent to shape with curvilinear bends formed between the intermediate section 7053 and adjoining inlet and outlet sections 7051, 7052. In such a case only the inlet and outlet end openings 7054, 7055 of each duct 7050 is seal welded to the outer and inner shells 7024, 7023, respectively. In such a construction, the external radiation attenuation shields 7080 may be used with the ducts.

FIGS. 84-87 depict an alternative configuration of a mitered and welded cooling air inlet duct 7050". In this embodiment, the upwardly angled inlet section 7051 described above is eliminated. Air inlet duct 7050" includes obliquely/downwardly angled intermediate section 7053" and obliquely/downwardly angled outlet section 7052". Outlet section 7052" is oriented at a different oblique angle to longitudinal axis 70LA and baseplate 7027 of module 7020 than intermediate section 7053". As one non-limiting illustrative example, outlet section 7052" may be disposed at an oblique angle of about 30 degrees to the horizontal baseplate 7027 and intermediate section 7053" may be oriented at an oblique angle of 45 degrees or greater, such as about 70 degrees in one configuration. Other oblique angles may be sued. Because previous inlet section 7051 shown in FIGS. 73 and 75 previously described herein is eliminated, intermediate section 7053" may be considered to serve as the inlet section of the alternative duct 7050". The outer end of intermediate duct section 7053" defines the exterior inlet end opening 7054" and the inner end of outlet duct section 7052" defines the interior outlet end openings 7055" of the duct. Duct 7050" may similarly be formed of steel or another metal.

Both mitered inlet air ducts 7050" (FIGS. 84-87) and 7050 (see, e.g. FIG. 73) may further each include a radiation attenuation shield 7080 which is attached to the exterior of each of the ducts, such as via welding, fasteners, or other methods. The shield members may be attached to the top surface of the roof wall of the ducts in one embodiment as illustrated. Radiation shields 7080 are complementary configured to ducts 7050/7050" and include two obliquely orientated sections as shown to match the angled sections of the mitered ducts. The shields 7080 have a multi-angled plate-like body which extends radially through module sidewall 7077 from proximate to the outer shell 7024 adjacent to inlet vent shield covers 7054-1 to the inner shell 7023 thereby shielding and covering substantially the entirety of the top of each inlet duct 7050/7050". The shields may have a lateral width approximately as wide as the ducts 7050/7050" and length substantially coextensive with the radial length of the ducts. In one embodiment, shields 7080 may be formed of steel plate; however other metallic materials including boron-containing materials may be used.

The inlet end openings 7054" of each mitered duct 7050" or 7050 may be fitted with a perforated radiation attenuating inlet vent shield cover 7054-1 which is attached to the outer shell 7024 of module 7020 at each air inlet opening. Welding or fasteners may be used to secure the covers to the shell 7024. The shield covers 7054-1 have a configuration and sufficient thickness to a serve as both effective attenuation of radiation emitted through the ducts and to minimize the ingress of ambient rainwater while allowing cooling air to enter the ducts. Each cover 7054-1 is thus a relatively thick structure in one (e.g. about 2 inches thick) which includes a plurality of through bores or perforations 7054-2. In one embodiment, the covers 7054-1 may be made of steel; however, other metallic materials including those containing boron may be used. The perforations are obliquely angled in orientation relative to longitudinal axis 70LA of module 7020 such that their outer ends are lower than their inner ends to preclude the entrance of rain and to eliminate any straight line of sight through the perforations from end to end to prevent neutron streaming.

In yet other possible constructions, alternative cooling air inlet ducts 7050' shown in FIG. 7076 may be provided which are formed instead of circular flow conduits. Alternative circular ducts 7050' may be formed from standardly available sections of metal piping (e.g. steel) of circular cross section which are seal welded together to emulate the same general periscopic shape as inlet air ducts 7050 previously described herein. For example, inlet section 7051' may be formed by a 60 degree long radius elbow, outlet section 7052' may be formed by a 45 degree long radius elbow, and intermediate section 7053' be formed by a straight pipe section. The same angular orientations of these different sections may be the same as their counterparts in rectilinear air inlet duct 7050 previously described herein. In some variations, the piping air inlet duct 7050' may be formed from three straight sections of circular piping which are cut to form miter joints between the different sections 7051', 7052', and 7053'. In yet another variation, the piping air inlet duct 7050' may instead be formed by a single monolithic unitary section of piping of circular cross-sectional shape hot bent to shape with curvilinear bends between the intermediate section 7053' and adjoining inlet and outlet sections 7051', 7052'. The arrangement of any of the foregoing piping structures in relation to the lower section of storage module 7020 may be the same as rectilinear air inlet duct 7050 previously described herein (see, e.g. FIG. 73). Accordingly, the air inlet and outlet end openings 7054', 7055' of the duct 7050' may be at identical locations to the inlet and outlet end openings of the rectilinear air inlet duct 7050.

In operation, ambient cooling flows generally inwards 360 degrees around module 7020 in all directions into the inlet ducts. The cooling air then flows in a generally downward direction in each air inlet duct 7050 traversing the full radial extent or thickness of the cask's sidewall 7077 before entering module cavity 7026 near the bottom of the ventilation annulus 7031. Thus, while the cooing air enters the module 7020 well above its bottom to prevent the ingress of floodwater via the outer inlet end openings 7054 of the inlet ducts 7050 through the outer shell 7024, the full benefit of the maximum vertical distance available within the cavity 7026 between the top and bottom vents for cooling the nuclear fuel-bearing canister 7029 is advantageously maintained. After the cooling air enters the bottom of the ventilation annulus 7031 inside module 7020, the air is heated by the canister 7029 and flows vertically upwards in the annulus from the air inlet ducts 7050 to the air outlet ducts 7070 at the top of cavity 7026. The heated cooling air is then discharge radially outwards from the module 7020 in all directions 360 degrees around the module.

It bears noting that an advantageous aspect of any of the foregoing inlet air ducts having a majority of their radial length obliquely angled in a downward direction toward the cavity 7026 of the storage module 7020 will act to drain any water or rain entering module into the bottom of the cavity. At this location in the cavity, the water will be exposed to the heat emitted from the canister and evaporated. The present obliquely angled duct arrangements thus effectively eliminate any horizontal portions of ducting of any substantially length where water might accumulate and accelerate corrosion of the ducting.

According to another aspect of the invention, the inner and outer shells 7023, 7024 of the main body of the module 7020 may be structurally tied and joined together via a pair of welded rigid radial shell interconnector plates 7073, 7074. Upper interconnector plates 7073 are located at the top end 7021 of the module. Lower interconnector plates 7074 are located at the bottom end 7022 of the module. The two interconnector plates in turn are spaced vertically apart from each other as shown. The interconnector plates 7073, 7074 extend radially from the inner shell 7023 to the outer shell 7024 of module 7020 and are welded at each of their ends to each shell. Each interconnector plate 7073, 7074 has opposing inner and outer vertical edges welded to the inner and outer shells 7023, 7024, respectively. The interconnector plates 7073, 7074 each have a height less than the height of the module, and preferably less than half the height of the module (see, e.g. FIGS. 73 and 78). In one embodiment, the radial interconnector plates may each have a flat, vertically oriented body which is perpendicularly and radially oriented relative to the inner and outer shells 7023, 7024. In other embodiments, the radial interconnector plates can be slightly oblique in angular orientation to the shells if desired. Four interconnector plates 7073, 7074 evenly spaced circumferentially apart may be provided in one embodiment as shown; however, other embodiments may have more or less plates. The interconnector plates 7073, 7074 may be formed of steel (e.g. carbon or stainless) in one embodiment. A representative thickness of plates 7073, 7074 is about 1 inch in one non-limiting embodiment.

The upper interconnector plates 7073 serve dual important functions. First, similarly to lower interconnector plates 7074, the upper interconnector plates 7073 rigidly reinforce the module structure. Secondly, the upper interconnector plates further function as the lifting points for the module to transfer the weight of the entire module (with SNF canister inside) to the closure fasteners 7042 and lifting beams 7049 in the lid 7040 to the crane or hoist. The dead load of the module is thus transferred through the skeleton of the module 7020 formed by the weldment of the metallic inner and outer shells 7023, 7024, lower interconnectors 7074, and baseplate 7027 to the upper interconnector plates 7073 where it is picked up by the bolting.

The combination of the weld joined shells 7023, 7024, interconnector plates 7073, 7074 and a thick rigid baseplate 7027 provide a strong rigid structural weldment which support as dense a concrete fill or liner 7072 (serving as radiation shielding material) in the sidewall 7077 of module 7020 particularly when lifted as a unit. Concrete fill weighing as much as 250 pcf (pounds per cubic foot) density are typically employed to maximize blockage of radiation. This rigid structural shell assembly ensures that the base plate 7027 which bears the entire dead load of the concrete liner, shells, and lid 7040 does not deform when lifted off the concrete support pad 70CP by a hoist or crawler crane.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A separable multi-component cask for spent nuclear fuel transport and storage comprising:

a vertical longitudinal axis;

a vertically elongated first body having a neutron radiation shielding composition, the first body defining a first cavity extending along the longitudinal axis;

a vertically elongated second body having a gamma radiation blocking composition, the second body defining a second cavity extending along the longitudinal axis and configured to hold a spent nuclear fuel canister;

the second body detachably mounted inside the first cavity of the first body; and an air ventilation annulus formed between the first and second bodies, the air ventilation annulus defining a heat removal passage to remove heat emitted by the canister when placed inside the second body;

wherein the neutron radiation shield composition of the first body comprises a solid boron-containing material.

2. The cask according to claim 1, wherein the second body has a higher thermal conductivity than the first body.

3. The cask according to claim 1, wherein the second body includes a bottom lid attached to a bottom end of the second body, and a radially protruding top mounting flange extending circumferentially around a top end of the second body.

4. The cask according to claim 3, wherein the top mounting flange is received at least partially with an upwardly open annular recess formed in a top end of the first body.

5. The cask according to claim 4, wherein the annular recess is formed by an angle ring having an L-shaped cross section.

6. The cask according to claim 4, wherein the annular recess comprises a plurality of raised spacer blocks, the top mounting flange of the second cylinder being seated on the spacer blocks to form a plurality of upper air outlet openings between the top flange and the first body within the recess which is in fluid communication with the air ventilation annulus between the first and second bodies.

7. The cask according to claim 6, wherein the top mounting flange is coupled directly to the spacer blocks by threaded fasteners.

8. The cask according to claim 3, wherein the first body includes a castellated top end, the top mounting flange of the second body being supported on the castellated top end forming a plurality of upper air openings in fluid communication with the air ventilation annulus.

9. The cask according to claim 3, wherein the second body comprises a composite wall construction including a cylindrical inner shell and a cylindrical outer shell with a gamma blocking liner sandwiched therebetween.

10. The cask according to claim 9, further comprising an annular bottom closure ring disposed on bottom ends of the inner and outer shells.

11. The cask according to claim 10, further comprising a resiliently compressible annular gasket compressed at an interface between the bottom lid and the bottom closure ring which forms a seal that seals the second cavity of the second body at a bottom of the second cavity.

12. The cask according to claim 11, wherein seal is formed of an elastomeric material or rubber.

13. The cask according to claim 10, wherein the bottom closure ring is coupled to the bottom lid by a plurality of threaded fasteners.

14. The cask according to claim 1, wherein the first and second bodies each have a cylindrical configuration.

15. The cask according to claim 1, wherein the second body comprises a plurality of lifting lug assemblies configured so that when the second body is detachably mounted inside the first body, the entire cask is liftable or lowerable via the lifting lug assemblies.

16. The cask according to claim 1, further comprising the spent nuclear fuel canister disposed in the second cavity of the second body, and an open vertically-extending cooling air ventilation annulus formed by a gap between the spent nuclear fuel canister and the second body.

17. The cask according to claim 16, further comprising a bottom lid coupled to a bottom end of the second body, and a plurality of air inlet holes extending through the bottom lid which provide a passage configured for introducing ambient cooling ventilation into the cooling air ventilation annulus.

18. A separable multi-component cask for spent nuclear fuel transport and storage comprising:

a vertical longitudinal axis;

a vertically elongated first body comprising a solid neutron radiation shielding composition containing boron, the first body defining a first cavity extending along the longitudinal axis;

a vertically elongated second body having a gamma radiation blocking composition, the second body defining a second cavity extending along the longitudinal axis and configured to hold a spent nuclear fuel canister; and the second body detachably mounted inside the first cavity of the first body;

an air ventilation annulus formed between the first and second bodies, the air ventilation annulus defining a heat removal passage to remove heat emitted by the canister when placed inside the second body; and the first body and the second body each comprising a top mounting flange;

wherein the top mounting flange of the second body is detachably coupled to the top mounting flange of the first body by a plurality of threaded fasteners.

19. The cask according to claim 18, further comprising a plurality of lifting lug assemblies coupled to the top mounting flange of the second body, the lifting lug assemblies being configured so that the entire cask is liftable or lower able via the lifting lug assemblies.

* * * * *